(12) United States Patent
Diallo et al.

(10) Patent No.: US 9,302,922 B2
(45) Date of Patent: Apr. 5, 2016

(54) FILTRATION MEMBRANES AND RELATED COMPOSITIONS, METHODS AND SYSTEMS

(71) Applicants: CALIFORNIA INSTITUTE OF TECHNOLOGY, Pasadena, CA (US); KOREA ADVANCED INSTITUTE OF SCIENCE AND TECHNOLOGY, Daejeon (KR)

(72) Inventors: Mamadou S. Diallo, Pasadena, CA (US); Madhusudhana Rao Kotte, South Korea (KR)

(73) Assignees: CALIFORNIA INSTITUTE OF TECHNOLOGY, Pasadena, CA (US); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

(21) Appl. No.: 13/754,883

(22) Filed: Jan. 30, 2013

(65) Prior Publication Data

US 2013/0213881 A1    Aug. 22, 2013

Related U.S. Application Data

(60) Provisional application No. 61/592,409, filed on Jan. 30, 2012, provisional application No. 61/601,410, filed on Feb. 21, 2012, provisional application No. 61/711,021, filed on Oct. 8, 2012.

(51) Int. Cl.
C02F 1/44     (2006.01)
B01D 69/10    (2006.01)
(Continued)

(52) U.S. Cl.
CPC .............. *C02F 1/44* (2013.01); *B01D 67/0079* (2013.01); *B01D 69/10* (2013.01); *B01D 69/12* (2013.01);
(Continued)

(58) Field of Classification Search
CPC ...... B01D 69/10; B01D 69/12; B01D 69/141; B01D 69/142; B01D 69/144; B01D 69/145; B01D 69/147; B01D 69/148; B01D 67/0079; B01D 71/022; B01D 71/34; B01D 71/40; B01D 71/60; B01D 2323/39; C02F 1/44; C02F 1/441; C02F 1/444; C02F 2103/08; D01F 1/10
See application file for complete search history.

(56) References Cited

U.S. PATENT DOCUMENTS 3,210,299 A    10/1965  Hagge et al.
7,342,083 B2    3/2008  Chang et al.
(Continued)

FOREIGN PATENT DOCUMENTS

WO    2009045237     4/2009
WO    2009/141488    11/2009
(Continued)

OTHER PUBLICATIONS

Madani et al "Aureole nanofibers by electrospinning of PAMAM—PEO solution." Journal of Applied Polymer Science 113.5 (2009): 3005-3011.*

(Continued)

*Primary Examiner* — Lucas Stelling
(74) *Attorney, Agent, or Firm* — Steinfl & Bruno LLP

(57) ABSTRACT

Described herein are filtration membranes and related, compositions, methods and systems and in particular filtration membranes with polymeric micro/nanoparticles embedded in a polymer matrix formed by a porous polymeric aggregate, a bicomposite membrane including a plurality of nanofibers and/or microfibers attached to a polymer matrix formed by a porous polymeric aggregate comprising polymeric nanoparticles, and related compositions, methods, and systems.

12 Claims, 66 Drawing Sheets

(51) Int. Cl.
| | |
|---|---|
| B01D 69/12 | (2006.01) |
| B01D 69/14 | (2006.01) |
| B01D 71/34 | (2006.01) |
| B01D 71/40 | (2006.01) |
| B01D 71/60 | (2006.01) |
| D01F 1/10 | (2006.01) |
| B01D 67/00 | (2006.01) |
| C02F 103/08 | (2006.01) |
| B01D 71/02 | (2006.01) |

(52) U.S. Cl.
CPC .............. *B01D 69/141* (2013.01); *B01D 71/34* (2013.01); *D01F 1/10* (2013.01); *B01D 71/022* (2013.01); *B01D 71/40* (2013.01); *B01D 71/60* (2013.01); *B01D 2323/39* (2013.01); *C02F 1/441* (2013.01); *C02F 1/444* (2013.01); *C02F 2103/08* (2013.01)

(56) References Cited

U.S. PATENT DOCUMENTS

| | | | |
|---|---|---|---|
| 7,459,502 | B2 | 12/2008 | Connor et al. |
| 7,470,369 | B2 | 12/2008 | Diallo |
| 2002/0001571 | A1* | 1/2002 | Wu et al. ................. 424/61 |
| 2002/0155311 | A1* | 10/2002 | Mayes et al. ............ 428/522 |
| 2003/0022216 | A1 | 1/2003 | Mao et al. |
| 2006/0016685 | A1 | 1/2006 | Hawkins et al. |
| 2006/0021938 | A1 | 2/2006 | Diallo |
| 2007/0175766 | A1 | 8/2007 | Holmes et al. |
| 2008/0185341 | A1 | 8/2008 | Diallo |
| 2009/0001802 | A1 | 1/2009 | Diallo et al. |
| 2009/0068461 | A1 | 3/2009 | Reneker et al. |
| 2009/0181257 | A1 | 7/2009 | Grote |
| 2009/0223896 | A1 | 9/2009 | Diallo |
| 2010/0129258 | A1 | 5/2010 | Gil et al. |
| 2010/0181257 | A1* | 7/2010 | Frechet et al. ............ 210/683 |
| 2010/0224555 | A1 | 9/2010 | Hoek et al. |
| 2010/0323573 | A1 | 12/2010 | Chu et al. |
| 2010/0326278 | A1 | 12/2010 | Nakamura et al. |
| 2011/0027599 | A1* | 2/2011 | Hoek et al. ............. 428/476.3 |
| 2011/0174720 | A1 | 7/2011 | Chen et al. |
| 2011/0315636 | A1 | 12/2011 | Diallo et al. |
| 2012/0035332 | A1 | 2/2012 | Diallo et al. |
| 2012/0297976 | A1 | 11/2012 | Sano |
| 2013/0015122 | A1 | 1/2013 | Awadh |
| 2013/0112618 | A1 | 5/2013 | Diallo et al. |
| 2013/0213881 | A1 | 8/2013 | Diallo et al. |

FOREIGN PATENT DOCUMENTS

| | | |
|---|---|---|
| WO | 2009141488 | 11/2009 |
| WO | 2011099587 | 8/2011 |
| WO | 2013116408 | 8/2013 |

OTHER PUBLICATIONS

Chiang, Yen-Che, et al. "Nanofiltration membranes synthesized from hyperbranched polyethyleneimine." Journal of Membrane Science 326.1 (2009): 19-26.*
PCT International Search Report mailed on May 15, 2013 for PCT/US2013/023947 filed on Jan. 30, 2013 in the name of California Institute of Technology et al.
PCT Written Opinion mailed on May 15, 2013 for PCT/US2013/023947 filed on Jan. 30, 2013 in the name of California Institute of Technology et al.
Adhikari, B., et al., "Polymers in sensor applications", Progress in Polymer Science, 29 (2004), 699-766.
ASTM D2187-94(2009): Standard Test Methods for Physical and Chemical Properties of Particulate Ion-Exchange Resins, 2009, 20 pages.
Augustsson, C., et al., "NM Epoxy Handbook, 3$^{rd}$ Edition", 2004, Nils Malmgren Ab.
Ba C, Langer J, Economy J (2009) Chemical modification of P84 copolyimide membranes by polyethylenimine for nanofiltration. *J. Membr. Sci.* 327: 49-58.
Baker RW (2004) "Ultrafiltration" in *Membrane technology and applications*, 2nd edn. John Wiley & Sons Ltd., Chichester; pp. 237-274.
Barrett, E.P., et al., "The Determination of Pore Volume And Area Distributions in Porous Substances. I. Computations form Nitrogen Isotherms", Journal of the American Chemical Society, 1951, 73 (1), 373-380.
Bergbreiter, D. E., et al., "Hyperbranched Surface Graft Polymerizations" *Advances in Polymer Science.* 2006, 198, 1-49.
Bormashenko Ye, Pogreb R, Stanevsky O, Bormashenko Ed (2004) Vibrational spectrum of PVDF and its interpretation. *Polym. Test.*, 23: 791-796.
Bruening, M.L., et al., "Creation of Fuctional Membranes Using Polyelectrolyte Multilayers and Polymer Brushes", Langmuir, 2008, 24, 7663-7673.
Butterfield, D.A., et al., "Catalytic biofunctional membranes containing site-specifically immobilized enzyme arrays: a review", Journal of Membrane Science, 181 (2001), 29-37.
Cheng S, Oatley DL, Williams PM, Wright CJ (2011) Positively charged nanofiltration membranes: Review of current fabrication methods and introduction of a novel approach. *Adv. Colloid Interface Sci.* 164: 12-20.
Chiang Y-C, Hsub Y-Z, Ruaan R-C, Chuang C-J, Tung K-L (2009) Nanofiltration membranes synthesized from hyperbranched polyethyleneimine. *J. Membr. Sci.* 326: 19-26.
Childs, R.F., et al., "Nanofiltration using pore-filled membranes: effect of polyelectrolyte composition on performance", Separation and Purification Technology, 22-23, (2001), 507-517.
Choi H, Kwon Y, Jung Y, Hong S, Tak T (2012) Preparation and characterization of antifouling poly(vinylidene fluoride) blended membranes. *J. Appl. Polym. Sci.* 123: 286-291.
Decher, G. "Fuzzy nanoassemblies: Toward layered polymeric multicomposites" *Science*, 1997, 277, 1232-1237.
Deng, H., et al., "High flux positively charged nanofiltration membranes prepared by UV-initiated graft polymerization of methacrylatoethyl trimethyl ammonium chloride (DMC) onto polysulfone membranes", Journal of Membrane Science, 366 (2011), 363-372.
Deng, Hui-Yu, et al., "Polyelectrolyte membranes prepared by dynamic self-assembly of poly (4-styrenesulfonic acid-*co*-maleic acid) sodium salt (PSSMA) for nanofiltration (I)", Journal of Membrane Science, 323 (2008) 125-133.
Deon S, Escoda A, Fievet P (2011) A transport model considering charge adsorption inside pores to describe salts rejection by nanofiltration membranes. *Chem. Eng. Sci.* 66: 2823-2832.
Diallo, M.S., et al. "Dendrimer Enhanced Ultrafiltration. 1. Recovery of Cu(II) from Aqueous Solutions Using Gx-NH2 PAMAM Dendrimers with Ethylene Diamine Core" *Environmental Science and Technology.* 2005, 39 (5), 1366-1377.
Diallo, M. S., et al. "Dendritic anion hosts: perchlorate binding to G5-NH2 poly(propyleneimine) dendrimer in aqueous solutions" *Environ. Sci. Technol.* 2007, 41, pp. 6521-6527.
Diallo, M.S. et al., "Dendritic Chelating Agents 1. Cu(II) Binding to Ethylene Diamine Core Poly(amidoamine) Dendrimers in Aqueous Solutions" *Langmuir* 2004, 20 (7), 2640-2651.
Diallo, M.S. et al., "Dendritic Chelating Agents 2. U(VI) Binding to Poly(amidoamine) and Poly(propyleneimine) Dendrimers in Aqueous Solutions" *Environmental Science and Technology.* 2008, 42, 1572-1579.
Diallo, M.S., et al., "Nanotechnology Solutions for Improving Water. In Nanotechnology Applications for Clean Water" Savage, N. et al., Eds. William Andrew Applied Science Publishers. 2009, 585-587.
Diallo, M.S. "Water Treatment by Dendrimer-Enhanced Filtration: Principles and Applications" In *Nanotechnology Applications for Clean Water*. Diallo, M.S. et al., Eds. William Andrew Applied Science Publishers. Nov. 2008, pp. 143-155. In Press.
Doosan Hydro Technology. U.S. Based Subsidiary of Doosan Heavy Industries & Construction [doosanhydro.com/about]. Retrieved on Jun. 6, 2013.

(56) References Cited

OTHER PUBLICATIONS

DOW Plastics, "DOW Liquid Epoxy Resins" Downloaded on Jan. 20, 2015 from Epoxy.Dow.Com/Resources/Literature.HTM. 43 pages.
Du R, Zhao J (2004) "Properties of poly (N,N-dimethylaminoethyl methacrylate)/polysulfone positively charged composite nanofiltration membrane". *J. Membr. Sci.* 239: 183-188.
Electrospinning (che.vt.edu/Wilkes/electrospinning/electrspinning.html) Retrieved Sep. 11, 2013. 8 pages.
Elimelech M, Philipp WA (2011) The future of seawater desalination: energy, technology and the environment. *Science* 333: 712-717.
Escoda A, Lanteri Y, Fievet P, Déon S, Szymczyk A (2010) Determining the dielectric constant inside pores on nnofiltration membranes from membrane potential measurements. *Langmuir* 26: 14628-14635.
Gokmen, M.T., et al., "Porous Polymer Particles—A Comprehensive Guide to Synthesis, Characterization, Functionalization and Applications", Progress in Polymer Science, 2012, 37 (3), 365-405.
Gopal R, Kaur S, Ma ZW, Chan C, Ramakrishna S, Matsuura, T (2006) Electrospun nanofibrous filtration membrane. *J. Membr. Sci.* 281: 581-586.
Gopal, R. et al., "Electrospun nanofibrous polysulfone membranes as pre-filters: Particulate removal", Journal of Membrane Science, 289, (1-2), 2007, 210-219.
Greiner, A., "Book review on An Introduction to Electrospinning and Nanofibers", Journal of Engineered Fibers and Fabrics, vol. 3, Issue 2, 2008, 2 pages.
Hammond, P.T., "Engineering Materials Layer-by-Layer: Challenges and Opportunities in Multilayer Assembly", AlChe Journal, Nov. 2011, 57, 11, 2928-2940.
Ho D. et al., "Hybrid protein-polymer biomimetic membranes" IEEE Trans. *Nanotech.* 2004 3(2) 256-263.
Hogue, C. "Rocket-Fueled River" *Chem. & Eng. News.* 2003, 81, 33, pp. 37-46.
Hollman, A.M., et al., "Pore Assembled Multilayers of Charged Polypeptides in Microporous Membranes for Ion Separation", Langmuir, 2004, 20, 5418-5424.
Holt JK et al., "Fast Mass Transport Through Sub-2-Nanometer Carbon Nanotubes" *Science* 2006, 312, 1034-1037.
Huang, R., Chen, G., Sun, M., Gao, C. (2009) "Preparation and characterization of composite NF membrane from a graft copolymer of trimethylallyl ammonium chloride onto chitosan by toluene diisocyanate cross-linking". *Desalination* 238: 38-45.
Huang R, Chen G, Sun M, Gao C (2008) Preparation and characterization of quaterinized chitosan/poly(acrylonitrile) composite nanofiltration membrane from anhydride mixture crosslinking. *Sep. Purif. Technol.* 58: 393-399.
Hwang, T., et al., "Haversting of *Chlorella* sp. KR-1 using a cross-flow membrane filtration system equipped with an anti-fouling membrane", Bioresource Technology, 139, 2013, 379-382.
Jang, S-S., et al., "Structures and Transport Properties of Hydrated Water-Soluble Dendrimer-Grafted Polymer Membranes for Application to Polymer Electrolyte Membrane Fuel Cells: Classical Molecular Dynamics Approach" *J. Phys. Chem. C.* 2007, 111, 2759-2769.
Jaworek A, Sobczyk AT (2008) Electrospraying route to nanotechnology: An overview. *J. Electrostat.* 66: 197-219.
Jeong, B.H., et al., "Interfacial Polymerization of Thin Film Nanocomposites: A New Concept for Reverse Osmosis Membranes" *Journal of Membrane Science* 294, 2007, 1-7.
Ji Y, An Q, Zhao Q, Chen H, Gao C (2011) "Preparation of novel positively charged copolymer membranes for nanofiltration". *J. Membr. Sci.* 376: 254-265.
Kee, R. A., et al. "Semi-controlled dendritic structure synthesis" In *Dendrimers and Other Dendritic Polymers*. Frechet, J.M.J., et al. Ed.; John Wiley & Sons, Ltd. 2001, pp. 209-236.
Kim S.H., et al., "Design of $TiO_2$ nanoparticle self-assembled aromatic polyamide thin-film-composit (TFC) membrane as an approach to solve biofouling problem" Journal of Membrane Science, 211 (2003), 157-165.
Kouketsu, T., et al., "PAMAM dendrimer composite for $CO_2$ separation: Formation of a chitosan gutter layer", Journal of Membrane Science, 287 (1), 2007, 51-59.
Lee, H.S., et al., "Polyamide thin-film nanofiltration membranes containing $TiO_2$ nanoparticles", Desalination, 219 (2008), 48-56.
Li, Y. Y., et al., "Efficiency of Various Lattices from Hard Ball to Soft Ball: Theoretical Study of Thermodynamic Properties of Dendrimer Liquid Crystal from Atomistic Simulation" *J. Am. Chem. Soc.* 2004, 126, 1872-1885.
Li, X., et al., "Solvent-Resistant Nanofiltration Membranes Based on Multilayered Polyelectrolyte Complexes", Chem. Mater., 2008, 20, 3876-3883.
Lin, S. T., et al., "Thermodynamic Stability of Zimmerman Self-Assembled Dendritic Supramolecules from Atomistic Molecular Dynamics Simulations" *J. Phys. Chem. B*. 2004, 108, pp. 10041-10052.
Liu, F., et al., "Progress in the production and modification of PVDF membranes", Journal of Membrane Science, 2011, 375, 1-2, 1-27. (49 pages).
Liu, Y., et al., "Multilayer Dendrimer—Polyanhydride Composite Films on Glass, Silicon, and Gold Wafers", Angew. Chem. Int. Ed. Engl., 35 (19), 1997, 2114-2116.
Liu, Y., et al., "PAMAM Dendrimers Undergo pH Responsive Conformational Changes without Swelling" *J. Am. Chem. Soc.* 2009, 131 (8), pp. 2798-2799.
Liu, Y., et al., "pH-Switchable, Ultrathin Permselective Membranes Prepared from Multilayer Polymer Composites", Journal of American Chemical Society, 1997, 119, 8720-8721.
Madani, M., et al., "Aureole Nanofiber by Electrospinning of PAMAM-PEO Solution", Journal of Applied Polymer Science, 113, 2009, 3005-3011.
Maiti, P. K., et al., "Effect of solvent and pH on the structure of PAMAM dendrimers" *Macromolecules*. 2005, 38 (3): 979-991.
Maiti, P. K. et al., "Solvent quality changes the structure of G8 PAMAM dendrimer, a disagreement with some experimental interpretations" *J. Phys. Chem. B* 110 (51): 25628-25632 (2006).
Mansouri J, Harrisson S, Chen V (2010) Strategies for controlling biofouling in membranefiltration systems: challenges and opportunities. *J. Mater. Chem.* 20: 4567-4586.
McGinnis R.L., et al. "Global Challenges in Energy and Water Supply: The Promise of Engineered Osmosis" *Environmental Science and Technology.* 2008, 42, 8625-8629.
Mo J., et al., "Preparation and Characterization of Polyamide Nanofiltration Composite Membranes with $TiO_2$ Layers Chemically Connected to the Membrane Surface", J. Appl. Polym. Sci., 2007, 105 (3), 1267-1274.
Oh SJ, Kim N, Lee YT (2009) Preparation and characterization of PVDF/TiO2 organic—inorganic composite membranes for fouling resistance improvement. *J. Membr. Sci.* 345: 13-20.
Peeva, P.D., et al., "Tuning the ultrafiltration properties of anti-fouling thin-layer hydrogel polyethersulfone composite membranes by suited crosslinker monomers and photo-grafting conditions", Journal of Membrane Science, 362 (2010), 560-568.
Pontie M, Dach H, Leparc J, Hafsi M, Lhassani A (2008) Novel approach combining physico-chemical characterizations and mass transfer modelling of nanofiltration and low pressure reverse osmosis membranes for brackish water desalination intensification. *J. Membr. Sci.* 221: 174-191.
Pontius, F. W., et al. "Regulating perchlorate in drinking water" In *Perchlorate in the Environment*; Urbansky, T. E., Ed.; Kluver Academic: New York, 2000, pp. 31-36.
"Public Health Goal for Perchlorate in Drinking Water: Jan. 2011" California Office of Environmental Health Hazard Assessment. [Retrieved Jan. 7, 2011] Available online at http://www.oehha.ca.gov/water/phg/010711perchlorate.html.
Qiu, C., et al., "Surface modification of cardo polyetherketone ultrafiltration membrane by photo-grafted copolymers to obtain nanofiltration membranes", Journal of Membrane Science, 295 (2007), 88-94.
Rether, A., et al., "Selective separation and recovery of heavy metal ions using water-soluble *N*-benzoylthiourea modified PAMAM polymers", Reactive and Functional Polymers, 57 (2003), 13-21.

(56) References Cited

OTHER PUBLICATIONS

Ritchie, S.M.C., et al., "Polycysteine and Other Polyamino Acid Fuctionalized Microfiltration Membranes for Heavy Metal Capture", Environ. Sci. Technol., 2001, 35, 3252-3258.

Saren, Q., et al., "Synthesis and Characterization of Novel Forward Osmosis Membranes based on Layer-by-Layer Assembly", Environmental Science and Technology, 2011, 45, 5201-5208.

Savage, N. et al., "Nanomaterials and Water Purification" *Journal of Nanoparticle Research* 2005, vol. 7, No. 4-5, 331-342.

Schaep J, Bruggen BVD, Vandecasteele C, Wilms D (1998) "Influence of ion size and charge in nanofiltration". *Sep. Purif. Technol.* 14: 155-162.

Service, R.F. "Desalination Freshens Up". *Science.* 2006, vol. 313, 1088-1090.

Setiawan L, Wang R, Li K, Fane AG (2011) Fabrication of novel poly(amide-imide) forward osmosis hollow fiber membranes with a positively charged nanofiltration-like selective layer. *J. Membr. Sci.* 369: 196-205.

Shannon, M.A. et al. Science and technology for water purification in the coming decades. *Nature.* 2008, 54, 301-310.

Sherrington, D. C. "Preparation, structure and morphology of polymer supports" *Chem.Commun.* 1998, pp. 2275-2286.

Shim, Y, Lee HJ, Lee SY, Moon SH, Cho J (2002) Effects of natural organic matter and ionic species on membrane surface charge. *Environ. Sci. Technol.* 36: 3864-3871.

Susanto, H., et al., "Photografted Thin Polymer Hydrogel Layers on PES Ultrafiltration Membranes: Characterization, Stability, and Influence on Separation Performance", Langmuir, 2007, 23, 7818-7830.

Taurozzi, J.S., et al., "Effect of filler incorporation route on the properties of polysulfone-silver nanocomposite membranes of different porosities", Journal of Membrane Science, 325 (2008), 58-68.

Tiraferri, A., et al., "Covalent Binding of Single-Walled Carbon Nanotubes to Polyamide Membranes for Antimicrobial Surface Properties", ACS Appl. Mater. Interfaces, 2011, 3 (8), 2869-2877.

Tomalia, D. A., et al., "Dendrimers—an enabling synthetic science to controlled organic nanostructures" In *Handbook of Nanoscience, Engineering and Technology.* Second Edition; Goddard, W. A. III. et al., Eds.; CRC Press: Boca Raton, 2007, pp. 24-1 to 24-47.

Tomalia, D. A, et al., "Laboratory synthesis and characterization of megamers: core-shell tecto(dendrimers)" In *Dendrimers and other Dendritic Polymers.* Fréchet, J.M.J., et al., Eds., J. Wiley and Sons: New York, 2001, 617-629.

Ulbricht, M. "Advanced Functional Polymer Membranes" *Polymer* 47. 2006, pp. 2217-2262.

Wei, Xiu-Zhen, et al., "New type of nanofiltration membrane based on crosslinked hyperbranched polymers", Journal of Membrane Science, 323 (2008), 278-287.

Xu, X. et al., "Influence of Moisture on CO2 Separation from Gas Mixture by a Nanoporous Adsorbent Based on Polyethylenimide-Modified Molecular Sieve MCM-41", Industrial & Engineering Chemistry Research, 2005, 44 (21), 8113-8119.

Zhao, Y-H., et al., "Porous membranes modified by hyperbranched polymers 1. Preparation and characterization of PVDF membranes using hyperbranched polyglycerol additive" *J. Membr. Sci.* 2007, 290, 222-229.

International Search Report mailed on Nov. 21, 2014 for PCT application PCT/US2014/048980 filed on Jul. 30, 2014 in the name of California Institute of Technology.

Written Opinion mailed on Nov. 21, 2014 for PCT application PCT/US2014/048980 filed on Jul. 30, 2014 in the name of California Institute of Technology.

Final Office Action mailed on Oct. 21, 2014 for U.S. Appl. No. 13/570,221, filed on Aug. 8, 2012 in the name of Mamadou S. Diallo et al.

Restriction Requirement mailed on Jul. 22, 2013 for U.S. Appl. No. 13/570,221, filed on Aug. 8, 2012 in the name of Mamadou S. Diallo et al.

Alami, S. W., et al. "Influence of the preparation methods on the functional group distribution of chloromethylated styrene-divinylbenzene copolymers" *Reactive Polymers* 1987, 6, pp. 213-219.

Alexandratos, S. D. "Ion-Exchange Resins: A Retrospective from Industrial and Engineering Chemistry Research" *Industrial & Engineering Chemistry Research* 2009, 48, pp. 388-398.

Arshady, R., et al., "Suspension, emulsion, and dispersion polymerization: A methodological survey" *Colloid Polym. Sci.* 1992, 270, 717-732.

Bacquet, M., et al. "Spatial distribution of pendent vinyl groups during chloromethylation of macroporous styrene-divinylbenzene copolymers" *Reactive Polymers* 1988, 9, pp. 147-153.

Barth, M. et al., "High loading polymer reagents based on polycationic Ultraresins. Polymer-supported reductions and oxidations with increased efficiency" *Tetrahedron* 2004, 60, 8703-8709.

Barth, M., et al. "Reversible Cross-Linking of Hyperbranched Polymers: A Strategy for the Combinatorial Decoration of Multivalent Scaffolds" *Angewandte Chemie International Edition* 44, 1560-1563, 2005.

Barth M., et al., "Tailoring ultraresins based on the cross-linking of polyethylene imines. Comparative investigation of the chemical composition, the swelling, the mobility, the chemical accessibility, and the performance is solid-phase synthesis of very high loaded resins" *Journal of Combinatorial Chemistry*, 2004, 6, 340-349.

Batista, J. R. et al. "Combining Ion-exchange (IX) technology and biological reduction for perchlorate removal" *Remediation Journal* 2002, 13, 21-38.

Bayer, E. et al, Polystyrene-immobilized poly(ethylene imine) chains—a new class of graft copolymers. *Polymer Bulletin* 1996, 37, 565-572.

Bernstein, R., et al., "UV-Photo Graft Functionalization of Polyethersulfone Membrane with Strong Polyelectrolyte Hydrogel and Its Application for Nanofiltration", ACS Appl., Mater. Interfaces, 2012, 4 (7), 3438-3446. Abstract Only.

Bhaskar, S., et al., "Microstructured Materials Based on Multicompartmental Fibers" *J. Am. Chem. Soc.* (2009) 131, 6650-6651.

Blevins, D. G.; Lukaszewski, K. M., "Boron in plant structure and function". *Annu. Rev. Plant. Phys.* 1998. 49, 481-500.

Bonnesen, P. V., et al. "Development of bifunctional anion-exchange resins with improved selectivity and sorptive kinetics for pertechnetate: batch-equilibrium experiments" *Environ. Sci. Technol.* 2000, 34, pp. 3761-3766.

Boyd, G. E. et al., "The Exchange Adsorption of Ions from Aqueous Solutions by Organic Zeolites. I. Ion-exchange Equilibria" *Journal of the American Chemical Society* 1947, 69, 2818-2829.

Callow, J.A., et al., "Trends in the development of environmentally friendly fouling resistant marine coatings." *Nat Commun,* 2011, 2: 244, pp. 1-10.

Campbell, S. A., The Science and Engineering of Microelectronic Fabrication. *Oxford University Press, USA; 2nd Edition.* 2001, pp. 290.

Candau, F., et al. "Inverse microemulsion polymerization of acrylamide: Characterization of the water-in-oil microemulsions and the final microlatexes" *Journal of Colloid and Interface Science* 101, 167-183, 1984.

Chen, D.P., et al., "Branched polymeric media: perchlorate-selective resins from hyperbranched polyethyleneimine." *Environ Sci Technol*, 2012,46: 10718-10726.

Chen D.P., C. J. Yu, Y. Wan, C. Chang, M. S. Diallo, "Perchlorate-selective Resins from Hyperbranched Macromolecules," oral presentation at the 242th American Chemical Society Meeting, *Novel Solutions to Water Pollution Session in Denver*, CO 2011.

Clifford D., et al., "The determinants of divalent/monovalent selectivity in anion exchanges" *Reactive Polymers*, 1983, 1, 77-89.

Crank, J., "The Mathematics of Diffusion". 2nd ed.; Clarendon Press: Oxford, U.K., 1975, pp. 32.

Davankov, V. A. et al., "Unusual mobility of hypercrosslinked polystyrene networks: Swelling and dilatometric studies" *Journal of Polymer Science Part B: Polymer Physics* 2000, 38, 1553-1563.

(56) References Cited

OTHER PUBLICATIONS

Diallo MS, et al., (2011) "Nanotechnology for Sustainability: Environment, Water, Food, Minerals and Climate". In: Roco MC, Mirkin C, Hersham M (ed) Nanotechnology Research Directions for Societal Needs in 2020: Retrospective and Outlook. Springer, pp. 157-188.

Donnan, F. G. (1995). "Theory of Membrane Equilibria and Membrane-Potentials in the Presence of Non-Dialyzing Electrolytes—a Contribution to Physical-Chemical Physiology (Reprinted from Zeitshrift Fur Elektrochemie Und Angewandte Physikalische Chemie, vol. 17, p. 572, 1911)." *Journal of Membrane Science*, 100: 45-55.

DSM "Our Hyperbranched Polymers Continue to Amaze". Available online at http://www.dsm.com/markets/paint/en_US/innovation/innovation-chemistry/innovation-chemistry-hyperbranched-polymers.html; Retrieved May 9, 2014.

Erdogju, F., "Mathematical approaches for use of analytical solutions in experimental determination of heat and mass transfer parameters" *Journal of Food Engineering* 2005, 68, 233-238.

Ezzeldin, H. A., et al. "Synthesis and Properties of Anion Exchangers Derived from Chloromethyl Styrene Codivinylbenzene and Their Use in Water Treatment" *International Journal of Polymer Science*, 1-9, 2010.

Frechet, J.M., "Functional polymers and dendrimers: reactivity, molecular architecture, and interfacial energy." *Science* 1994, 263: 1710-1715.

Fritzmann, C., J. Lowenberg, et al. (2007). "State-of-the-art of reverse osmosis desalination." *Desalination*, 216: 1-76.

Gazi, M.; Galli, G.; Bicak, N., "The rapid boron uptake by multi-hydroxyl functional hairy Polymers". *Sep. Pur. Technol.* 2008, 62, 484-488.

Geckeler, K. E. et al., "Removal of Hazardous Substances from Water Using Ultrafiltration in Conjunction with Soluble Polymers" *Environmental Science & Technology* 1996, 30, 725-734.

Geise, G. M., Lee, H-S., Miller, D. L., Freeman, B. D., McGrath, J. E. and Paul, D. "Water Purification by Membranes: The Role of Polymer Science". *J. Polym. Sc. Part B: Polymer Physics*, 2010, vol. 48, 1685-1718.

Ghosh, A.K., et al. "Impacts of reaction and curing conditions on polyamide composite reverse osmosis membrane properties", *Journal of Membrane Science*, 311, 2008, pp. 34-45.

Gingras, T. M., et al., "Biological reduction of perchlorate in ion exchange regenerant solutions containing high salinity and ammonium levels" *Journal of Environmental Monitoring* 2002, 4, 96-101.

Gloe, K., et al. "Where is the anion extraction going?" *Chem. Eng. Technol.* 2003, 26, pp. 1107-1117.

Goossen, L. J, Ohlmann, D. M. And Lange, P. L. "The Thermal Amidation of Carboxylic Acids Revisited". *Synthesis*, 2009, No. 1, pp. 0160-0164.

Greenlee, L. F., D. F. Lawler, et al. (2009). "Reverse osmosis desalination: Water sources, technology, and today's challenges." *Water Research*, 43(9): 2317-2348.

Grinstead, R. R., "Removal of boron and calcium from magnesium chloride brines by solvent-extraction". *Ind. Eng. Chem. Prod. Res. Dev.*, 1972, 11, 454-460.

Gu, Y., et al "Functional polymeric hybrid nanotubular materials derived from natural cellulose substances", *J. Mater. Chem.*, 20, 10217-10223, 2010.

Gu B., et al. "Recent Advances in Ion Exchange for Perchlorate Treatment, Recovery and Destruction" B. Gu, et al. Eds. Springer US, 2006, 209-251.

Gu, B. H., et al. "Selective anion exchange resins for the removal of perchlorate (ClO4 -15) from groundwater" *Oak Ridge National Laboratory Report ORNL/TM-13753*, 1999, pp. 1-31.

Gu, B.H., et al. "Treatment of perchlorate-contaminated groundwater using highly selective, regenerable ion-exchange technologies" *Environ. Sci. Technol.* 2007, 41, pp. 6277-6282.

Hautman, D. P. et al., "Determination of Perchlorate in Drinking Water Using Ion Chromatography" *National Exposure Research Laboratory Office of Research and Development U.S. Environmental Protection Agency*: Cincinnati, Ohio, 1999, 1-49.

Health Canada, 2005. "Environmental and workplace health: Perchlorate and Human Health" http://www.hc-sc.gc.ca/ewh-semt/pubs/water-eau/perchlorate-eng.php. Retrieved Sep. 20, 2013. 2 pages.

Hershey, J. P.; Fernandez, M.; Milne, PJ; Millero, FJ, "The ionization of boric acid in NaCl, Na—Ca—Cl and Na—Mg—Cl solutions at 25° C.". *Geochim. Cosmochim. Acta* 1986, 50, 143-148.

Hestekin, J.A., et al., "Poly(amino acid)-Functionalized Cellulosic Membranes: Metal Sorption Mechanisms and Results", Industrial and Engineering Chemistry Research, 2001, 40, 2668-2678. Abstract Only.

Hou X., et al. "A review on speciation of iodine-129 in the environmental and biological samples" *Anal. Chim. Acta.* 2009, 632, pp. 181-196.

Hydranautics. IMSDesign. Available online at http://www.membranes.com/index.php?pagename=imsdesign. Membrane Technology, Nov. 2008, pp. 8.

Icenhower, J. P., et al. "The biogeochemistry of technetium: a review of the behavior of an artificial element in the natural environment" *American Journal of Science.* 2010, 310, pp. 721-752.

IPCC (Intergovernmental Panel on Climate Change). 2008. Climate Change and Water. Bates, B.C., Z.W. Kundzewicz, S. Wu and J.P. Palutikof, Eds. Technical Paper of the Intergovernmental Panel on Climate Change, IPCC Secretariat, Geneva, 214 pages.

Kaftan, O.; Acikel, M.; Eroglu, A. E.; Shahwan, T.; Artok, L.; Ni, C. Y., "Synthesis, characterization and application of a novel sorbent, glucamine-modified MCM-41, for the removal/preconcentration of boron from waters". *Anal. Chim. Acta.* 2005, 547, 31-41.

Kaur, S., R. Gopal, et al. (2008). "Next-generation fibrous media for water treatment." *MRS Bulletin*, 33: 21-26.

Kim, S-J. et al., "Direct seawater desalination by ion concentration polarization" *Nature Nanotechnology*. (Published online: Mar. 21, 2010). Apr. 2010, vol. 5, pp. 297-301.

King, C. W. and M. E. Webber (2008). "Water Intensity of Transportation." *Environmental Science & Technology*, 42(21): 7866-7872.

Koper, G. J. M. and M. Borkovec (2010). "Proton binding by linear, branched, and hyperbranched polyelectrolytes." *Polymer*, 51: 5649-5662.

Kotte, M.R., et al., "A facile route to the preparation of mixed matrix polyvinylidene fluoride membranes with in-situ generated polyethyleneimine particles", Journal of Membrane Science, 2014, 450, 93-102. Abstract Only.

Lahann, J. "Recent Progress in Nano-biotechnology: Compartmentalized Micro- and Nanoparticles via Electrohydrodynamic Co-jetting" *Small* (2011) 7, No. 9, 1149-1156.

Lau, W.J., et al., "A recent progress in thin film composite membrane, A review", Desalination, 2012, 287, 190-199. Abstract Only.

Lee, K. P., T. C. Arnot, et al. (2011). "A review of reverse osmosis membrane materials for desalination-Development to date and future potential." *Journal of Membrane Science*, 370: 1-22.

Lee, J.H., et al., "Effects of NO and SO2 on growth of highly-CO2-tolerant microalgae", Journal of Microbiology and Biotechnology, 2000, 10 (3), 338-343. Abstract Only.

Lehman, S. G., et al. "Perchlorate and nitrate treatment by ion exchange integrated with biological brine treatment" *Water Research* 2008, 42, pp. 969-976.

Li, D., Xia, Y., 2004. "Electrospinning of Nanofibers: Reinventing the Wheel?" *Advanced Materials*, 16:1151-1170.

Li, J.H., et al., "Fabrication and characterization of a novel $TiO_2$ nanoparticle self-assembly membrane with improved fouling resistance." *Journal of Membrane Science* 2009 326: 659-666.

Li, D. and H. T. Wang (2010). "Recent developments in reverse osmosis desalination membranes." *Journal of Materials Chemistry*, 20(22): 4551-4566.

Li, Y. et al. "The array and interfacial activity of sodium dodecyl benzene sulfonate and sodium oleate at the oil/water interface" *Journal of Colloid and Interface Science* 290, 275-280, 2005.

(56) References Cited

OTHER PUBLICATIONS

Li, D. et al., "Use of Electrospinning to Directly Fabricate Hollow Nanofibers with Functionalized Inner and Outer surfaces" *Small* 2005, 1, 83-86.

Liu, D.J., et al., "Self-assembly of polyphenylene denrimers into micrometer long nanofibers: an atomic force microscopy study", *Langmuir*, 18, 2385-2391, 2002.

Meszaros, R., L. Thompson, et al. (2003). "Interaction of sodium dodecyl sulfate with polyethyleneimine: Surfactant-induced polymer solution colloid dispersion transition." *Langmuir*, 19: 609-615.

Mishra, H., et al., "Branched polymeric media: boron-chelating resins from hyperbranched polyethylenimine." *Environ Sci Technol* 2012 46: 8998-9004.

Misra, A.C., et al., "Multicompartmental Particles for Combined Imaging and siRNA Delivery" Advanced Materials (2012) pp. 1-7.

Moyer, B. A., et al. "Physical factors in anion separations" In *Supramolecular Chemistry of Anions* Bianchi, A., et al. Ed.; Wiley-VCH, New York, 1997, pp. 1-44.

Musale, D. A. and A. Kumar (2000). "Solvent and pH resistance of surface cross linked chitosan/poly(acrylonitrile) composite nanofiltration membranes." *Journal of Applied Polymer Science*, 77: 1782-1793.

Nippon Shokubai. Polyethyleneimine: EPOMIN. http://www.shokubai.co.jp/en/products/functionality/epomin1.html (accessed Sep. 10, 2013). 10 pages.

Nonogaki S., et al. "Polyvalent Anion-Exchange Resins Composed of Cross-Linked Polythylenimine Complexes of Heavy Metals" *The Journal of Physical Chemistry*, 1958, 62, 601-603.

Ocken, H., "An Evaluation of Enriched Boric Acid in European PWRs". *Electric Power Research Institute*. EPRI *Report* 1003124. 2001. 114 pages.

Park, S.J., et al., "Nanofiltration membranes based on polyvinylidene fluoride nanofibrous scaffolds and crosslinked polyethyleneimine networks." *Journal of Nanoparticle Research* 2012 14: 884. 14 pages.

*Polymer Factory* [Accessed Jul. 11, 2013]; Available from: www.polymerfactory.com/. 2 pages.

"Polymer Solutions: Solvents and Solubility Parameters." [Accessed May 13, 2014]; Available from: http://www.sigmaaldrich.com/etc/medialib/docs/Aldrich/General_Information/polymer_solutions.Par. 0001.File.tmp/polymer_solutions.pdf, pp. 46-49.

"Purolite A530E Macroporous strong base anion exchange resin" Available online at http://www.purolite.com/defaultaspx?RelID=606288&ProductID=333. [Retrieved Apr. 23, 2014].

Purolite A532E. Gel strong base anion exchange resin. Available online at http://www.purolite.com/defaultaspx?RelID=606285&ProductID=353. Retrieved Apr. 24, 2014.

Qiu, X., et al., "Selective separation of similarly sized proteins with tunable nanoporous block copolymer membranes." *ACS Nano* 2013 7: 768-776.

Rademann, J., et al. "Ultra Loaded Resins Based on the Cross-Linking of Linear Poly(ethylene imine). Improving the Atom Economy of Polymer-Supported Chemistry" *Angewandte Chemie International Edition* 41, 2975-2978, 2002.

Ramakrishna, S., Jose, R., Archana, P. S., Nair, A. S, Balamurugan, R., Venugopal, J., and Teo, W. E. "Science and Engineering of Electrospun Nanofibers for Advances in Clean Energy, Water Filtration, and Regenerative Medicine". *J. Mater. Sci.* 2010, 45, 6283-6312.

Rasband, W. S. *ImageJ*, U. S. National Institutes of Health, Bethesda, Maryland, USA. Available online at http://imagej.nih.gov/ij/. Oct. 10, 2012. 198 pages.

Reichenberg, D., "Properties of Ion-Exchange Resins in Relation to their Structure. III. Kinetics of Exchange" *Journal of the American Chemical Society* 1953, 75, 589-597.

Rhenium. Available online at http://en.wikipedia.org/wiki/Rhenium. [Retrieved Sep. 11, 2013].

Rivas, B. L., et al. "Branched and linear polyethyleneimine supports for resins with retention properties for copper and uranium. VII." *Journal of Applied Polymer Science* 1989, 38, pp. 801-807.

Rivas, B., et al. "Synthesis and metal complexation of poly(ethyleneimine) and derivatives" in *Polymer Synthesis Oxidation Processes; Advances in Polymer Science*, vol. 102, pp. 171-188 (Springer Berlin / Heidelberg, 1992).

Rivas, B. L. et al. "Water-soluble acidic polyelectrolytes with metal-removing ability" *Polymers for Advanced Technologies* 2002, 13, 1000-1005.

Roh, J.; Bartels, C.; Wilf, M. "Use of Dendrimers to Enhance Selective Separation of Nanofiltration and Reverse Osmosis Membranes". 2009. Desalination and Water Purification Research and Development Report No. 140. Available online at http: www.usbr.gov/pmts/water/publications/reportpdfs/report140.pdf. 57 pages.

Roice, M., et al. "Ultramine: A High-Capacity Polyethylene-Imine-Based Polymer and Its Application as a Scavenger Resin" *Chemistry—A European Journal* 10, 4407-4415, 2004.

Russell, C. G. et al., "National Cost Implications of a Perchlorate Regulation" *Journal American Water Works Association* 2009, 101, 54-67.

Safety Data Sheet: Lupasol. Available online at http://worldaccount.basf.com/wa/NAFTA~en_US/Catalog/ChemicalsNAFTA/pi/BASF/Brand/lupasol. [Retrieved on Sep. 16, 2013]. 80 pages.

Scholl, M., et al. "Controlling polymer architecture in the thermal hyperbranched polymerization of l-lysine" *Macromolecules* 2007, 40, pp. 5726-5734.

Shepherd, E. J., et al. "Studies of Cross-linked Poly(ethyleneimine) Ion-Exchange Resin" *J. Chem. Soc.*, 86-92, 1957.

Simonnot, M. O.; Castel, C.; Nicolai, M.; Rosin, C.; Sardin, M.; Jauffret, H., "Boron removal from drinking water with a boron selective resin: Is the treatment really selective?" *Wat. Res.* 2000, 34, 109-116.

Smith, B. F.; Robison, T. W.; Carlson, B. J.; Labouriau, A.; Khalsa, G. R. K.; Schroeder, N. C.; Jarvinen, G. D.; Lubeck, C. R.; Folkert, S. L.; Aguino, D. I., "Boric acid recovery using polymer filtration: studies with alkyl monool, diol, and triol containing polyethylenimines". *J. Appl. Polym. Sci.* 2005, 97, 1590-1604.

Strathmann, H., "Introduction to membrane science and technology". 2011, Weinheim, Germany: *Wiley-VCH Verlag & Co*, pp. 1-17.

Sun SP, Hatton AT, Chung TS (2011) Hyperbranched polyethyleneimine induced crosslinking of polyamide-imide nanofiltration hollow fiber membranes for effective removal of ciprofloxacin. *Environ. Sci. Technol.* 45: 4003-4009.

Tao, M., et al., "Hydrophilic poly (vinylidene fluoride)(PVDF) membrane by in situ polymerisation of 2-hydroxyethyl methacrylate (HEMA) and micro-phase separation." *Journal of Materials Chemistry*, 2012, 22: 9131-9137.

Tiraferri, A., et al., "Highly hydrophilic thin-film composite forward osmosis membranes functionalized with surface-tailored nanoparticles." *ACS Appl Mater Interfaces* 2012 4: 5044-5053.

Tongwen X, Weihua Y (2003) "A novel positively charged composite membranes for nanofiltration prepared from poly(2,6-dimethyl-1,4-phenylene oxide) by in situ amines crosslinking". *J. Membr. Sci.* 215: 25-32.

Tripp, A. R., et al. "Ion exchange for the remediation of perchlorate-contaminated drinking water" *J. American Water Works Association*. 2006, 98, pp. 105-114.

Tsuru T, Urairi M, Nakao S, Kimura S (1991) "Negative rejection of anions in the loose reverse osmosis separation of mono- and divalent ion mixture". *Desalination* 81: 219-227.

UNEP (2006) "Challenges to international waters—Regional assessments in a global perspective". United Nations Environment Programme, Nairobi, Kenya. 125 pages.

United States Government Accountability Office. "Perchlorate: Occurrence Is Widespread but at Varying Levels; Federal Agencies Have Taken Some Actions to Respond to and Lessen Releases"; United States Government Accountability Office: 2010, 63 pages.

Urbansky E., "Perchlorate as an Environmental Contaminant" *Environmental Science and Pollution Research*, 2002, 9, 187-192.

Urbansky, E. T., "Perchlorate Chemistry: Implications for Analysis and Remediation" *Bioremediation Journal* 1998, 2, 81-95.

USEPA *Interim drinking water health advisory for perchlorate* 2008; EPA 822-R-08-025; USEPA: Washington, DC, 2008. 49 pages.

Verissimo S, Peinemann KV, Bordado J (2005) New composite hollow fiber membrane for nanofiltration. *Desalination* 184: 1-11.

(56) References Cited

OTHER PUBLICATIONS

Vezzani D, Bandini S (2002) Donnan equilibrium and dielectric exclusion for characterization of nanofiltration membranes. *Desalination* 149: 477-483.

Wang X, Chen X, Yoon K, Fang D, Hsiao BS, Chu B (2005) High flux filtration medium based on nanofibrous substrate with hydrophilic nanocomposite coating. *Environ. Sci. Technol.* 39: 7684-7691.

Watanabe, Y. et al., "Effects of the Spaces Available for Cations in Strongly Acidic Cation-Exchange Resins on the Exchange Equilibria by Quaternary Ammonium Ions and on the Hydration States of Metal Ions" *Analytical Chemistry* 2011, 83, 7480-7485.

Xiao, Y. K.; Liao, B. Y.; Liu, W. G.; Xiao, Y.; Swihart, G. H., "Ion exchange extraction of boron from aqueous fluids by Amberlite IRA 743 resin". *Chinese J. Chem.* 2003, 21, 1073-1079.

Xiong Z., et al., "Sorption and desorption of perchlorate with various classes of ion exchangers: a comparative study" *Industrial & Engineering Chemistry Research*, 2007, 46, 9213-9222.

Xu, Y.; Jiang, J. Q., "Technologies for boron removal". *Ind. Eng. Chem. Res.* 2008, 47, 16-24.

Yan C, Zhang S, Yang D, Jian X (2008) "Preparation and characterization of chloromethylated/quaternized poly(phthalazinone ether sulfone ketone) for positively charged nanofiltration membranes". *J. Appl. Polym. Sci.* 107: 1809-1816.

Yoo, H. S., Kim, T. G. And Park, T. G. "Surface-functionalized Electrospun Nanofibers for Tissue Engineering". *Adv. Drug. Del. Rev.* 2009, 61, 1033-1042.

Yoon K., et al., "Functional nanofibers for environmental applications", Journal of Materials Chemistry, 18 (2008), 5326-5334. Abstract Only.

Yoon K, Hsiao BS, Chu B (2009) "High flux ultrafiltration nanofibrous membranes based on polyacrylonitrile electrospun scaffolds and cross linked polyvinyl alcohol coating", *J. Membr. Sci.* 338: 145-152.

Yoon, I.-H. et al., "Perchlorate adsorption and desorption on activated carbon and anion exchange resin" *Journal of Hazardous Materials* 2009, 164, 87-94.

Yoshimura, K.; Miyazaki, Y.; Ota, F.; Matsuoka, S.; Sakashita, H., "Complexation of boric acid with the N-methyl-D-glucamine group in solution and in cross linked polymer". *J. Chem. Soc. Faraday. T.* 1998, 94, 683-689.

Yuchi, A. et al., "Effects of the Exchange Capacity and Cross-Linking Degree on the Hydration States of Anions in Quantitative Loading onto Strongly Basic Anion-Exchange Resins" *Analytical Chemistry* 2010, 82, 8611-8617.

Yung L, Ma H, Wang X, Yoon K, Wang R, Hsiao BS, Chu B (2010) Fabrication of thinfilm nanofibrous composite membranes by interfacial polymerization using ionic liquids as additives. *J. Membr. Sci.* 365: 52-58.

Zhang Q, Wang H, Zhang S, Dai L (2011) Positively charged nanofiltration membrane based on cardo poly(arylene ether sulfone) with pendant tertiary amine groups. *J. Membr. Sci.* 375: 191-197.

Zhang, D., Song, X., Liang, F., Li, Z. & Liu, F. "Stability and Phase Behavior of Acrylamide-Based Emulsions before and after Polymerization". *The Journal of Physical Chemistry B* 110, 9079-9084, (2006).

Zhou Y, Yu S, Gao C, Feng X (2009) "Surface modification of thin film composite polyamide membranes by electrostatic self-deposition of polycations for improved fouling resistance". *Sep. Sci. Technol.* 66: 287-294.

International Search Report mailed on Feb. 26, 2013 for PCT application PCT/US2012/050043 filed on Aug. 8, 2012 in the name of California Institute of Technology.

Written Opinion mailed on Feb. 26, 2013 for PCT application PCT/US2012/050043 filed on Aug. 8, 2012 in the name of California Institute of Technology.

Non-Final Office Action mailed on Dec. 31, 2013 for U.S. Appl. No. 13/570,221, filed Aug. 8, 2012 in the name of Mamadou S. Diallo et al.

\* cited by examiner

A. Anion Selective Hyperbranched Macromolecules
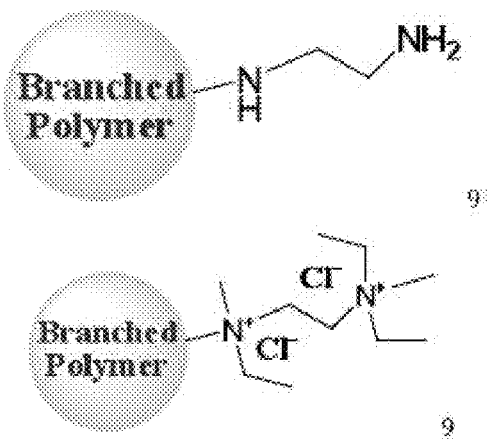
B. Cation Selective Hyperbranched Macromolecules
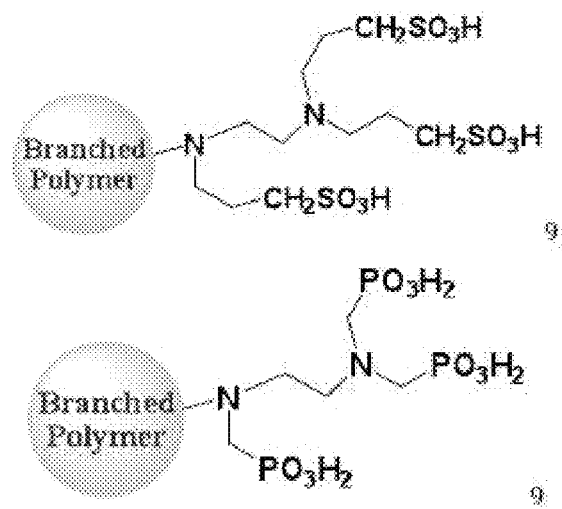
FIG. 28

2,2-bis(methylol)propionic acid (MPA) hyperbranched macromolecule

A
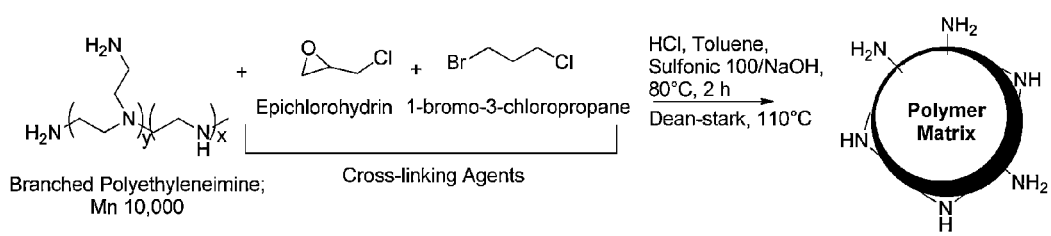
B
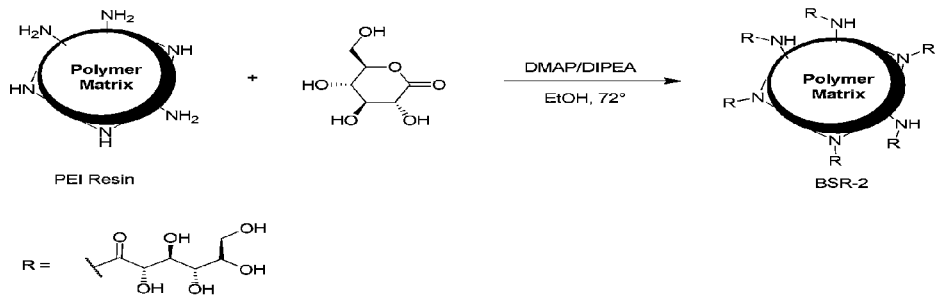
FIG. 50

A. Complexation and/or Encapsulation of Target Metal Ions [e.g. Pd(II)]
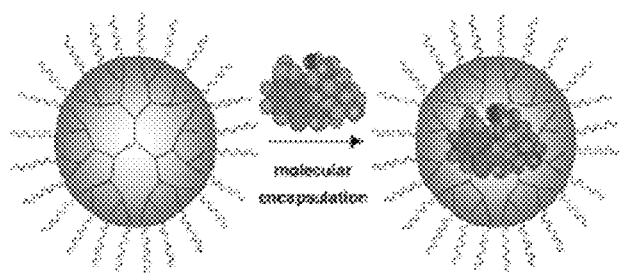
B. Reduction of Encapsulated Metal Ions to Produce Metallic Clusters/Nanoparticles [e.g. Pd(0)]
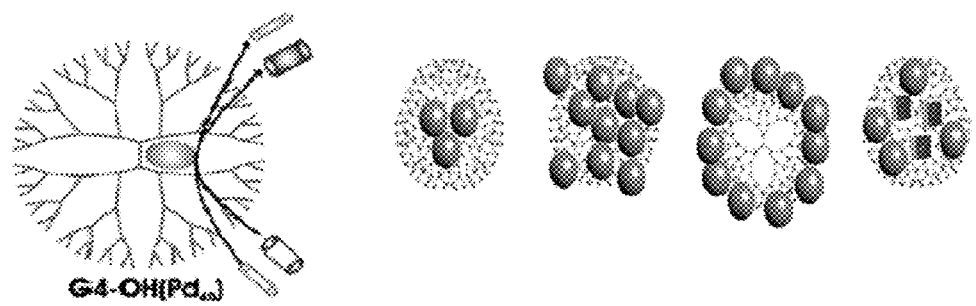
G4-OH(Pd$_{40}$)
FIG. 52

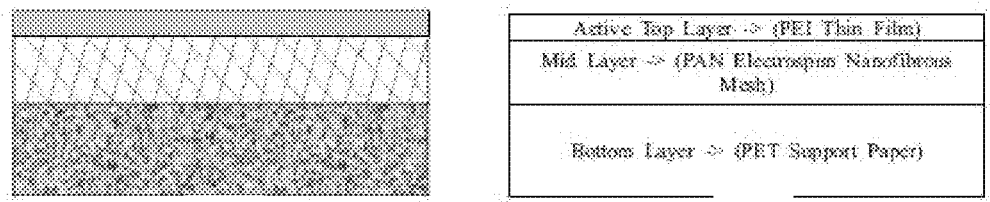
A      FIG. 70      B
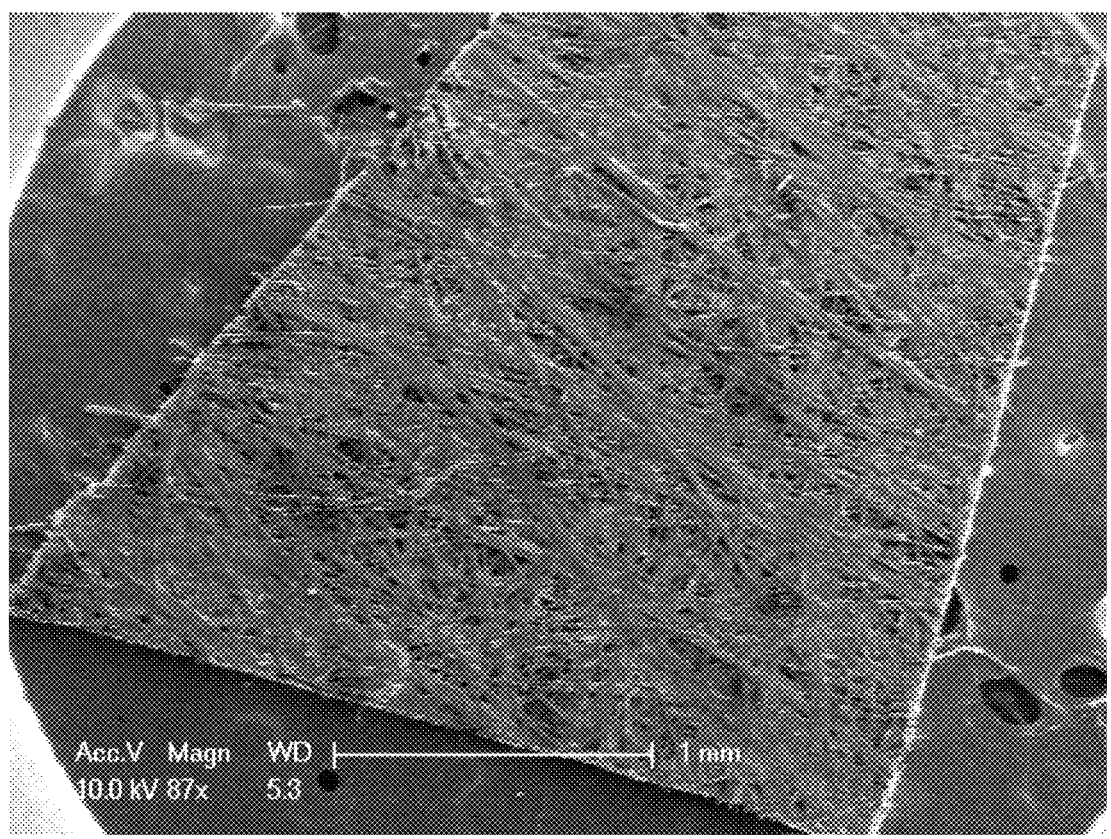
FIG. 71

FILTRATION MEMBRANES AND RELATED COMPOSITIONS, METHODS AND SYSTEMS

CROSS REFERENCE TO RELATED APPLICATIONS

The present application claims priority to U.S. Provisional Application No. 61/592,409, entitled "Ion-Selective Nanofiltration Membranes Based on Polymeric Nanofibrous Scaffolds and Separation Layers Consisting of Crosslinked Dendritic Macromolecules" filed on Jan. 30, 2012, to U.S. Provisional Application No. 61/601,410, entitled "Low-Pressure Ion-Selective Membranes for Water Treatment and Desalination: Synthesis, Characterization and Multiscale Modeling" filed on Feb. 21, 2012, to U.S. Provisional Application No. 61/711,021, entitled "Composite and Multifunctional Polymeric Membranes with Embedded Polymeric Micro/Nanoparticles: Compositions, Methods, Systems and Applications" filed on Oct. 8, 2012 and to PCT Patent Application PCT/US2012/050043 entitled "Filtration Membranes, and Related Nano and/or Micro fibers, Composites, Methods and Systems" filed on Aug. 8, 2012 which in turn claims priority to U.S. Provisional Application No. 61/521,290, entitled "Low-Pressure Ion-Selective Membranes for Water Treatment and Desalination: Synthesis, Characterization and Multiscale Modeling" filed on Aug. 8, 2011, to U.S. Provisional Application No. 61/592,409, entitled "Ion-Selective Nanofiltration Membranes Based on Polymeric Nanofibrous Scaffolds and Separation Layers Consisting of Crosslinked Dendritic Macromolecules" filed on Jan. 30, 2012, and to U.S. Provisional Application No. 61/601,410, entitled "Low-Pressure Ion-Selective Membranes for Water Treatment and Desalination: Synthesis, Characterization and Multiscale Modeling" filed on Feb. 21, 2012, each of the above mentioned applications is incorporated herein by reference in its entirety.

STATEMENT OF GOVERNMENT GRANT

This invention was made with government support under CBET0948485 awarded by the National Science Foundation. The government has certain rights in the invention.

FIELD

The present disclosure relates to filtration membranes and related compositions, methods and systems.

BACKGROUND

Development of efficient membranes has been a challenge in the field of fluid filtration, in particular when aimed at water treatment.

Filtration membranes have become the critical components of a broad range of sustainability applications and technologies including (i) energy conservation and storage (e.g. fuel cells and batteries), (ii) water reuse and desalination (e.g. reverse osmosis, nanofiltration and ultrafiltration) and (iii) gas separations (e.g. $CO_2$ and $H_2$ separations). Current commercial polymeric membranes often carry a single function, i.e. salt rejection by a reverse osmosis membrane or proton transport by a polymer electrolyte membrane.

Whether for human consumption, agriculture or industry, several methods are commonly used for filtration including reverse osmosis (RO), nanofiltration (NF), ultrafiltration (UF) and microfiltration (MF) and additional methods identifiable by a skilled person.

Despite production and elaboration during the past 20 years of several filtration concepts/technologies proposed as improvements or alternatives to the above mentioned approaches, development of efficient, cost-effective and/or environmental friendly filtration methods and system has been a challenge in particular when directed at selective filtration.

SUMMARY

Provided herein are filtration membranes with embedded polymeric micro/nanoparticles and related compositions, methods, and systems that allow in several embodiments to perform selective filtration of a liquid and in particular of water or aqueous solutions, which can have various applications such as industrial and environmental separations.

According to a first aspect, a filtration membrane with embedded polymeric nanoparticles is described. In particular, the filtration membrane comprises polymeric nanoparticles embedded in a polymer matrix formed by a porous polymeric aggregate.

According to a second aspect, a method of making a filtration membrane with embedded dendritic nanoparticles is described, the method comprising contacting a polymeric component, a dendritic component, a cross-linking component, and a solvent for a time and under a condition to permit to allow in situ formation of dendritic nanoparticles to provide a dope solution; and casting the dope solution to provide a filtration membrane with embedded dendritic nanoparticles. In particular, in some embodiments, the polymeric component and dendritic component are contacted to form a blend and the cross-linking agent is added to the blend to allow in situ formation of dendritic nanoparticles and obtain the dope.

According to a third aspect, a method of making a filtration polymeric membrane with embedded preformed polymeric nanoparticles is described, the method comprising contacting a polymeric component, preformed polymeric nanoparticles, and a solvent for a time and under a condition to provide a dope solution; and casting the dope solution to provide a polymeric membrane with embedded preformed polymeric nanoparticles.

According to a fourth aspect, a filtration membrane is described. The filtration membrane comprises a plurality of nano and/or micro fibers, wherein at least one of the nano and/or micro fibers comprises a dendritic nanoparticle embedded in a polymeric component. In some embodiments, in the filtration membrane, the plurality of nanofibers and/or microfibers is arranged in a mesh structure forming a layer comprised in the membrane, alone or in combination with additional layers. In some embodiments, the plurality of nanofibers and/or microfibers are arranged in a substantially parallel configuration, in particular in some of these embodiments, one or more nanofibers and/or microfibers of the plurality of the nanofibers and/or microfibers are hollow.

According to a fifth aspect, a nanofiber or microfiber is described. The nanofiber or microfiber comprises a dendritic nanoparticle embedded in a polymeric component. In some embodiments the nanofiber or microfiber comprises reactive sites, and the reactive sites can be positively and/or negatively charged.

According to a sixth aspect, a method of making a nano and/or micro fibers with embedded dendritic nanoparticles is described, the method comprising contacting a polymeric component, a dendritic component, a cross-linking component, and a solvent for a time and under a condition to permit the in situ formation of dendritic nanoparticles to provide a dope solution; and spinning the dope solution to provide a nanofiber or microfiber herein described. In particular, in some embodiments, the polymeric component and dendritic component are contacted to form a blend and the cross-linking agent is added to the blend to allow in situ formation of dendritic nanoparticles and obtain the dope.

According to a seventh aspect, a bicomposite membrane is described, which comprises a plurality of nanofibers and/or microfibers herein described attached to a polymer matrix formed by a porous polymeric aggregate comprising polymeric nanoparticles. In some embodiments, in the bicomposite membrane, the plurality of nanofiber and/or microfiber are arranged in a mesh structure forming a layer comprised in the membrane, alone or in combination with additional layers. In some embodiments, the plurality of nanofiber and/or microfibers are arranged in a substantially parallel configuration, in particular in some of these embodiments, one or more nanofibers and/or microfibers of the plurality of the nanofibers and/or microfibers are hollow.

Filtration membranes with embedded polymeric micro/nanoparticles and related methods and systems herein described allow in several embodiments filtration of fluids without the need for the high pressures required in conventional fluid purification methods such as reverse osmosis.

Filtration membranes with embedded polymeric micro/nanoparticles and related methods and systems herein described in several embodiments allow more efficient, cost-effective and/or environmentally sound technologies to filter fluids including extracting clean water and valuable chemicals (e.g. critical materials or other elements) from impaired water including wastewater, brackish water and seawater.

Filtration membranes with embedded polymeric micro/nanoparticles and related methods and systems herein described can be used in connection with applications wherein water filtration in particular when aimed at selective filtration is desired. Exemplary applications comprise fluid purification, and in particular water filtration, water purification and in particular water desalination and additional applications associated with industrial/environmental separations, including chemical and/or biological purifications, which are identifiable by a skilled person. Additional applications comprise gas separations, additional chemical and/or biological purifications and catalysis wherein selective absorption, inclusion or removal/conversion of one or more solutes/compounds is desired.

In particular, described herein are membrane compositions, methods and applications using poly(vinylidenefluoride) [PVDF], polyamines (e.g. hyperbranched PEI), acrylic polymers as building blocks. It is expected that this new versatile, flexible and tunable membrane platform could be used to produce a new generation of high performance membranes, modules and systems for a broad range applications including water treatment, catalysis, gas separations, chemical and biological purifications, and energy generation, conversion and storage The details of one or more embodiments of the disclosure are set forth in the accompanying drawings and the description below. Other features, objects, and advantages will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the detailed description and the examples, serve to explain the principles and implementations of the disclosure.

FIG. 28 shows functionalized hyperbranched macromolecules as building blocks for ion-selective hollow fibers according to an embodiment herein described. Panel A shows schematics of exemplary anion selective hyperbranched macromolecules with amine and ammonium reactive sites. Panel B shows schematics of exemplary cation selective hyperbranched macromolecules with $SO_3H$ and $PO_3H_2$ reactive sites.

FIG. 50 shows a schematic showing general reaction schemes of the synthesis of boron-selective PEI nano/microparticles. Panel A shows base PEI beads. Panel B shows Functionalization of Base PEI Beads with glucono-1,5-D-lactone

FIG. 52 shows a schematic representation of generation of metallic clusters/nanoparticles inside NFC-PET-PVDF-PEI membranes by complexation/encapsulation of target metal ions followed by reaction with reducing agents (e.g. $H_2$). Panel A shows a schematic representation of complexation and/or encapsulation of target metal ions including, for example, palladium (II) ions. Panel B shows a schematic representation of the reduction of the metal ions, for example, the reduction of palladium (II) to catalytically active palladium (0).

FIG. 61 shows a schematic example of the electrospinning and electrospraying of the nanofibers comprising the membrane.

FIG. 62 shows an SEM image of the three layers.

FIG. 63 shows the various chemistries and exemplary structures of the separation layers.

FIGS. 68A-C shows salt rejection at pH 4-8 and FIGS. 68D-F show permeat flux at pH 4-8.

FIG. 70 shows configuration of an exemplary membrane. Panel A is a schematic depiction of the membrane and Panel B is the description of the composition of the layers.

FIG. 71 shows an SEM picture of the PET paper of an exemplary membrane as depicted in FIG. 70 at low magnification.

DETAILED DESCRIPTION

Figure 1:
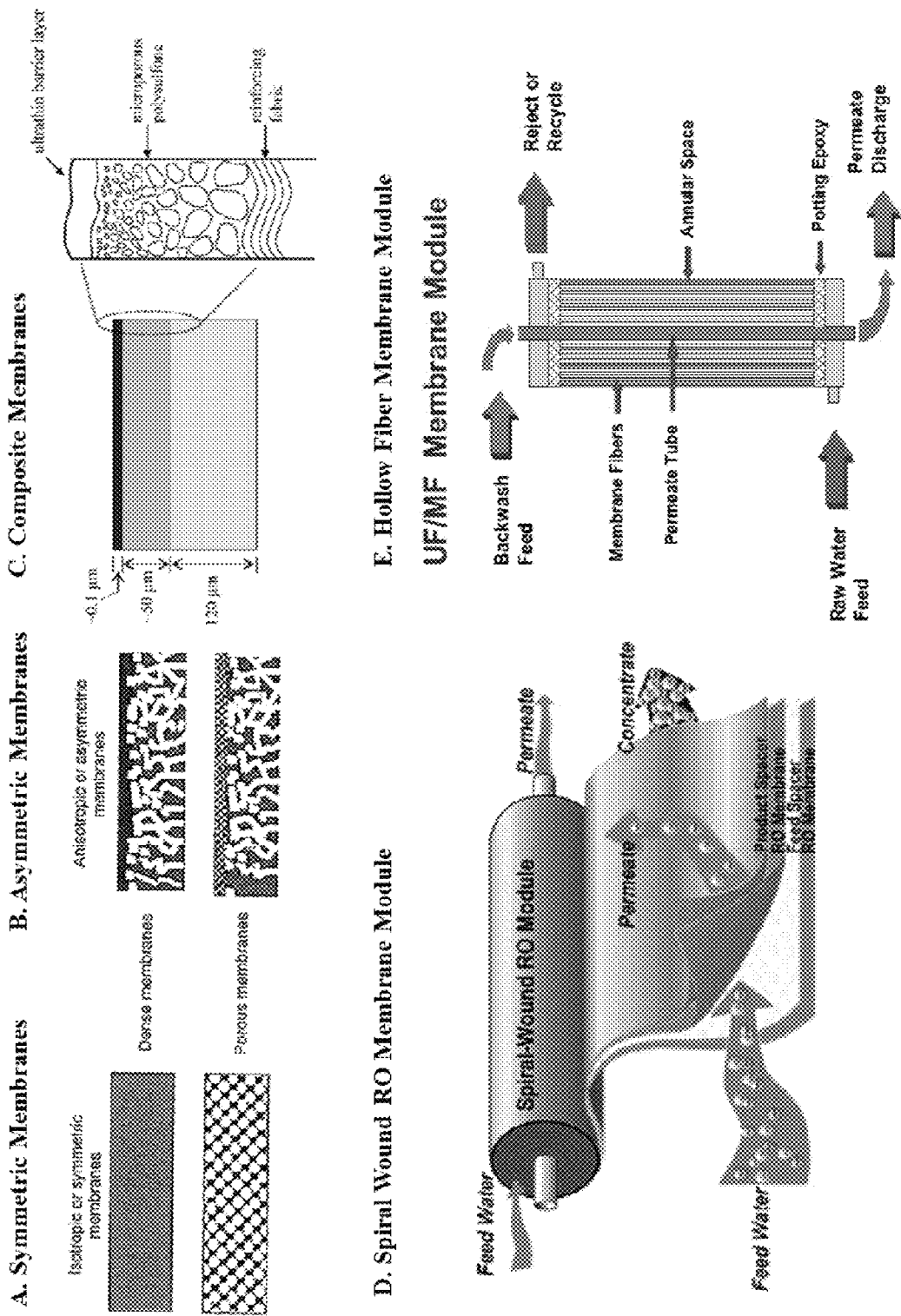
FIG. 1 shows structures, geometries and configurations of commercial polymeric membranes and modules, in particular a symmetric membrane (Panel A), an asymmetric membrane (Panel B), a composite membrane (Panel C), a spiral wounds reverse osmosis module (Panel D), and a hollow fiber membrane module (Panel E).
Figure 2:
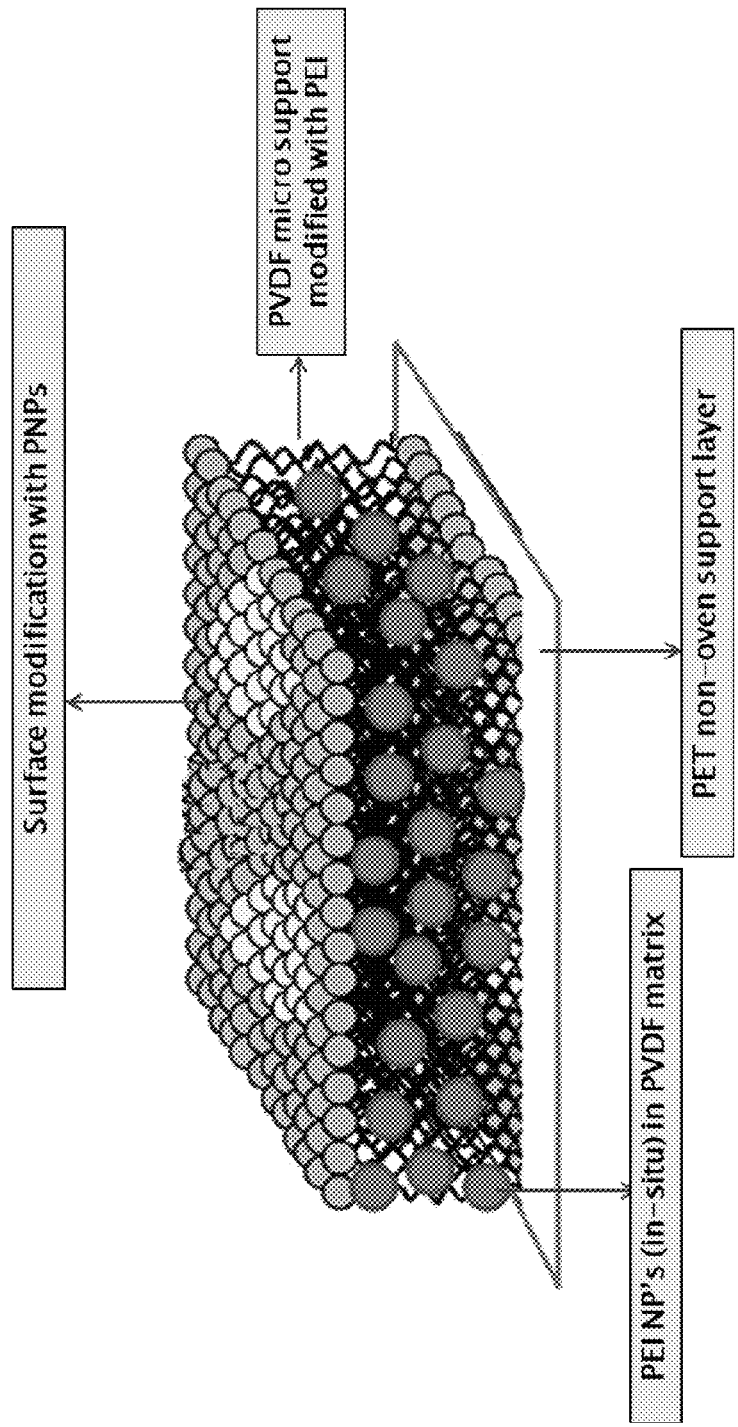
FIG. 2 shows a schematic illustration of a polymeric membrane with embedded nanoparticles according to embodiments herein described.

Provided herein are filtration membranes with embedded polymeric micro/nanoparticles and related methods and systems that allow in several embodiment to perform selective filtration of a liquid and in particular of water.

The term "filtration" as used herein refers to the mechanical or physical operation which can be used for separating components of a homogeneous or heterogeneous solutions. Types of filtration can be classified by the approximate sizes of chemicals to be separated and can include particle filtration, or PF (>10 μm); microfiltration, or MF (0.1-10 μm); ultrafiltration, or UF (0.01-0.1 μm); nanofiltration, or NF (0.001-0.01 μm); and reverse osmosis, or RO (<0.001 μm).

The term "chemicals" as used herein indicates a substance with a distinct composition that is produced by or used in a chemical process. Exemplary chemicals comprise particles, molecules, metals, ions, organic compounds, inorganic compounds and mixture thereof as well as any additional substance detectable through chemical means identifiable by a skilled person. In particular, in some embodiments, the chemicals can comprise solutes dissolved in a fluid (e.g. water), and in particular dissolved ions.

The term "membrane" as used herein refers to a porous structure that is capable of separating components of a homogeneous or heterogeneous fluid. In particular, "pores" in the sense of the present disclosure indicate voids allowing fluid communication between different sides of the structure. More particular in use when a homogeneous or heterogeneous fluid is passed through the membrane, some components of the fluid can pass through the pores of the membrane into a "permeate stream", some components of the fluid can be retained by the membrane and can thus accumulate in a "retentate" and/or some components of the fluid can be rejected by the membrane into a "rejection stream". Membranes can be of various thickness, with homogeneous or heterogeneous structure. Membranes can be comprised within, for example, flat sheets or bundles of hollow fibers. Membranes can also be in various configurations, including but not limited to spiral wound, tubular, hollow fiber, and other configurations identifiable to a skilled person upon a reading of the present disclosure (see, for example the web page kochmembrane.com/Learning-Center/Configurations.aspx). Membrane can also be classified according to their pore diameter. According to IUPAC, there are three different types of pore size classifications: microporous (dp<2 nm), mesoporous (2 nm<dp<50 nm) and macroporous (dp>50 nm). In particular, in some instances, membranes can have pores with a 0.5 nm to 1.0 mm diameters. Membranes can be neutral or charged, and particles transport can be active or passive. The latter can be facilitated by pressure, concentration, chemical or electrical gradients of the membrane process.

In several embodiments, a filtration membrane herein described comprises a polymer matrix formed by a porous polymeric aggregate.

The term "polymer matrix" as used herein refers to three-dimensional network of a polymer component. The term "polymer component" as used herein refers to a linear polymer comprising repeating structural unit forming long chains without branches or cross-linked structures. In some instances molecular chains of a linear polymer can be intertwined, but in absence of modification or functionalization the forces holding the polymer together are physical rather than chemical and thus can be weakened by energy applied in the form of heat. In particular, polymers forming the polymeric component in the sense of the disclosure comprise substituted or unsubstituted aliphatic polymer, a substituted or unsubstituted unsaturated polymer and a substituted or unsubstituted aromatic polymer identifiable by a skilled person.

The polymer matrix according to embodiments herein described is formed by a porous polymer aggregate. The term "polymer aggregate" as used herein refers to aggregations of polymer molecules that form an amorphous network structure. The amorphous network structure can provide structural support to the filtration membranes and pores through which desired substances can pass from one side of the membrane to the other. Exemplary polymer matrices and aggregates can be seen, for example, in FIG. 5. In particular, in some embodiments, the pores provided by the polymer aggregate of the polymer matrix can permit the passage of some molecules (e.g. solvent molecules such as water) while preventing the passage of others (e.g. solute molecules such as proteins) thus configuring the membrane to act as a size-exclusion membrane.

In embodiments herein described, the polymeric matrix further includes polymeric nanoparticles embedded in the polymer matrix The term "polymeric nanomaterial" or "polymeric nanoparticles" as used herein refers to particles of cross-linked polymeric molecules in which the cross-linked polymeric molecules form aggregate nanostructures and/or microstructure with a controlled composition, architecture, and/or size. In particular, in some embodiments, the polymeric molecules to be cross-linked can be linear polymeric molecules such as, for example, poly(methacrylic acid). In other embodiments, the polymeric molecules can be or further include dendritic nanomaterials such as, for example, poly(ethyleneimine) (PEI) or 2,2-bis(methylol)propionic acid (MPA) hyperbranched macromolecule.

The term "dendritic nanomaterial" or "dendritic nanoparticles" refers to highly branched dendritic macromolecules linked in aggregate nanostructures and/or microstructure with a controlled composition, architecture, and/or size. The term "highly branched dendritic macromolecule" as used herein indicates a macromolecule whose structure is characterized by a high degree of branching that originates from a central core region. Exemplary highly branched dendritic macromolecules comprise dendrimers, hyperbranched polymers, dendrigraft polymers, dendronized linear polymers, tecto-dendrimers, core-shell (tecto) dendrimers, hybrid linear dendritic copolymers, dendronized polymers and additional molecule identifiable by a skilled person (see e.g. US 2006/0021938, US 2008/0185341, US 2009/0001802, US 2010/0181257, US 2011/0315636, and US 2012/0035332 each incorporated by reference in its entirety, also describing method of making highly branched dendritic macromolecules). Exemplary dendritic nanomaterials can include, for example, any highly branched dendritic macromolecules or mixtures thereof, in dendrimer-based supramolecular assemblies, 3-D globular nanoparticles or dendritic nano/microparticles identifiable by a skilled person (see, for example, US 2006/0021938, US 2008/0185341, US 2009/0001802, US 2010/0181257, US 2011/0315636, and US 2012/0035332 each incorporated by reference in its entirety).

In particular in some embodiments of the filtration membranes herein described a polymeric nanomaterial (e.g. polymeric and/or dendritic nanoparticles) can be embedded in the porous polymer aggregate forming the polymer matrix.

The term "embed" or "embedded" as used herein refers to a spatial relationship of an item relative to a structure in which the item is at least partially enclosed within the structure. In particular, when used in connection to spatial relationship of nanoparticle with reference to a polymer matrix the term "embed" refers to the nanoparticles being at least partially enclosed by the matrix in a suitable configuration within the polymeric aggregate. In particular, in some embodiments the nanoparticles can be attached (e.g. through covalent bonds or through non-covalent interactions such as, for example, van Der Waals forces) to the polymer molecules forming the porous aggregate in particular in correspondence to pores of the porous aggregate structure of the polymer matrix. (see e.g. FIG. 6).

In embodiments herein described, the polymer forming the polymer component comprising the polymer matrix has a functional group capable of interacting with a corresponding functional group on the polymeric nanoparticle.

The term "functional group" as used herein indicates specific groups of atoms within a molecular structure that are responsible for the characteristic chemical reactions and chemical properties of that structure. Exemplary functional groups include hydrocarbons, groups containing halogen, groups containing oxygen, groups containing nitrogen and groups containing phosphorus and sulfur all identifiable by a skilled person. In particular, functional groups in the sense of the present disclosure include a halide, carboxylic acid, amine, triarylphosphine, azide, acetylene, sulfonyl azide, thio acid and aldehyde. In particular, for example, the first functional group and the second functional group can be selected to comprise the following binding partners: carboxylic acid group and amine group, carboxylic acid and ether group, amine group and nitrile group, azide and acetylene groups, azide and triarylphosphine group, sulfonyl azide and thio acid, aldehyde and primary amine, and an amine group and a fluorine. Additional functional groups can be identified by a skilled person upon reading of the present disclosure. As used herein, the term "corresponding functional group" refers to a functional group that can react or interact (e.g. through non-covalent electrostatic attraction) with another functional group. Thus, functional groups that can react or interact with each other can be referred to as corresponding functional groups. In embodiments where the corresponding functional groups are in the polymer forming the polymer matrix and in the polymer forming the nanoparticle, the corresponding functional groups react to form a covalent bond, a hydrogen bond or other bond functional to the attachment of the polymer forming the polymer matrix and the polymer forming the nanoparticle identifiable by a skilled person upon reading of the present disclosure.

The term "attach" or "attachment" as used herein, refers to connecting or uniting by a bond, link, force or tie in order to keep two or more components together, which encompasses either direct or indirect attachment such that, for example, a first compound is directly bound to a second compound or material, and the embodiments wherein one or more intermediate compounds, and in particular molecules, are disposed between the first compound and the second compound or material. In particular, in some embodiments, the polymeric nanomaterial can be associated with the polymer matrix by, for example, by being physically embedded in the polymer matrix, by being covalently bonded to the polymeric component, or through a combination of both.

In embodiments herein described, the filtration membranes can have embedded nanoparticles in which the concentration of nanoparticles in the membranes can be between about 1 and 50 wt % of the membrane weight as determined by, for example, x-ray photoelectron spectroscopy of the membranes (see, e.g. Example 2 and Table 3 in Example 2). In particular, in some embodiments, the concentration of nanoparticles can be between about 1 and 10 wt %. In particular, in other embodiments, the concentration of the nanoparticles can be greater than about 10 wt %, and more particularly greater than about 20 wt %, and more particularly greater than about 40 wt %. in some embodiments the nanoparticles concentration can be up to about 50%.

Figure 6:
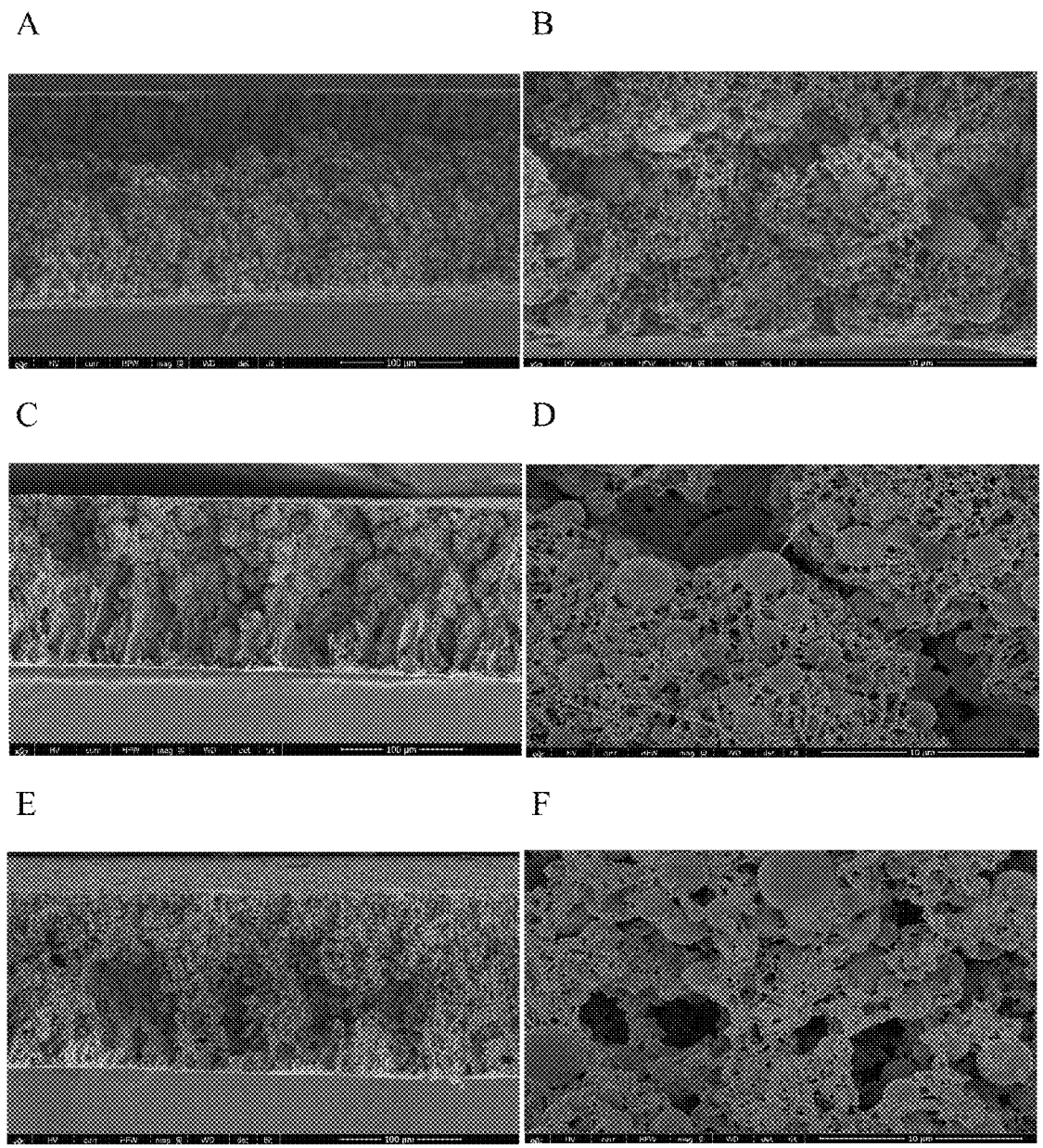
FIG. 6 shows representative SEM images showing cross section morphology of nanocomposite membranes modified with HPEI-ECH according to embodiments herein described. Panel A and Panel B show NSM-1. Panel C and Panel D show NSM-2. Panel E and Panel F show NSM-3.

In some embodiments, the filtration membranes herein described can have a homogeneous distribution throughout the membrane wherein similar numbers of nanoparticles are observed within same sized areas (e.g. in SEM images at the same magnification) throughout different portions of the membrane (see, e.g. Example 2 and FIG. 6). In particular, in some embodiments, some (greater than about 5%) the nanoparticles can be present as clusters of nanoparticles as can be observed by imaging the membrane (e.g. with SEM images of the membrane). In other embodiments, the particles can be discrete and not detectable as clusters (see, e.g. Examples 2-3 and FIG. 6, FIG. 53, FIG. 54, and FIG. 58B).

In particular, in some embodiments, the filtration membranes can have nanoparticles approximately 1-30000 nm in size as can be determined, for example, by SEM and AFM imaging (see e.g. Examples 2 and 3, and FIG. 6, FIG. 9-FIG. 13, and FIG. 53-FIG. 58).

In particular, in some embodiments, the filtration membranes herein described can have pores formed by the polymer aggregates forming the polymer matrix that range in size from approximately 0.5 microns to 10 microns as can be observed by imaging the membrane, for example, by SEM (Examples 2 and 3, and FIG. 5, FIG. 6, FIG. 9-FIG. 13, and FIG. 53-FIG. 58).

In particular, in some embodiments, the polymer matrix and polymeric nanoparticles can be brought together to form membranes comprising the polymer matrix and polymeric nanoparticles such that the polymeric nanoparticles are embedded in the polymer matrix. In particular, in some embodiments, the formation of the membranes with embedded polymeric nanoparticles can be accomplished by allowing formation of polymeric nanoparticle in situ.

In particular, in some of those embodiments, a method for making a filtration membrane in situ herein described comprises preparing a blend comprising the polymer that will form the polymer matrix and the polymer that will form the polymeric nanoparticles in a suitable solvent or mixture of solvents. Embodiments wherein formation of polymeric nanoparticles is performed in situ allow under appropriate conditions formation of homogeneous membrane having a concentration of particles up to about 50% and/or in which fractal formation of nanoparticle is not detectable. In addition or in the alternative to the particle distribution, concentration and configuration, filtration membrane obtainable by in situ formation can have further controllable features identifiable by a skilled person upon reading of the present disclosure.

For example, the polymer that will form the polymer matrix can be selected based on desired features such as morphology, structural strength, and others known to a skilled person (see e.g. [Ref 6]) as well as compatibility based on thermodynamic parameters identifiable to a skilled person. For example, one desired feature can be the presence of skin layers on either side of the membrane when observed in cross section (see e.g. FIG. 6). In particular, the thickness of one of the skin layers can be decreased by increasing the amount of polymer to form the polymeric nanoparticles in the blend of polymer to form the polymeric nanoparticles and polymer to form the polymer matrix (see, e.g. Example 2 and FIG. 6). For example, another desired feature can be particle size. In particular, the size of the nanoparticles can be decreased by increasing the amount of polymer to form the polymeric nanoparticles in the blend of polymer to form the polymeric nanoparticles and polymer to form the polymer matrix (e.g. membranes made with 7.45 wt % PEI in the blend showed particle size as low as 400 nm whereas membranes formed with 5.39 wt % and 3.49 wt % in the blend showed particle sizes ranging from 1000-3000 nm; see, e.g. Example 2 and FIG. 6 and FIG. 7). For example, another desired feature can be porosity as determined by imaging (e.g. with SEM) of the surface of the membrane. In particular, the number of pores can be increased by increasing the amount of polymer to form the polymeric nanoparticles in the blend of polymer to form the polymeric nanoparticles and polymer to form the polymer matrix (see, e.g., Example 2 and FIG. 7).

Factors to be considered comprise having a solubility parameter (see, e.g., [Ref 7-9]) similar to that of polymer that will form the polymeric nanoparticles, as well as favorable interactions between the comprising polymer that will form the polymer matrix and the polymer that will form the polymeric nanoparticles. In particular, the similarity of solubility parameters can ensure that the polymer forming the polymeric nanoparticles is sufficiently distributed in the blend of polymer that will form the polymeric nanoparticles and polymer that will form the polymer matrix (as determined, for example, by inspection of the turbidity and viscocity of the blend) such that a membrane with a desired concentration of nanoparticles is obtained. For example, in embodiments, wherein a concentration of greater than about 20 wt % is desired, PVDF or other fluorinated polymer can be chosen as the polymer for the polymer matrix based on its ability to hydrogen bond with amine groups on polymers such as PAMAM, PEI, or PPI and on the similarity in solubility coefficients between the PVDF or other fluorinated polymer and the PAMAM, PEI, or PPI that can be used to form nanoparticles. In another example wherein a membrane with similar features is desired a poly(ether sulfone) polymer or other polymer with ether groups and/or sulfonyl and/or carbonyl groups can be chosen as the polymer for the polymer matrix based on its ability to hydrogen bond to hydroxyl and/or carboxylic acid groups on polymers such as MPA that can be used to form nanoparticles) thus providing a homogeneous blend adapted to form particles, and in particular discrete particles, in situ when a cross-linker is added to the blend form a dope with homogeneously distributed discrete to form the membrane as described herein (see, e.g., Examples 1-3 and 21).

In particular, the in situ formation of the nanoparticles can be controlled by parameters such as relative concentration of the polymers to form the matrix and nanoparticles and cross linker (see, e.g. Example 21) such that the membranes produced have discrete particles in which formation of nanoparticle clusters is minimized (see e.g. FIG. 58B) as well as fractal growth as can occur in membranes when the particles are preformed and blended with the polymer that will form the polymer matrix. In particular, the membranes with in situ generated nanoparticles can have nanoparticles in concentrations exceeding about 20 wt % and in particular, exceeding about 40 wt %. For example, when a blend of 3.49 wt % PEI and 13.45 wt % PVDF is combined with 2.30 wt % ECH cross-linker, membranes with a concentration of nanoparticles greater than about 30 wt % are produced, and when the amount of PEI is increased (with a constant ratio of cross linker) to a blend of 7.45 wt % PEI and 12.42 wt % PVDF which is combined with 4.90 wt % ECH cross-linker, the concentration of nanoparticles in the membrane produced increases to about 50 wt % (see, e.g. Example 2 and Table 2. In addition, the membranes formed with the 3.49 wt % PEI and 13.45 wt % PVDF blend combined with 2.30 wt % ECH cross-linker and with the 7.45 wt % PEI and 12.42 wt % PVDF blend combined with 4.90 wt % ECH cross-linker both show discrete particles embedded in the polymer matrix without homogeneous distribution of particles and discrete particles devoid of clustering by fractal growth (see, e.g. Example 2 and FIG. 6).

In other embodiments, filtration membranes herein described can be formed by a process wherein the nanoparticles are added to the membrane ex situ. In particular, in some of these embodiments, the nanoparticles can be preformed by cross linking suitable polymeric nanomaterial separately from the polymer forming the matrix (see e.g. Examples 4, 5, and 14) and then mixed with the polymer that will form the polymer matrix to form a dope with preformed polymeric nanoparticles. The method can further comprise casting the dope to form the membranes as described herein (see, e.g., Examples 1 and 20). In particular, the membranes made with preformed nanoparticles in the dope can have clusters of nanoparticles (see e.g. FIG. 58B) from fractal growth. In particular, the membranes with ex situ generated preformed nanoparticles can have nanoparticles in concentrations between about 1 wt % and about 10 wt %.

In some embodiments, the polymer matrix can be formed by an aggregate of a polymer having a formula

(I)

wherein:

Q, Y, and Z comprise saturated aliphatic hydrocarbon, aromatic hydrocarbon, or unsaturated aliphatic hydrocarbons;

m, l, and k independently are integers ranging between 0-50;

at least one of m, l, k is not equal to zero;

j is an integer ranging between 50-500; and at least one of Q (when Q≠0), Y (when Y≠0), or Z (when Z≠0), comprises the polymer corresponding functional group.

The term "saturated aliphatic hydrocarbon" as used herein refers to a hydrocarbon comprising, carbon atoms that are joined together in straight chains, branched chains, or non-aromatic rings in which the carbon-carbon bonds are saturated with hydrogen (e.g. methane, ethane, propane, isobutane, and butane). For example, in saturated aliphatic hydrocarbons have a general formula of $C_nH_{2n+2}$ for acyclic saturated aliphatic hydrocarbons and $C_nH_{2n}$ cyclic saturated aliphatic hydrocarbons. Saturated aliphatic hydrocarbon can be substituted with one or other elements, for example, N, O, S, P, F, Cl, Br, and I.

The term "aromatic hydrocarbon" as used herein refers to a hydrocarbon comprising a conjugated ring of unsaturated bonds, lone pairs, and/or empty orbitals which can exhibit a stabilization stronger than expected by the stabilization by conjugation alone. An exemplary aromatic compounds is benzene which is a six-membered ring having alternating double and single bonds between carbon atoms. Aromatic hydrocarbons can be monocyclic (MAH) (e.g. benzene) or polycyclic (PAH) (e.g. naphthalene, anthracene, pyrene). Aromatic hydrocarbons can be substituted with one or other elements, for example, N, O, S, P, F, Cl, Br, and I.

The term "unsaturated aliphatic hydrocarbon" as used herein refers to a hydrocarbon comprising carbon atoms that are joined together in straight chains, branched chains, or non-aromatic rings and comprise at least one of a double or a triple bond between adjacent carbon atoms, referred to as "alkenes" and "alkynes", respectively. An unsaturated hydrocarbon can comprise one or more of double or triple bonds. In hydrocarbons having more than one double or triple bond, the unsaturated hydrocarbon can be conjugated (e.g. 1,4-hexadiene) or can be isolated (e.g. 1,5-hexadiene). In hydrocarbons comprising internal alkenes, the alkenes can be in a "cis" or a "trans" configuration (e.g. trans-2-butene or cis-2-butene). Unsaturated aliphatic hydrocarbon can be substituted with one or other elements, for example, N, O, S, P, F, Cl, Br, and I.

In particular in some embodiments, Q, Y, and Z in formula (I) can independently selected from the following formulas:

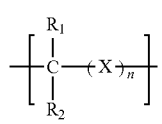
(II)

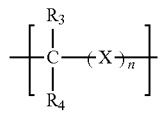
(III)

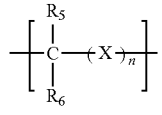
(IV)

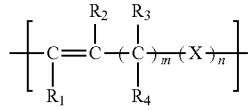
(V)

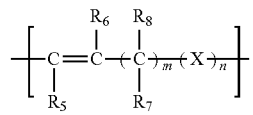
(VI)

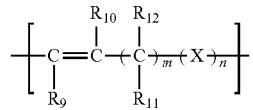
(VII)

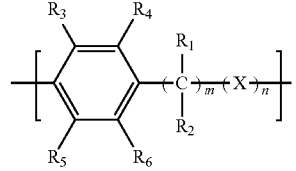
(VIII)

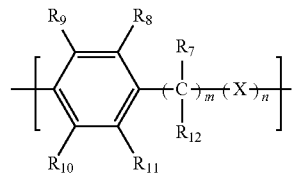
(IX)

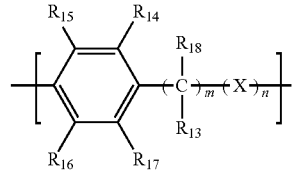
(X)

wherein:
n=0 or 1;
m is an integer ranging from 0-15;
X is a functional group comprising an atom selected from O, S, N, P, or F; and
$R_1$-$R_{18}$ are independently selected from: the polymer component functional group; hydrogen; $C_1$-$C_{20}$ linear, branched, saturated, unsaturated, or aryl hydrocarbon which are either substituted or unsubstituted with O, N, B, S, P; or substituted O, N, B, S, or P;
and at least one of $R_1$-$R_{18}$ is the polymer corresponding functional group attaching the dendrimer component.

Exemplary linear polymer materials for producing a polymeric matrix and/or polymeric nanoparticles made from linear polymers herein described comprise polysulfone (PS), polyether sulfone (PES), poly(vinylidene) fluoride (PVDF), poly(tetrafluoroethylene) (PTFE), poly(acrylonitrile) (PAN), poly(methacrylic acid) (PMAA), poly(acrylic acid) (PAA), poly(vinyl methyl ketone), and poly(ethylene terephthalate) (PET). Additional polymers suitable as a polymer component herein described comprise polymers which can be used as base polymers in the fabrication of commercial UF/MF membranes, polymer which is either partially soluble or can be dispersed in solvents with different physicochemical properties together with nanoparticles according to the disclosure, and polymers which can be functionalized, which are identifiable by a skilled person upon reading of the present disclosure (see e.g. [Ref 6-8]).

Suitable polymeric nanoparticles according to embodiments herein described can be selected for a given polymer matrix based on compatibility with the polymer matrix which can be determined based on the presence of corresponding functional group capable of attachment as well as possibly other features such as solubility of the polymer that forms the polymeric nanoparticles for in situ nanoparticle formation (or solubility of the preformed polymeric nanoparticles for preformed nanoparticle formation) together with the polymer that forms the polymer matrix in a particular solvent or mixture of solvents, affinity of the dendritic component for polymeric component, and/or stability of the dendritic component in a solvent to be used in the fabrication of the membrane. By way of example, compatibility can be determined by the polymeric nanoparticle possessing functional groups (e.g. amine groups or carboxylic acid or hydroxyl groups) capable of interacting with functional groups on the polymer matrix (e.g. fluoride atoms or oxygen atoms) and/or by the polymers used to make the polymer matrix and polymeric nanoparticles having similar solubility parameters (see e.g. [Ref 6-8]). In particular, if the polymeric nanoparticle possesses amine groups (e.g. PMAM, PPI, or PEI) then a polymer to form the polymer matrix can be chosen which possesses fluoride atoms; if the polymeric nanoparticle possesses carboxylic acid or hydroxyl groups (e.g. MPA or bis-MPA polyester-16-hydroxyl) then a polymer to form the polymer matrix can be chosen which possesses oxygen atoms (e.g. a poly(sulfone) or poly(ether sulfone) polymer).

In some embodiments, the polymers to form polymeric nanoparticles can be a highly branched dendritic macromolecule forming the dendritic nanomaterial and in particular to the highly branched dendritic macromolecule according to general formula (XI)

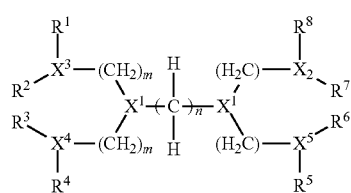

(XI)

wherein:

n and m are integers ranging from 2-5;

$R^1$-$R^8$ are independently selected from hydrogen or hyperbranched polymer moieties;

$X^1$ and $X^2$ are N; and $X^4$-$X^5$ are selected from amine, amide, imide, and carbamate.

In particular, in some embodiments, the highly branched dendritic macromolecule according to some embodiments have the general formulas XII and XIII below:

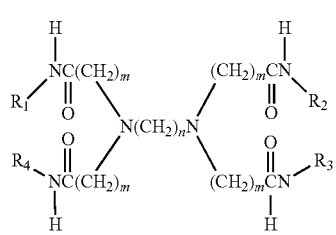

(XII)

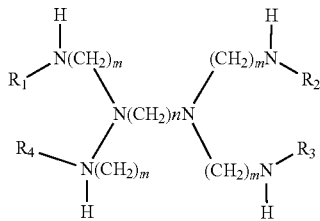

(XIII)

wherein n and m are integers from 2-5, and wherein $R_1$-$R_4$ can be independently hydrogen or hyperbranched polymer moieties including, but not limited to, polyethyleneimine (PEI) and derivatives thereof.

In some embodiments, the highly branched dendritic macromolecule to form polymeric nanoparticles according to some embodiments comprises a core, a plurality of arms extending from the core, the arms having a hyperbranched structure, and within the hyperbranched structure, a plurality of units satisfying having the formula:

(XIV)

where $R^1$ comprises no nitrogen atoms that are simultaneously bound to two or more carbon atoms, for example, secondary and tertiary amines or amides.

In some embodiments the dendritic component comprises the formula:

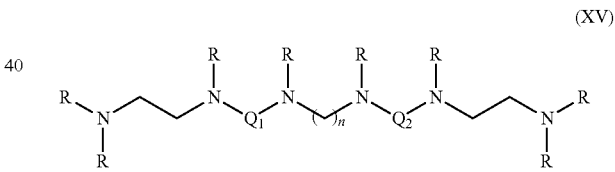

(XV)

where n is an integer ranging from 2-5, each of $Q_1$ and $Q_2$ comprises hyperbranched polymer moiety, and R is selected from hydrogen, an alkyl group, or a 2-hydroxyalkyl group.

In particular, in some embodiments, when groups $R^1$-$R^8$ and Q of formulas XI-XV comprise hyperbranched polymer moieties with amino and/or alcohol groups, the molecules can be converted to nano/microparticles by cross linking the molecules with cross-linking reagents described herein (e.g. 1,3-dibromopropane or epichlorohydrin) using inverse micelles as described herein (see e.g. Example 14). In particular, in some embodiments, the formation of the particles can occur by blending polymers that comprise the polymer matrix with polymers that form the polymeric nanoparticles, an in particular dendritic nanoparticles to form a blend, and adding a cross-linker to form a dope with in situ generated polymeric nanoparticles, and in particular dendritic nanoparticles as described herein (see, e.g. Examples 1 and 2).

Figure 29:
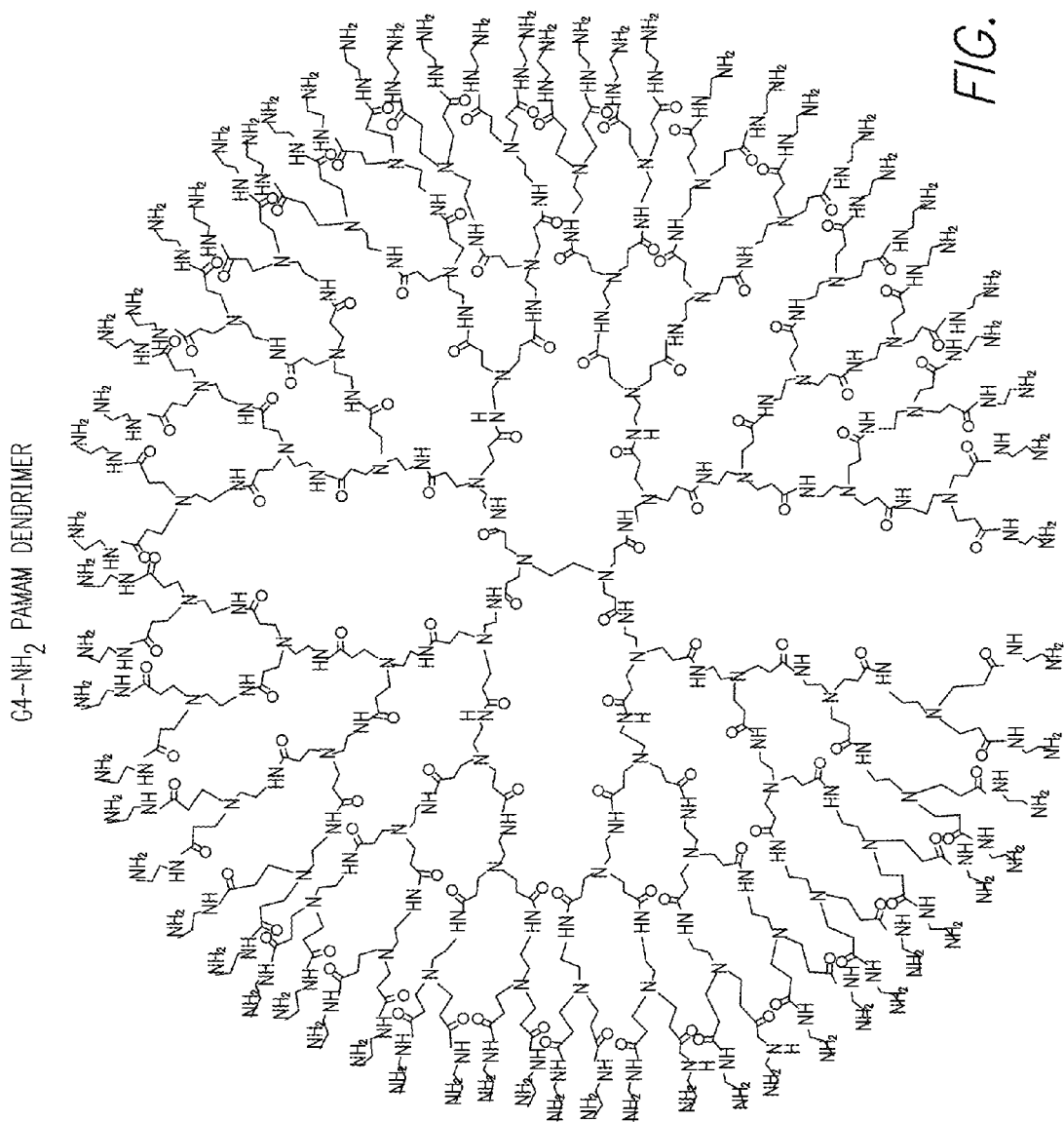
FIG. 29 shows the 2-D structure of a fourth generation PAMAM dendrimer.
Figure 30:
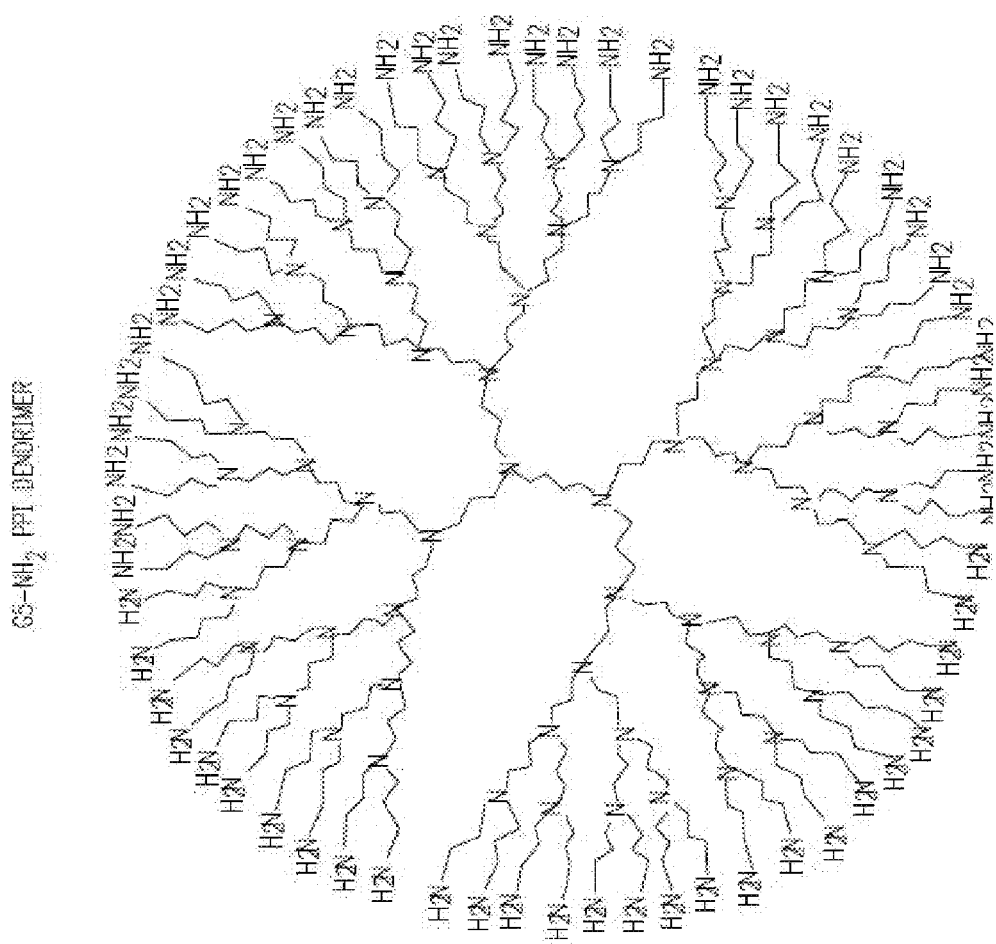
FIG. 30 shows the 2-D structure of a fifth generation PPI dendrimer.
Figure 34:
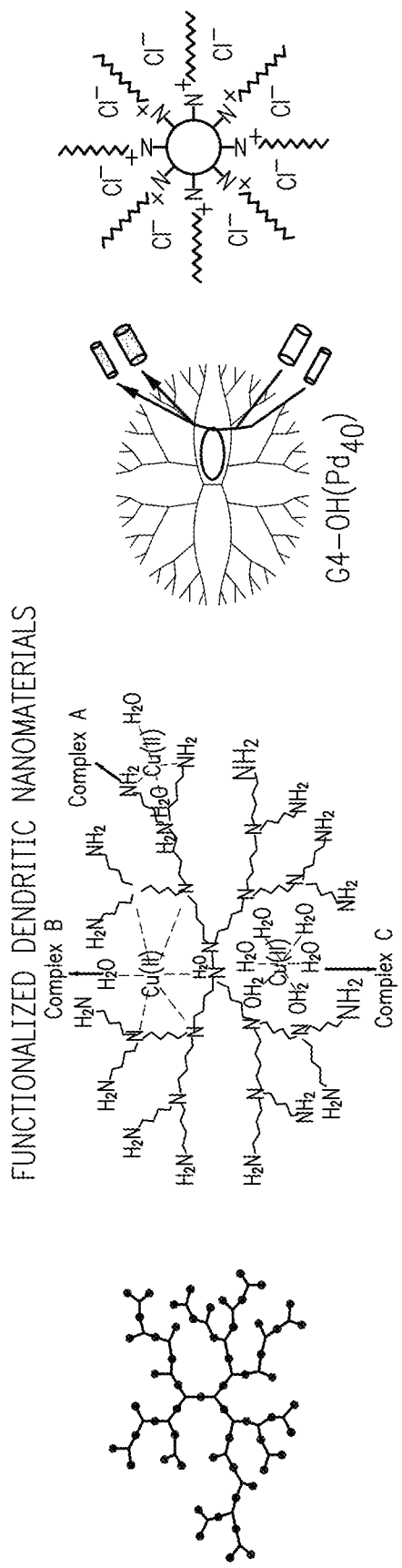
FIG. 34 shows general schematic depictions of the dendritic molecules.

In particular, in some embodiments, the highly branched dendritic macromolecule to form polymeric nanoparticles can comprise various monodisperse generations of poly(amidoamine) (PAMAM) dendrimers (for example, G3, G4, or G5 PAMAM; see e.g. FIG. 29) or micro and/or nano aggregates thereof; monodisperse generations of poly(propyleneimine) (PPI) (for example, G3, G4, or G5 PPI; see e.g. FIG. 29) or micro and/or nano aggregates thereof; monodisperse generations of poly(bis(methylol)propionic acid) (MPA) (for example, G3, G4, or G5 MPA) or micro and/or nano aggregates thereof; or monodisperse generations of poly(ethyleneimine) (PEI) (for example, G3, G4, or G5 PEI) or micro and/or nano aggregates thereof. In other embodiments, the dendritic component can be polydisperse hyperbranched PEI. Hyperbranched PEI can be prepared, for example, by ring opening polymerization of aziridine also known as ethylene imine. Additional dendritic components can be selected, for example, based on compatibility with a polymeric component as described herein (see, e.g., FIG. 34).

Suitable polymer components comprising the polymer matrix can be selected for a given dendrimer component based on compatibility which can be determined based on the presence of corresponding functional group capable of attachment as well as possibly other features such as thermodynamic parameters such as solubility of the polymer component together with the dendrimer component in a particular solvent or mixture of solvents, affinity of the polymer component for the dendrimer component (e.g. the ability to hydrogen bond or have an electrostatic attraction), and/or stability of the polymer component in a solvent to be used in the fabrication of the membrane.

In filtration membranes herein described, polymeric nanoparticles are attached to the polymer component of the polymer matrix typically through a covalent and/or a hydrogen bond. For example, in some embodiments, when the polymeric components of formulas I-XI comprise fluorine and/or sulfonyl groups (e.g. PVDF or PES), dendritic components of formulas XII-XV comprising amino groups can attach to the polymeric component through hydrogen bonds from the amino hydrogen atoms to the fluorine or carbonyl oxygen atoms. In other embodiments, when the polymeric components comprise oxygen groups (e.g. ethers, carbonyls, and sulfonyls), dendritic components comprising hydroxyl or carboxylic acid groups can attach to the polymeric component through formation of hydrogen bonds.

In particular in embodiments of the filtration membrane herein described the polymeric nanomaterial are embedded in the polymer aggregate of the polymer matrix to present reactive sites in the membrane.

The term "present" as used herein with reference to a compound or functional group indicates attachment performed to maintain the chemical reactivity of the compound or functional group as attached. Accordingly, a functional group presented on a surface, is able to perform under the appropriate conditions the one or more chemical reactions that chemically characterize the functional group.

The term "reactive site" as used herein refers to a chemical functional group capable of attracting, rejecting, and/or binding to a chemical of interest. In particular, reactive sites herein described are able to attract, reject or bind selectively a chemical to be filtered. Exemplary functional groups suitable as reactive sites include, but are not limited to, amines, quaternary ammonium groups, amides, hydroxyl groups, ethers, carboxylates, esters, sulfonates, sulfiniates, sulfonate esters, sulfinate esters, sulfonamides, sulfonamides, phosphates, carbamates, ureas, imidines, guanidines, oximes, imidazoles, pyridines, thiols, thioethers, thiocarboxylates, and phosphines.

In particular, in some embodiments, the reactive sites can be located on the functional groups of the linear polymer forming the polymeric nanoparticles. By way of example, the reactive sites can comprise carboxylic acid groups in polymeric nanoparticles formed with a linear polymer such as poly(methacrylic acid).

In particular, in some embodiments, the reactive site can be located on a highly branched dendritic macromolecule forming the polymeric nanoparticles (for example, amino groups on PEI or carboxylic acid groups on MPA) without any chemical transformation being necessary. In other embodiments, one or more reactive sites can be introduced into the dendritic component after a chemical transformation. Exemplary chemical transformations suitable for the introduction of a reactive site comprise reductive amination of amine groups to form alkylated amino groups, alkylation of amines to form quaternary ammonium groups, alkylation of hydroxyl groups to form ethers, reaction of amines or hydroxyls with haloalkyl carboxylic acids and/or derivatives (such as, for example, 2-chloroacetic acid or methyl 2-chloroacetate) to form carboxylic acids and/or derivatives, reaction of amines or hydroxyls with haloalkyl sulfonic acids and/or derivatives (such as, for example, 2-(chloromethyl)sulfonic acid or methyl 2-(chloromethyl)sulfonate to form sulfonic acids and/or derivatives, and reaction of amines with epoxides to form alcohols. Other transformations are identifiable to a skilled person upon a reading of the present disclosure (see, for example, US 2010/0181257 and US 2011/0315636 each incorporated by reference in its entirety). In some embodiments, the chemical transformation of the reactive site on the dendritic component can be performed before the dendritic component is associated with the polymeric component as herein described. In other embodiments, the chemical transformation of the reactive site on the dendritic component can be performed after the dendritic component is associated with the polymeric component as herein described.

In particular, in some embodiments where dendritic nanoparticles are formed in situ, the dendritic nanoparticles can be functionalized when the particles are formed in the polymer blend and before casting of the membrane. In other embodiments where dendritic nanoparticles are formed in situ, the dendritic nanoparticles can be functionalized after the casting of the membranes, for example by contacting the membrane with the functionalization reagents to functionalize the nanoparticles and then rinsing the membrane. For example, if a cation-rejecting membrane with a cation-rejecting nanoparticle concentration of greater than about 20 wt % is desired, PEI nanoparticles or other polymeric nanoparticles with amine groups can be formed in situ in the dope and the particles quaternized using an alkyl iodide or bromide (see, e.g. FIG. 49 and Example 15) by treating the dope with the alkyl iodide or bromide, casting the membrane and rinsing the membrane to produce a cation-rejecting membrane with a nanoparticle concentration of greater than about 20 wt %. If a cation-rejecting membrane with a cation-rejecting nanoparticle concentration of between about 1 and about 10 wt % is desired, PEI nanoparticles or other polymeric nanoparticles with amine groups can be formed ex situ (see, e.g., Example 14) and quaternized using an alkyl iodide or bromide (see, e.g. FIG. 49 and Example 15) and then mixed with the polymer to form the polymer matrix to form a dope for casting a membrane with a cation-rejecting nanoparticle concentration of between about 1 and about 10 wt % (see, e.g. Examples 3 and 19). As another example, if a cation-selective membrane with a cation-selective nanoparticle concentration of greater than about 20 wt % is desired, PEI nanoparticles or other polymeric nanoparticles with amine groups can be formed in situ in the dope and the particles functionalized with N, O, and S donors (see, e.g., Example 17 and FIG. 51).

In particular, in some embodiments, the cross-linking of polymers in the polymer blend herein described to form polymeric nanoparticles as described herein can result in the formation of additional reactive sites in addition to those already present on the polymer forming the polymeric nanoparticle. For example, if the polymer comprises carboxylic acids groups (e.g., as in poly(methacrylic acid) or MPA) and the cross-linker used is a diamine, the cross-linking can give rise to amide reactive sites in addition to the carboxylic acid reactive sites In embodiments herein described of filtration membrane herein described the reactive site can be selected and configured on the polymer forming the polymeric nanoparticles to provide selective filtration of one or more chemicals of interest. In particular, in some embodiments, the reactive site can be selected to separate the one or more chemicals of interest in the rejection stream, permeate stream and/or retentate of the membrane. In particular, the dimension, chemical nature, and electrical charge of the reactive site as well as the location on the dendrimer component can be selected based on the dimensions, chemical nature and electrical charge of the chemical to be selectively filtered.

For example, in embodiments wherein selective filtration is desired to include anions in rejection stream and 2s metal ions cations such as $Ca^{2+}$ and $Mg^{2+}$ in the retentate of the membrane, reactive sites having negatively charged O donors [Ref 10] can be presented on the dendrimer component of the membrane. As another example, polymeric nanoparticles having neutral oxygen donors can be used to coordinate selective retention of 1s metal ions such as $Na^+$ [Ref 10]. As another example, polymeric nanoparticles, and in particular dendritic nanoparticles having positively charged nitrogen atoms (e.g. quaternary ammonium groups) can be used to selectively reject cations. As another example, polymeric nanoparticles, and in particular dendritic nanoparticles, comprising vicinal diol groups can be used to coordinate selective retention of boron.

In some embodiments, reactive sites retaining one or more chemical of interest can then be subjected to further reactions to selectively release some or all of the chemicals forming the retentate in a permeate stream, and/or to further modify the retentate as will be understood by a skilled person upon reading of the present disclosure.

In particular, membranes herein described including a suitable retentate can be treated to convert the retentate into a catalyst thus forming a catalytic membrane. For example, in some embodiments, a retentate form by metals can be treated with suitable active agents to change the oxidation state and/or ligation state to convert the metal to a catalytically active form. For example, in an embodiment dendritic components having groups capable of retention of palladium (e.g. amines and phosphines) can be subjected to reduction (e.g. $H_2$ or other reducing agents) to reduce the Pd atoms to produce catalytically active Pd(0) sites. Additional suitable metals or other materials suitable for preparation of catalytic membrane and related activating agents and/or suitable treatments will be identifiable by a skilled person.

In some embodiments, the retentate can be subjected to a selective release before or after an additional treatment. For example dendritic components having negatively charged O donors and tertiary amine groups can be used to selectively bind $Ca^{2+}$ and $Mg^{2+}$ ions at pH ~7.0, and the ions can later be released from the dendritic component by washing the dendritic component with an acidic solution containing a small ligand such as citric acid.

In some embodiments, the polymeric nanoparticles of the membranes herein described in any configuration, can be formed by polymeric nanomaterials according to the present disclosure that can range from approximately 1-3000 nm in size and can in some embodiments can selectively encapsulate and release a broad range of solutes in water including but not limited to cations (e.g., copper, silver, gold and uranium), anions (e.g., chloride, perchlorate and nitrate) and organic compounds (e.g., pharmaceuticals) [Ref 11, 12].

In particular in some embodiments, the highly branched dendritic macromolecule forming the polymeric nanoparticles can comprise hyperbranched PEI macromolecules, water-soluble branched macromolecules with functional N groups including for example, Gx-$NH_2$ PPI dendrimers, Gx-$NH_2$ PAMAM dendrimers, hyperbranched and dendrigraft lysine macromolecules, Hybrane hyperbranched polymers can be used as building blocks separation layers for the filtration membranes disclosed in this disclosure. Similarly, polymers such as polysulfone (PS), polyethersulfone (PES), and/or poly(vinyl) alcohol can be used in making polymer matrix of the filtration membranes described herein.

In some embodiments, polymeric nanomaterials can be selected to retain chemicals and to be used as nanoscale reactors and catalysts [Ref 11, 12]. In some embodiments, dendritic nanomaterial can be selected to be selective for cells, or other biological material (e.g. to reject or retain such material). For example, in some embodiments, filtration membranes herein described can be configured to bind bacteria and viruses possibly followed by a deactivation of the same [Ref 12]. In other embodiments, the dendritic nanomaterials can be used as scaffolds and templates for the preparation of metal-bearing nanoparticles with controllable electronic, optical and catalytic properties [Ref 11, 12]. Dendritic nanomaterials can also be used as delivery vehicles or scaffolds, for example for bioactive compounds [Ref 13].

According to embodiments herein described, the polymeric nanomaterials, and in particular dendritic nanomaterials, can be functionalized with surface groups can make the polymeric nanomaterial soluble in selected media or bind to surfaces. According to some embodiments, a first dendritic nanomaterial can be covalently linked to one or more further dendritic nanomaterials or associated with one or more macromolecules to form supramolecular assemblies.

Figure 25:
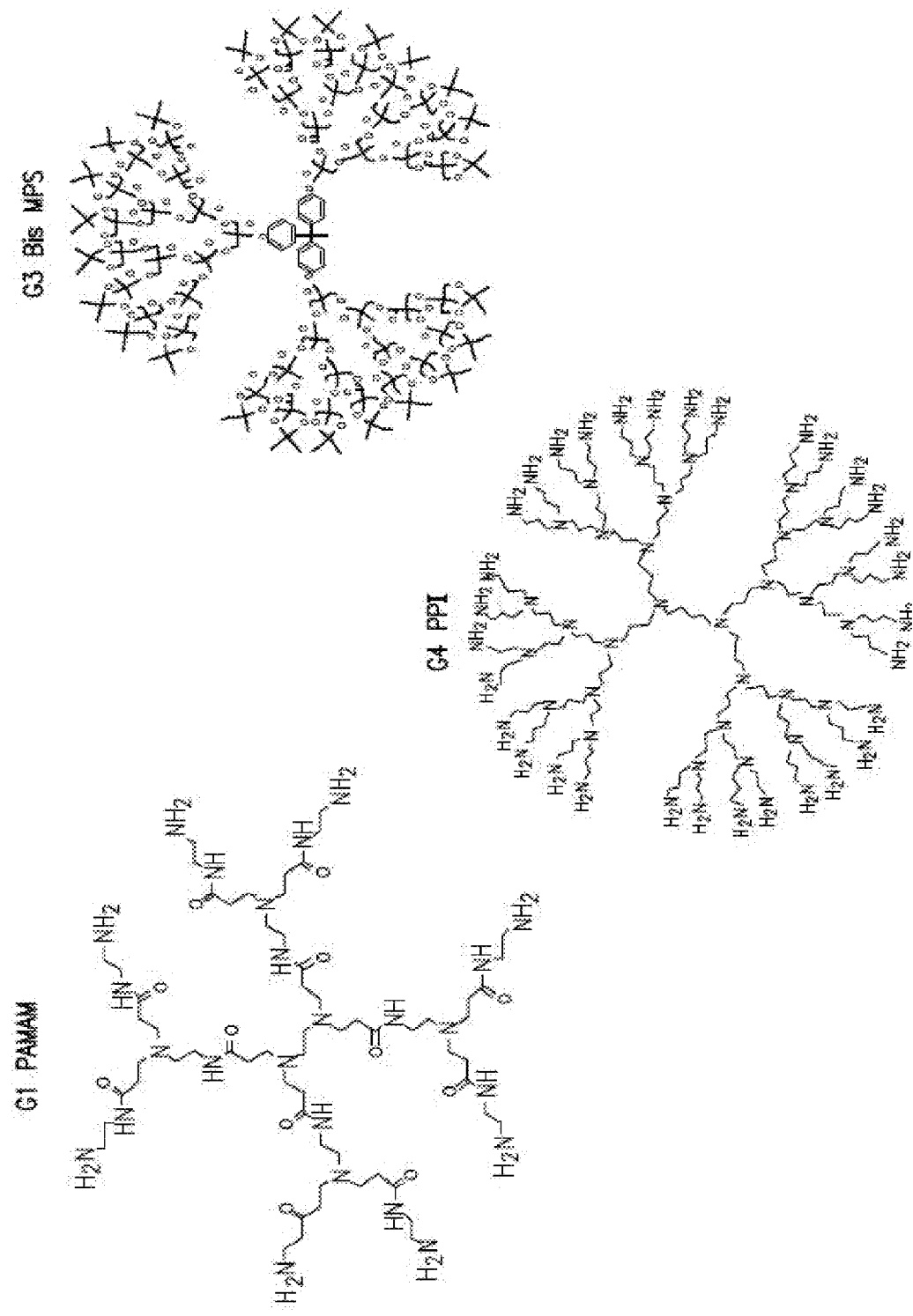
FIG. 25 shows 2-D structures of exemplary poly(amidoamine) (PAMAM), poly(propyleneimine) (PPI) and bis bis(methylol)propionic acid (MPA) dendrimers suitable in embodiments herein described.

According to some embodiments, a polymeric nanomaterial can be used as functional materials, for example, for water treatment [Ref 14-19]. According to some embodiments, the dendritic component comprises a carbon based structure functionalized with N or O. In particular, in some embodiments, the dendritic macromolecules comprise amines, carbonyls, and/or amides. In these embodiments, the N and O groups can sorb anions and/or cations. Exemplary dendritic components with N and O groups which can function as anion and cation sorbents include but is not limited to poly(amidoamine) [PAMAM], poly(propyleneimine) and bis(methylol)propionic acid (MPA) dendrimers (see, e.g. FIG. 25). Syntheses of dendritic nanomaterials according to the present disclosure can be carried out, for example, by cross linking of dendritic macromolecules to form dendritic nano- and/or microparticles. Further syntheses of dendritic nanomaterials will be apparent to a skilled person upon reading of the present disclosure (see, for example, [Ref 14-23]).

According to some embodiments, the polymeric nanomaterials, and in particular dendritic nanomaterials can bind and release cations such as $Cu^{2+}$, $Co^{2+}$, $Fe^{3+}$, $Ni^{2+}$ and $U^{6+}$] and anions such as $Cl^-$, $ClO_4^-$ and $SO_4^{2-}$, for example, through a change of solution pH [Ref 14-19]. In particular PAMAM, PPI, and MPA particles can in some embodiments bind and release cations such as $Cu^{2+}$, $Co^{2+}$, $Fe^{3+}$, $Ni^{2+}$ and $U^{6+}$, and anions such as $Cl^-ClO_4^-$ and $SO_4^{2-}$. In some embodiments PAMAM dendrimers are used and the dendrimer can present for example, an amide, a primary amine, a secondary amine, and/or a tertiary amine group. In some embodiments PPI dendrimers are used. In embodiments where PPI dendrimers are used, the PPI dendrimers have only primary and tertiary amine groups. In some embodiments MPA dendrimers are used. MPA dendrimers can have carbonyl and/or carboxyl groups which can allow for membranes to have a high capacity, selective, and/or recyclable ligands for $Ca^{2+}$, $Mg^{2+}$ and $Na^+$ [Ref 10].

Figure 24:
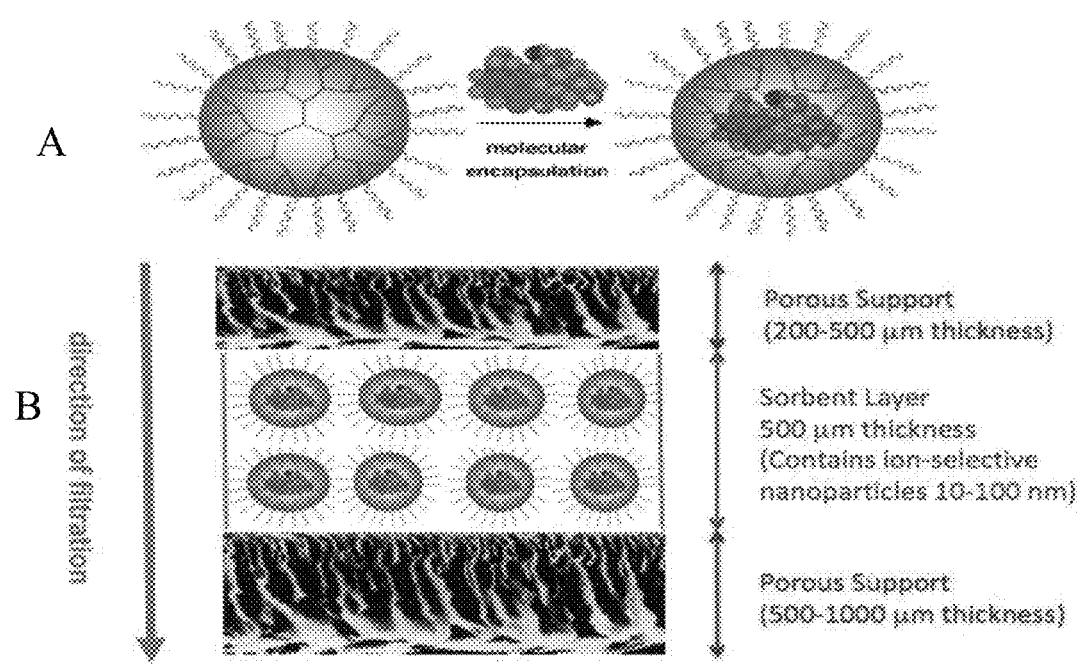
FIG. 24 shows a depiction of an hyperbranched macromolecules and a schematic of their use in an ion absorbing microfiltration (IAµF) membrane according to an embodiment herein described. Panel A shows a schematic representation of encapsulation of a molecule by a dendritic component as herein described. Panel B shows an exemplary membrane comprising a composite material nano and/or microfiber layer in between two porous support layers.

According to further embodiments, polymeric nanomaterials and in particular dendritic nanomaterials according to the present disclosure (e.g. PAMAM, PPI and MPA) can be functionalized with terminal groups which can allow the dendrimer to be soluble in a particular solvent to type of solvent, bind onto one or more targeted surfaces, or cross-link with other dendrimers to form multifunctional supramolecular assemblies [Ref 11, 12] (See e.g. FIG. 24).

In some embodiments, the polymeric nanomaterials and in particular dendritic macromolecules (e.g., PAMAM, PEI, and PPI dendrimers) can provide selective and recyclable high capacity macroligands for anions (for example $Cl^-$, $Br^-$; $SO_4^{2-}$; $NO_3^-$; and $ClO_4^-$) and cations (for example, $Na^+$, $Ca^{2+}$, and $Mg^{2+}$) in aqueous solutions [Ref 16-19]. Such dendritic macromolecules can be suitable, for example, in making filtration membranes for water purification as $Na^+$, $Ca^{2+}$, and $Mg^{2+}$ cations and anions $Cl^-$ and $SO_4^{2-}$ anions make-up more than 98% of the total dissolved solids (TDS) in brackish water and seawater [Ref 1].

Figure 44A:
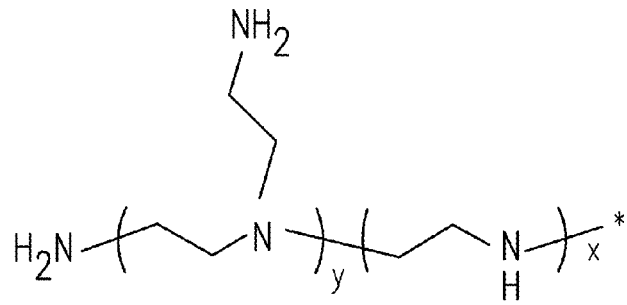
FIG. 44 shows the structure of hyperbranched polyethyleneimine (PEI). Panel A shows the monomer subunits of and exemplary PEI molecule. Panel B is a schematic depiction of an exemplary hyperbranched PEI molecule.
Figure 44B:
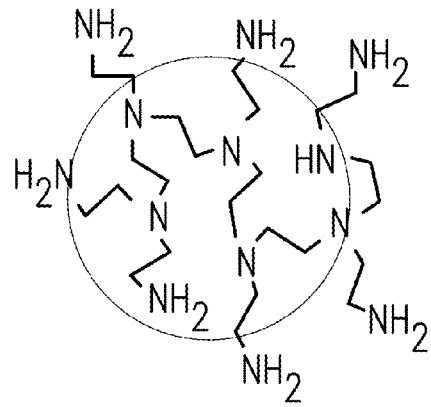

In some embodiments, the polymeric nanomaterials, and in particular dendritic nanomaterials comprise hyperbranched macromolecules, such as polyethyleneimine (PEI) which can behave similarly to corresponding, dendrimers [Ref 1]. Hyperbranched PEI has a degree of branching at approximately 65-70%. Hyperbranched PEI are generally soluble (e.g. 5-20 wt %) in solvents such dimethyl formamide (DMF) and dimethyl acetamide (DMAc) [Ref 19, 24]. Hyperbranched polyethyleneimine (PEI) can be useful as a monomer of interfacial polymerization due at least in part to its high amine density. Generally, hyperbranched PEI have a large number of amine groups per molecule (e.g. primary, secondary, and tertiary amine groups in a ratio of approximately 1:2:1), each nitrogen atom is linked each other by an ethylene group (FIG. 44) [Ref 25] which can allow for a number of unreacted amine groups, which can be sources of charges (e.g. by pH change in aqueous solution [Ref 26] or post-functionalization), for example, for enhancing Donnan exclusion effects.

In some embodiments, the dendritic nanomaterials are capable of rejecting cations and anions. For example, dendritic components having negatively charged O donors can be used to coordinate 2s metal ions such as $Ca^{2+}$ and $Mg^{2+}$ [Ref 10]. As another example, dendritic components having neutral oxygen donors can be used to coordinate with 1s metal ions such as $Na^+$ [Ref 10].

In some embodiments, dendritic nanomaterials containing negatively charged O donors and tertiary amine groups can be used to selectively bind $Ca^{2+}$ and $Mg^{2+}$ ions at pH ~7.0. The $Ca^{2+}$ and $Mg^{2+}$ ions can then be released from the dendritic component by washing the dendritic component with an acidic solution containing a small ligand such as citric acid. As another example, dendritic nanomaterials containing neutral O donors and tertiary amine groups can selectively bind $Na^+$ ions at pH ~7.0. The $Na^+$ ions can then be released from the dendritic nanomaterial by washing the dendritic component with an acidic solution containing a small complexing ligand such as citric acid. These examples are based on established trends in coordination chemistry [Ref 10] and accordingly other methods of making and using dendritic components based on such trends as will be understood by a skilled person, can be implemented without departing from the scope of the present disclosure.

In some embodiments, the dendritic nanomaterial can be made by cross-linking highly branched dendritic macromolecules by using a cross linking agent. For example, a dendritic nanomaterial comprising amine groups can be combined with a cross linking agent which is capable of cross linking proximate amine groups (amine-amine cross linking agents). The amine-amine cross linking agents can be bifunctional (e.g. two sites which can form covalent bonds with amines) or multifunctional (e.g. three or more sites which can form covalent bonds with amines). The cross linking agents can include but are not limited to primary bifunctionalized alkanes having the general formula (XVI) or (XVII) below:

wherein $X^1$ and $X^2$, by way of example, can be independently selected from (COCl, COBr, COI, Cl, Br, I, $OSO_3CH_3$, $OSO_3C_7H_7$, n can range from 1-15, and wherein R can be H, alkyl, or epoxy substituted alkyl. Crosslinking agents can also include imidoesters (e.g. dimethyl adipimidate.2HCl (DMA), dimethyl pimelimidate.2HCl (DMP), dimethyl suberimidate.2HCl (DMS), dimethyl 3,3'-dithiobispropionimidate.2HCl (DTBP)), N-hydroxy succinimide (NHS)-esters (e.g. disuccinimidyl suberate (DSS), bis(sulfosuccinimidyl) suberate (BS3), disuccinimidyl glutarate (DSG)), and 1,5-difluoro-2,4-dinitrobenzene (DFDNB). Exemplary amine cross linking agents comprise in particular, trimesoyl chloride (TMC), 1,3-dibromopropane (DBP), and epichlorohydrin (EPC) to form dendritic nanoparticles.

In some embodiments, membranes can be fabricated by casting a mixture of the polymer component, the dendrimer component, one or more solvents, and a cross-linking agent onto porous polymeric MF membrane supports [Ref 27].

Figure 26:
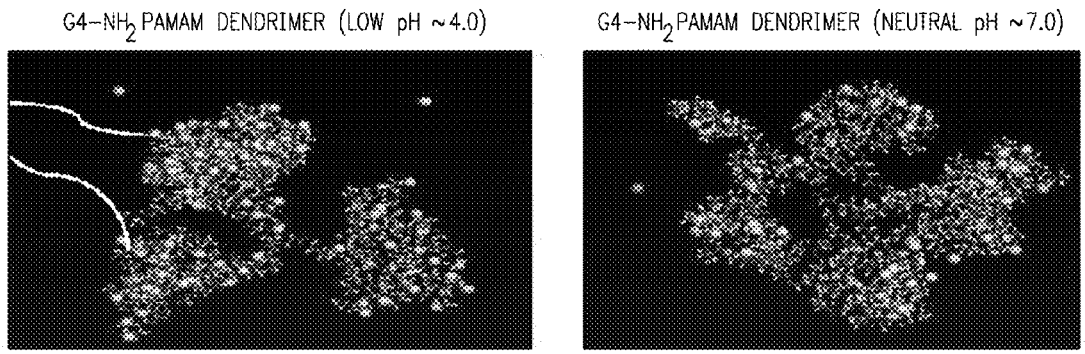
FIG. 26 shows atomistic molecular dynamics simulations of CF (light gray atoms (151) binding to a fourth generation (G4-$NH_2$ poly(amidoamine) (PAMAM)) dendrimer in aqueous solutions [Ref 2]. The left image shows the dendrimer at approximate pH 4.0 and the right image shows the dendrimer at approximate pH 7.0.

Targeted atomistic molecular dynamics (MD) simulations of anion and/or cation binding to a dendritic component (e.g. PAMAM, PPI, and MPA) can be carried out using a Dreiding III force field (FIG. 26) [Ref 2] to develop and validate a computer-aided molecular design framework that can be used to guide the synthesis of high capacity and recycle low-cost ion-selective dendritic polymers.

In some embodiments, the membranes with embedded nanoparticles as described herein can comprise a polymeric matrix with polymeric nanoparticles made from cross-linked linear polymers.

In some embodiments, the membranes with embedded nanoparticles as described herein can comprise a polymeric matrix made from poly(vinylidene) fluoride (PVDF) with polymeric nanoparticles made from cross-linked linear polymers.

In some embodiments, the membranes with embedded nanoparticles as described herein can comprise a polymeric matrix made from poly(vinylidene) fluoride (PVDF) with polymeric nanoparticles made from cross-linked poly(methacrylic acid) (PMAA).

In some embodiments, the membranes with embedded nanoparticles as described herein can comprise a polymeric matrix made from poly(tetrafluoroethylene) (PTFE) with polymeric nanoparticles made from cross-linked linear polymers.

In some embodiments, the membranes with embedded nanoparticles as described herein can comprise a polymeric matrix made from poly(tetrafluoroethylene) (PTFE) with polymeric nanoparticles made from cross-linked poly(methacrylic acid) (PMAA).

In some embodiments, the membranes with embedded nanoparticles as described herein can comprise a polymeric matrix made from polyether sulfone (PES) with polymeric nanoparticles made from cross-linked linear polymers.

In some embodiments, the membranes with embedded nanoparticles as described herein can comprise a polymeric matrix made from polyether sulfone (PES) with polymeric nanoparticles made from cross-linked poly(methacrylic acid) (PMAA).

In some embodiments, the membranes with embedded nanoparticles as described herein can comprise a polymeric matrix made from poly(acrylonitrile) (PAN) with polymeric nanoparticles made from cross-linked linear polymers.

In some embodiments, the membranes with embedded nanoparticles as described herein can comprise a polymeric matrix made from poly(acrylonitrile) (PAN) with polymeric nanoparticles made from cross-linked poly(methacrylic acid) (PMAA).

In some embodiments, the membranes with embedded nanoparticles as described herein can comprise a polymeric matrix made from poly(ethylene terephthalate) (PET) with polymeric nanoparticles made from cross-linked linear polymers.

In some embodiments, the membranes with embedded nanoparticles as described herein can comprise a polymeric matrix made from poly(ethylene terephthalate) (PET) with polymeric nanoparticles made from cross-linked poly(methacrylic acid) (PMAA).

In some embodiments, the membranes with embedded nanoparticles as described herein can comprise a polymeric matrix with polymeric nanoparticles made from cross-linked highly branched dendritic macromolecule.

In some embodiments, the membranes with embedded nanoparticles as described herein can comprise a polymeric matrix made from poly(vinylidene) fluoride (PVDF) with polymeric nanoparticles made from cross-linked highly branched dendritic macromolecule.

In some embodiments, the membranes with embedded nanoparticles as described herein can comprise a polymeric matrix made from poly(vinylidene) fluoride (PVDF) with polymeric nanoparticles made from cross-linked poly(ethyleneimine) (PEI).

In some embodiments, the membranes with embedded nanoparticles as described herein can comprise a polymeric matrix made from poly(vinylidene) fluoride (PVDF) with polymeric nanoparticles made from cross-linked poly(bis(methylol)propionic acid) (MPA) (for example, G3, G4, or G5 MPA).

In some embodiments, the membranes with embedded nanoparticles as described herein can comprise a polymeric matrix made from poly(tetrafluoroethylene) (PTFE) with polymeric nanoparticles made from cross-linked highly branched dendritic macromolecule.

In some embodiments, the membranes with embedded nanoparticles as described herein can comprise a polymeric matrix made from poly(tetrafluoroethylene) (PTFE) with polymeric nanoparticles made from cross-linked poly(ethyleneimine) (PEI).

In some embodiments, the membranes with embedded nanoparticles as described herein can comprise a polymeric matrix made from poly(tetrafluoroethylene) (PTFE) with polymeric nanoparticles made from cross-linked poly(bis(methylol)propionic acid) (MPA) (for example, G3, G4, or G5 MPA).

According to a further embodiment of the disclosure, a method of making a polymeric membrane with embedded polymeric nanoparticles is described. The method comprises contacting a polymeric component, a dendritic component, and a solvent to provide a blend, contacting the blend with a cross-linking component, for a time and under a condition to permit the in situ formation of dendritic nanoparticles to provide a dope solution; and casting the dope solution to provide a filtration membrane with embedded dendritic nanoparticles.

In particular, in some embodiments, contacting a polymeric component, a dendritic component, and a solvent to provide a blend is performed by mixing a solution of the polymeric component in a suitable solvent—the suitable solvent chosen based on parameters such as solubility parameters (see e.g. [Ref 7, 8]), compatibility of the dendritic component with the polymer component (e.g. hydrogen bonding between amine groups and fluoride groups or interaction of hydroxyl/carboxylic acid groups with oxygen atoms), or other chemical and thermodynamic parameters identifiable to a skilled person—for approximately 1-24 hours at 25-85° C.—or other times and temperatures capable of producing a homogeneous solution without decomposing the polymeric component as would be identifiable to a skilled person—and then adding a solution of the dendritic component and mixing to form a homogeneous blend (see, e.g., Example 2). In particular, in some embodiments, that the concentration of the dendritic component is between about 3.5 wt % and 7.5 wt % of the blend.

In particular, in some embodiments, the contacting of the blend with a cross linking component can be performed by mixing a crosslinking catalyst and cross-linking component—the cross-linking catalyst and cross linking component chosen based on the functional groups on the dendritic component as would be identifiable to a skilled person (e.g., if the dendritic component has amine groups, the cross linking component can be an epoxide such as epichlorohydrin or dihaloalkane such as 1,3-dibromopropane and the catalysts can be HCl; if the dendritic component has carboxylic acid groups, the cross-linking component can be a diamine such as 1,3-diamino propane and the cross-linking catalyst can be 1-ethyl-3-(3-dimethylaminopropyl)carbodiimide (EDC))—for 1-24 hours at approximately 25-85° C.—or other times and temperatures capable of producing a homogeneous dope without decomposing either the polymeric or dendritic components as would be identifiable to a skilled person—to provide a dope solution with dendritic nanoparticles formed in situ (see, e.g., Example 2). In particular, in some embodiments, the dendritic component is at a concentration of about 1.5 times the concentration of the cross-linking component In particular, in membranes cast with in situ generated nanoparticles aggregates and clusters of nanoparticles that form for example through fractal growth are not detectable contrary to membranes cast with nanoparticles that are preformed (compare, e.g., FIG. 6 with FIG. 53 and FIG. 58B) resulting in discrete nanoparticles being distributed in membranes with nanoparticles formed in situ. In particular, in some embodiments, the nanoparticles can be present in the membrane at a concentration of greater than about 20 wt %, and more particularly at a concentration of greater than about.

In particular, in some embodiments, the dope solution with in situ formed dendritic nanoparticles can be cast to provide a polymeric membrane with embedded with dendritic nanoparticles. In particular, in some embodiments, the membrane can be cast by phase inversion casting (see, e.g. [Ref 6]). In particular, in some embodiments, the casting can be performed by pouring the hot dope solution onto a glass surface and allowing it to air dry at room temperature and then immersing it into water for a time to form a nascent membrane as would be identifiable to a skilled person. The nascent membrane can then be immersed in fresh water and then immersed in ethanol to remove impurities as would be identifiable to a skilled person. The membranes can then be removed from the glass and dried to provide a polymeric membrane with pores, the pores embedded with dendritic nanoparticles. In other embodiments, the dope solution with in situ formed dendritic nanoparticles can be cast onto a polymer support (e.g. a poly(ethylene terephthalate) non-woven fabric) in place of glass to provide a polymeric membrane with pores, the pores embedded with dendritic nanoparticles wherein the polymeric membrane is layered on top of the polymer support.

According to further embodiments, a method of making a polymeric membrane with embedded preformed polymeric nanoparticles is described. The method comprises contacting a polymeric component, preformed polymeric nanoparticles, and a solvent for a time and under a condition to provide a dope solution; and casting the dope solution to provide a polymeric membrane with pores, the pores embedded with the preformed polymeric nanoparticles.

In particular, in some embodiments, the preformed polymeric nanoparticles can be preformed by cross-linking a polymer (e.g. PEI or poly(methacrylic acid)) to form polymeric nanoparticles for example by inverse micelle cross-linking (see, e.g., Example 14).

In particular, in some embodiments, contacting a polymeric component, preformed polymeric nanoparticles, and a solvent for a time and under a condition to provide a dope solution is performed by mixing a solution of the polymeric component in the solvent for 1-24 hours at approximately 25-85° C.—or other times and temperatures capable of producing a homogeneous solution without decomposing the polymeric component as would be identifiable to a skilled person—and then adding a solution of the preformed polymeric nanoparticles and mixing the solution for 1-24 hours at approximately 25-85° C.—or other times and temperatures capable of producing a homogeneous blend without decomposing either the polymeric or dendritic components as would be identifiable to a skilled person to provide a dope solution with preformed polymeric nanoparticles.

In particular, in some embodiments, the dope solution with preformed dendritic nanoparticles can be cast to provide a polymeric membrane with embedded with dendritic nanoparticles. In particular, in some embodiments, the membrane can be cast by phase inversion casting (see, e.g. [Ref 6]). In particular, in some embodiments, the casting can be performed by pouring the hot dope solution onto a glass surface and allowing it to air dry at room and then immersing it into water for a time to form a nascent membrane as would be identifiable to a skilled person. The nascent membrane is then immersed in fresh water and then immersed in ethanol to remove impurities as would be identifiable to a skilled person. The membranes can then be removed from the glass and dried to provide a polymeric membrane with pores, the pores embedded with dendritic nanoparticles. In other embodiments, the dope solution with preformed dendritic nanoparticles can be cast onto a polymer support (e.g. a poly(ethylene terephthalate) non-woven fabric) in place of glass to provide a polymeric membrane with pores, the pores embedded with dendritic nanoparticles wherein the polymeric membrane is layered on top of the polymer support.

Figure 53:
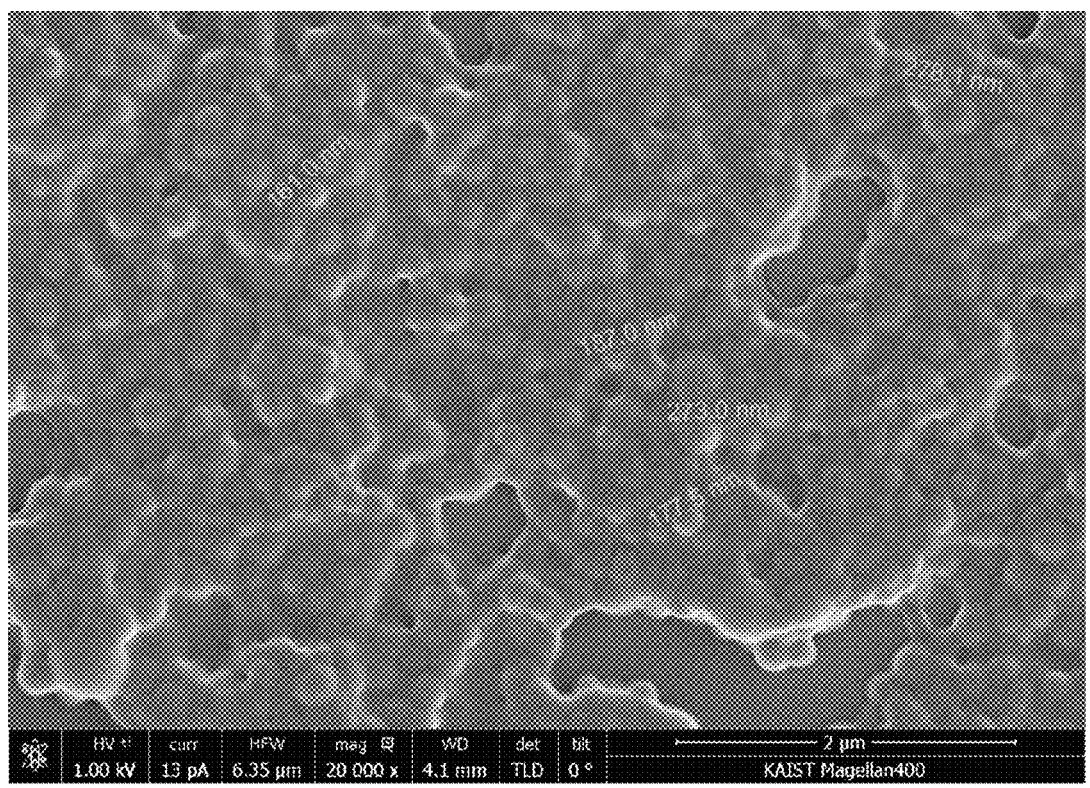
FIG. 53 shows an SEM image of preformed PEI Nanoparticles in a PVDF composite membrane by casting a membrane with preformed particles.

In particular, membranes cast with preformed nanoparticles can possess aggregates and clusters of nanoparticles that form through fractal growth unlike the discrete particles embedded in membranes when the particles are formed in situ (compare, e.g., FIG. 53 and FIG. 58B with FIG. 6).

In some embodiments, the membranes with embedded nanoparticles as described herein can comprise a polymeric matrix with polymeric nanoparticles made from cross-linked linear polymers made by using preformed nanoparticles.

In some embodiments, the membranes with embedded nanoparticles as described herein can comprise a polymeric matrix made from poly(vinylidene) fluoride (PVDF) with polymeric nanoparticles made from cross-linked poly(methacrylic acid) (PMAA). In particular, when the particles are premade, the PMMA can be cross-linked with either EGDMA or PEGDMA with an AIBN initiator (see, e.g., Example 14).

In some embodiments, the membranes with embedded nanoparticles as described herein can comprise a polymeric matrix made from poly(tetrafluoroethylene) (PTFE) with polymeric nanoparticles made from cross-linked poly(methacrylic acid) (PMAA). In particular, when the particles are premade, the PMMA can be cross-linked with either EGDMA or PEGDMA with an AIBN initiator (see, e.g., Example 14).

In some embodiments, the membranes with embedded nanoparticles as described herein can comprise a polymeric matrix made from polyether sulfone (PES) with polymeric nanoparticles made from cross-linked poly(methacrylic acid) (PMAA). In particular, when the particles are premade, the PMMA can be cross-linked with either EGDMA or PEGDMA with an AIBN initiator (see, e.g., Example 14).

In some embodiments, the membranes with embedded nanoparticles as described herein can comprise a polymeric matrix made from poly(acrylonitrile) (PAN) with polymeric nanoparticles made from cross-linked poly(methacrylic acid) (PMAA). In particular, when the particles are premade, the PMAA can be cross-linked with either EGDMA or PEGDMA with an AIBN initiator (see, e.g., Example 14).

In some embodiments, the membranes with embedded nanoparticles as described herein can comprise a polymeric matrix made from poly(ethylene terephthalate) (PET) with polymeric nanoparticles made from cross-linked poly(methacrylic acid) (PMAA). In particular, when the particles are premade, the PMAA can be cross-linked with either EGDMA or PEGDMA with an AIBN initiator (see, e.g., Example 14).

In some embodiments, the membranes with embedded nanoparticles as described herein can comprise a polymeric matrix with polymeric nanoparticles made from cross-linked highly branched dendritic macromolecules made by either in situ particle formation or by using preformed nanoparticles.

In some embodiments, the membranes with embedded nanoparticles as described herein can comprise a polymeric matrix made from poly(vinylidene) fluoride (PVDF) with polymeric nanoparticles made from cross-linked poly(ethyleneimine) (PEI). In particular, when the particles are made in situ, the PEI can be cross-linked with either epichlorohydrin or 1,3-dibromopropane with an a catalytic amount of HCl at 80° C. for 1 hour to form a dope with nanoparticles of cross-linked PEI.

In some embodiments, the membranes with embedded nanoparticles as described herein can comprise a polymeric matrix made from poly(vinylidene) fluoride (PVDF) with polymeric nanoparticles made from cross-linked poly(bis(m-ethylol)propionic acid) (MPA) (for example, G3, G4, or G5 MPA). In particular, when the particles are made in situ, the MPA can be cross-linked with 1,3-diaminopropane and 1-ethyl-3-(3-dimethylaminopropyl)carbodiimide) (EDC) to form a dope with nanoparticles of cross-linked MPA.

In some embodiments, the membranes with embedded nanoparticles as described herein can comprise a polymeric matrix made from poly(tetrafluoroethylene) (PTFE) with polymeric nanoparticles made from cross-linked poly(ethyleneimine) (PEI). In particular, when the particles are made in situ, the PEI can be cross-linked with either epichlorohydrin or 1,3-dibromopropane with an a catalytic amount of HCl at 80° C. for 1 hour to form a dope with nanoparticles of cross-linked PEI.

In some embodiments, the membranes with embedded nanoparticles as described herein can comprise a polymeric matrix made from poly(tetrafluoroethylene) (PTFE) with polymeric nanoparticles made from cross-linked poly(bis(m-ethylol)propionic acid) (MPA) (for example, G3, G4, or G5 MPA). In particular, when the particles are made in situ, the MPA can be cross-linked with 1,3-diaminopropane and 1-ethyl-3-(3-dimethylaminopropyl)carbodiimide) (EDC) to form a dope with nanoparticles of cross-linked MPA.

In some embodiments, the membranes with embedded nanoparticles as described herein can comprise a polymeric matrix made from poly(methacrylic acid) (PMAA) with polymeric nanoparticles made from cross-linked poly(ethyleneimine) (PEI). In particular, when the particles are made in situ, the PEI can be cross-linked with either epichlorohydrin or 1,3-dibromopropane with an a catalytic amount of HCl at 80° C. for 1 hour to form a dope with nanoparticles of cross-linked PEI.

In some embodiments, the membranes with embedded nanoparticles as described herein can comprise a polymeric matrix made from poly(methacrylic acid) (PMAA) with polymeric nanoparticles made from cross-linked poly(bis(m-ethylol)propionic acid) (MPA) (for example, G3, G4, or G5 MPA). In particular, when the particles are made in situ, the MPA can be cross-linked with 1,3-diaminopropane and 1-ethyl-3-(3-dimethylaminopropyl)carbodiimide) (EDC) to form a dope with nanoparticles of cross-linked MPA.

In some embodiments a dope comprising a polymer forming the polymer matrix herein described in which polymeric nanomaterial is embedded can be used to provide nanofibers and/or microfibers.

The term "fiber" as used herein indicate a material that is a continuous filament or is in a discrete elongated piece, similar to a length of thread. In particular, "nanofiber" as used herein refer to fibers with a diameter less than approximately 1000 nm and the term "microfiber" as used herein refer to fibers with a diameter between approximately 1 µm to approximately 10 µm in size.

In particular, in some embodiments the dope solution comprising a polymer embedding nanoparticles herein described can be used in a method of making a nano and/or micro fibers with embedded polymer nanoparticles, and in particular with embedded dendritic nanoparticles, herein described. In some embodiments, the method comprises contacting a polymeric component, a dendritic component, a cross-linking component, and a solvent for a time and under a condition to permit the in situ formation of dendritic nanoparticles to provide a dope solution; and spinning the dope solution to provide a nanofiber or microfiber herein described. In particular, in some embodiments, the polymeric component and dendritic component are contacted to form a blend and the cross-linking agent is added to the blend to allow in situ formation of dendritic nanoparticles and obtain the dope before the spinning. In some embodiments, the nanoparticle are preformed and then added to the polymer for an ex situ formation according to methods and systems herein described to provide a dope solution that is then spun to provide a nano-fiber and/or microfiber herein described.

In some embodiments, the nanofibers with embedded polymeric nanoparticles can be electrospun onto a support layer (e.g. a PET non-woven fabric; see e.g. Example 2). Then a nanofibrous composite membrane can be fabricated as described in U.S. patent application Ser. No. 13/570,221 entitled "Filtration Membranes, and Related Nano and/or Micro fibers, Composites, Methods and Systems" filed on Aug. 8, 2012 incorporated by reference in its entirety.

A "support layer" in the sense of the present disclosure is an aggregate material comprising a polymer component configured to strengthen the membrane structure. Suitable polymers to be included in support layers comprise, for example, poly(vinylidene) fluoride (PVDF), poly(tetrafluoroethylene) (PTFE), poly(acrylonitrile) (PAN), poly(methyl methacrylate) (PMMA), poly(methacrylic acid) (PMAA), poly(acrylic acid) (PAA), poly(vinyl methyl ketone), and poly(ethylene terephthalate) (PET) which can be aggregated by inverse casting the polymer or by electrospinning. In some embodiments the support layer includes pores. In some embodiments, the support layer can be functionalized with a dendrimer component. In other embodiments, after a nanofibers and/or microfibers with embedded dendritic nanoparticles are electrospun onto a support layer, a further support layer can be electrospun to provide a top support layer for providing additional strength or for creating a bipolar membrane. In some embodiments, the support layer can comprise or be formed by a polymer matrix with embedded polymer nanoparticles, and in particular dendritic nanoparticles, in accordance with the present disclosure.

Accordingly, in some embodiments a filtration membrane can comprise a plurality of nano and/or micro fibers, wherein at least one of the nano and/or micro fibers comprises polymeric nanoparticles embedded in a polymeric component. The plurality of nano and/or micro fibers can be attached to a support layer and/or a polymer matrix comprising embedded polymer nanoparticles and in particular dendritic nanoparticles herein described. Additional layers such as a separation layer or a further support layer can also be comprised as will be understood by a skilled person.

In some embodiments a filtration membrane can comprise a polymer matrix comprising embedded polymer nanoparticles herein described attaching a nano- and/or microfiber. Additional layers such as a separation layer or a further support layer can also be comprised as will be understood by a skilled person.

In some embodiments, the nanofiber and/or microfiber can comprise a polymeric nanoparticle embedded in a polymeric component as described herein. In some embodiments other kind of nanofibers and/or microfibers can be comprised in filtration membranes herein described in the alternative or in addition to a nano fiber and/or microfiber with embedded nanoparticles. In particular in some of those embodiments, another kind of nano-fiber and/or microfiber that can be comprised in a filtration membrane herein described can comprise a scaffold component providing a supporting framework for one or more additional components attached to the scaffold providing functionalities to the scaffold and in particular to a dendrimer component as described in U.S. patent application Ser. No. 13/570,221 entitled "Filtration Membranes, and Related Nano and/or Micro fibers, Composites, Methods and Systems" filed on Aug. 8, 2012 incorporated by reference in its entirety. The scaffold component and the additional components define features of the nanofiber and microfiber such as a diameter (or radius), a mechanical strength, chemical stability, functionalization and chemical properties which are detectable using techniques and process identifiable by a skilled person. Additional details concerning the nano-fiber and/or microfiber comprising a scaffold component and a dendrimer component are described in U.S. patent application Ser. No. 13/570,221 entitled "Filtration Membranes, and Related Nano and/or Micro fibers, Composites, Methods and Systems" filed on Aug. 8, 2012 incorporated by reference in its entirety.

In some embodiments the polymeric nanoparticles embedded in the polymeric component of the nanofiber or microfiber and/or presented on the scaffold component of the nano-micro-fiber can comprise reactive sites, and the reactive sites can be positively and/or negatively charged.

In some embodiments, in the filtration membrane, the plurality of nanofibers and/or microfibers can be arranged in a mesh structure forming a layer comprised in the membrane, alone or in combination with additional layers. In some embodiments, the plurality of nanofibers and/or microfibers are arranged in a substantially parallel configuration, in particular in some of these embodiments, one or more nanofibers and/or microfibers of the plurality of the nanofibers and/or microfibers are hollow.

In particular, in some embodiments microfiber and/or nanofiber herein described can be comprised as a composite material layer having a mesh structure comprised in the filtration membrane alone or in combination with one or more additional layers.

The term "composite material" as used herein refers to a heterogeneous material made from two or more different materials, the materials having different chemical and/or physical properties and remaining as separate and distinct materials within the composite material. For example, according to embodiments herein described, a composite material can comprise a polymer component and a dendritic nanoparticle which is structurally different from the polymer component and is embedded in the polymer component. The composite material according to some embodiments can comprise a semi-permeable barrier made of overlapping strands of nanofibers.

In particular, the composite material comprising a plurality of nanofibers and/or microfibers can comprise a plurality of a same type of fiber or of two or more different types of fibers. In some embodiments, fibers can be covalently cross-linked to one another. In some embodiments, nanofibers and/or microfibers comprised in the composite material can comprise hollow fibers herein described.

In embodiments herein described, wherein a membrane comprise a mesh, the features of the mesh such as dimension of the pores of the mesh structure, the strength and resistance of the mesh and chemical compatibility of the mesh can be controlled by selection of the diameter of the nanofiber or microfiber, number and configuration of the nanofiber and/or microfiber forming the mesh and the specific polymer component and dendrimer component of each fiber as will be understood by a skilled person upon reading of the present disclosure.

Also described herein is a bicomposite membrane, which comprises a plurality of nanofibers and/or microfibers herein described attached to a polymer matrix formed by a porous polymeric aggregate comprising polymeric nanoparticles. In particular, in some embodiments, the polymeric nanoparticles are embedded in the porous polymer aggregate (e.g., by in situ particle formation as herein described).

In particular, in some embodiments, the nanofibers and/or microfibers in the bicomposite membrane can comprise dendritic nanoparticles embedded (e.g. through in situ particle formation as herein described) in a polymer matrix as described herein. In some embodiments, the nanofibers and microfibers comprising embedded nanoparticles can be hollow. In some embodiments the polymeric nanoparticles embedded in the polymeric component of the nanofiber or microfiber comprises reactive sites, and the reactive sites can be positively and/or negatively charged.

In particular, in some embodiments, the nanofibers and/or microfibers in the bicomposite membrane comprise a scaffold component providing a supporting framework for one or more additional components attached to the scaffold providing functionalities to the scaffold. The scaffold component and the additional components define features of the nanofiber and microfiber such as a diameter (or radius), a mechanical strength, chemical stability, functionalization and chemical properties which are detectable using techniques and process identifiable by a skilled person. The features of nanofibers and microfibers in the sense of the present disclosure which can also be controlled by modifying the chemical composition and structure of the fiber during manufacturing of the fiber according to techniques identifiable by a skilled person upon reading of the present disclosure. In particular, in some embodiments, the scaffold component comprises a polymeric component providing a fiber scaffold and the additional component comprises a dendritic component attached to the polymeric component to present reactive sites on the fiber scaffold (see, e.g., FIG. 63).

In some embodiments, in the bicomposite membrane, the plurality of nanofiber and/or microfiber are arranged in a mesh structure forming a layer comprised in the membrane, alone or in combination with additional layers. In some embodiments, the plurality of nanofiber and/or microfibers are arranged in a substantially parallel configuration, in particular in some of these embodiments, one or more nanofibers and/or microfibers of the plurality of the nanofibers and/or microfibers are hollow.

In particular, in some embodiments, the plurality of nanofibers and/or microfibers is directly attached to polymer matrix formed by a porous polymeric aggregate comprising polymeric nanoparticles (e.g. by forming a polymer aggregate comprising polymeric nanoparticles by in situ particle formation as herein described and electrospinning the nanofibers and/or microfibers directly only the polymer aggregate comprising polymeric nanoparticles). In other embodiments, the plurality of nanofibers and/or microfibers is attached to a support layer (e.g. a PET non-woven fabric) and the support layer is further attached to porous polymeric aggregate comprising polymeric nanoparticles (e.g. by casting a membrane comprising porous polymeric aggregate with embedded polymeric nanoparticles on a support layer and then electrospinning the nanofibers and/or microfibers onto the side of support layer opposite to the membrane comprising porous polymeric aggregate with embedded polymeric nanoparticles; see e.g. Examples 2, 20 and FIG. 59 and FIG. 60)

In some embodiments a filtration membrane comprises a layer of the composite material according to the disclosure in combination with a one or more additional layers. The additional layers can include, for example, a support layer and/or a separation layer (see e.g. Examples 22-24 and FIG. 62 and FIG. 63). In embodiments wherein filtration membrane herein described comprise one or more composite material layers and one or more additional layers, the one or more composite material layers and the additional layers can be comprised in the filtration membrane in various configurations as will be understood by a skilled person upon reading of the present disclosure. For example in some embodiments one or more composite layers can be comprised between two functionalized or unfunctionalized supporting layers. In some embodiments, one or more composite layers can be comprised between a supporting layer and a coating layer. In some of these embodiments a functionalized supporting layer can be further attached to the coating layer. In some embodiments a coating layer can be comprised between one or more composite layers a functionalized supporting layer. Additional configurations can be identified by a skilled person. In particular, selection of a configuration of the membrane can be performed by a skilled person in view of the polymer component and dendrimer component forming the composite material and/or the support layer and/or coating layer and in view of a desired selection of one or more chemicals to be filtered. (see e.g. U.S. patent application Ser. No. 13/570,221 entitled "Filtration Membranes, and Related Nano and/or Micro fibers, Composites, Methods and Systems" filed on Aug. 8, 2012 incorporated by reference in its entirety)

In some embodiments, where the filtration membrane comprises a composites material layer with one or more additional layers, the polymer component and the dendritic component of the one or more composite material layers and/or of the one or more additional layer can be either the same or different. In some of these embodiments, the polymer component can be polysulfone (PS), polyether sulfone (PES), poly(vinylidene) fluoride (PVDF), poly(tetrafluoroethylene) (PTFE), poly(acrylonitrile) (PAN), poly(methyl methacrylate) (PMMA), poly(methacrylic acid) (PMAA), poly(acrylic acid) (PAA), and/or poly(vinyl methyl ketone). In some of these embodiments the dendrimer component can be a highly branched dendritic macromolecule selected from the group consisting of generation-3 poly(amidoamine) (PAMAM) dendrimer, generation-4 poly(amidoamine) (PAMAM) dendrimer, generation-5 poly(amidoamine) (PAMAM) dendrimer, generation-3 poly(propyleneimine) (PPI) dendrimer, generation-4 poly(propyleneimine) (PPI) dendrimer, generation-5 poly(propyleneimine) (PPI) dendrimer, generation-3 poly(bis(methylol)propionic acid) (MPA) dendrimer, generation-4 poly(bis(methylol)propionic acid) (MPA) dendrimer, generation-5 poly(bis(methylol)propionic acid) (MPA) dendrimer, generation-3 poly(ethyleneimine) dendrimer, generation-4 poly(ethyleneimine) dendrimer, generation-5 poly (ethyleneimine) dendrimer, and hyperbranched poly (ethyleneimine), or aggregate nanostructures and/or microstructure thereof.

According to a further embodiment of the disclosure, a filtration system is described. The filtration system comprises a plurality of modules, each module comprising one or more of the filtration membranes for pretreatment of water according to embodiments herein described, charged particle rejection of water, and charged particle absorption of water is described.

The term "module" as used herein refers to a compartment comprising a filtration membrane according to the disclosure, adapted to be used in connection with other modules to perform parallel and/or sequential filtrations.

In particular, in some embodiments, a module herein described can comprise one of the filtration membranes herein described through which water can pass. For example, if the membrane in a module is charged particle rejecting, it can remove charged particles from the water passing through the membrane in the module such that the charged particles are reduced and/or substantially eliminated from water exiting the membrane. As another example, if the membrane in a module is charged particle absorbing, it can absorb charged particles from the water passing through the membrane in the module such that the charged particles are reduced or eliminated from water exiting the membrane.

In particular, in some embodiments, the filtration within the modules can operate by size exclusion and/or Donnan exclusion. The Donnan exclusion can be in operation can when sizes of charged species are much smaller than the pore size of a membrane [Ref 28]. For example, a more porous membrane than a general NF membrane can be provided which simultaneously shows rejection for the charged species by enhancing the Donnan exclusion effect.

The Donnan equilibrium, also known as the Gibbs-Donnan effect, Donnan effect, or Gibbs-Donnan equilibrium, refers the behavior or distribution of charged particles through the both sides of a semi-permeable membrane when they are not distributed evenly across the membrane due to the presence of a charged substances at one side of the membrane. These charged substances are unable to pass through the membrane and thus generate an electrical potential. For membranes with fixed positive or negative charges, the Donnan Effect refers to the repulsion of co-ions, (anions or cations that have the same charges as the fixed charges of the membranes).

Figure 40:
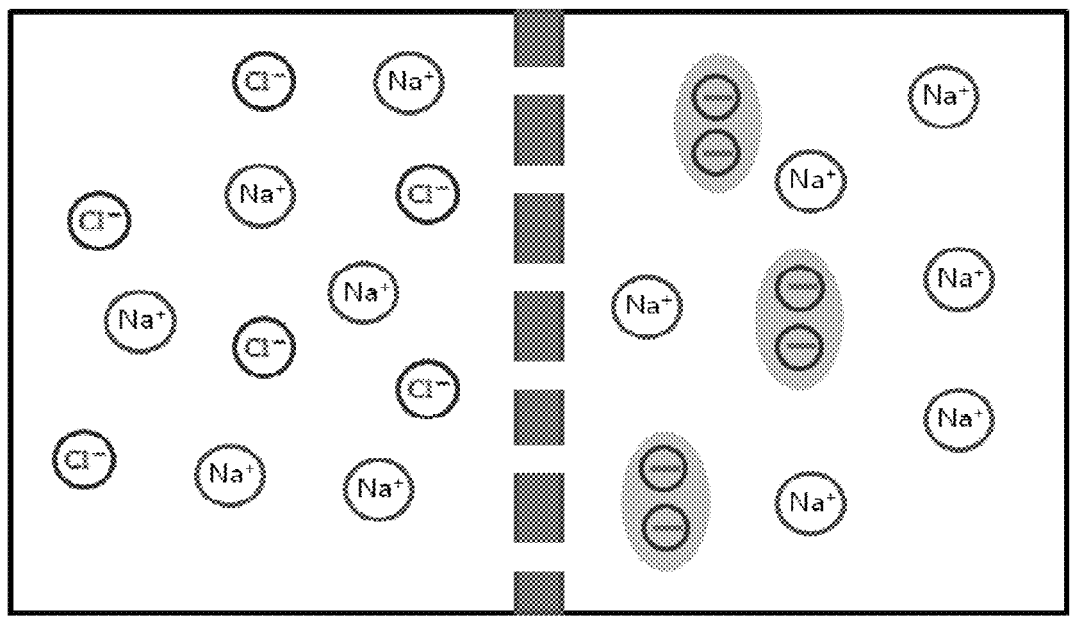
FIG. 40 shows a schematic depiction of the Donnan equilibrium at the initial stage.

At an initial stage, the numbers of ions in both sides can be represented as (See e.g. FIG. 40): left side: $[Na^+]=6$, $[Cl^-]=6$ and right side: $[Na^+]=6$ Since, the electrochemical potentials of both sides are different, $Cl^-$ at the left side can start to move through the right side. Due to the movement of anions, electrical potential is generated between each side separated by the membrane. The left side will be positively charged and the right side will be negatively charged. And the cation will also move through the membrane due to the electrical potential until this system will reach at electrochemical equilibrium.

Figure 41:
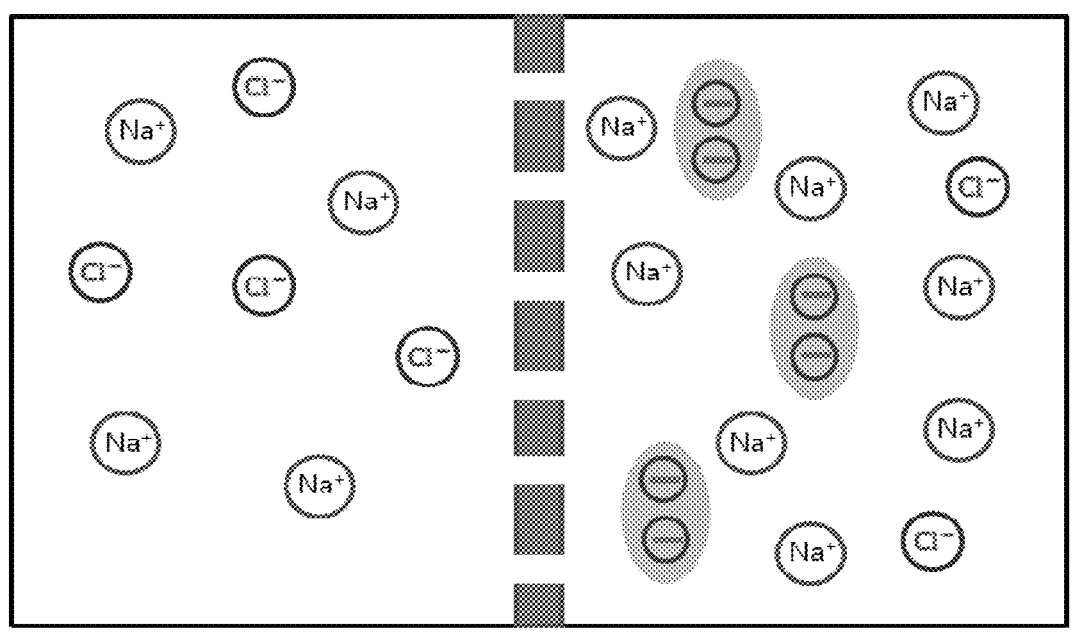
FIG. 41 shows a schematic depiction of the Donnan equilibrium at equilibrium.

At equilibrium, the numbers of ions in both sides can be represented as (FIG. 41). left side:

$[Na^-]4$, $[Cl^-]=4$ and right side: $[Na^+]=8$, $[Cl^-]=2$

In summary, net ion transport across the membrane is 2 pairs of NaCl among 6 pairs.

In this example, chloride anions are selectively rejected

Figure 42:
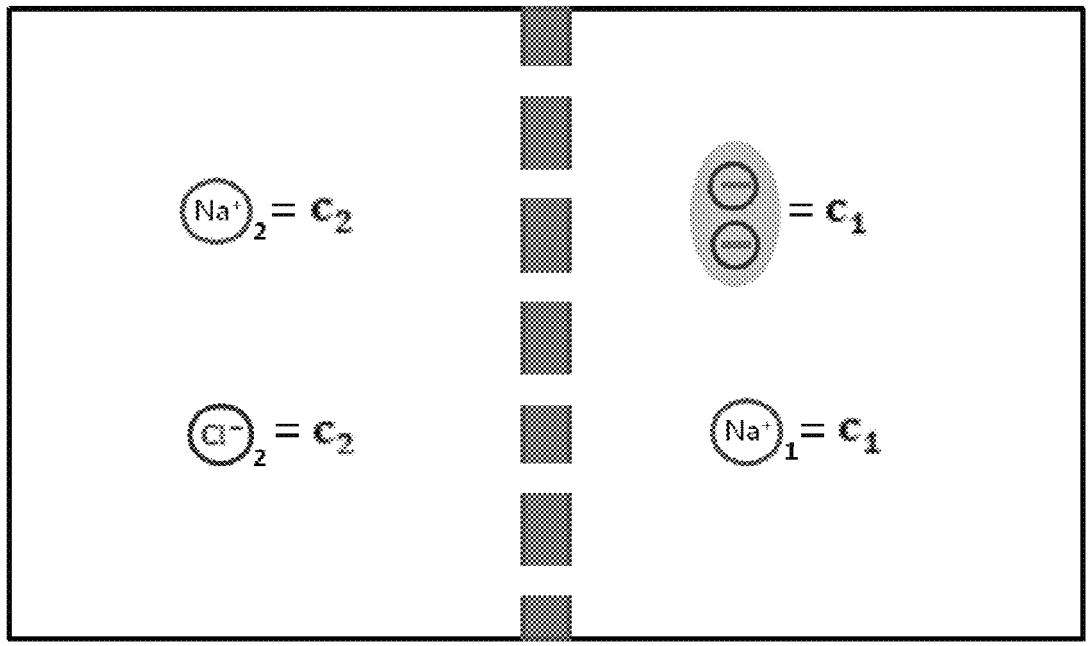
FIG. 42 shows a schematic depiction of the Donnan equilibrium under an initial condition.

Initial condition (FIG. 42) Left side: $[Na^+]_2=c_2$, $[Cl^-]_2=c_2$ Right side: $[Na^+]_1=c_1$, $[P^-]=c_1$ ($P^-$: Big anions which cannot penetrate the membrane)

Figure 43:
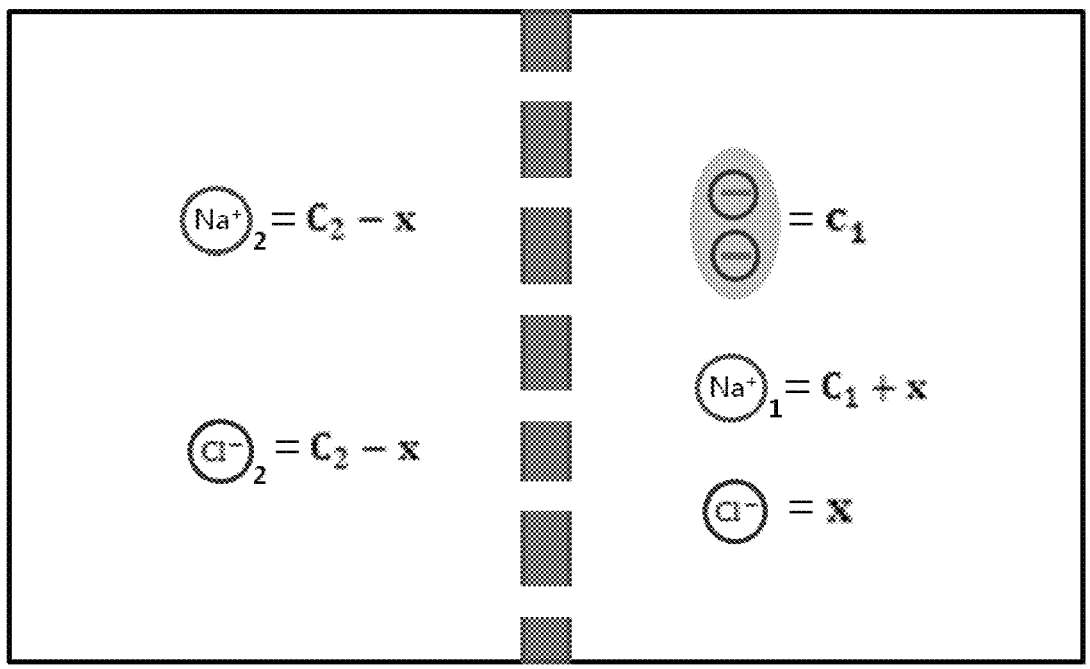
FIG. 43 shows a schematic depiction of the Donnan equilibrium at equilibrium.

At equilibrium (FIG. 43) Left side: $[Na^+]_2=c_2-x$, $[Cl^-]_2=c_2-x$ Right side: $[Na^+]_1=c_1+x$, $[P^-]=c_1$, $[Cl^-]=x$ At equilibrium; $\Delta G = \Delta G_{Na^+} + \Delta G_{Cl^-} = 0$ where $$\Delta G_{Na^+} = RT\ln\frac{[Na^+]_2}{[Na^+]_1}, \Delta G_{Cl^-} = RT\ln\frac{[Cl^-]_2}{[Cl^-]} \text{ and}$$

$$\Delta G = RT\ln\frac{[Na^+]_2}{[Na^+]_1} + RT\ln\frac{[Cl^-]_2}{[Cl^-]} = 0$$

$$RT\ln\frac{[Na^+]_2[Cl^-]_2}{[Na^+]_1[Cl^-]} = 0$$

$$\frac{[Na^+]_2[Cl^-]_2}{[Na^+]_1[Cl^-]} = 1$$

with constants and variables, $$\frac{(c_2-x)^2}{(c_1+x)x} = 1$$

and solving this equation for x, $$x = \frac{c_2^2}{c_1 + 2c_2}$$

is obtained.

Therefore by increasing $c_1$, in embodiments herein described, the amount of x (anions which penetrate the membrane) can be decreased.

In embodiments, when a charged membrane is used to separate ionic species in solution, Donnan effects can dominate or contribute to the separation mechanism of ions. This effect indicates a distribution of ionic species between the solution and the charged membrane. For example, if a negatively charged membrane is used, the co-ions (anions) can be affected by repelling electro-static force. Consequently, a distribution of ionic species in membrane and solution can be changed.

For example, assuming that a negatively charged membrane is in contact with a sodium chloride solution, at equilibrium, the chemical potentials of ions at the interface (solution/membrane) can be considered to be the same.

$$\mu_i = \mu_i^m$$

The electrochemical potential ($\Psi$) of an ion in solution can be described by:

$$\Psi_i = \mu_i^0 + RT \ln a_i + z_i FE$$

wherein $\mu_i^0$ represents reference state, R represents the gas constant, T represents temperature, $a_i$ represents activity of ion I, z represents valence of the ion, F represents the faraday constant, and E represents the measured potential.

The electrochemical potential of an ion in the membrane can be described by:

$$\Psi_i^m = \mu_i^{m,0} + RT \ln a_i^m + zFE^m.$$

Since the concentration of the ions in solution and membrane can be different, there can be an electrical potential at the interface which is called Donnan potential ($E_{don}$) which can be described by:

$$E_{don} = E^m - E = \frac{RT}{z_1 F} \ln \frac{a_1}{a_j^m}.$$

Assuming that the chemical potential of the reference state is same in both phases:

$$\mu_i^0 = \mu_i^{m,0}$$

and assuming that the solution is a diluted solution ($a_i \approx c_i$) then the following can be obtained:

$$c_{Na^+} \times C_{Cl^-} = c_{Na^+}^m \times c_{Cl^-}^m$$

For electro-neutrality conditions, $$\Sigma z_i c_i = 0$$

Electro-neutrality equation for both solution and membrane phase are, $$c_{Na^+} = c_{Cl^-}$$

and $$c_{Na^+}^m = c_{Cl^-}^m + c_{X^-}^m$$

It can thus be obtained that $$c_{Cl}^m \times c_X^m + (c_{Cl^-}^m)^2 = (c_{Cl^-})^2$$

or $$\frac{c_{Cl^-}}{c_{Cl^-}^m} = \sqrt{\frac{c_{X^-}^m}{c_{Cl^-}^m}} + 1$$

where X represents membrane charge.

The above equation can be rewritten As:

$$*1\text{-}1 \text{ salt: } \frac{c_{Cl^-}^m}{c_{Cl^-}} = \frac{c_{Cl^-}}{(c_{Cl^-}^m + c_{X^-}^m)}.$$

A similar equation can be derived for a 2-1 salt and a 1-2 salt using the same method to give $$*2\text{-}1 \text{ salt: } \frac{c_{Cl^-}^m}{c_{Cl^-}} = \left(\frac{2c_{Cl^-}}{2c_{Cl^-}^m + c_{X^-}^m}\right)^2 \rightarrow MgCl_2 \text{ and}$$

$$*1\text{-}2 \text{ salt: } \frac{c_{SO_4^{2-}}^m}{c_{SO_4^{2-}}} = \sqrt{\frac{c_{SO_4^{2-}}}{c_{SO_4^{2-}}^m + c_X^m}} \rightarrow Na_2SO_4, \text{ respectively.}$$

In some embodiments, the filtration within a module can operate by ultrafiltration (UF) and microfiltration (MF). UF and MF membranes can have large pore size (e.g., 5-100 nm) allowing them to operate pressures between approximately 0.3-5.0 bar). UF and MF can suitable in embodiments where it desired to generate less membrane concentrates, for example compared to an RO filtration. UF and MF are particularly suitable for a pretreatment process to remove particles from saline water in the desalination of brackish water and seawater.

In some embodiments, the filtration system can be configured to have three units: a first unit comprising a module, the module comprising a nanofiltration membrane to remove, for example, particles and dissolved organic matter; a second unit comprising a series of alternating positive and negative charged particle rejecting modules, for example, to remove a majority of the charged particles; and a third unit comprising a parallel series of modules capable of absorbing charged particles of interest.

Also provided herein, a filtration method comprising, passing water to be filtered through one or more modules comprising conventional nanofiltration membranes to remove particles and dissolved organic matter, passing the water through a series of alternating positive and negative charged particle rejecting modules comprising the membranes herein described to remove a majority of the charged particles, and passing the water through a parallel series of modules capable of absorbing charged particles of interest is described.

In some embodiments, the membrane filtration system for the desalination of brackish water and seawater comprises: an ion-rejection filtration stage, wherein saline water passes through a series of alternating cation/anion selective tight UF membranes designed to reject 70-90% of dissolved ions; and an ion-absorption filtration stage, wherein the product water from the ion-rejection filtration system is split into two streams that pass through a series of ion-absorbing MF membranes designed to selectively bind target anions/cations of interest.

Further advantages and characteristics of the present disclosure will become more apparent hereinafter from the following detailed disclosure by way or illustration only with reference to an experimental section.

EXAMPLES

The polymeric membranes with embedded polymeric micro/nanoparticles and related methods and systems herein described are further illustrated in the following examples, which are provided by way of illustration and are not intended to be limiting.

In particular, the following examples illustrate exemplary polymeric membranes with embedded polymeric micro/nanoparticles and related methods and systems. A person skilled in the art will appreciate the applicability and the necessary modifications to adapt the features described in detail in the present section, to additional polymeric membranes with embedded polymeric micro/nanoparticles and related methods and systems according to embodiments of the present disclosure.

Example 1

Figure 3:
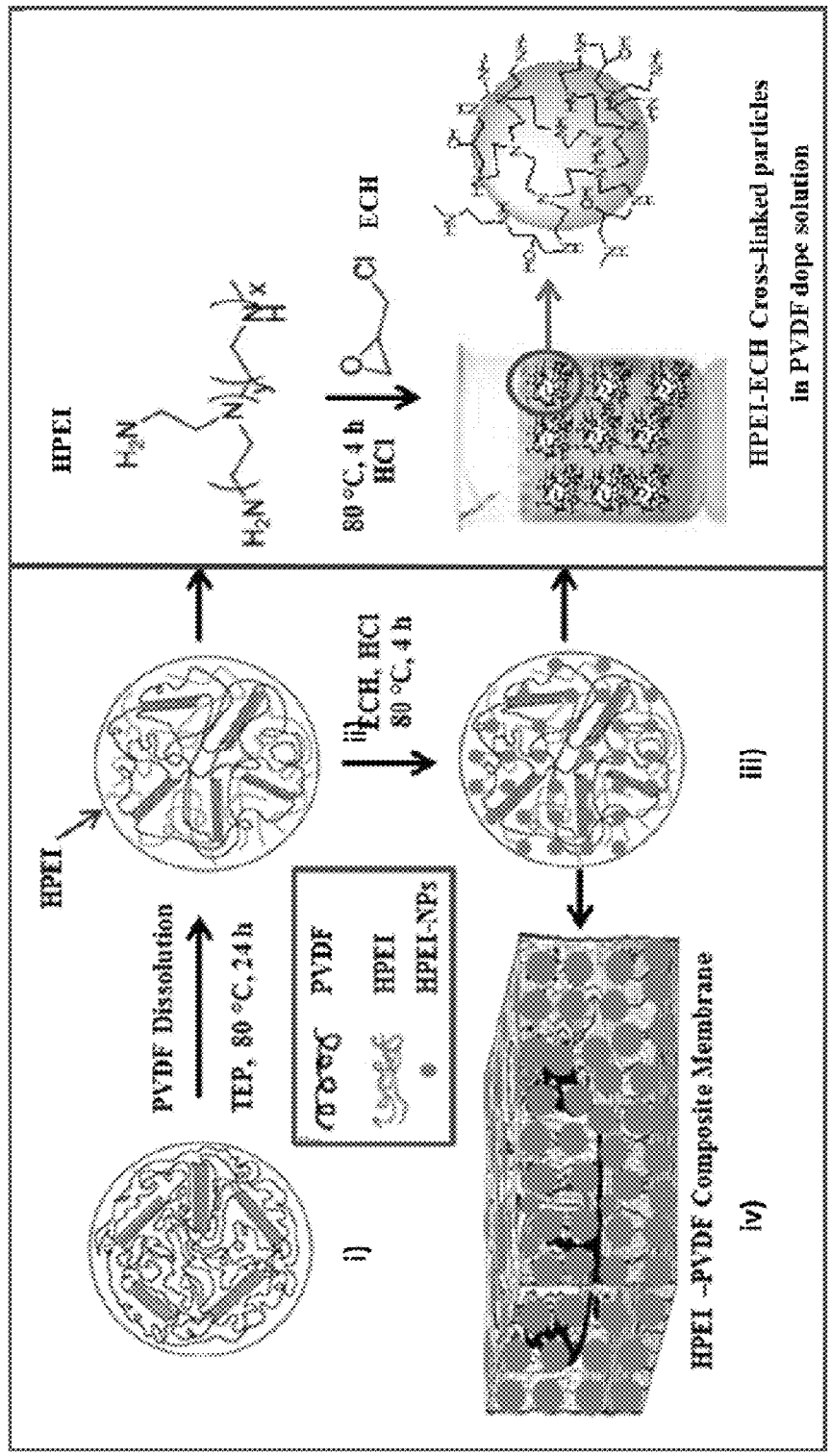
FIG. 3 shows a schematic illustration of an exemplary process of HPEI-ECH Cross-linked particle synthesis and the in situ reaction protocol used to prepare PVDF composite membrane by phase inversion casting according to embodiments herein described. Panel A shows a schematic illustration of the steps of i) PVDF dissolution in TEP, ii) HPEI addition to PVDF dope solution, iii) in situ cross-linking reaction between HPEI and ECH leading to the formation of HPEI-NPs, iv) HPEI-PVDF Composite membrane preparation by phase inversion casting. Panel B shows a schematic illustration of ring opening cross-linking reaction scheme between HPEI and ECH; Subsequent formation of cross-linked HPEI-ECH particles within PVDF solution.

General Preparation of Polymeric Membranes with Embedded Particles Produced In Situ The preparation of well-defined spherical PEI particles in nanometer scale is itself a challenging task and incorporation in membrane matrix without affecting the porous structure is not addressed. In this Example, PVDF composite membrane embedded with PEI submicron/nanoparticles without adverse effect on porous structure were prepared. The reaction scheme and graphical process protocol to synthesize novel composite PVDF membrane are depicted in FIG. 3. According to the scheme firstly, required concentration of PVDF dope solution was prepared in triethyl phosphate (TEP) solvent. To this, PEI and ECH were added and reaction was carried out for 4 h in presence of PVDF dope solution. During the in situ reaction between PEI and ECH intra molecular three dimensional cross-link networks were formed which simultaneously precipitated in PVDF dope solution. Then, the PVDF dope solution dispersed with PEI particles was utilized for phase inversion casting to prepare composite membranes with and without porous support layer (see, e.g., Example 2). This reaction protocol is simple and single pot to prepare composite membranes with engineered polymeric particles. These particles are homogeneously distributed and dispersed in the PVDF matrix. These PNPs embedded composite PVDF membranes with unique morphologies and high dense positively charge particles anticipated to find numerous applications. Moreover, this opens up wide spectrum of possibility to synthesize tailor made membranes with various polymer combinations suitable for multiple functions. (see also FIG.

Example 2

Exemplary of Polymeric Membranes with Embedded Particles Produced In Situ

Materials.
PVDF (Kynar 761, Arkema Inc.), Hyper branched polyethylenimine (PEI) (Epomin SP003, Mn: 300; Nippon Shokubai), Epichlorohydrin (ECH, Aldrich), Methyl phosphate (TEP, Daejung Chemicals, Korea) and Hydrochloric acid (HCl, 35%, Daejung Chemicals, Korea) were used as received.

PVDF Solution in TEP.
A solution of PVDF (15 g/100 g) in TEP was prepared in three neck round bottom flask equipped with condenser and overhead stirrer. The homogeneous PVDF solution was obtained after mixing for 24 h at 80° C.

PEI In Situ Cross-Linking to Generate Submicron Particles.

In a typical synthesis, to the above 15% (w/w) PVDF solution the requisite amount of PEI dissolved in requisite amount of TEP was added at 80° C. After mixing for 10 minutes a catalytic amount of HCl (4.2% weight w.r.t. PEI quantity) was added and allowed for mixing for 15 minutes. The quantity of HCl can be optimized according to methods developed by the Applicants [Ref 29, 30]. Then, the required quantity of ECH was added under di-nitrogen atmosphere. The cross-linking reaction with ECH was carried out for four hours under di-nitrogen atmosphere.

Figure 4:
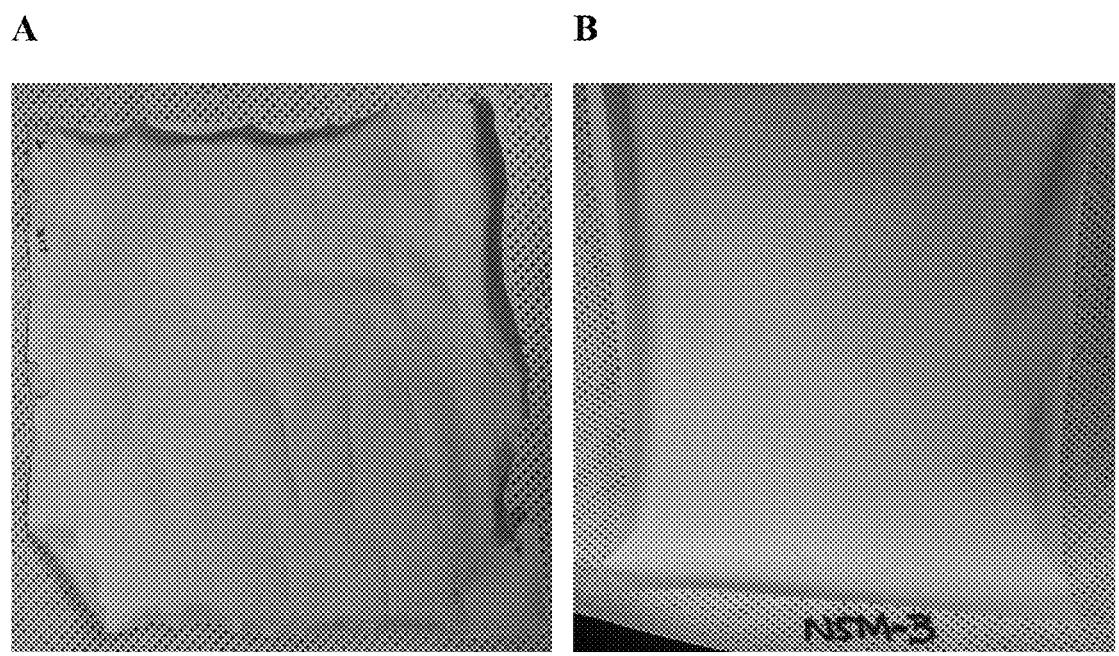
FIG. 4 shows photographs of exemplary NSM-3 composite PVDF membrane showing with and without support layer. Panel A shows a membrane casted without support layer. Panel B shows a membrane casted on polyethylene terephthalate (PET) non-woven porous fabric.

Membrane Preparation by Phase Inversion Casting.
The PVDF membranes were prepared in two modes: i) the membrane without any support and ii) with polyethylene terephthalate (PET) non-woven fabric (FIG. 4). In the first mode, the hot PVDF dope solution modified with PEI particles was poured on a clean glass plate. A casting knife (BYK Chemie) with 300 μm air gap was used to provide a uniform coating of PVDF dope solution on to the glass plate. The nascent membranes were air dried for 30 s at ambient temperature (26° C., RH: 55%), then immersed into 23° C. Milli Q water served as a coagulation bath. After 2 h, the nascent membranes were transferred to fresh Milli Q water and immersed for further 24 h to ensure that no more organic leached from the membranes. Then, the membranes were immersed in an ethanol bath for 10 h. Finally, the membranes were air dried and stored in a desiccator. Similar procedure was followed to prepare the membranes with PET support layer. For all characterizations only the membranes without support layer were utilized. The membranes with support layer were utilized for membrane filtration experiments. A typical recipe for a composite membrane (NSM-2) is shown in TABLE 1

TABLE 1

| Component | Weight (g) | Weight, % |
|---|---|---|
| I. PVDF dope solution recipe | | |
| PVDF | 5.25 | 12.42 |
| TEP | 29.75 | 70.36 |
| Total | 35.0 | |
| II. In situ cross-linking recipe | | |
| PEI | 2.28 | 5.39 |
| ECH | 1.50 | 3.55 |
| TEP | 3.5 | 8.28 |
| Total | 42.28 | 100 |

HCl: 0.1 g (4.2% w/w on PEI) is excluded from the recipe

For comparison, the neat PVDF membrane (designated PVDF-2), as well as a control membrane formed by blending of requisite amount of PEI at 80° C. for 1 h without ECH cross-linking (designated PVDF-1) was fabricated using the same procedure. The composition for PVDF-1 is similar to in-situ membrane NSM-2 excluding ECH cross-linker.

The composition of various membranes modified with PEI at a fixed degree of cross-linking (39.7%, w/w) with ECH is described in Table 2. All these membranes were prepared by phase inversion casting with PVDF dope solution in TEP as solvent. The nanocomposite membranes NSM-1, NSM-2 and NSM-3 were synthesized by in situ cross-linking reaction between PEI and ECH. The control membranes such as PEI blend with PVDF dope solution (without in situ reaction; PVDF-1) and neat PVDF membranes (PVDF-2) were fabricated as shown in Table 2. These control membranes utilized as comparison for composite membranes.

TABLE 2

| Composition | NSM-1 | NSM-2 | NSM-3 | PVDF-1 (Blend) | PVDF-2 (Neat) |
|---|---|---|---|---|---|
| On total dope solution (w/w), % | | | | | |
| PVDF | 13.45 | 12.42 | 11.43 | 12.42 | 15 |
| HPEI + ECH | 5.79 | 8.94 | 12.35 | 8.94 | — |
| TEP | 80.76 | 78.64 | 76.22 | 78.64 | 85 |
| Final membrane composition (w/w), % | | | | | |
| PVDF | 69.9 | 58.14 | 48.1 | 58.14 | 100 |
| PEI | 30.1 | 41.86 | 51.9 | 41.86 | — |

Morphology of Membranes.

Figure 5:
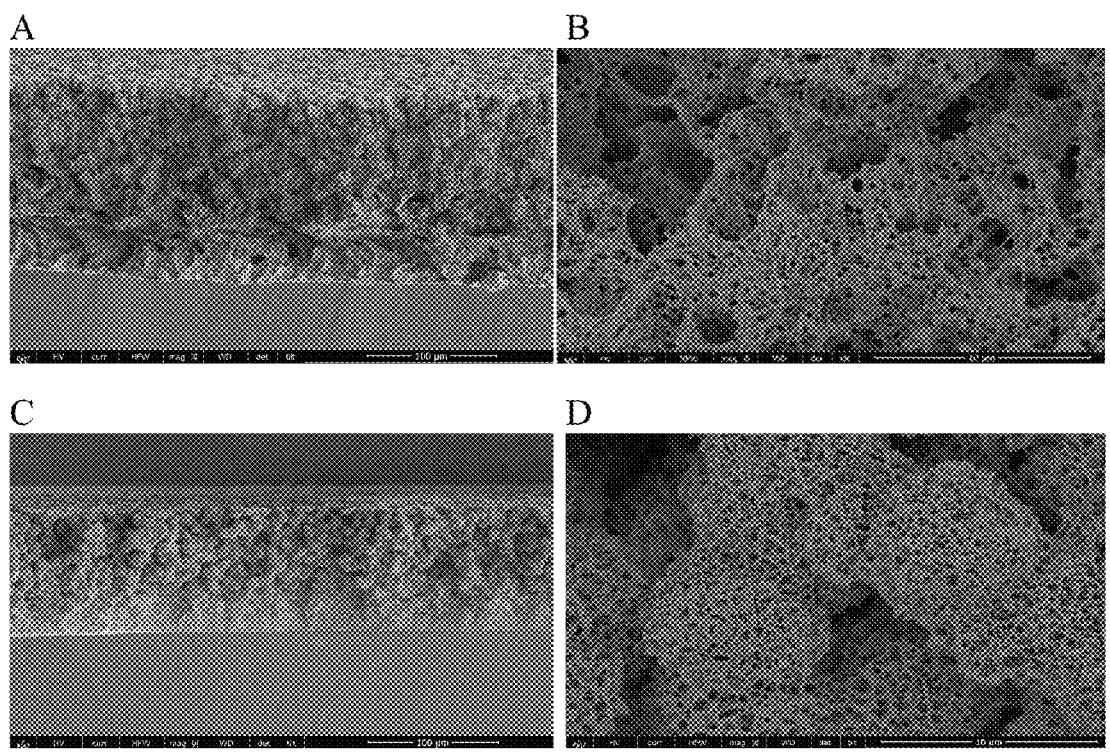
FIG. 5 shows representative SEM images showing cross section morphology of control membranes according to embodiments herein described. Panel A and Panel B show PVDF-1 (PVDF and PEI without cross-linker). Panel C and Panel D show PVDF-2 (neat PVDF).
Figure 7:
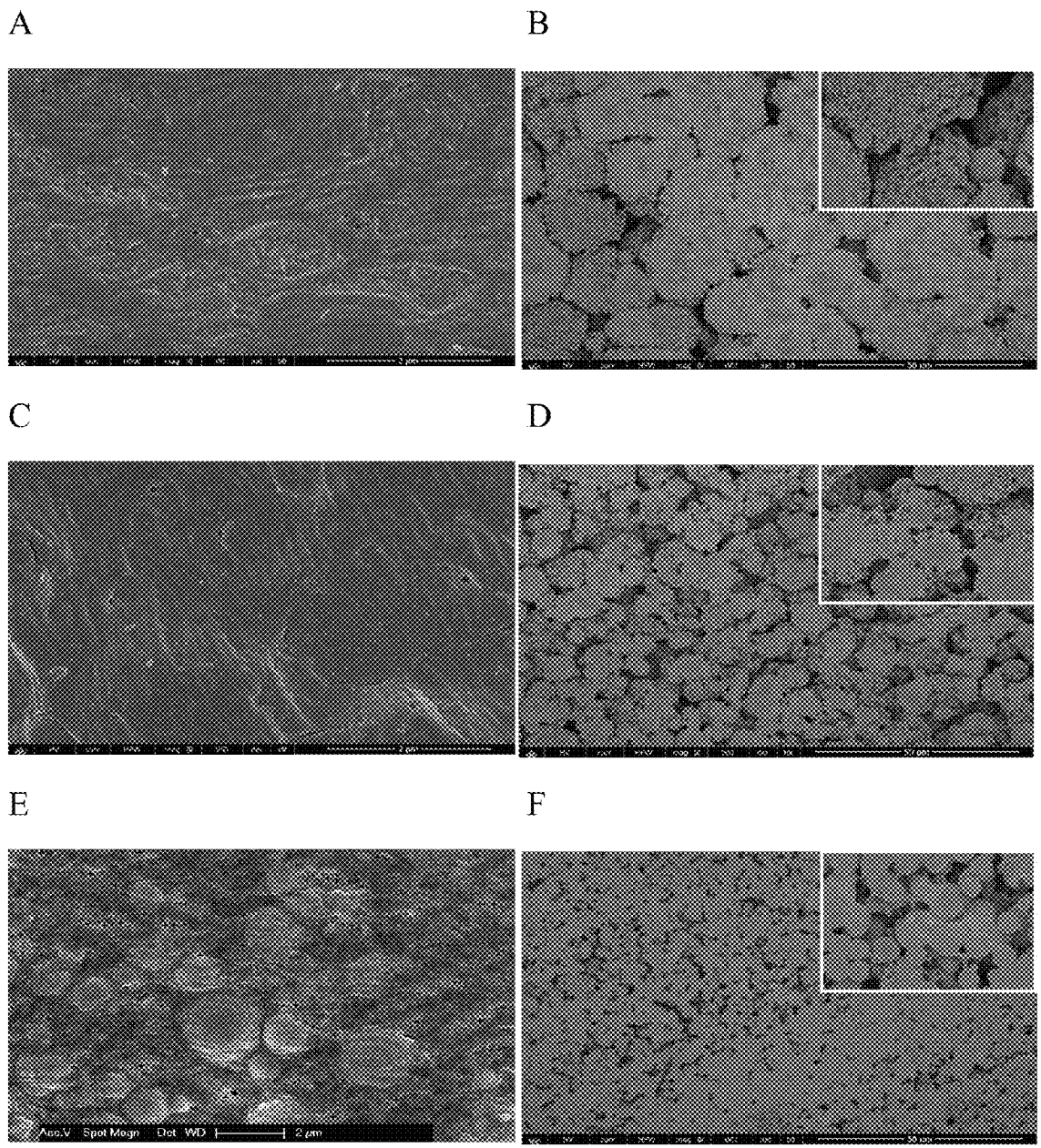
FIG. 7 shows representative SEM images showing top and bottom morphology of composite membranes according to embodiments herein described. Top surface images are taken at 20,000× and bottom surface images are taken at 1,000× magnification in all cases. Panel A shows NSM-1, top surface. Panel B shows NSM-2, bottom surface. Panel C shows NSM-2, top surface. Panel D shows NSM-2, bottom surface. Panel E shows NSM-3, top surface. Panel F shows NSM-3, bottom surface. It can be observed that HPEI particles are visible at bottom surface. Top surface morphology of NSM-3 shows more number of pores than NSM-1 and NSM-2 but not much change in basic morphology. Inset shows the magnified view to observe the PEI particles presence at bottom surface (Panels b, d, and f) of respective membranes.

Representative microphotograph of control membranes of PVDF-1 and PVDF-2 were taken by Scanning Electron Microscope (SEM) is shown in FIG. 5. The cross section morphology of the neat PVDF membrane (FIG. 5C and FIG. 5D) reveals a fibrous-like microstructure with inter-connected pores caused by the special combination effect of non-solvent and thermally induced phase inversion using TEP as the solvent [Ref 31]. The control membrane PVDF-1 also exhibits the similar morphology (FIG. 5A and FIG. 5B) except that the fibrils are less compact than neat PVDF membrane. This is due to PEI acting as pore forming agent rather than to become integral part of PVDF matrix. FIG. 6 depicts the representative SEM images of cross section morphology of composite membranes NSM-1, NSM-2, and NSM-3. Modification by in situ cross-linking does not cause a significant alteration of cross section morphology of nanocomposite membranes. However, the significant difference was occurred to the membrane structure by unusual formation of PEI particles. To understand the particle formation, the nanocomposite membranes NSM-2 and NSM-3 were synthesized with higher concentrations of PEI. The highest particle density and lowest particle size down to few hundred nanometers is observed in SEM image of NSM-3. This is the manifestation from in situ cross-linking reaction between PEI and ECH in presence of the PVDF solution. The particle size measurements from Image J software concludes that, the NSM-3 membrane has a particle size as low as 400 nm whereas, the membranes NSM-2 and NSM-1 are ranging from 1-3 μm. Further, the cross section morphology of nanocomposite membranes reveals that the dense skin layer is decreasing with increasing PEI concentration render to symmetric structure within an asymmetric membrane system. The distribution of PEI particles observed throughout the matrix however, it is more at the bottom side. This can be because of rapid exchange of solvent from bottom to top surface, as a result phase separation originated at bottom side and hence relatively less time to migrate particles to top surface (FIG. 7).

Figure 8:
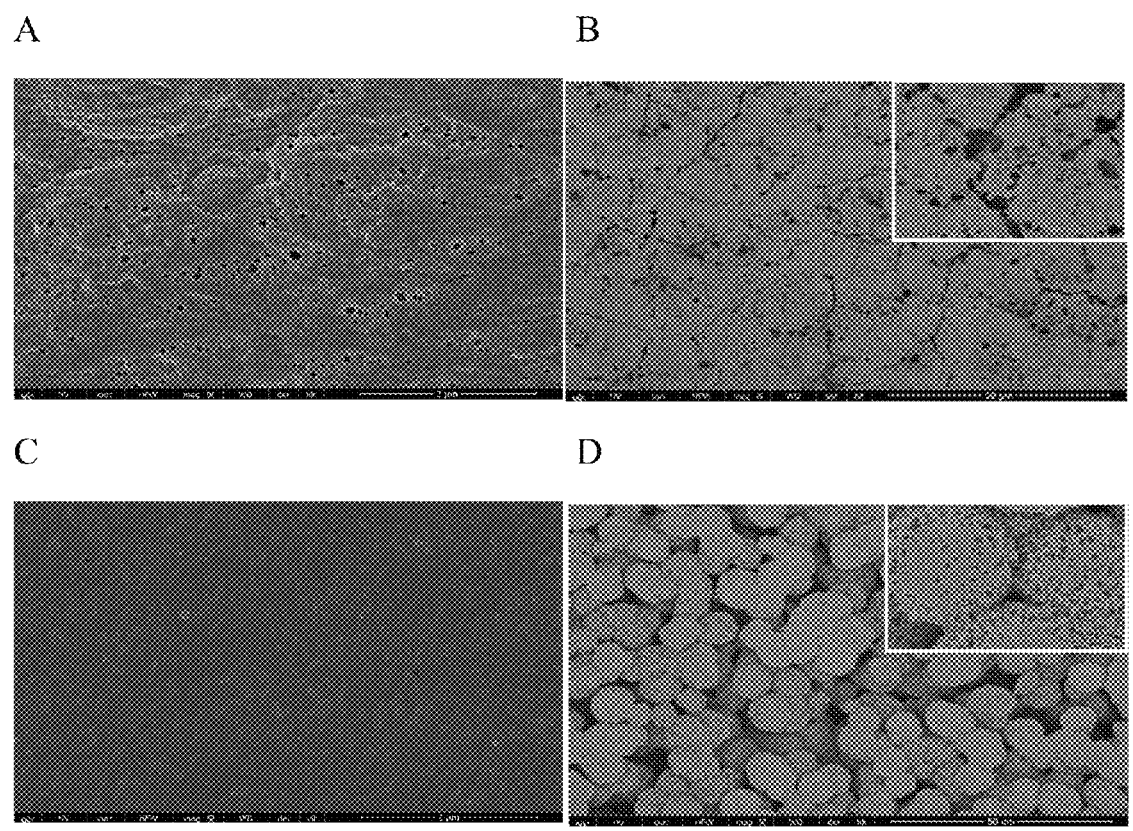
FIG. 8 shows representative SEM images showing top and bottom morphology of control membranes according to embodiments herein described. Top surface images are taken at 20,000× and bottom surface images are taken at 1,000× magnification in all cases. Panel A shows PVDF-1 (Blend) top surface. Panel B shows PVDF-1 (Blend) bottom surface. Panel C shows PVDF-2 (Neat) top surface. Panel D shows PVDF-2 (Neat) bottom surface. It can be observed that in above all cases the particles are absent.
Figure 9:
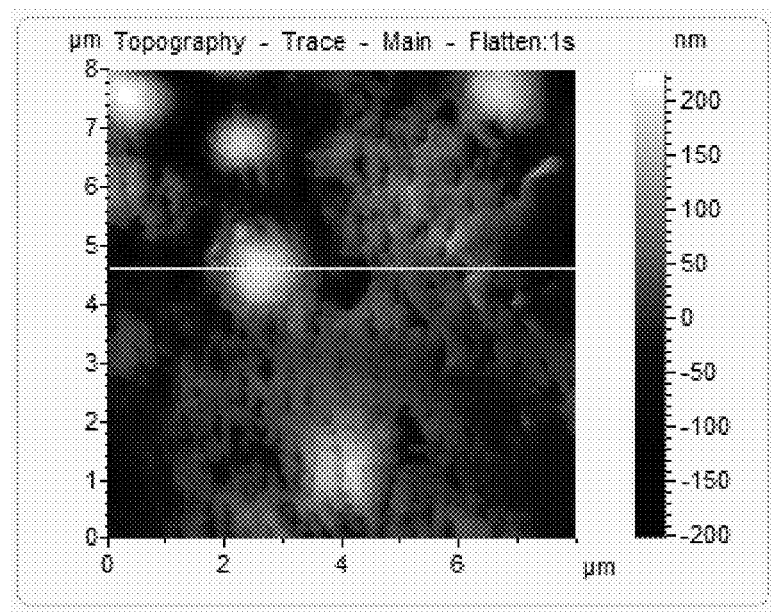
FIG. 9 shows an atomic force microscopy image of an exemplary composite polymeric membrane with embedded nanoparticles according to embodiments herein described (NSM-1; RMS of 129 nm).
Figure 10:
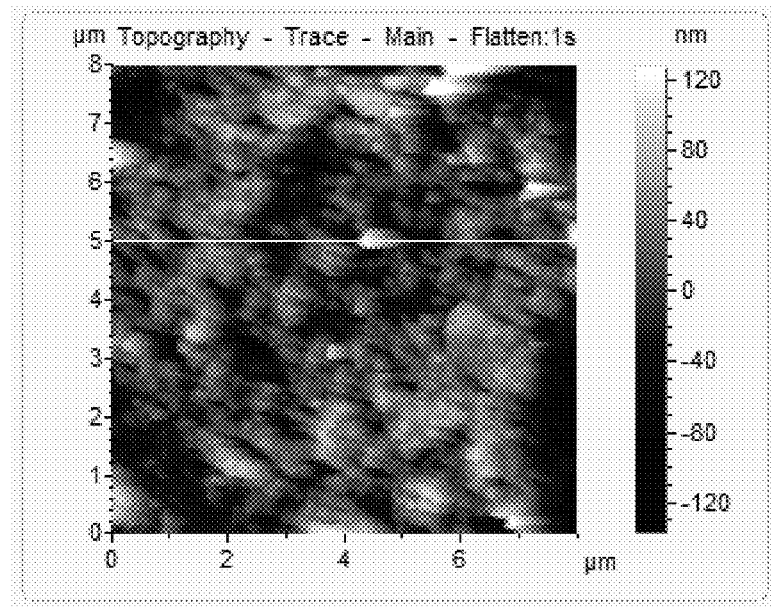
FIG. 10 shows an atomic force microscopy image of an exemplary composite polymeric membrane with embedded nanoparticles according to embodiments herein described (NSM-2; RMS of 261 nm).
Figure 11:
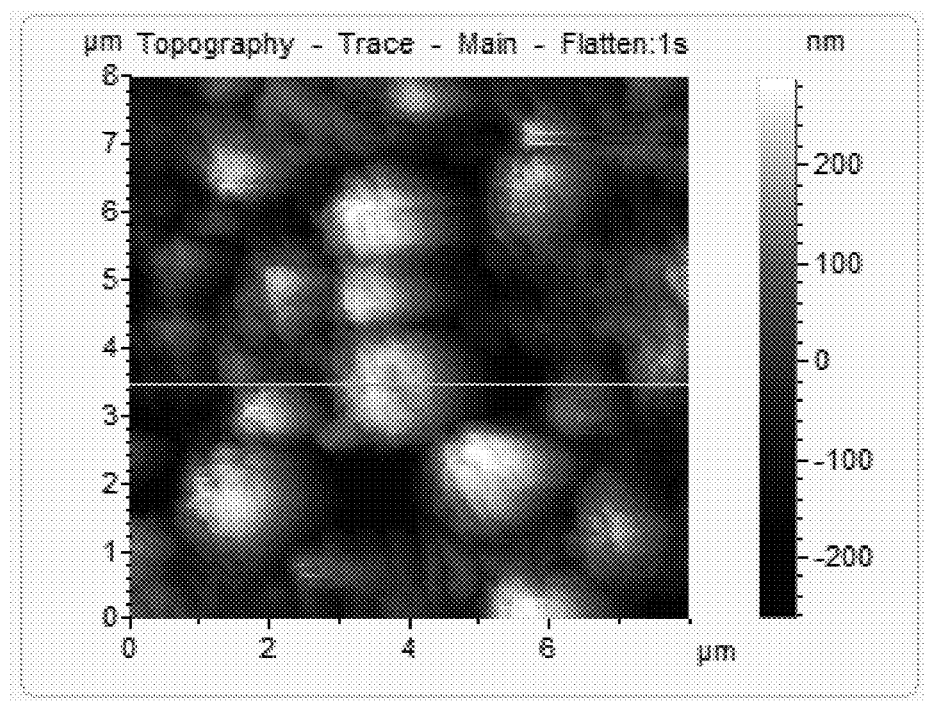
FIG. 11 shows an atomic force microscopy image of an exemplary composite polymeric membrane with embedded nanoparticles according to embodiments herein described (NSM-3; RMS of 343 nm).
Figure 12:
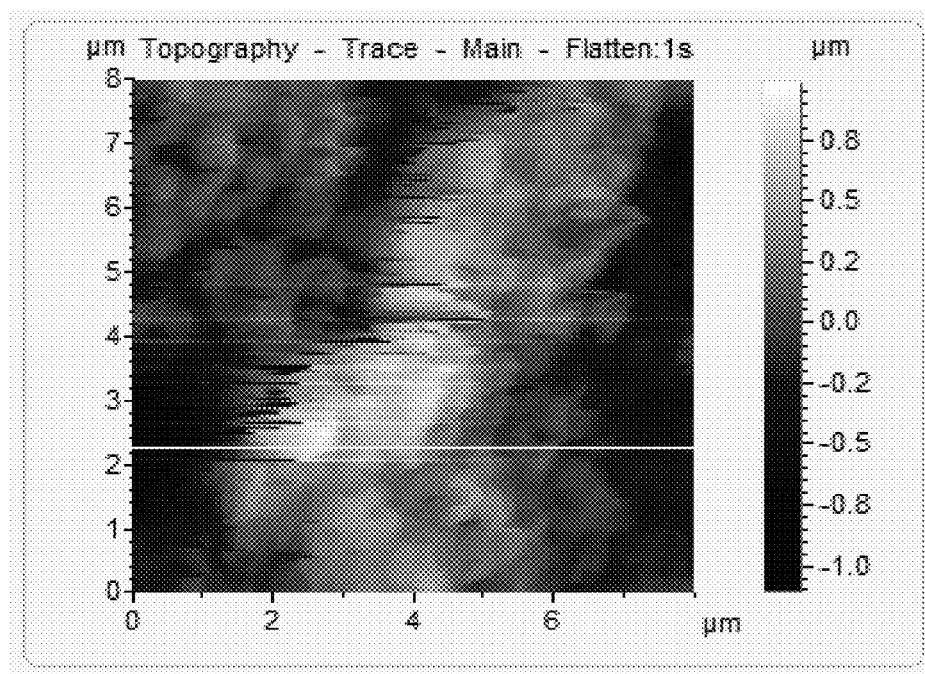
FIG. 12 shows an atomic force microscopy image of an exemplary control polymeric membrane according to embodiments herein described (PVDF-1; RMS of 400 nm).
Figure 13:
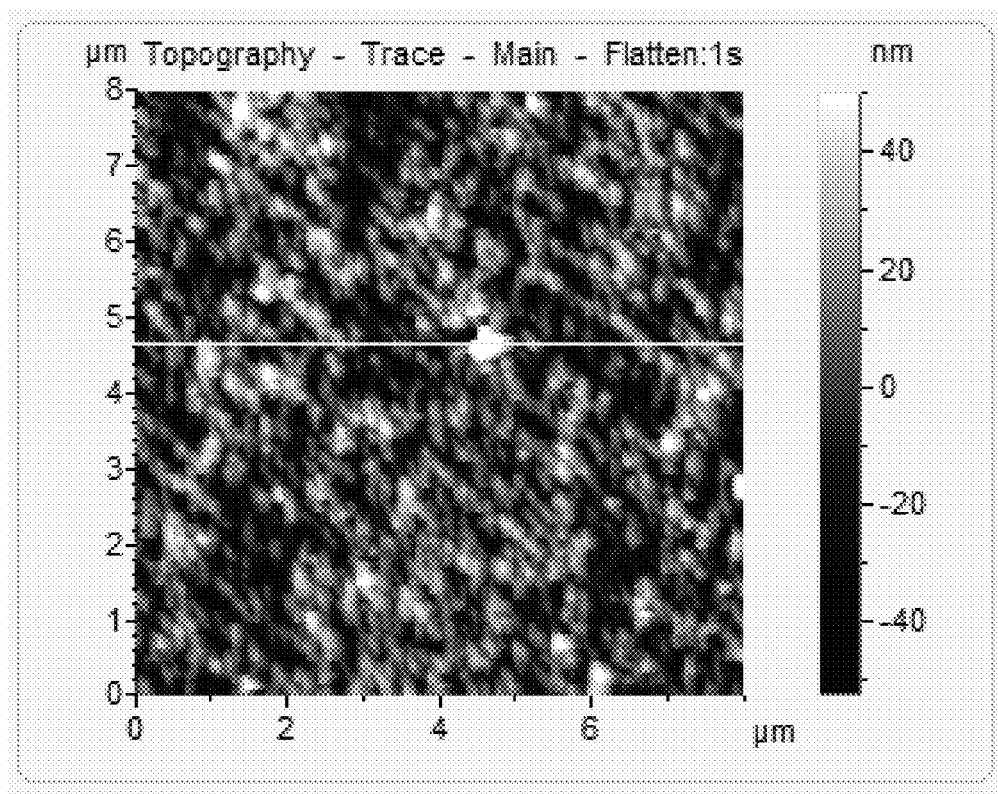
FIG. 13 shows an atomic force microscopy image of an exemplary control polymeric membrane according to embodiments herein described (PVDF-2; RMS of 51 nm).

The morphology of top surface of nanocomposite membranes found to be distinct from their control membranes. The neat PVDF membrane (PVDF-2) has a relatively dense top surface caused by the delayed demixing during phase inversion and parts of nano-scale pores can be observed. In contrast, the other control membrane PVDF-1 shows a porous surface with a micron scale pores (FIG. 8). Here, the HPEI is acting like a pore forming agent by creating a porous structure rather than remaining as integral part of membrane structure. This can be due to the PEI not being compatible with PVDF in the case of simple physical blending. The nanocomposite membrane also shows proximate dense top surface structure with discrete circular pores on surface. As the PEI concentration increases in the matrix a nominal change in pore diameter is observed. In contrast to other composite membranes the NSM-3 shows more number of pores at the surface (FIG. 7). The membrane morphology changes can be interpreted by the phase separation mechanism during the precipitation process controlled by thermodynamics and kinetics. The in situ reaction of PEI with ECH within PVDF dope solution enhances the thermodynamic instability and hence promotes microphase separation. Furthermore, the appearance of large macro-voids in the cross section of PVDF-1 indicates the lower compatibility and higher instability of PVDF and PEI in blend solution.

Measurement of Particle Size of Embedded Particles.

Particle size was measured from scanning electron microscope (SEM) images by Image J software. Field emission scanning electron microscopy (FE-SEM) was conducted on Magellan Series 400 (FEI Corporation) at an acceleration voltage of 2.0 kV. The sample for cross section analysis was made by breaking the samples in liquid nitrogen. In order to get better image quality the sputtering method was optimized. All samples were first coated with osmium for 30 s followed by gold for 30 s and ensured that minimum charge effect and maximum image quality.

Analysis by AFM.

Membranes and particles were also analyzed by atomic force microscopy. AF images can be seen in FIG. 9-FIG. 13.

Infrared Spectroscopy Analysis.

Fourier Infrared (FTIR) spectra were recorded on a Perkin-Elmer Spectrum 2000 by using KBr pellet method. The samples were ground to fine powder and mixed with KBr powder. All samples were scanned from 500 to 4000 $cm^{-1}$ with a scan rate of 2 mm/s. FTIR Data is reported in wavenumber ($cm^{-1}$) vs percentage transmittance.

Figure 14:
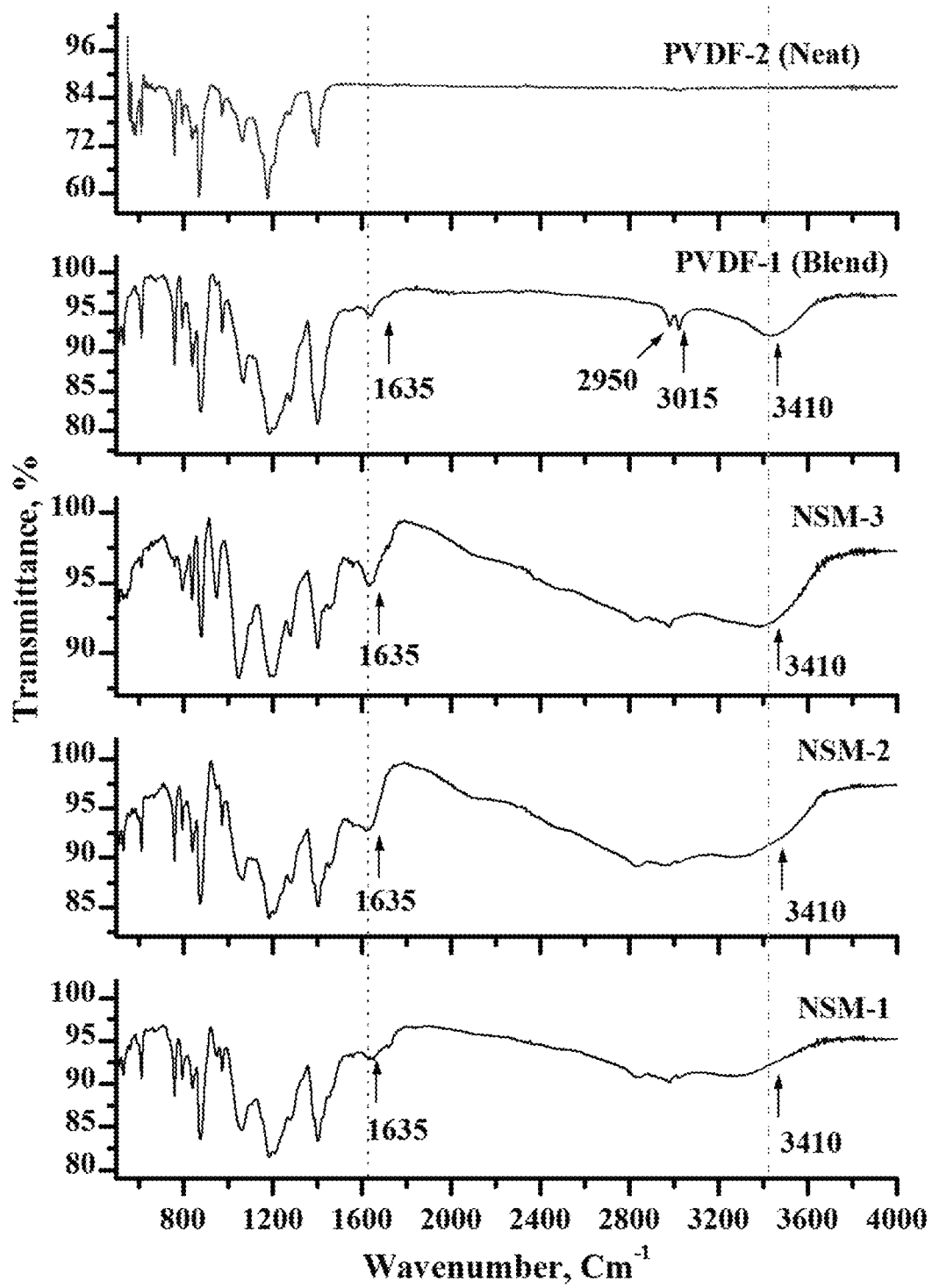
FIG. 14 shows FTIR spectrum scans of control and nano-composite membranes according to embodiments herein described.

FTIR spectrums of neat PVDF, PVDF-PEI blend and nanocomposite membranes can be seen in FIG. 14. The characteristic peaks are assigned to neat PVDF membrane including $CF_2$ bending (615 and 766 $cm^{-1}$), $CH_2$ rocking (840 $cm^{-1}$), CH stretching (976 $cm^{-1}$), and CF stretching (1234 and 1279 $cm^{-1}$) [Ref 32]. In contrast to neat PVDF membrane (PVDF-2), the PVDF-PEI blend (PVDF-1) and nanocomposite membranes (NSM-1, NSM-2, and NSM-3) exhibits two new peaks including $NH_2$ bending (1635 $cm^{-1}$) from primary amines and —NH stretching (3255 $cm^{-1}$) from primary/secondary amines. These peaks are assigned to HPEI macromolecule particles which are embedded in PVDF membranes. In contrast, the FTIR spectrum of nanocomposite membranes exhibits a broad peak of —OH stretching at 3410 $cm^{-1}$ indicating that hydroxyl groups were produced when the HPEI macromolecules reacted with ECH cross-linker. The characteristic peak intensity at 1635 $cm^{-1}$ ($NH_2$ bending) is increasing from NSM-1 to NSM-3 which confirms that the increasing concentration of HPEI-NPs in membrane matrix. Furthermore, the bands of 2950-3015 $cm^{-1}$ appear which are stretching vibration bands of C—H bond of —$CH_2$ groups coexist. The control membrane PVDF-1 however, shows all characteristic peaks and prominent peak of —CH stretching which further confirms the absence of cross-linking reaction.

XPS Analysis of Membranes.

Figure 15:
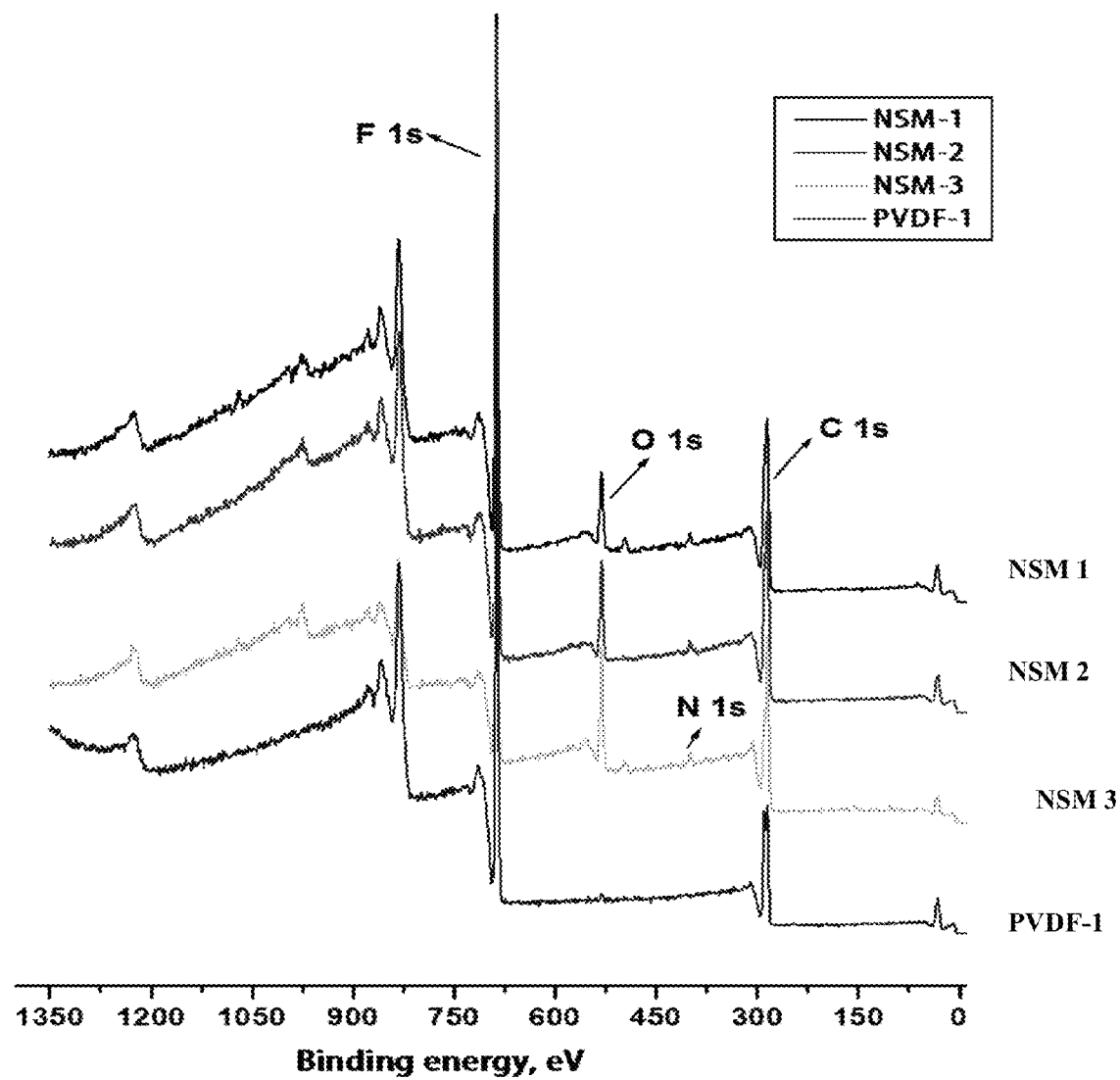
FIG. 15 shows XPS spectra of composite membranes and control membrane (PVDF-1).

The elemental composition of the membrane surface was analyzed by X-ray photoelectron spectroscopy (XPS, SSX- 100 UHV, Surface Science Instruments). The sample was irradiated with a beam of monochromatic Al Kα X-rays with energy of 1.486 keV. The XPS wide-scan spectra of the neat PVDF control (PVDF-2) and composite membranes is shown in FIG. 15. There are two signals attributed to carbon and fluorine in the neat PVDF membrane. The two new peaks appearing in the spectrum of composite membranes attributed to oxygen and nitrogen confirms the existence of PEI and ECH. The element mass concentrations of the samples calculated from XPS shows that, after in situ cross-linking reaction between PEI and ECH, the fluorine 1s concentration is decreased and carbon is concentration is increased in the composite membranes Table 3. The peaks observed for oxygen and nitrogen mass concentrations in the composite membranes is increased as the concentration of PEI and ECH increases which is consistent with the chemistry. This further confirms the increase in particle density in the membranes as the concentration of the reactants increases. The in situ particle formation offers a good distribution of PEI moieties in PVDF matrix during the membrane formation, making sure that PEI will not be aggregated, so as to segregate smoothly without entanglement hindrance during the phase inversion process. Meanwhile, micro-phase separation takes place between the hydrophilic PEI particles and hydrophobic PVDF matrix. As a result the PEI segments segregate and self-organize at the membrane-water interface due to the enthalpic preference whereas the hydrophobic segments of PVDF tend to be embedded in the membrane matrix in order to lower the interfacial free energy.

TABLE 3

| Sample | XPS Mass concentration, % | | | |
| --- | --- | --- | --- | --- |
|  | C | F | O | N |
| PVDF-1 | 51.71 | 48.29 | — | — |
| NSM-1 | 53.93 | 38.2 | 6.85 | 1.02 |
| NSM-2 | 54.46 | 36.01 | 8.25 | 1.28 |
| NSM-3 | 57.37 | 28.41 | 12.38 | 1.84 |

Measurement of Zeta Potential of Membranes.

Figure 20:
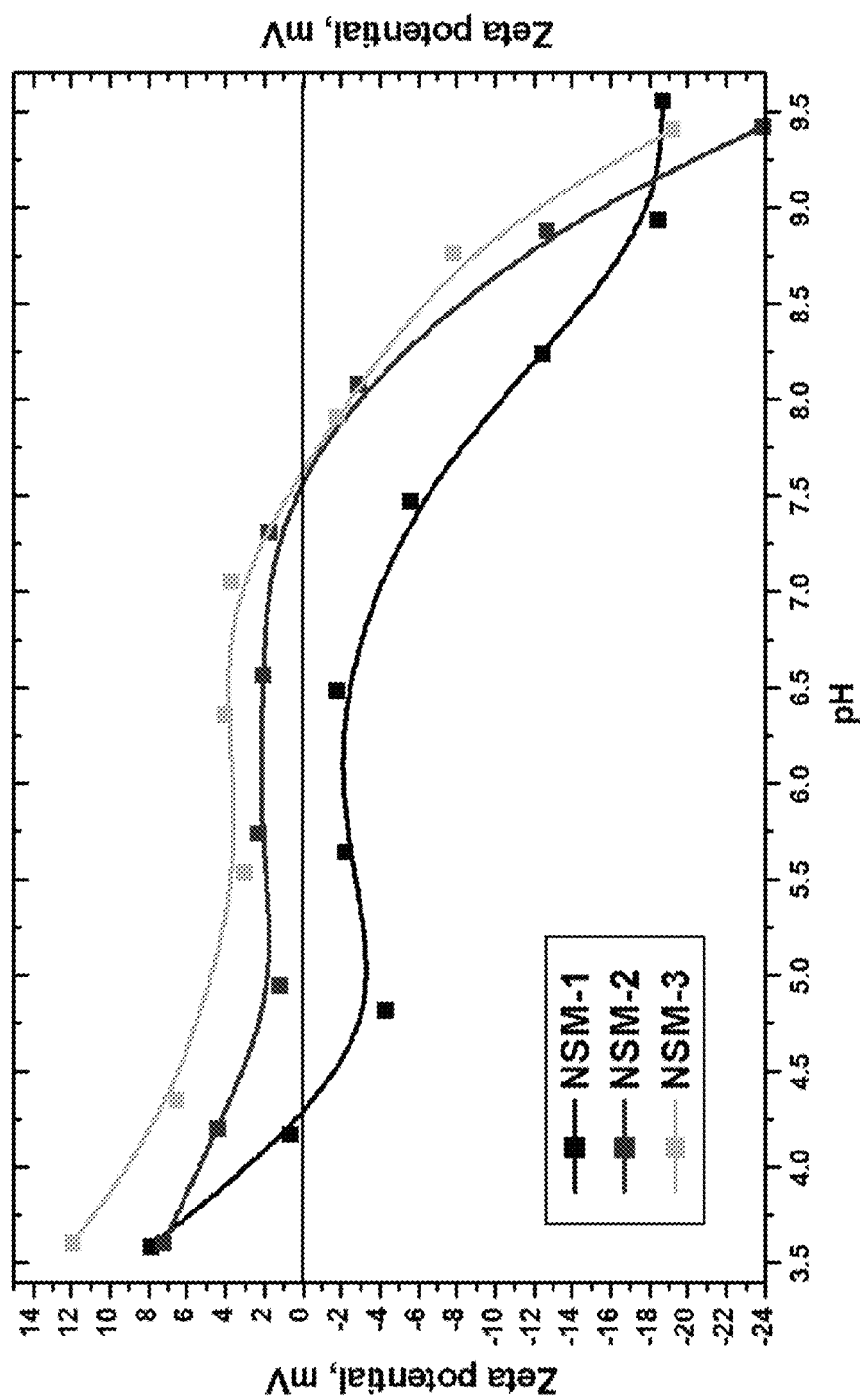
FIG. 20 shows Zeta potential measurements of composite membranes as herein described at pH ranging from 3.5 to 9.5 by electrophoresis method.

The Zeta potential of membranes was determined using the electrophoresis method [Ref 33]. This involves measuring the electrophoretic mobility of monitoring particles inside an electrophoresis chamber consisting of a membrane and quartz cells. Due to the sorption and accumulation of ions at the surface of the membranes, an electro-osmotic flow occurs inside the electrophoresis chamber. This induced electro osmotic flow causes the particles to undergo electrophoretic flow. An ELS-8000 electrophoretic light scattering spectrophotometer with a plate quartz cell (Ostuka Electronics, Japan) was employed to measure the electrophoretic mobility of the monitoring particles in 0.01 M KCl solution as a function of pH (FIG. 20). The monitoring particles consisted of PS latex particles with a hydroxyl propyl cellulose surface coating and diameter of 520 nm. The PS particles were dispersed in 0.01 N KCl solution. The pH of the KCl solutions was adjusted with 0.1 N HCl or KOH as needed. The measured electrophoretic mobilities (U) [cm$^2$/(V s)] were employed to calculate the zeta potential ($\zeta_{EP}$) (mV) of the membranes using the Smoluchowski equation as given below [Ref 33].

$$\zeta_{EP} = 4\pi\eta U/\epsilon_r \epsilon_0$$

Where, $\eta$ is the liquid viscosity (0.89×10$^{-3}$ Pa s), $\epsilon_r$ is the relative permittivity of liquid (78.38), and $\epsilon_0$ is the vacuum permittivity (8.854×10$^{-12}$ s m$^{-1}$).

Determination of Wettability and Hydrophilicity of Membranes.

The hydrophilicity of each membrane was determined from contact angle measurements using a Phoenix 300 contact angle analyzer (SEO Corporation, Korea). A microsyringe was utilized to place a water droplet on the surface of each membrane. After 30 s and 120 s, the image was captured and analyzed using the instrument's image processing software. Each reported contact angle is the average of 5 different measurements at randomly selected points over the membrane surface.

Figure 16:
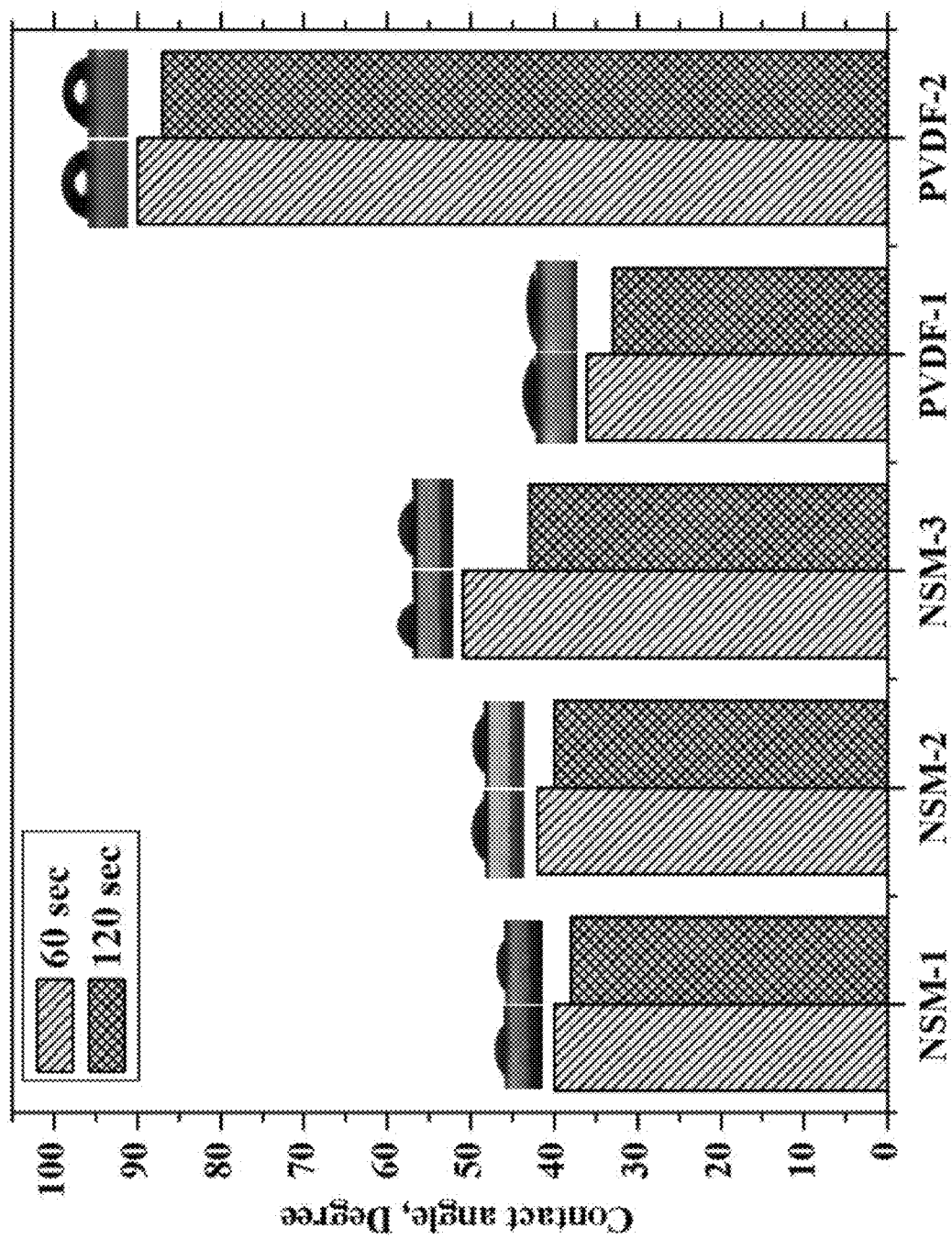
FIG. 16 shows contact angle measurements and images of control and composite membranes according to embodiments herein described at a drop ageing of 30 and 120 seconds.

Wettability and hydrophilicity of the membrane material can play a crucial role in controlling fouling resistance and release of adsorbed foulants since these parameters are directly related to the material surface tension [Ref 34-36]. Recent study has shown to improve membrane hydrophilicity by functionalized surface-tailored inorganic nanoparticles coated with polyelectrolytes [Ref 37]. The enrichment of PEI moieties in a membrane surface has shown promising improvement of hydrophilicity of nanofiltration membranes [Ref 38]. In the present case, the wettability of nanocomposite membranes was obtained by contact angle measurements (FIG. 16). The lowest contact angle of 36°±1.8° was observed at initial time of 30 s for a control membrane PVDF-1 and the highest value 90°±2.1° for a control membrane PVDF-2. The high hydrophilicity of PVDF-1 membrane was due to the porosity rather than the chemical modification of PVDF (FIG. 8). In the case of PVDF-2, there is no significant change in contact angle with drop ageing (120 s) suggests that the surface is completely hydrophobic in nature. The nanocomposite membranes embedded with PEI particles shows substantial lower contact angle yet not much change in porous structure (FIG. 7). FIG. 16 further shows a gradual increase in contact angle with increase in concentration of PEI particles in the membrane matrix. This suggests that the membranes are tightly packed with particles and free from voids and defects. Meanwhile, the membrane with highest PEI particle concentration (NSM-3) shows initial contact angle of 51°±1.5° and decreased significantly with drop ageing (120 s) to 43°±1.2°. In this work, there are two major factors determining the decrease in contact angle, including the hydrophilicity and porosity of the membrane surface. Despite the more porous top surface which could accelerate the penetration of water droplets due to capillary effects [Ref 39], control membranes PVDF-1 and PVDF-2 exhibits a stable contact angle. Therefore, the significant decrease in contact angle for NSM-3 was mainly caused by its hydrophilicity endowed by in situ generated PEI nanoparticles.

Evaluation of Membranes.

Membranes were evaluated according to the conditions described in Table 4.

TABLE 4

| Run-1: Compaction | Run-2: Pure water flux |
| --- | --- |
| Feed: DI water; pH: 5.5 | Feed: DI water; pH: 5.5 |
| Pressure: 1 Bar | Pressure: 1 Bar |
| Compaction: 30 min @ 1 Bar | Run time: 40 min |
| Run-3: BSA rejection | Run-4: Cleaning |
| Concentration: 1000 ppm; pH: 6.54 | Membrane cleaning in DI |
| Run time: 60 min | water under stirring |
| Pressure: 1 Bar | Cleaning time: 60 min |
| Run-5: Pure water flux | |
| Feed: DI water; pH: 5.5 | |
| Pressure: 1 Bar | |
| Run time: 60 min | |

A custom made cross-flow filtration system with an effective membrane area of 24 cm$^2$ was employed to measure the filtration performance of the membranes. The measuring protocol was as follows: for the first 30 min, the membrane was compacted at 0.15 MPa to compromise the compacting effect, and then the pure water flux was recorded every 5 min at 0.1 MPa. Then, pure water was changed to 1 g bovine serum albumin (BSA; Franction V, Mn=67 k, Aldrich) solution for the fouling test. The flux of the protein solution was also measured for every 5 min. Both the feed and permeate solutions were examined by UV-VIS spectrometer at 280 nm. The rejection of BSA (R (%)) was calculated using the following equation (1):

$$R\ (\%) = \left(1 - \frac{A_1}{A_0}\right) \times 100 \quad (1)$$

Where $A_1$ is the absorption value of permeate, and $A_0$ is the absorption value of the feed. After the protein filtration, the tested membrane was washed with Milli Q water under stirring for 1 hour. The pure water flux was measured again. The flow recovery ratio (FRR) was governed by the following equation (2):

$$FRR\ (\%) = \left(\frac{J_{w2}}{J_{w1}}\right) \times 100 \quad (2)$$

Where $J_{w1}$ is the steady pure water flux before fouling and $J_{w2}$ is the steady pure water flux after washing the membrane.

A membrane permeability experiment of NSM-2 sample was conducted with the same cross-flow filtration system using pure water at different trans-membrane pressures from 0.1 MPa to 0.4 MPa. A stable water flux value was used to plot a linear curve fitting and the slope of the curve gives the permeability of the membrane.

Figure 17:
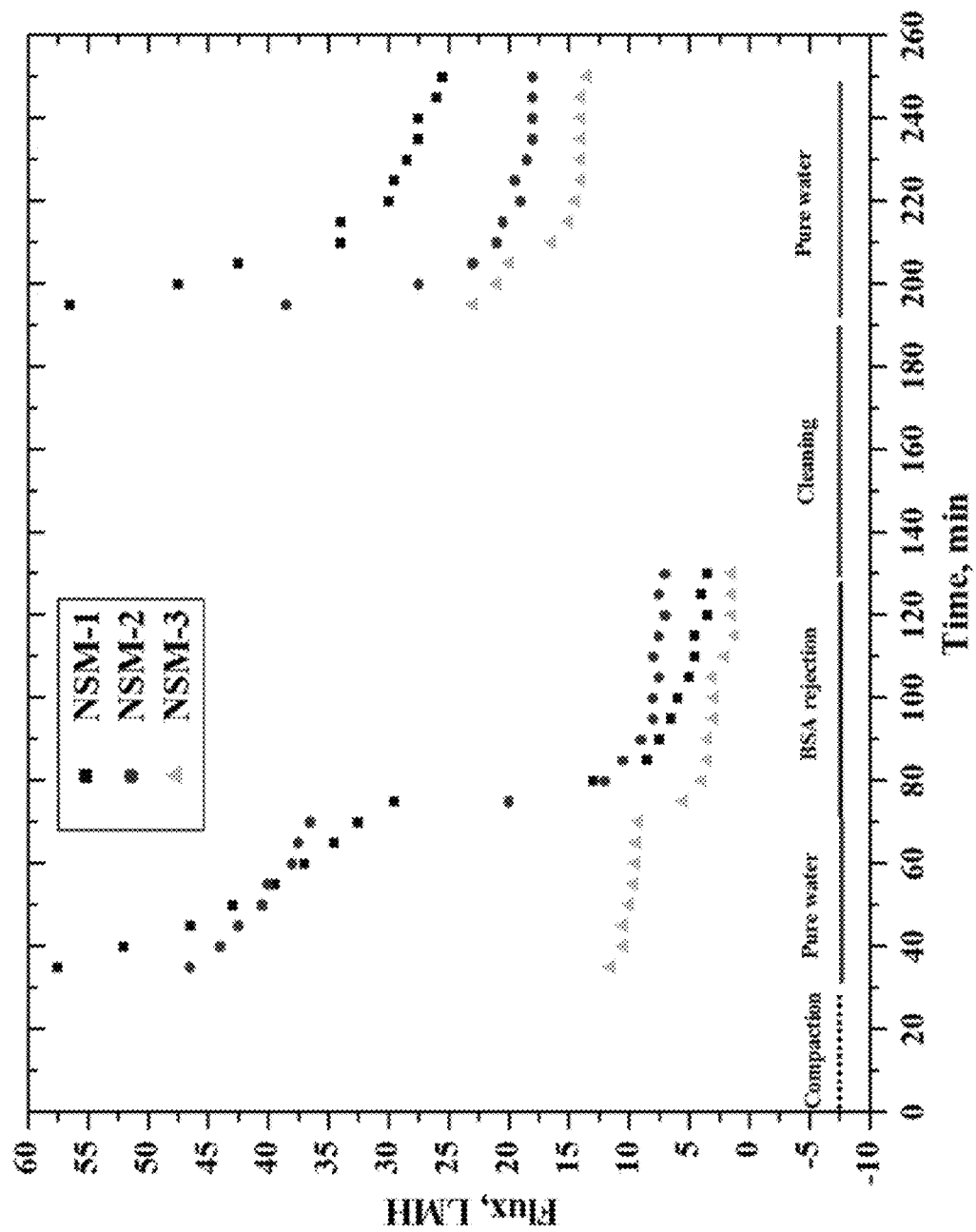
FIG. 17 shows a graph of pure water flux of exemplary polymeric membranes (NSM-1, NSM-2, and NSM-3) with embedded nanoparticles according to embodiments herein described.
Figure 18:
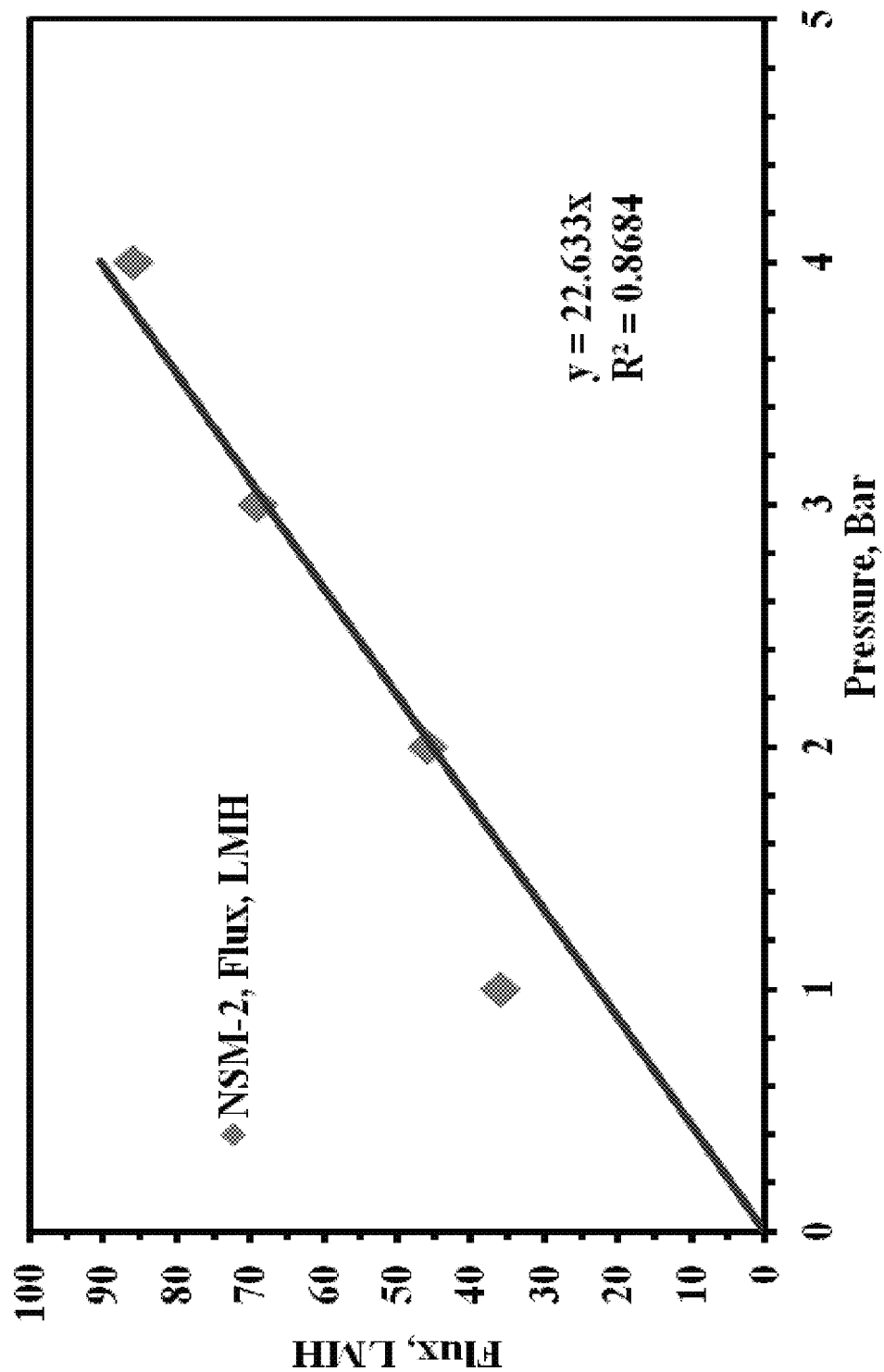
FIG. 18 shows a graph of the permeability of NSM-2 membrane.

The time dependent water flux of composite membranes NSM-1, NSM-2 and NSM-3 is depicted in FIG. 17. The neat PVDF membrane is highly hydrophobic in nature and having a dense top surface it shows pure water flux below 3 LMH hence this data is excluded from the graph. The initial pure water flux of these membranes shows a unique trend, though the initial water flux of NSM-1 is high when compared to NSM-2 and NSM-3, it shows high compaction. As a result stable water flux of NSM-1, NSM-2 and NSM-3 is in the order of 29.5, 36 and 5.5 LMH respectively. It can be observed that NSM-2 shows reasonably high water flux and less compaction in nature. This can be understood by high hydrophilicity of NSM-2 purely because of the chemical modification of the matrix by means of packed PEI particles. In case of NSM-3, the membrane shows less water flux and compaction because it is highly packed with PEI micro and nanoparticles. These particles further block the pores of membrane leading to less porous in nature. Membrane permeability of NSM-2 sample was studied by measuring water flux as a function of pressure. A plot of linear curve fitting was drawn between stable pure water flux and operation pressure is shown in FIG. 18. The slope of the curve gives permeability of the membrane, in case of NSM-2 it is found to be 22.663 LMH per bar pressure. This permeability data suggests that these membranes are in the order of nanofiltration membranes.

Figure 19:
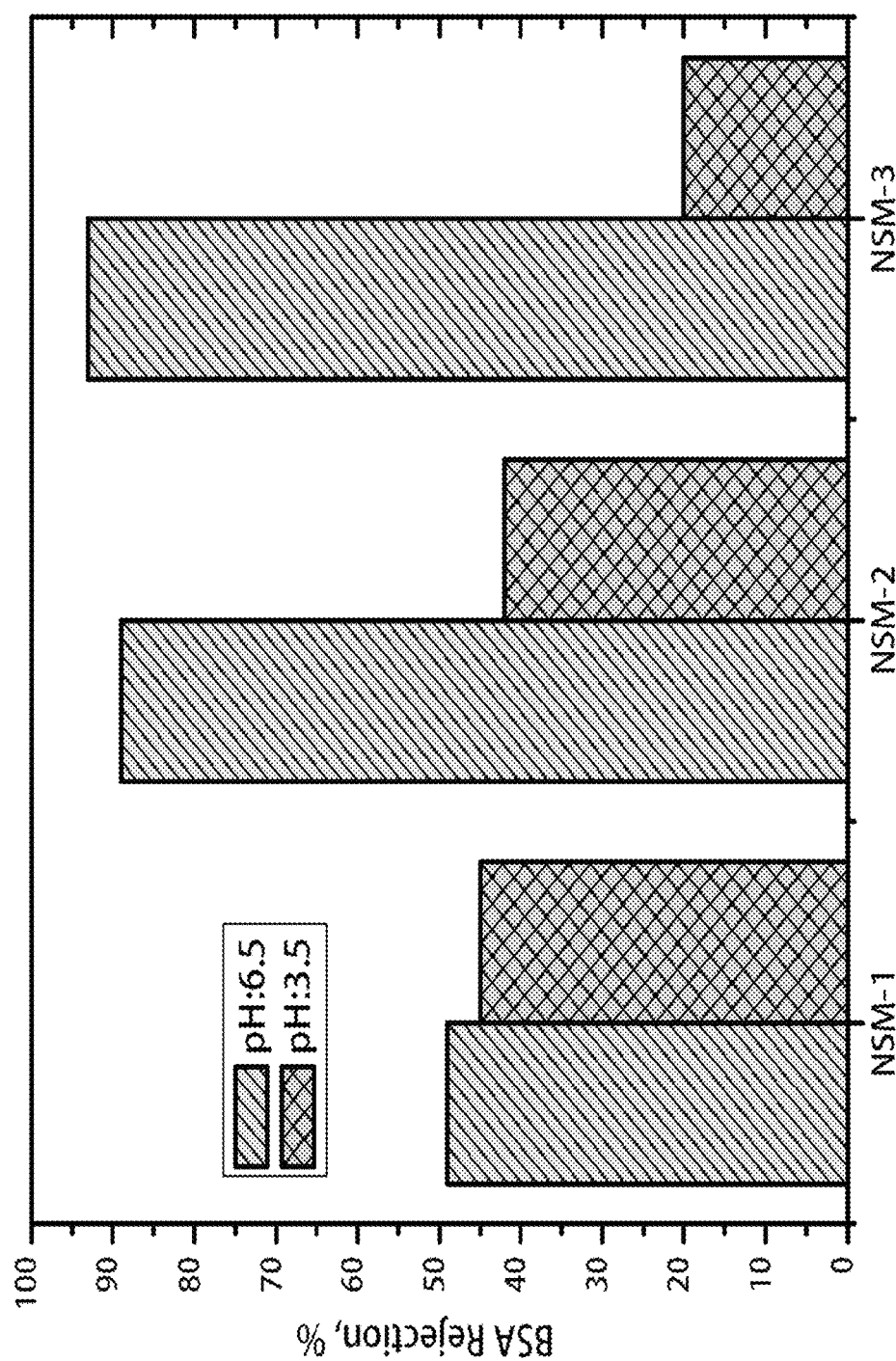
FIG. 19 shows a graph of BSA protein rejection at different pH of NSM-1, NSM-2, and NSM-3.

Protein adhesion studies were conducted for these membranes by passing BSA solution. The permeate fluxes dropped dramatically in the first 15 min and then became stable in all cases, which is probably caused by protein fouling and concentration polarization. When BSA solution was used with the membranes, a stable permeate flux of NSM-2 membrane is more when compared to other two membranes. The isoelectric point (pI) of a protein plays an important role in transport. When the pH value of a buffer solution exactly equal to the pI of a protein, the surface charge of the protein is neutral. When the pH deviates even slightly from the pI of the protein, the charge of the protein changes. At a pH above the pI, the protein is negatively charged; at a pH below pI, the protein is positively charged. FIG. 19 shows the BSA rejection of composite membranes at pH 6.5 and 3.5. The BSA rejection is as high as above 93% for NSM-3 membrane when BSA solution is at pH 6.5. At same pH, the BSA rejection for NSM-1 and NSM-2 are found to be 49% and 89% respectively.

To understand the mechanism of BSA rejection, these membranes were characterized for zeta potential measurements at different solution pH (FIG. 20). The reported pI of BSA is 4.7, therefore pH 6.5 is much higher than its pI value hence the protein is negatively charged. The zeta potential of NSM-1 membrane at pH 6.5 is slightly negative charge (−1.78 mV). In this case, both membrane and BSA protein is negatively charged hence there is a strong electrostatic repulsion resulted in no protein adsorption over the membrane. This is the probable reason for the greater transport of protein through the pores of NSM-1 membrane. The zeta potential measurement of NSM-2 and NSM-3 at pH 6.5 shows 2.04 and 4.05 mV respectively (FIG. 20). In this case, membranes are positively charged and BSA protein is negatively charged hence because of electrostatic attractions protein molecules adsorbed on to the membranes and hindered the transport of protein molecules through the pores as a result high BSA rejections obtained. These results are consistent with a previous report by Xiaoyan Qiu et al. [Ref 40].

To further support these results BSA rejection experiments are conducted at solution pH 3.5 which is below the pI value of BSA. The zeta potential measurements at pH 3.5 shows that all the membranes are positively charged and NSM-3 found to be highest zeta potential value (11.90 mV). The BSA rejection of NSM-3 at pH 3.5 dramatically reduced to 20%, from its initial 93% rejection at pH 6.5. This suggests that there is no protein adsorption throughout the entire membrane's thickness which allowed protein to transport through the pores of membrane freely. In case of NSM-1 there is no significant change in BSA rejection trend. This is probably because of a more porous structure rather than the ionic strength of the membrane and protein. Although ionic strength of the system is plays a major role other parameters such as the molecular shape, mobility and hydrophilic-to-hydrophobic ratio of amino acids (nature of protein) also affects the transport phenomenon. A combination of these factors influences the protein transport behavior through the nanopores of the membrane [Ref 40]. The charged membranes developed in the present case by in situ generated PEI particles responded well to the diffusion of BSA protein molecule as a function of solution pH which can make them useful for the separation of proteins.

In order to see the protein binding or fouling of these composite membranes, after the diffusion experiments, the membranes were rinsed with ultrapure water for 1 hour and repeated the water flux experiments. Then measured the flux recovery rate (FRR) from the stable pure water flux before and after BSA diffusion experiments. After the treatment, the pore radius of the membranes did not change as observed from water flow experiments, indicating that there was no irreversible protein adsorption inside the pores. The FRR of these membranes found to be more that 100% in all membranes suggests that recovery of original water flux is 100% after BSA diffusion studies (FIG. 17). If the permanent protein binding took place, the adsorbed protein would foul the membrane and cause a decrease in water flux. This shows that these novel membranes are promising for providing bio fouling resistance in membranes for membrane filtration applications.

Figure 21:
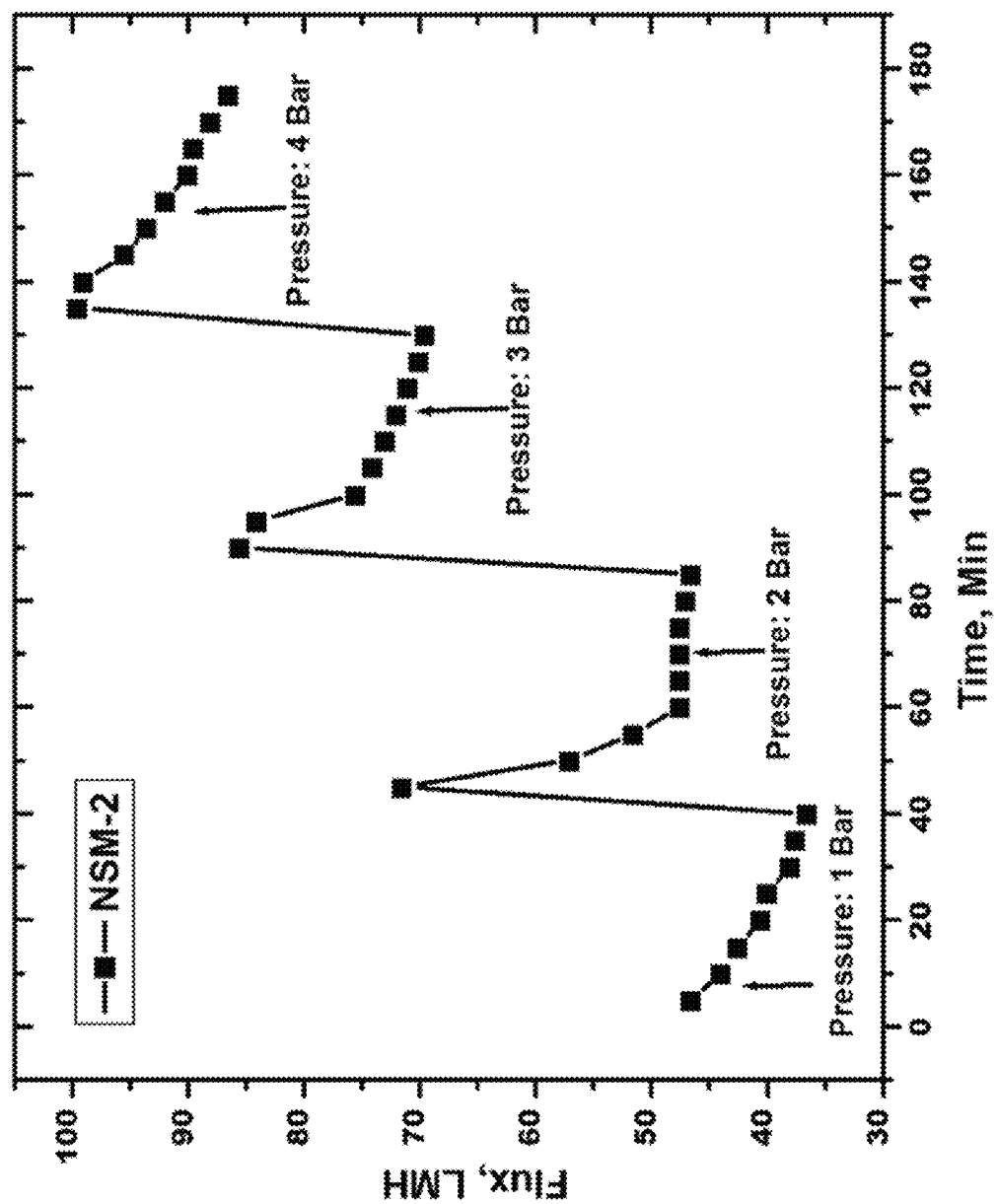
FIG. 21 shows a graph of the effect of pressure on pure water flux in an exemplary polymeric membrane (NSM-2) with embedded nanoparticles according to embodiments herein described.

The neat PVDF membrane (PVDF-2) pure water flux is less than 3 LMH at 1 bar and PEI composite membranes (NSM-1, NSM-2, NSM-3) show typical pure water flux of UF range, stable flux of 315 LMH at 1 bar (TABLE 5, FIG. 17, and FIG. 21). Pure water flux of composite membranes shows well below the UF range at 1 bar pressure. The flux recovery after the BSA rejection cycle was found to be 100% by simple water wash in case of composite membranes. The in situ PEI chemical reaction provides hydrophilicity to the composite membranes that controls the protein binding mechanism with the membrane.

TABLE 5

| Time, min | Permeate Flux, LMH | | |
|---|---|---|---|
| | NSM-1 | NSM-2 | NSM-3 |
| Pure water Flux | | | |
| 35 | 57.5 | 46.5 | 11.5 |
| 40 | 52 | 44 | 10.5 |
| 45 | 46.5 | 42.5 | 10.5 |
| 50 | 43 | 40.5 | 10 |
| 55 | 39.5 | 40 | 9.6 |
| 60 | 37 | 38 | 9.5 |
| 65 | 34.5 | 37.5 | 9.4 |
| 70 | 32.5 | 36.5 | 9.2 |
| BSA rejection | | | |
| 75 | 29.5 | 20 | 5.5 |
| 80 | 13 | 12 | 4 |
| 85 | 8.5 | 10.5 | 3.5 |
| 90 | 7.5 | 9 | 3.5 |
| 95 | 6.5 | 8 | 3 |
| 100 | 6 | 8 | 2.9 |
| 105 | 5 | 7.5 | 3.1 |
| 110 | 4.5 | 8 | 2.1 |
| 115 | 4.5 | 7.5 | 1.3 |
| 120 | 3.5 | 7 | 1.5 |
| 125 | 4 | 7.5 | 1.5 |
| 130 | 3.5 | 7 | 1.5 |
| Pure water flux | | | |
| 195 | 56.5 | 38.5 | 23 |
| 200 | 47.5 | 27.5 | 21 |
| 205 | 42.5 | 23 | 20 |
| 210 | 34 | 21 | 16.5 |
| 215 | 34 | 20.5 | 15 |
| 220 | 30 | 19 | 14.5 |
| 225 | 29.5 | 19.5 | 14 |
| 230 | 28.5 | 18.5 | 14 |
| 235 | 27.5 | 18 | 14 |
| 240 | 27.5 | 18 | 14 |
| 245 | 26 | 18 | 14 |
| 250 | 25.5 | 18 | 13.5 |

BSA rejection of the membranes NSM-1, NSM-2, NSM-3, and PVDF-1 (PEI and PVDF without cross-linker) are shown in Table 6.

TABLE 6

| Membrane ID | BSA Rejection, % |
|---|---|
| NSM-1 | 49 |
| NSM-2 | 89 |
| NSM-3 | 93 |
| PVDF-1 (PEI and PVDF without cross-linker) | 42 |

As the PEI particle concentration increases the BSA rejection is increasing. This could be because of the membranes became less porous and the interstitial spaces between particles provides mass transport. The PVDF membrane is more porous in nature because of PEI leach out during phase inversion mechanism.

These results indicate that the permeability of composite membranes can be applied to nanofiltration applications. These BSA protein diffusion studies demonstrate that the diffusion of protein is pH dependent could be useful for the protein molecules separation. Since these membranes contains functionalized polymer particles, over all hydrophilicity improved and protein binding on to the membranes found to be temporary. This property helps to recover from bio fouling and subsequently to its original permeability.

In summary, engineered polymer particle embedded composite membranes can be synthesized by in situ in presence of membrane dope solution. By this methodology, novel composite PVDF membranes with high concentrations of positively charged PEI particles can be made. Further, these membranes were prepared with and without support layer by simple and commercial feasible phase inversion casting method. The membranes with support layer can be used for membrane distillation experiments to test their multi functionality. The particle concentration is achieved as high as about 50% on the basis of final membrane composition. In this work, the membranes were embedded with engineered PEI particles cross-linked with ECH at a fixed degree of cross-linking 39.7%. The other challenges associated with particles dispersion in membrane matrix could also be addressed by this methodology. These membrane morphologies as seen in the SEM images were found to be unique and confirm the dispersion of PEI particles throughout the membrane matrix. It is worth noting that the improved hydrophilicity of composite PVDF membranes endowed by in situ generated PEI particles. Therefore, particles generation by in situ can provide a better way to prepare polymeric composite membranes, while the surface enrichment of hydrophilicity can be controlled by micro-phase separation of particles. Membrane characteristics like permeability, selectivity and fouling resistance can be optimized according to methods described in the present disclosure to ascertain their applications in water treatment, catalysis and separations. Moreover, optimization of particle concentration and expanding this methodology to acrylic based negative charge particles can also be accomplished by using the methods described herein.

Example 3

Determination of In Situ and Ex Situ Particle Formation for Polymeric Membranes Produced with PEI and Other Polymers and Under Various Conditions and Evaluation of Producing Membranes with Preformed Particles Produced Ex Situ In addition to the exemplary membranes produced in Example 2, other conditions and polymers were employed to determine in situ particle formation. Hydrophilic modification of PVDF membranes was accomplished by using hydrogel polyelectrolyte moieties by in situ polymerization with PVDF dope solution. Polyelectrolyte particles having negative, positive or both can be incorporated by in situ polymerization technique. In both cases, if the particles are made with low degree of cross-linking they can act like a hydrogels. The acrylic monomers such as methacrylic acid, AMPS, acrylic acid, vinyl sulphonic acid, acrylonitrile, acrylamide etc. can be used to generate negative charge moieties in the membranes. The positive charge moieties including polyamines, polyimines and quaternary ammonium functionalities can be incorporated. Table 7 describes the acrylic moieties incorporated by in situ polymerization and cross-linking with various monomers and their combinations. For the positive charge moieties in all cases PEI was employed. It was found that branched polymers led to in situ formation or particles whereas linear polymers (e.g. poly(methacrylic acid)) required preformation of particles to obtain membranes with embedded particles (sections 2-4 of Table 7).

hyperbranched macromolecules, such as polyethyleneimine (PEI), behave very similarly as the corresponding, but expensive, dendrimers [Ref 1]. Hyperbranched PEI has a degree of branching at approximately 65-70%. They comprise of primary, secondary and tertiary amines linked by $C_2$ alkyl chains. Two features of hyperbranched PEI macromolecules are their large N content (18-20 mol/kg) and the ease of functionalization of their primary and secondary amine

TABLE 7

| Expt ID | Monomer | X-linker | Initiator | Reaction parameters | Remarks |
|---|---|---|---|---|---|
| 1. PVDF membranes modified with positive charge moieties (In situ PEI NP's) | | | | | |
| PM-20 (NSM-1) | PEI (1.36 g) | ECH (0.9) | — | 4 h @ 80° C. | Particles formation |
| PM-02 (NSM-2) | PEI (2.28 g) | ECH (1.5 g) | — | 4 h @ 80° C. | Particles formation |
| PM-21 (NSM-3) | PEI (3.42 g) | ECH (2.25 g) | — | 4 h @ 80° C. | Particles formation |
| PM-22 (Blend) | PEI (2.28 g) | — | — | | No particle formation |
| PVDF-4 (Neat) | — | — | — | NA | No particle formation |
| 2. PVDF membranes modified with negative charge moieties | | | | | |
| PM-10 | Methacrylic acid | EGDMA-1% | AIBN (0.033 g) | 5 h @ 80° C. | No particle formation |
| PM-11 | Methacrylic acid | EGDMA-5% | AIBN (0.033 g) | 5 h @ 80° C. | No particle formation |
| PM-12 | Methacrylic acid | EGDMA-10% | AIBN (0.033 g) | 5 h @ 80° C. | SEM data not available |
| PM-13 | Methacrylic acid | PEGDMA-5% | AIBN (0.033 g) | 5 h @ 80° C. | SEM data not available |
| PM-14 | Methacrylic acid | PEGDMA-10% | AIBN (0.033 g) | 5 h @ 80° C. | SEM data not available |
| PM-15 | Methacrylic acid | PEGDMA-15% | AIBN (0.033 g) | 5 h @ 80° C. | No particle formation |
| PM-18 | — | PEGDMA-100%, Mn: 550 | AIBN (0.033 g) | 5 h @ 80° C. | SEM data not available |
| PM-19 | — | PEGDMA-100%, Mn: 750 | AIBN (0.033 g) | 5 h @ 80° C. | SEM data not available |
| 3. PVDF membranes modified with both negative and positive charge | | | | | |
| PM-04 | a) Methacrylic acid | — | AIBN (0.015 g) | 3 h @ 80° C. | No particle formation |
| | b) PEI | ECH (0.6 g) | — | 3 h @ 80° C. | |
| PM-06 | a) PEI | ECH (0.6 g) | — | 3 h @ 80° C. | Particle formation but |
| | b) Methacrylic acid | — | AIBN (0.015 g) | 3 h @ 80° C. | particles were cracked |
| PM-07 | a) Methacrylic acid | EGDMA (0.6 g) | AIBN (0.015 g) | 3 h @ 80° C. | No particle formation |
| | b) PEI | ECH (0.6 g) | — | 3 h @ 80° C. | |
| PM-08 | a) PEI | ECH (0.6 g) | — | 3 h @ 80° C. | Particle formation |
| | b) Methacrylic acid | EGDMA (0.2 g) | AIBN (0.015 g) | 3 h @ 80° C. | without cracks |
| 4. PVDF membranes modified with blended preformed nanoparticles produced ex situ | | | | | |
| PM-25B | PEI NPs (3.5 g) | ECH | — | 2 h @ 80° C. | Few particle clusters were formed. |
| PM-26B | Acrylic NPs (3.5 g) | EGDMA | — | 2 h @ 80° C. | Homogeneous particles mixing. |
| PM-27B | PEI NPs (1.75 g) Acrylic NPs (1.75 g) | ECH EGDMA | — | 2 h @ 80° C. | Homogeneous particles mixing. |
| PM-28B | PEI NPs (2.0 g) | ECH | — | 2 h @ 80° C. | Few particle clusters were formed |

Filtration experiments were carried out on PM-25B and PM-26B (preformed acrylic particles) with DI water at 1 bar pressure. The stable flux of PM-25B and PM-26B obtained was 7.5 LMH and 1.5 LMH respectively. In both cases, the flux of feed water having BSA of 1000 ppm was almost negligible (less than 3 LMH). The flux data shows these membranes were less porous than in-situ NPs generated membranes.

Example 4

Synthesis and Characterization of Anion-Exchange Hyperbranched Macromolecules

Figure 22:
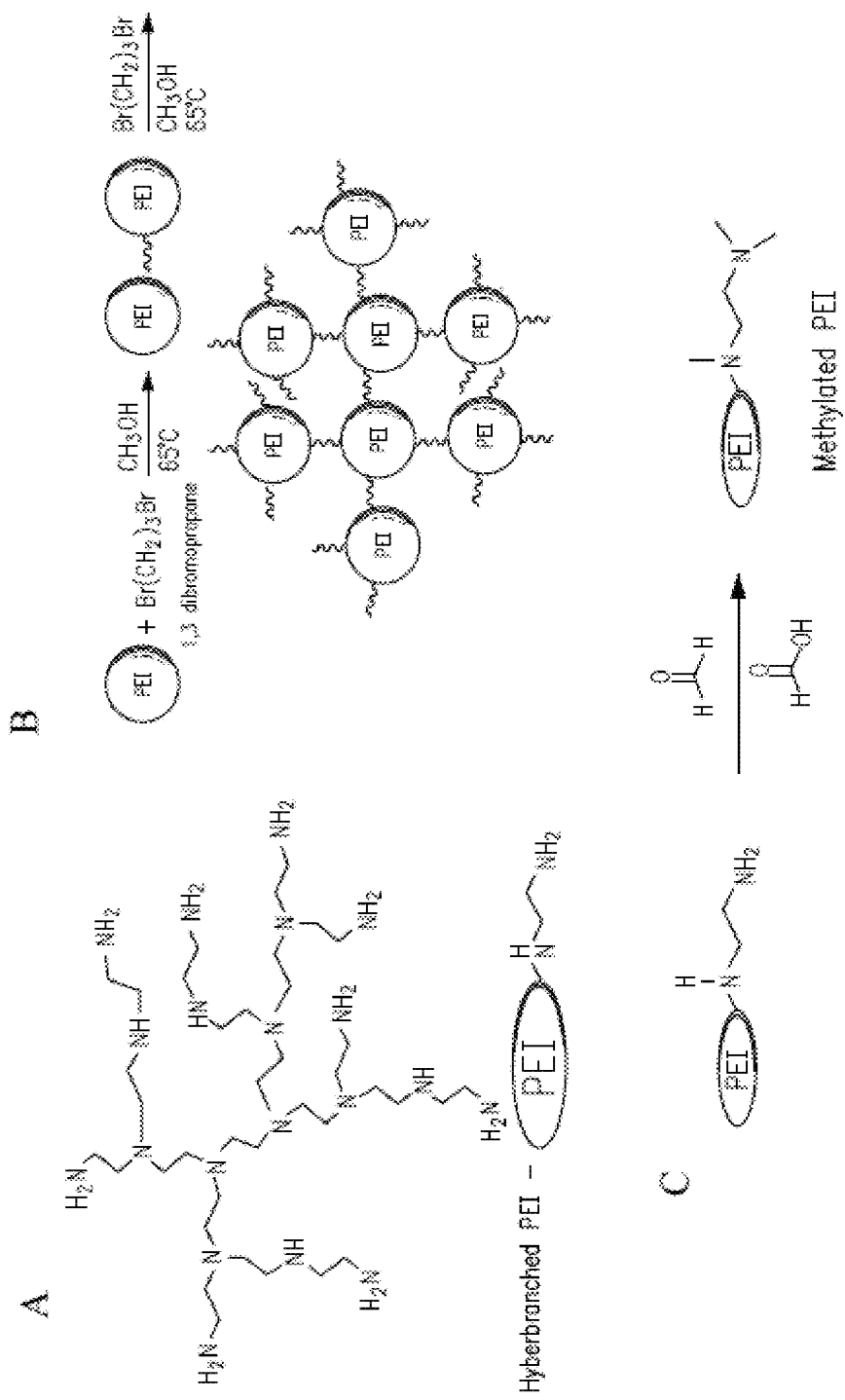
FIG. 22 shows a hyperbranched polyethyleneimine (PEI) macromolecule (Panel A) and related methods of cross linking (Panel B) and methylation (Panel C) of anion-selective hyperbranched macromolecules [Ref 1].

In this example, the Applicants have utilized dendritic macromolecules (e.g., PAMAM and PPI dendrimers) as selective and recyclable high capacity macroligands for anions and cations in aqueous solutions [Ref 16-19] which a skilled person can utilize to form polymeric nanoparticles based upon a reading of the present disclosure. Low-cost groups. FIG. 22 shows a particular strategy for functionalizing hyperbranched PEI macromolecules with various functional groups to synthesize anion-selective macromolecules including macroligands that can selectively bind anions (e.g., $Cl^-$, $Br^-$ and $SO_4^{2-}$; $NO^{3-}$; and $ClO^{4-}$) at pH of approximately 5-6 and release them at pH ~9.0 [Ref 1]. In this Example, PEI is reacted with cross-linking agent 1,3-dibromopropane in methanol at 65° C. to form cross-linked PEI units.

The Applicants have also synthesized and characterized functionalized hyperbranched PEI macromolecules that can serve as high capacity anion-exchange ligands. The anion exchange ligands were prepared by methylation of hyperbranched PEI using an Eschweiler-Clarke reaction as shown in the bottom of FIG. 22, followed by conversion of its tertiary amine groups to quaternary groups with permanent positive charges (—$R_4N^+$). In this example, the chemical compositions and molar masses of the synthesized hyperbranched macromolecules were characterized using the appropriate analytical techniques (e. g. NMR, SEC, MALDI-TOF MS, etc.) The exchange capacity of the anion-exchange hyperbranched macromolecules was also measured.

Example 5

Synthesis and Characterization of Anion-Exchange Polymeric Nanoparticles

Figure 23:
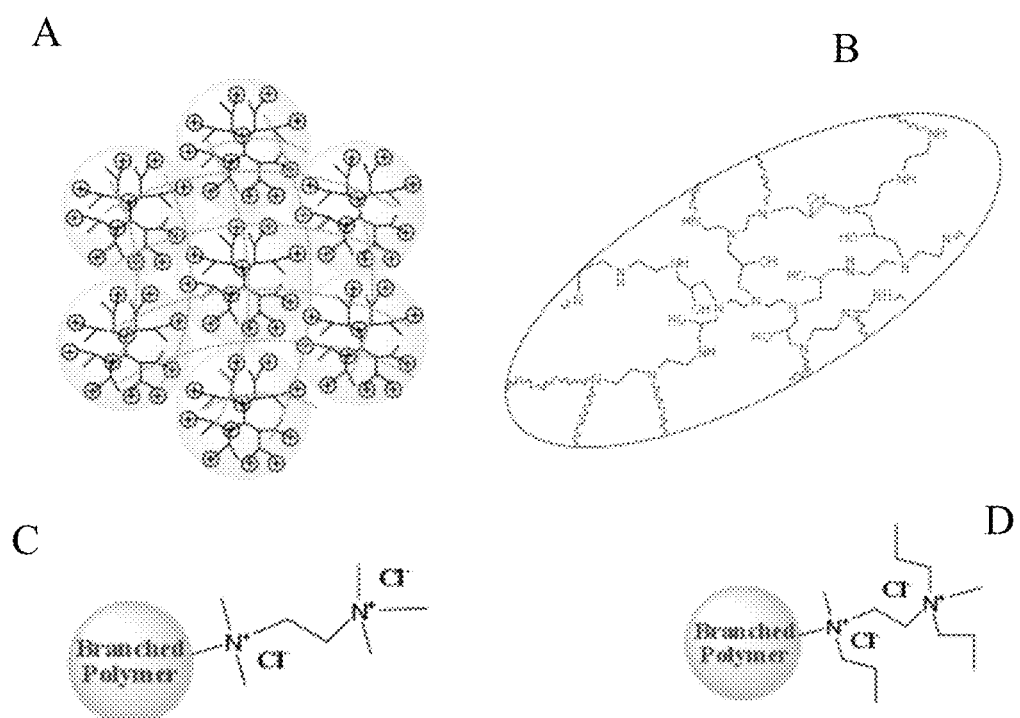
FIG. 23 shows anion-exchange hyperbranched microparticles. In particular, Panel A shows a schematic of an aggregate of hyperbranched macromolecules forming anion-exchange hyperbranched microparticles. Panel B shows the interior microenvironment of the microparticles. Panels C and D show an embodiment where the reactive site is a quaternary ammonium center.

In this example, the use of high performance media for water treatment (patent pending) is described (see U.S. Provisional Patent Application 61/665,749). The media comprise functionalized polymeric nanoparticles (PNP) which were synthesized using low-cost hyperbranched polymers HBP as precursor materials as shown in FIG. 23. Due at least in part to their unique chemistry and hyperbranched architecture, the media were reacted with a broad variety of chemical groups to prepare ion-selective media. The Applicants have synthesized ion-selective hyperbranched microparticles with a strong base anion-exchange capacity (SBEC) of 2.0 eq/L [Ref 24]. In this example, the exchange capacity is larger by ~40% than that of DOWEX® SAR anion-exchange resin, which has a SBEC of 1.4 eq/L and is one of the largest anion-exchange capacity in the market (dow.com/liquidseps/prod/dx_sar.htm).

Applicants have prepared anion-exchanged polymeric nanoparticles (NP) using synthetic strategies similar to those described in U.S. Provisional Patent Application 61/665,749. In this example, the physicochemical properties of the anion-exchange PNP were characterized using elemental analysis, FT-IR, SEM and TEM. The exchange capacity of the anion-exchange PNP can also be measured. The results of this example provided the building blocks for preparing heterogeneous anion-exchange hollow fibers with high charge density and Donnan potential.

Example 6

Multiscale Modeling Anion-Exchange Polymeric Nanoparticles

In this example, a computer-aided molecular design framework for designing ion-selective hyperbranched macromolecules, polymeric nanoparticles and fibers is described. Using atomistic molecular dynamics (MD) simulations of the structures and physical/chemical properties of dendrimers and polymer electrolyte membranes fuel cells with embedded dendrimers [Ref 2, 41], multiscale simulations can be used to determine the structures of anion-selective hyperbranched polymeric nanoparticles (FIG. 23) and to probe their interactions with relevant cations (e.g. $Ca^{2+}$, $Mg^{2+}$ and $Na^+$) and anions ($Cl^-$ and $SO_4^{2-}$) in water and model electrolyte solutions.

Characterization data from elemental analysis, NMR and size exclusion chromatography data can be used to build 3-D models of anion-selective hyperbranched PEI macromolecules and polymeric nanoparticles (FIG. 22 and FIG. 23). Atomistic MD simulations of these systems in explicit water with counterions can be carried out. Following completion of these simulations, 3-D models of ion-selective hollow fibers by embedding hyperbranched PEI polymeric nanoparticles (FIG. 23) inside matrices of selected polymers (e.g. PS, PES, PVDF and PAN) can be built. These systems can then be used to carry out multiscale modeling ion and water transport through the modeling of polymeric nanoparticles and ion-selective hollow fibers and UF membranes made with the polymeric nanoparticles. Parameters that are expected to be determinable from these simulations include: (1) Ion membrane-water partition coefficients; (2) Ion diffusion constant and permselectivity; (3) Water transport (e.g. diffusion) and permeability; and (4) Electrostatic charge and potential distributions inside the membranes and at membrane-solution interfaces. The results are expected provide a computer aided molecular design framework that can guide the synthesis of ion-selective UF membranes for water treatment and desalination.

Example 7

Synthesis and Characterization of IAµF Membranes by Phase Inversion (PI) Casting The Applicants have also synthesized and characterized IAµF membranes by phase inversion (PI) casting of dope solutions of dendritic macromolecules onto glass supports.

Example 8

Synthesis and Characterization of Ion-Selective Dendritic Macromolecules (ISDM)

The Applicants have shown that the cation/anion binding capacities of PAMAM and PPI dendrimers are very large. The Applicants have developed a facile and versatile strategy for synthesizing low-cost ISDM with protonable N groups that can selectively bind anions (e.g., $Cl^-$, $Br^-$, $NO_3^-$ and $ClO_4^-$) at pH 5-6 and release them at pH 9.0 [Ref 1, 3].

Example 10

Multiscale Modeling and Computer-Aided Molecular Design of Ion-Selective Dendritic Macromolecules In this example, a computer-aided molecular design framework for ion-selective dendritic macromolecules (ISDM) can be used to guide the design of ion-selective dendritic macromolecules. This example uses a modeling and simulation of the structures and properties of dendritic polymers [Ref 2, 20-23, 41]. The atomistic molecular dynamics (MD) simulations of the structures and transport properties of polymer electrolyte membranes fuel cells (PEMFC) with embedded dendrimers [Ref 41] and the effects of solution pH and counterions (e.g., $Cl^-$) on the structure, size and conformation of PAMAM dendrimers in aqueous solutions (FIG. 26) [Ref 2] are modeled and/or simulated. Targeted atomistic MD simulations of anion/cation binding to model low-cost ISD synthesized can be carried out. The computer-aided molecular design framework can be used to guide the synthesis of low cost ISD.

Example 11

Figure 33:
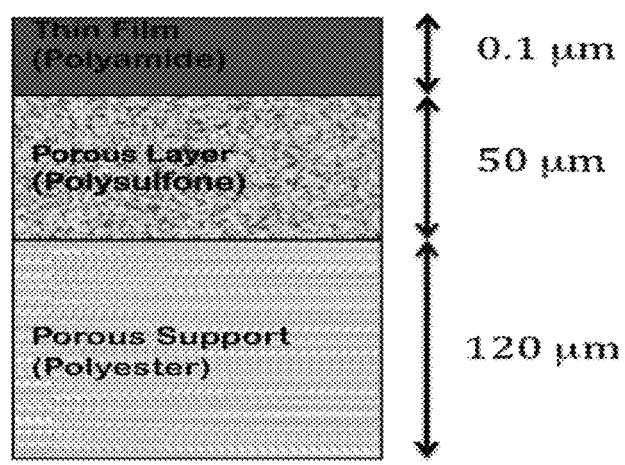
FIG. 33 shows a schematic of a commercial thin film composite (TFC) nanofiltration membrane suitable to be used in connection with membranes, and systems herein described.
Figure 36:
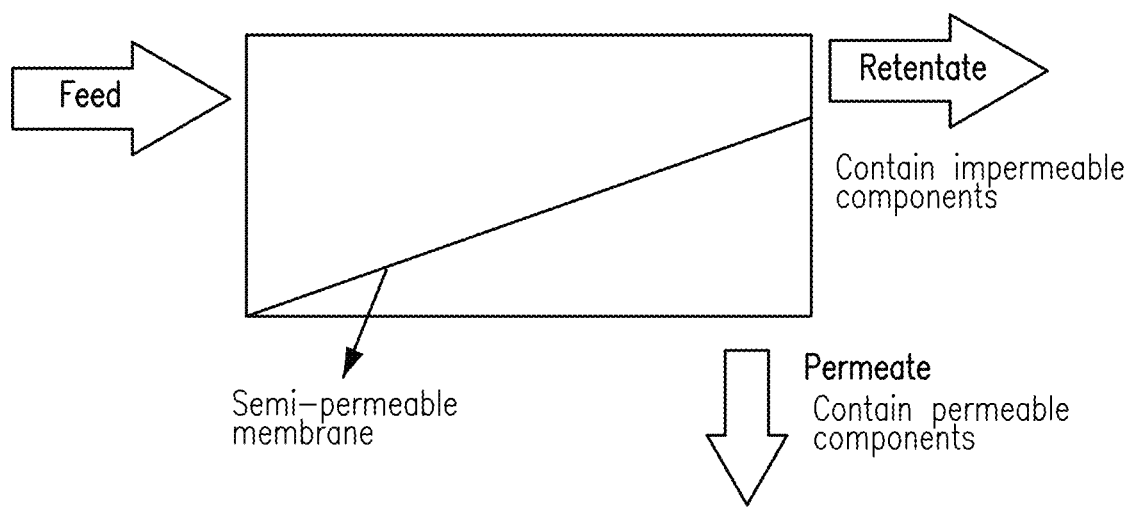
FIG. 36 shows a schematic diagram of membrane filtration processes [Ref 5].
Figure 37:
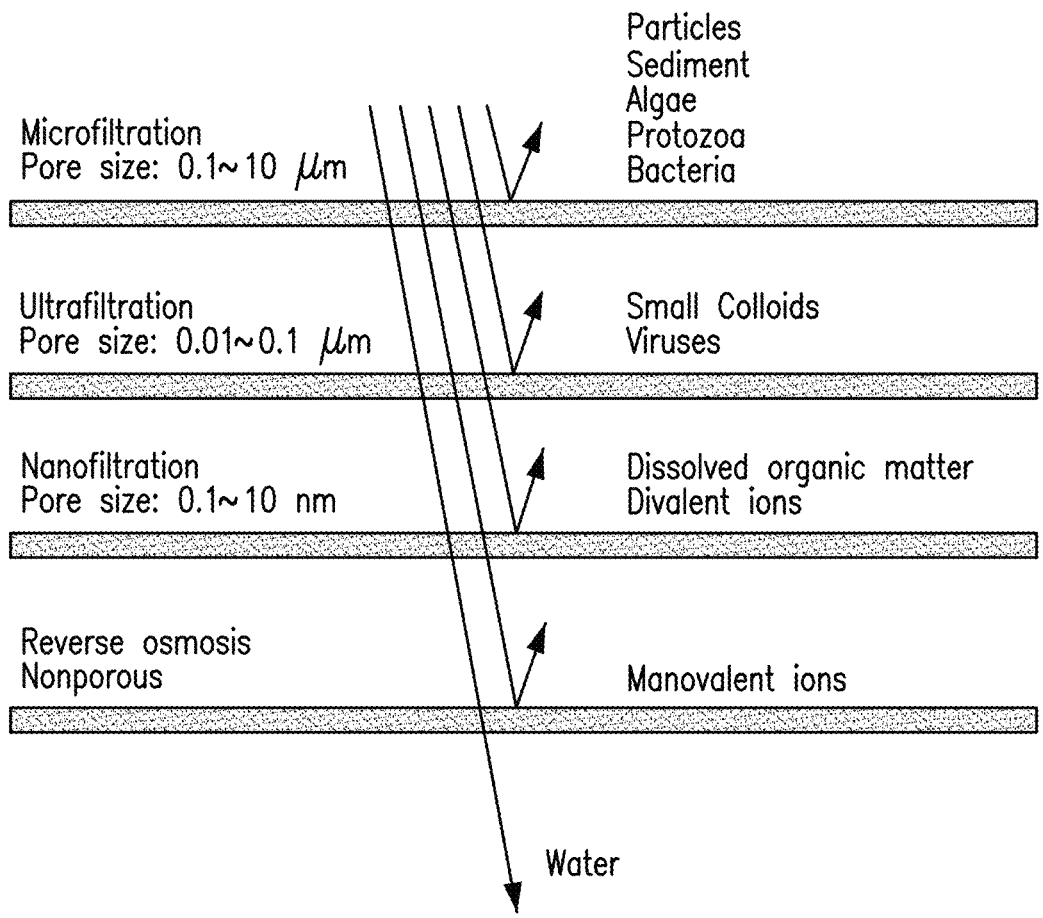
FIG. 37 shows several types of membrane filtration processes [Ref 5].
Figure 38:
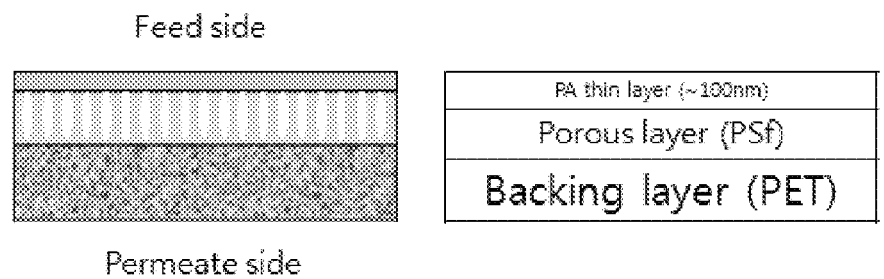
FIG. 38 shows schematic pictures of a commercial PA TFC membrane suitable in filtration methods and systems according to embodiments herein described.
Figure 39:
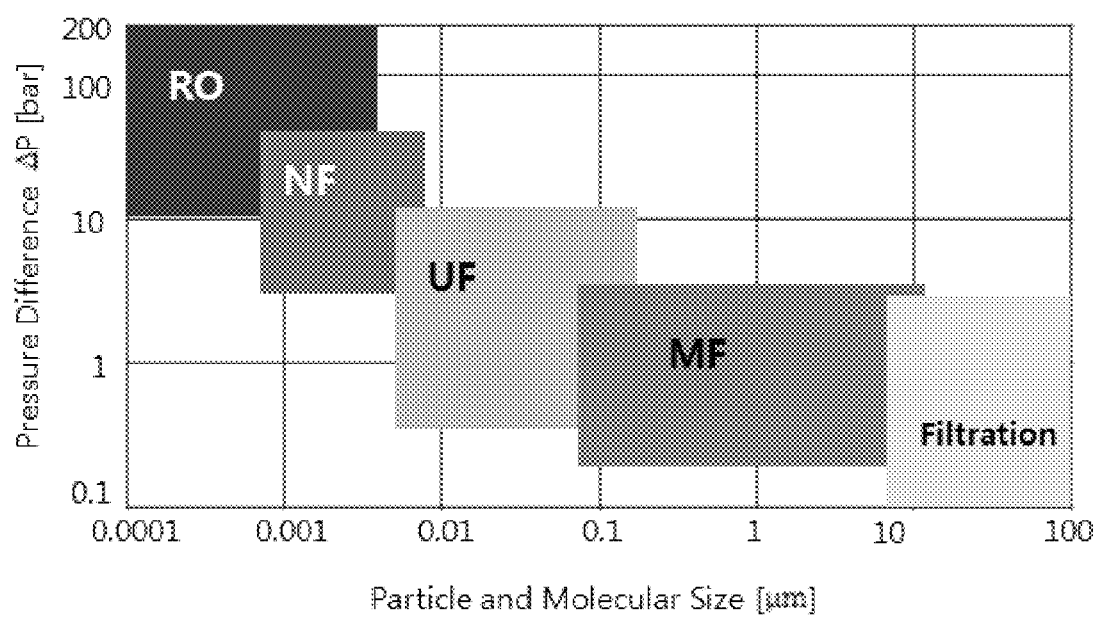
FIG. 39 shows separation capabilities of pressure-driven membrane separation processes [8.7].

Example of a Low-Pressure Filtration System that can Desalinate Brackish Water and Seawater In this example, the Applicants have describe a low-pressure filtration system that can desalinate brackish water and seawater more efficiently and cost effectively than RO using the filtration membranes herein described. In some embodiments, the filtration systems herein described can comprise other membranes in combination with the filtration membranes herein described. For example, commercially available membranes can also be included as will be understood by a skilled person. For example, some suitable commercial RO membranes comprise a polyamide layer thin film over a porous polysulfone layer, which in turn is over a polyester support layer (FIG. 33) In some instances the polyamide layer can face the incoming feed water (see FIG. 38). In FIG. 36, a general schematic of the desalination process is shown, wherein feed water, (comprising chemicals such as dissolved NaCl that is to be removed) passes through a membrane and the permeate (e.g. water) is passed through the membrane and the retentate (e.g. NaCl and other salts in seawater) and can be diverted to a waste stream or elsewhere to recover the dissolved material not passed by the membrane. The types of the chemicals to be separated from the feed water depends on the relative size of the chemicals (FIG. 37 and FIG. 39) In particular, FIG. 27 shows a typical process configuration of a desalination system.

Figure 27A:
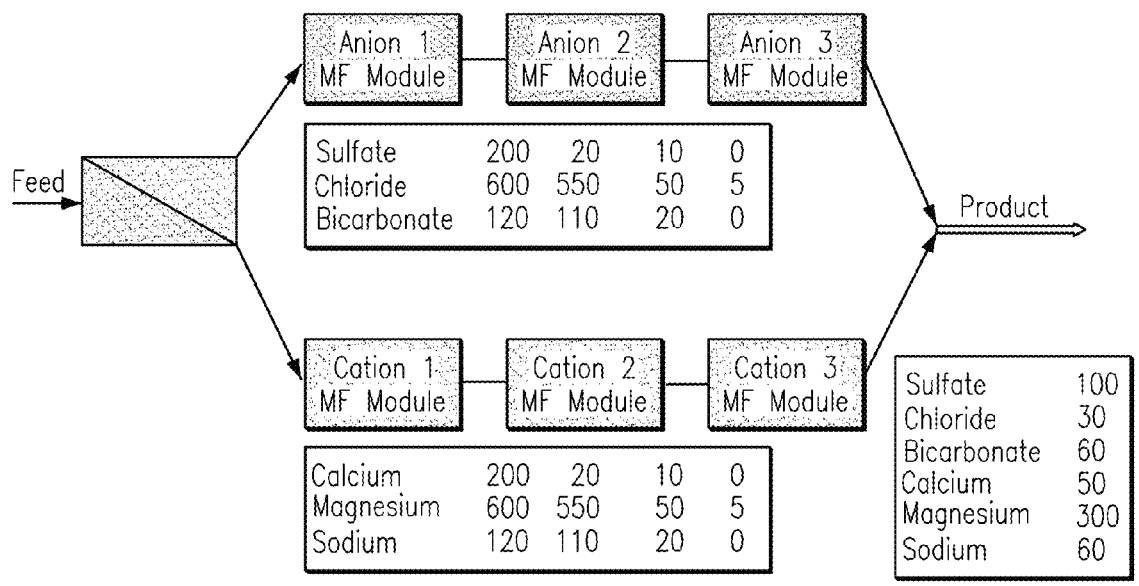
FIG. 27 shows a schematic diagram of an exemplary configuration for a low-pressure membrane filtration system and related method for desalination according to an embodiment herein described.
Figure 27B:
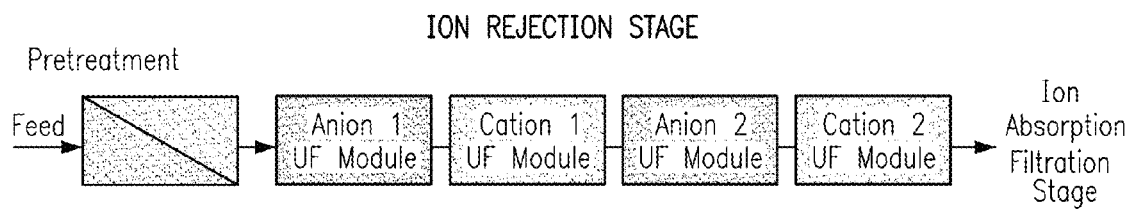

The desalination system illustrated in FIG. 27 can comprise three units: 1) a pretreatment system to remove particles and dissolved organic matter, 2) an ion-rejection ultrafiltration (UF) system and 3) an ion-absorption microfiltration (MF) system. Various membranes can be included in the three systems, as will be understood by a skilled person. For example, cation-rejecting and anion rejecting membranes with embedded polymeric nanoparticles herein described can be comprised as a part of the ion-rejection ultrafiltration (UF) system) of FIG. 27.

For example in the first unit, saline water can be pretreated by to remove particulate and dissolved organic matter using standard pretreatment technologies such as microfiltration and cartridge filtration. In the second unit, the pretreated saline water can be passed through a series of alternating cation/anion selective tight UF membranes designed to reject 70-90% of dissolved ions. Because of the ion-selective UF membranes can be backwashed intermittently to control the build-up of ions at the membrane surfaces, they can be operated at significantly lower pressure (e.g. 4-10 bar) and much higher water recovery (~80-90%) than RO membranes. Moreover, they are expected to produce significantly less wastes (e.g. backwash water+dissolved ions) than RO membranes which generate large amounts of brine (e.g. membrane concentrates). In the third unit, the product water from the ion-rejection UF system can be split into two streams and passed through a series of ion-absorbing MF membranes designed to selectively bind target anions/cations of interest.

Figure 35:
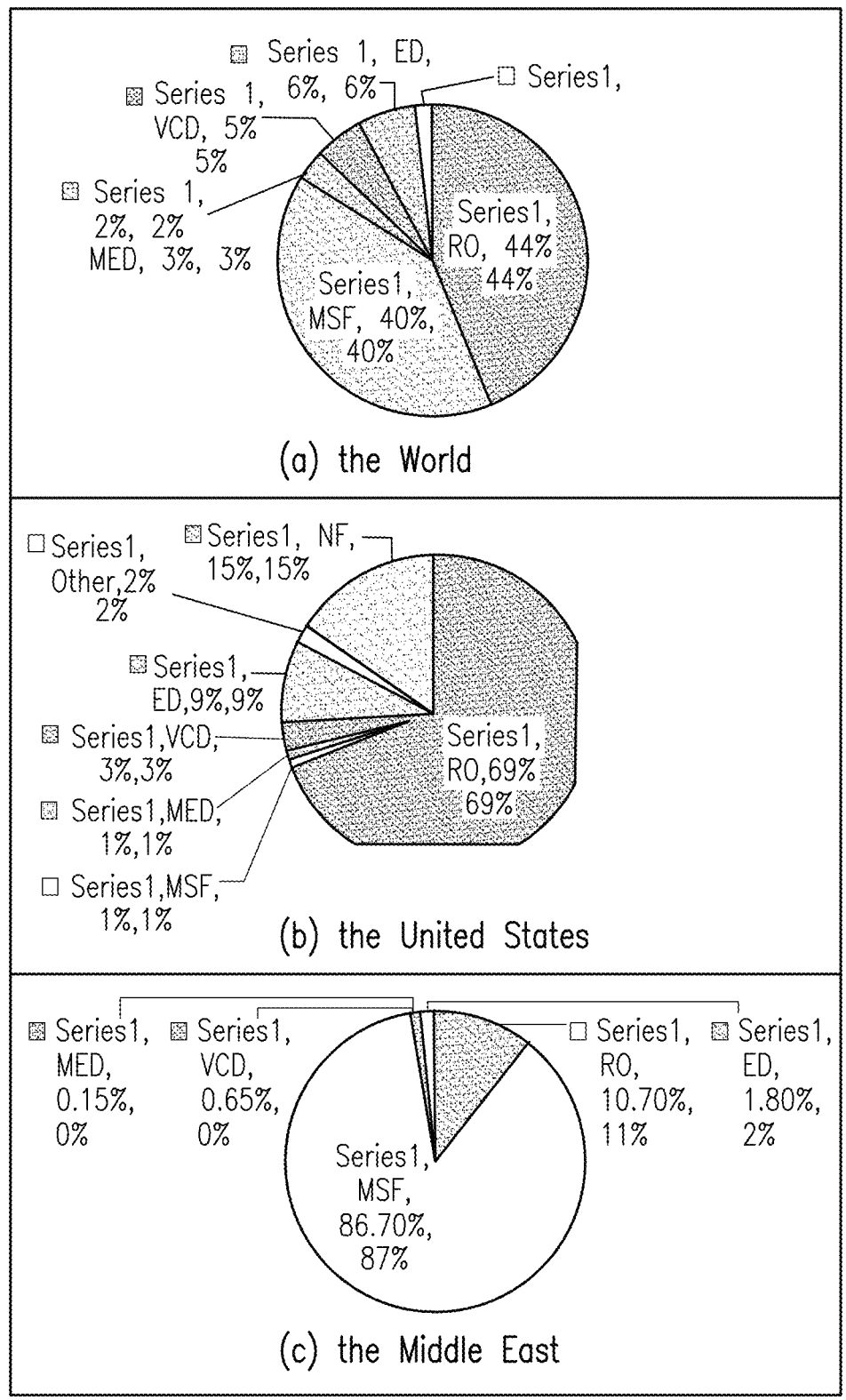
FIG. 35 shows the distribution of desalination production capacity by process technology in the word and various regions of the world where membranes and systems herein described can find application, where MSF is multi-stage flash distillation, MED is multi-effect distillation, VCD is vapor composition distillation, RO is osmosis, NF is nanofiltration, and ED is electrodialysis. Panel A shows the distribution of desalination production capacity by process technology for the world in 2005. Panel B shows the distribution of desalination production capacity by process technology for the United States in 2005. Panel C shows the distribution of desalination production capacity by process technology for the Middle East in 2005 [Ref 4].

The ion-selective MF membranes is also expected to be operable at low pressure (e.g. 0.5-2.0 bar). Moreover, the bound anions/cations is expected to be released by intermittently backwashing the MF membranes with an acidic/basic solution, or a solution containing sufficient concentration of an anion/cation selective ligand (e.g., citric acid). Following treatment, the streams from the ion-absorbing MF systems is be expected to yield a product water with a specified ionic concentration when the streams are mixed together. The filtration system described is expected to able widely applicable throughout the world, and in particular in arid regions such as the Middle East (FIG. 35).

Example 12

Possible Variations and Modifications on the Low-Pressure Membrane Desalination System The low-pressure membrane desalination system shown FIG. 27 was designed to be flexible, scalable and reconfigurable. The user can select the number and chemistry of the ion-selective UF/MF modules that will be deployed to achieve the desired product water composition. In some cases, a user can select to use a conventional or improved nanofiltration (NF) membrane system as the first stage to reject dissolved organic matter, divalent ions and a fraction of the monovalent ions.

Example 13

Synthesis and Characterization of Ion-Selective Hyperbranched Macromolecules and Microparticles PAMAM and PPI dendrimers can serve as selective and recyclable high capacity macroligands for anions and cations in aqueous solutions [Ref 14-19, 42]. Low-cost hyperbranched macromolecules, such as polyethyleneimine (PEI), behave very similarly as the corresponding, but expensive dendrimers [Ref 1, 3]. Hyperbranched PEI has a degree of branching at approximately 65-70%. Industrial scale quantities of hyperbranched PEI macromolecules with various molecular weights (MW) ranging from about 1,000 to several million Daltons are commercially available from several suppliers. This example shows a strategy for functionalizing hyperbranched PEI macromolecules (FIG. 22) to prepare macroligands with very large molar mass that can selectively bind anions such as $Cl^-$, $Br^-$ and $SO_4^{2-}$ at pH ~6 and release them at pH ~9.0 [Ref 1, 3].

The Applicants have also synthesized and characterized functionalized hyperbranched PEI macromolecules and microparticles that can selectively anions ($Cl^-$ and $SO_4^{2-}$) in aqueous solutions and release them through a simple change of solution acidity/basicity. It is also expected that similar functionalized hyperbranched PEI macromolecules and microparticles that can bind cations ($Na^+$, $Ca^{2+}$ and $Mg^{2+}$) can also be synthesized as described in this example. These ions make-up more than 98% of the total dissolved solids (TDS) in brackish water and seawater [Ref 1]. In this example, further to the synthetic routes shown in FIG. 22 for preparing hyperbranched macromolecules that selectively bind and release $Cl^-$ and $SO_4^{2-}$, recyclable hyperbranched macromolecules that can selectively bind $Na^+$, $Ca^{2+}$ and $Mg^{2+}$ were synthesized.

2s metal ions such as $Ca^{2+}$ and $Mg^{2+}$ have a strong preference to coordinate with ligands containing negative O donors [Ref 10]. 1s metal ions such as $Na^+$ prefer to coordinate with ligands containing neutral oxygen donors [Ref 10]. Thus, the following guidelines (based on these well-established trends in coordination chemistry [Ref 10]) provides the conceptual framework for the synthesis of recyclable and selective hyperbranched macroligands for $Na^+$, $Ca^{2+}$ and $Mg^{2+}$:

Guideline 1: Hyperbranched macromolecules containing negative O donors and tertiary amine groups will selectively bind $Ca^{2+}$ and $Mg^{2+}$ ions at pH ~7.0 and release them by washing with an acid solution containing a small ligand such as citric acid.

Guideline 2: Hyperbranched macromolecules containing neutral O donors and tertiary amine groups will selectively bind Na+ at pH ~7.0 and release them by washing with an acid solution containing a small complexing ligand such as citric acid.

Figure 31:
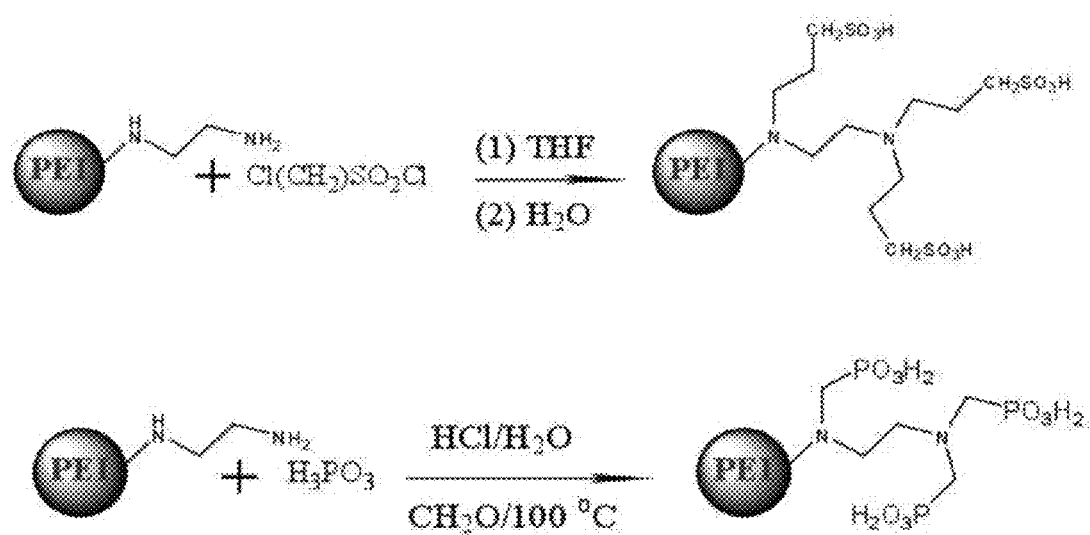
FIG. 31 shows a reaction scheme for the synthesis of the cation-selective macromolecules of FIG. 28 by functionalization of hyperbranched poly(ethyleneimine) PEI Macromolecules [Ref. 5.16] suitable in embodiments herein described.

To prepare hyperbranched macromolecules containing tertiary amine and negative O donors, primary/secondary amine groups of hyperbranched PEI (FIG. 22) were reacted with the appropriate functional groups (e.g. sulfonate and phosphonate) (FIG. 31).

Figure 32A:
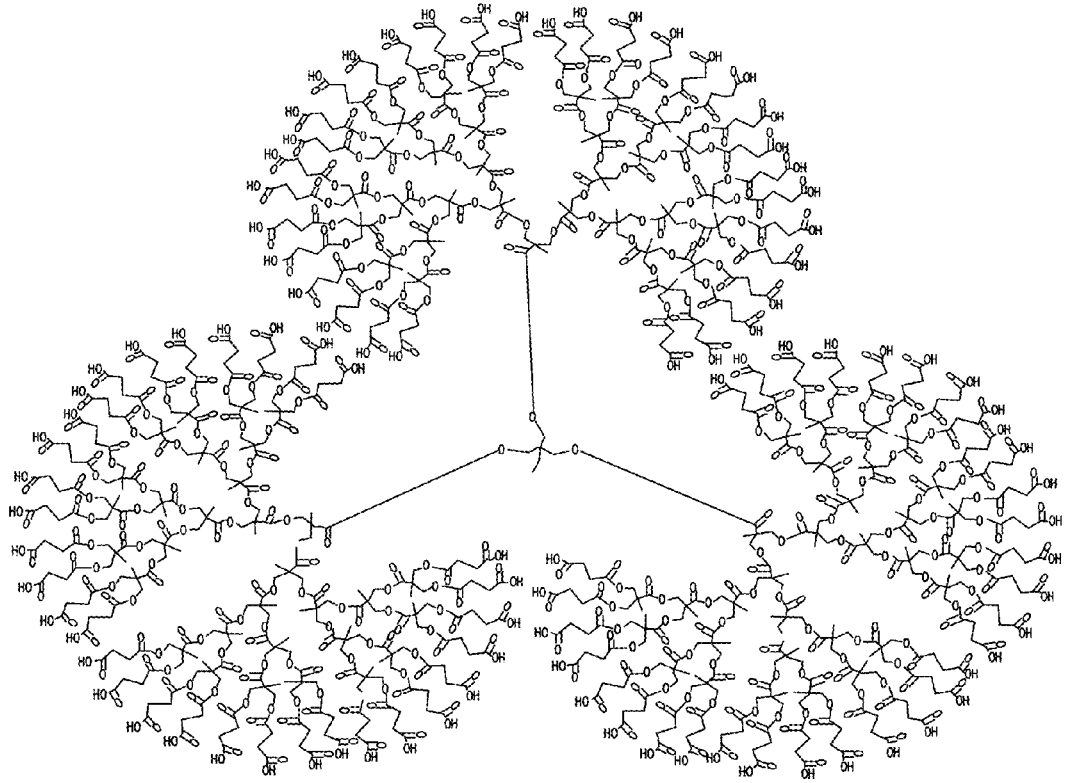
FIG. 32 shows an example of a cation-selective bis(methylol)propionic acid (MPA) dendrimer (Panel A) and an example of its synthesis (Panel B) [Ref 3] suitable in embodiments herein described.
Figure 32B:
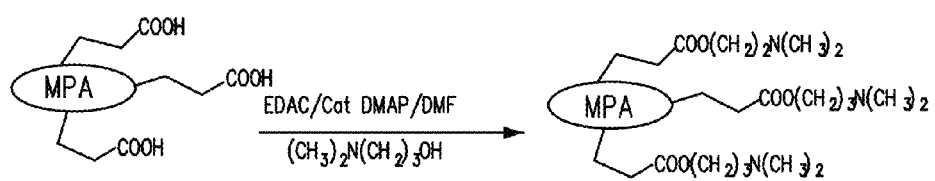

For the preparation of hyperbranched macromolecules with neutral O donors, it is expected that commercially available 2,2-bis(methylol)propionic acid (MPA) hyperbranched macromolecules can be as starting materials. MPA dendritic macromolecules (FIG. 32) have large numbers of internal O groups and terminal OH groups [Ref 43]. The terminal OH groups of an MPA hyperbranched macromolecule (with 64 terminal OH groups) [Ref 43] can be reacted with the appropriate functional groups (e.g. alcohols, amines) and is expected to yield hyperbranched macromolecules containing internal O groups and terminal tertiary amine groups (FIG. 32).

Example 14

Synthesis and Characterization of Branched PEI Micro/Nanoparticles

Figure 47:
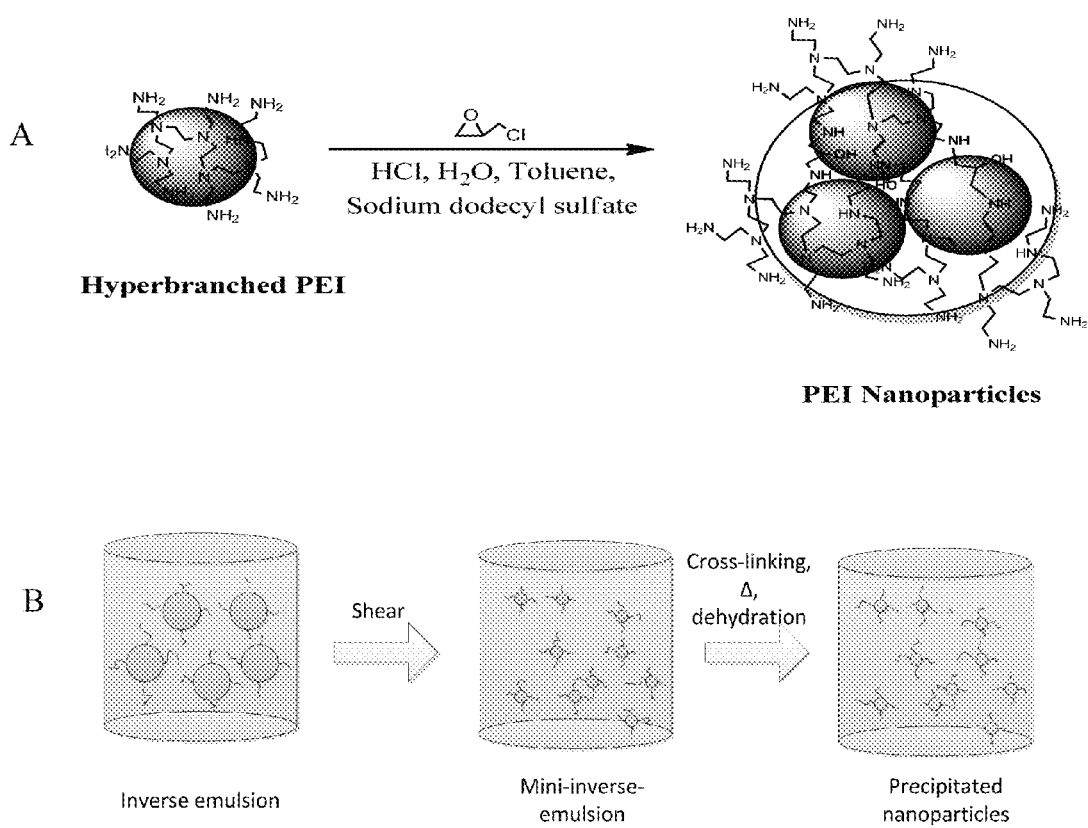
FIG. 47 shows a schematic showing the synthesis of hyperbranched PEI nanoparticles using inverse miniemulsion. Panel A shows the reaction scheme for the formation of hyperbranched PEI nano/microparticles from hyperbranched PEI macromolecules. Panel B shows a schematic depiction of the inverse miniemulsion process.

Applicants have developed a route for synthesizing dendritic micro/nanoparticles with controllable size using low-cost hyperbranched polymers as building blocks (FIG. 47; U.S. Provisional Patent Application 61/665,749). As an example of this methodology, the synthesis and characterization of hyperbranched poly(ethyleneimine) (PEI) nanoparticles (NPs) is described.

Nanoparticle Synthesis:

Because hyperbranched PEI macromolecules are water-soluble, a surfactant-stabilized inverse suspension of water-in-toluene was used to prepare the base PEI beads with high density of amine groups. The reaction vessel is charged with hyperbranched polyethyleneimine (PEI) polymer as the desired amount of HCl is added over the course of 30 min to an hour under ambient temperature. Water and surfactant (sodium dodecyl benzene sulfonate or sodium dodecyl sulfate) is added, followed by addition of toluene, which serves as continuous phase. The mixture is stirred for 1 hour until a turbid solution was attained. The solution was homogenized to induce high shearing and formation of stable mini emulsions using a stator rotor type homogenizer. The mixture is then heated to 70-80° C. and followed by drop-wise addition of cross-linker (epichlorohydrin or dibromopropane). After 2 hours, the reaction was heated to 120° C. to commence dehydration of the solution. The reaction end point was considered to be reached when all the water from the system has been removed. After, the temperature of the reaction vessel was cooled to ambient temperature and the suspended particles are collected. The nanoparticles suspension was separated by centrifugation. Nanoparticles were neutralized to pH 7 and dialyzed with water to wash away excess HCl or surfactant.

A skilled person will also realize upon a reading of the present disclosure that nanoparticles of hydrophobic polymers can be similarly synthesized by suspension polymerization. For example, monomers capable of radical polymerization and a radical initiator can be dispersed in a polar solvent in which they are immiscible and the mixture agitated to form droplets of monomer in which the radical initiator can initiate polymerization of the monomer to form nanoparticles of the hydrophobic polymer.

Figure 48:
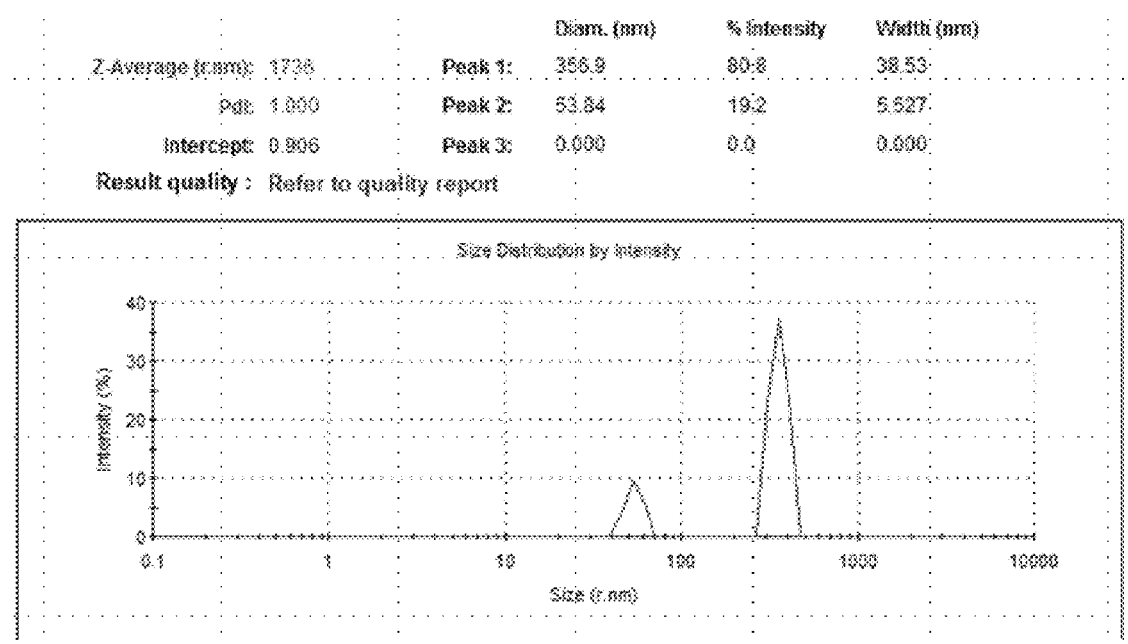
FIG. 48 shows a plot indicating a size distribution by dynamic light scattering of PEI nano/microparticles produced by inverse miniemulsion.

Nanoparticle Characterization:

Dynamic light scattering (DLS) was used to characterize the size of the PEI nanoparticles. FIG. 48 shows that the PEI NPs have a bimodal size distribution with the majority of the particles having an average particle size of 365 nm.

Example 15

Synthesis of Quaternized PEI Microparticles

Figure 49:
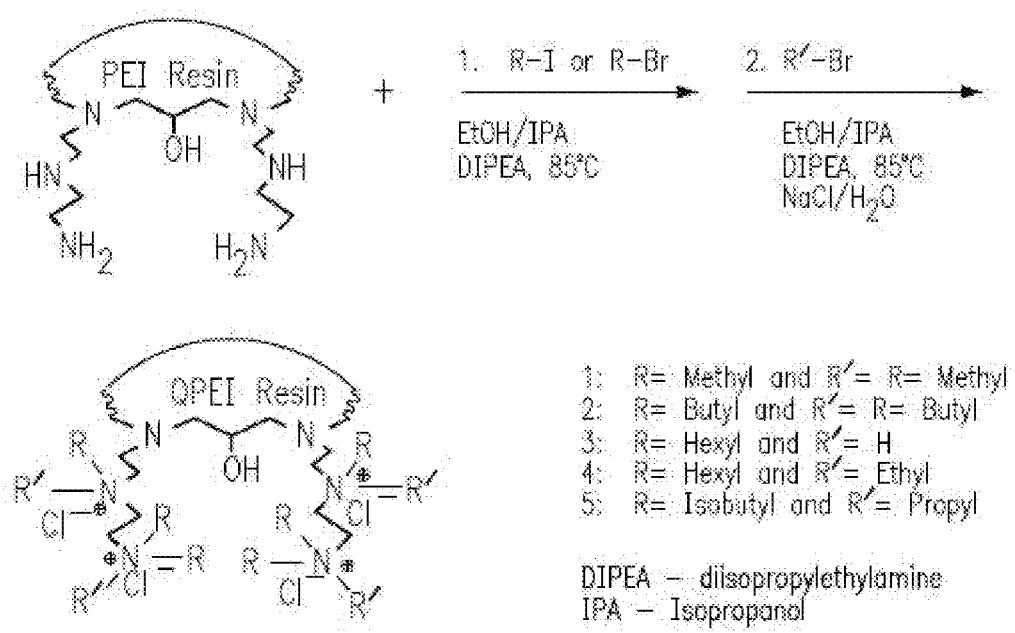
FIG. 49 shows a schematic showing a general reaction scheme of the synthesis of quaternized PEI nano/microparticles.

Applicants have developed synthetic strategies for functionalization of PEI macromolecules and PEI microparticles to weak base and strong base resins with anion high exchange capacity and controllable size (US Patent Application US 2010/0181257 A1, US Patent Application US 2011/0315636 A1 and U.S. Patent Application 61/665,749). These strategies can be used to convert membranes to anion-transfer membranes that can reject cations while allowing anions to pass through the membranes. As an example of this methodology, the quaternized PEI microparticles by alkylation of base PEI microparticles that were synthesized using an inverse emulsion/suspension process is described (FIG. 28A, FIG. 47 and FIG. 49).

Alkylation of PEI Microparticles

Microparticles were prepared with high anion-exchange capacity by alkylation of cross linked PEI beads (FIG. 49) that were synthesized using an inverse suspension process and a precursor branched PEI macromolecule with molar mass $M_n$=10,000 Da. Two classes of QPEI resins with monofunctional exchange sites (1-3) and bifunctional exchange sites (4-5) were prepared (FIG. 49). What follows is a typical preparation procedure for the quaternized PEI resins (QPEI) with monofunctional exchange sites. Approximately 20 g of cross-linked PEI beads were mixed with excess amounts of alkylating reagent (R-I or R-Br) in ethanol (EtOH) or isopropanol (IPA). 3-5 mL of a proton scavenger (i. e. diisopropylethylamine [DIPEA]) was added to the mixture, which was subsequently heated at 75° C. in a pressure vessel for 24 h. For QPEI resins with bifunctional exchange sites (3 and 4 in FIG. 49), the PEI beads were first alkylated with a bromoalkane with longer alkyl chain (e.g. hexyl or isobutyl) followed by reaction with a bromoalkane with shorter alkyl chain (e.g. ethyl or propyl). The second alkylation step for the QPEI-3 resin was designed to increase the conversion of amines to quaternary ammonium groups (QPEI-4).

Example 16

Synthesis of Boron-Selective PEI Microparticles

Applicants have developed synthetic strategies for functionalized PEI microparticles and macromolecules with boron-selective groups. These strategies can be used to convert membranes to regenerable and boron chelating membranes. FIG. 50 shows the functionalization of base PEI microparticles with organic compounds (e.g. 2-oxiranyl-methanol and glucono-1,5-D-lactone) containing boron chelating vicinal diol groups. Here again, the base PEI microparticles were synthesized using an inverse emulsion/suspension process (see Example 14 and FIG. 47 and FIG. 49).

Example 17

Synthesis of Cation-Selective PEI Microparticles

Figure 51:
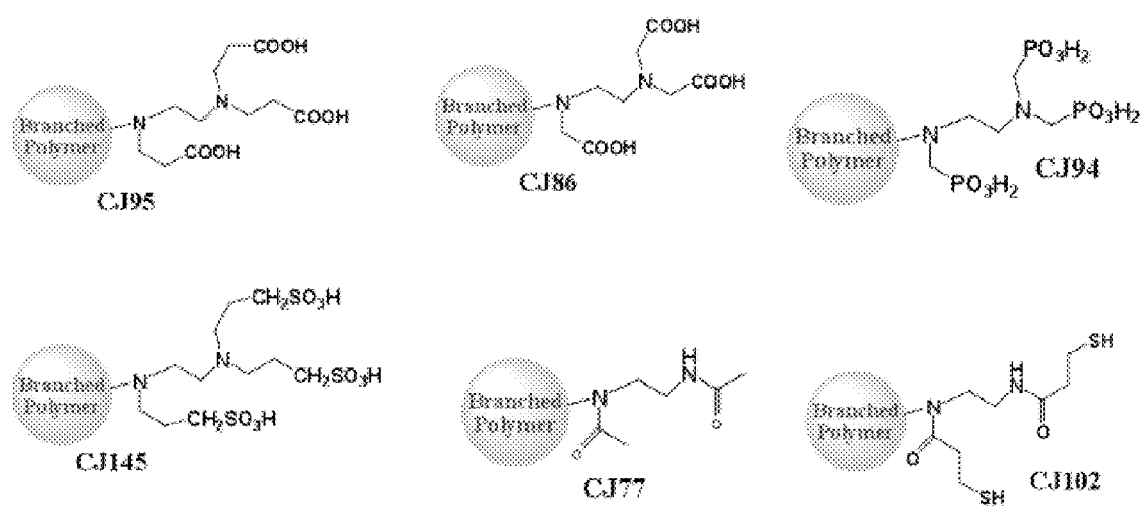
FIG. 51 shows a schematic showing exemplary cationic-selective PEI nano/microparticles.

Applicants have developed synthetic strategies for functionalized PEI microparticles and macromolecules with cation-selective groups (FIG. 28B, FIG. 51). Representative cation-selective ligands that can be linked to PEI microparticles include compounds with N, O and S donors (FIG. 51) such as carboxylic acid, carbamate, urea, sulfonic acid, sulfanic acid, amide, imidine, guanidine, oxime, imidazole, pyridine, thiol, thio-ether, thio-carboxylic acid. The chemistry for linking these groups to the primary/secondary amines of base PEI microparticles (FIG. 31, FIG. 47, and FIG. 50) can be readily implemented due the superior nucleophilicity of amino groups. This can include halide substitutions, Michael additions and addition to carboxylates. These strategies can used to convert membranes to cation transfer membranes or cation-chelating membranes.

Example 18

Synthesis of Hybrid Inorganic-Organic NFC-PVDF-PEI Membranes

Figure 45:
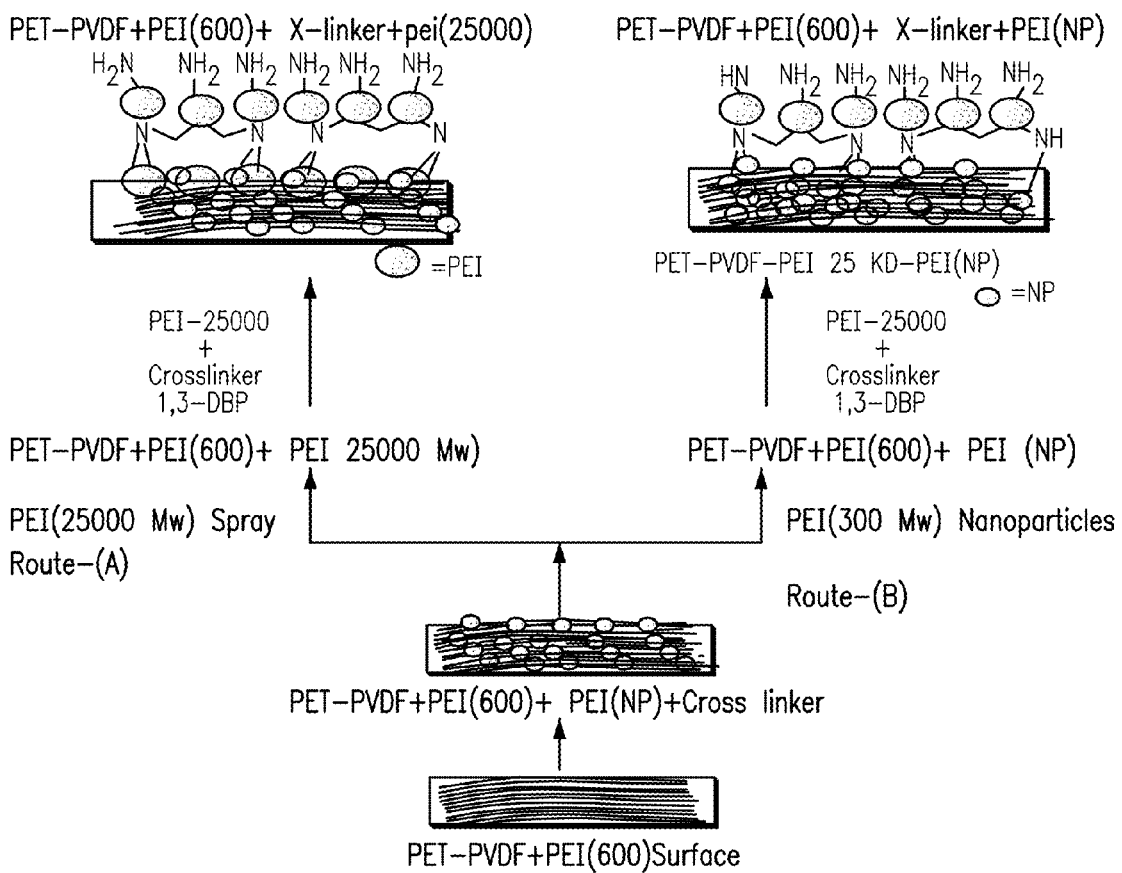
FIG. 45 shows a schematic flow diagram of various steps according to some methods herein described. Route-(A) schematically illustrates a first method according to some embodiments herein described. The method comprises depositing PEI macromolecules and nanoparticles on filtration membrane surfaces. Route-(B) schematically illustrates a second method according to some embodiments herein described. The method comprises covalently attaching PEI macromolecules and nanoparticles on filtration membrane surfaces.
Figure 46:
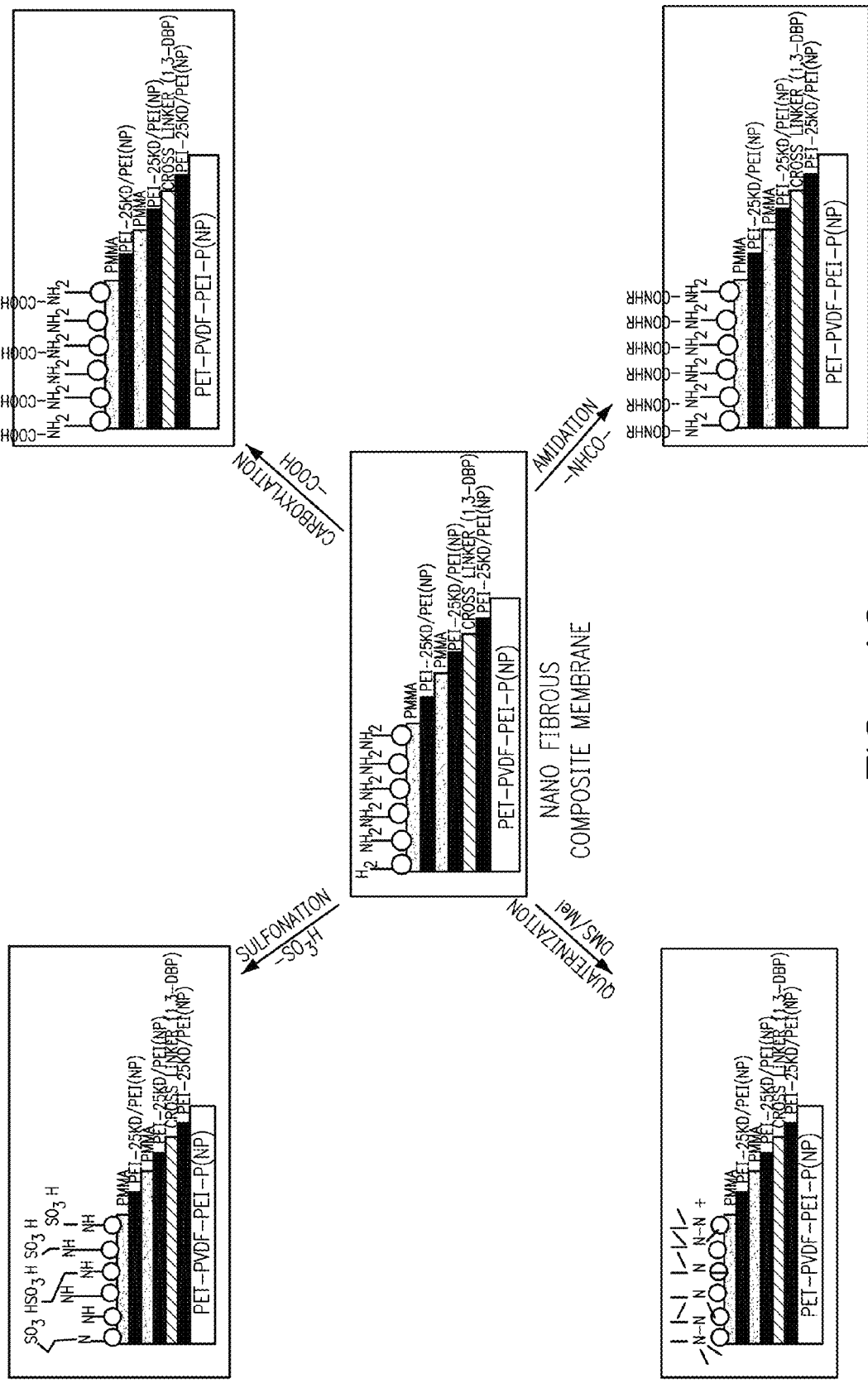
FIG. 46 shows a schematic diagram illustrating various functionalizations of NFC Membranes according to some embodiments, including sulfonation, carboxylation, quaternization, and amidation. As shown here, amine groups of the PEI films of the filtration membranes can be reacted with functional groups to produce films with high density of charged groups including quaternary amines, carboxylic, sulfonate and amide groups to increase their charge density.

The NFC-PVDF-PEI (see Example 22) membrane platform in this example allows for building a family of hybrid inorganic-organic membranes. This example shows an exemplary method of a strategy for synthesizing such hybrid inorganic-organic NFC-PVDF-PEI. This can include the following steps (FIG. 45):
1. Synthesizing of NFC-PVDF-PEI membranes (FIG. 45)
2. Functionalizing of NFC-PVDF-PEI membranes with selective ligands for the target metal ions of interest (e.g. Cu(II), Ag(I), Fe(II)/Fe(III), Pd(II), Pt(II)] (FIG. 46)
3. Contacting and saturating the functionalized NFC-PVDF-PEI membranes with aqueous solutions of the target metal ions (e.g. Cu(II), Ag(I), Fe(II)/Fe(III), Pd(II), Pt(II))
4. Reacting the metal ion laden with reducing agents such as $H_2$ to produce NFC-PVDF-PEI membranes with metallic clusters/nanoparticles.

In this example (FIG. 45), a PET support was to fabricate the NFC-PET-PVDF NFC membranes. PVDE can be used as a building block for both the microfibrous support and nanofibrous scaffold of the NFC-PVDF-PEI membranes (FIG. 45) due to its high thermal/chemical resistance and tensile strength, and solubility in a broad range of solvents including dimethyl formamide (DMF), N-methyl-2-pyrrolidone (NMP) and dimethyl acetamide (DMAc). These properties of PVDF provide degrees of freedom for controlling the properties of the microporous supports and nanofibrous scaffolds of NFC membranes (FIG. 45) by selecting the appropriate synthesis conditions. Further the functionalized NFC-PVDF-PEI membranes in this example can also be loaded with prepared inorganic particles (e.g. metal oxide/sulfide nanoparticles). By controlling the structure and chemistry of the membranes and embedded inorganic nanoparticles (e.g. $TiO_2$) and/or metal clusters [e.g. Pd(0), Pt(0) and Fe(0)Pd(0)], other hybrid inorganic-organic membranes can be fabricated with controllable catalytic/redox activity and, affinity for gases such as $H_2$. Such membranes can also be useful in a broad range of sustainability applications such as water purification, gas separations, energy conversion and storage, and chemical manufacturing, for example (FIG. 52).

A skilled person will also realize, upon a reading of the present disclosure, that the above strategies for functionalization of the dendritic components of the NFC-PVDF-PEI membranes can be applied to the polymeric nanoparticles of membranes comprising a polymer matrix with embedded polymeric nanoparticles as described herein.

Example 19

Fabrication of Membranes with Preformed Polymeric Nanoparticles

Membranes with preformed polymeric nanoparticles can be obtained by mixing a solution of the polymeric component for forming the polymer matrix in a solvent for 1-24 hours at approximately 25-85° C.—or other times and temperatures capable of producing a homogeneous solution without decomposing the polymeric component as would be identifiable to a skilled person—and then adding a solution of the preformed polymeric nanoparticles and mixing the solution for 1-24 hours at approximately 25-85° C.—or other times and temperatures capable of producing a homogeneous blend without decomposing either the polymeric or dendritic components as would be identifiable to a skilled person to provide a dope solution with preformed polymeric nanoparticles. If desired, the nanoparticles can be functionalized with different functional groups to achieve different properties (e.g. rejection of ions, proteins, and/or other substances, or the absorption of particular ions and/or substances). The functionalization can be performed before or after the being blended with the polymer used to form the polymer matrix.

In particular, in some embodiments, the dope solution with preformed dendritic nanoparticles can be cast to provide a polymeric membrane with embedded with dendritic nanoparticles. In particular, in some embodiments, the membrane can be cast by phase inversion casting (see, e.g. [Ref 6]). In particular, in some embodiments, the casting can be performed by pouring the hot dope solution onto a glass surface and allowing it to air dry at room and then immersing it into water for a time to form a nascent membrane as would be identifiable to a skilled person. The nascent membrane is then immersed in fresh water and then immersed in ethanol to remove impurities as would be identifiable to a skilled person. The membranes can then be removed from the glass and dried to provide a polymeric membrane with pores, the pores embedded with dendritic nanoparticles. In other embodiments, the dope solution with preformed dendritic nanoparticles can be cast onto a polymer support (e.g. a poly(ethylene terephthalate) non-woven fabric) in place of glass to provide a polymeric membrane with pores, the pores embedded with dendritic nanoparticles wherein the polymeric membrane is layered on top of the polymer support.

The membranes made with embedded preformed nanoparticles can then be characterized and evaluated as described in Example 21 and the conditions of the formation and blending of the nanoparticles can be adjusted to achieve desired results/properties as identifiable to a skilled person.

Figure 54:
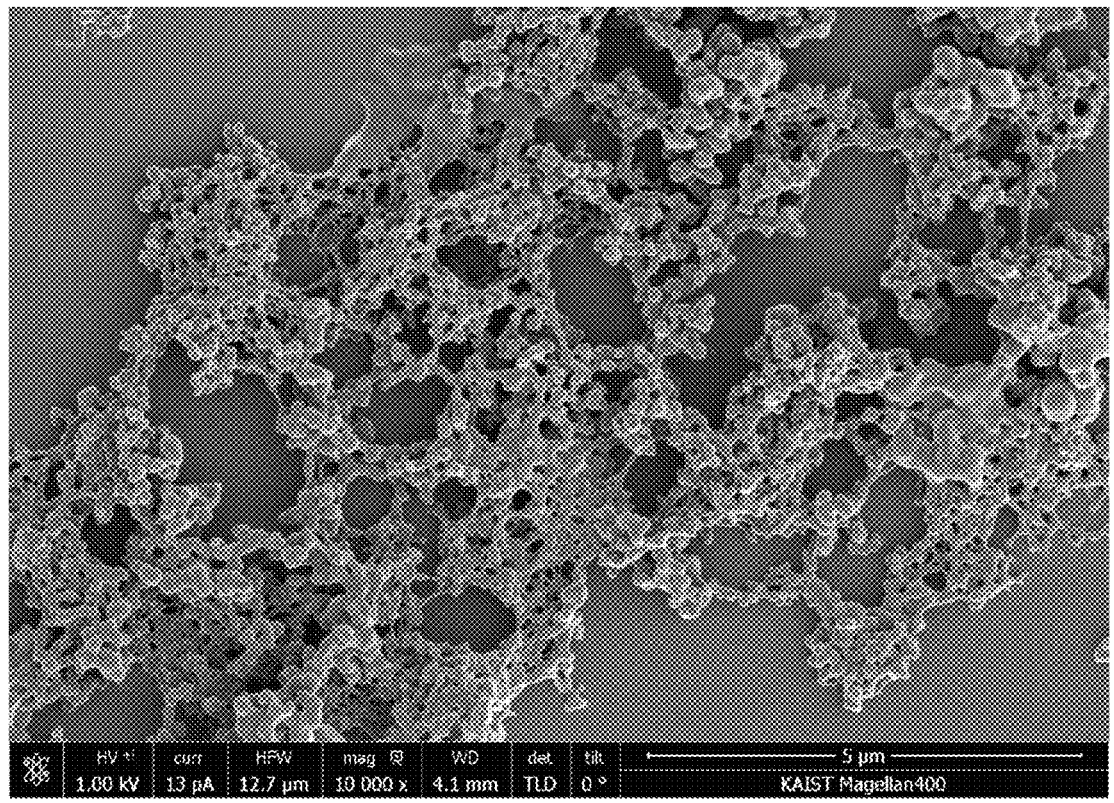
FIG. 54 shows an SEM image of acrylic nanoparticles (poly(methacrylic acid)) in a PVDF composite membrane by casting a membrane with preformed particles.
Figure 55:
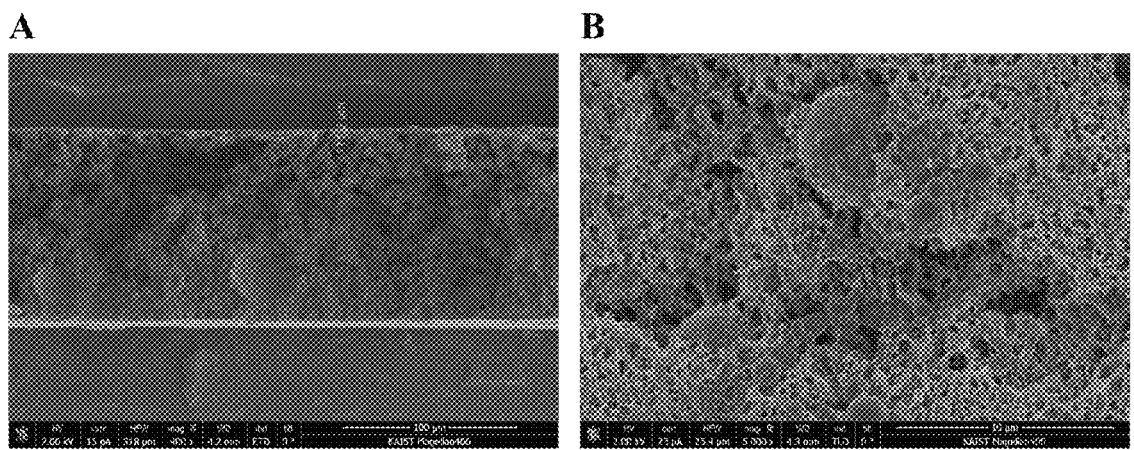
FIG. 55 shows SEM images of cross sections of a PVDF composite membrane prepared by casting a membrane with preformed PEI nanoparticles. Panel A shows complete membrane morphology. Panel B shows magnified image shows embedded PEI nanoparticles.
Figure 56:
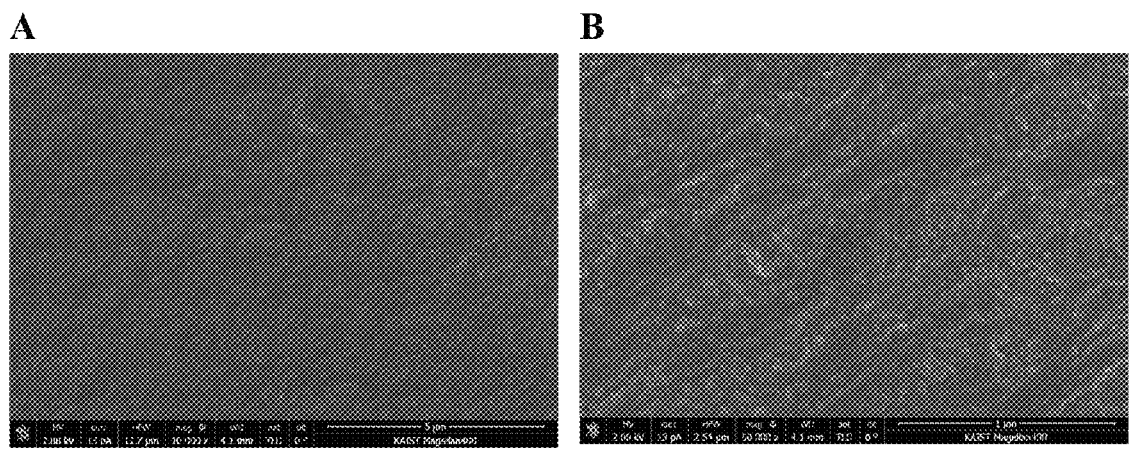
FIG. 56 shows SEM images of top surfaces of a PVDF composite membrane prepared by casting a membrane with preformed PEI nanoparticles. Panel A shows a rough surface with less porosity. Panel B shows a Magnified image showing PEI nanoparticles present at the surface layer with nanometer pores.
Figure 57:
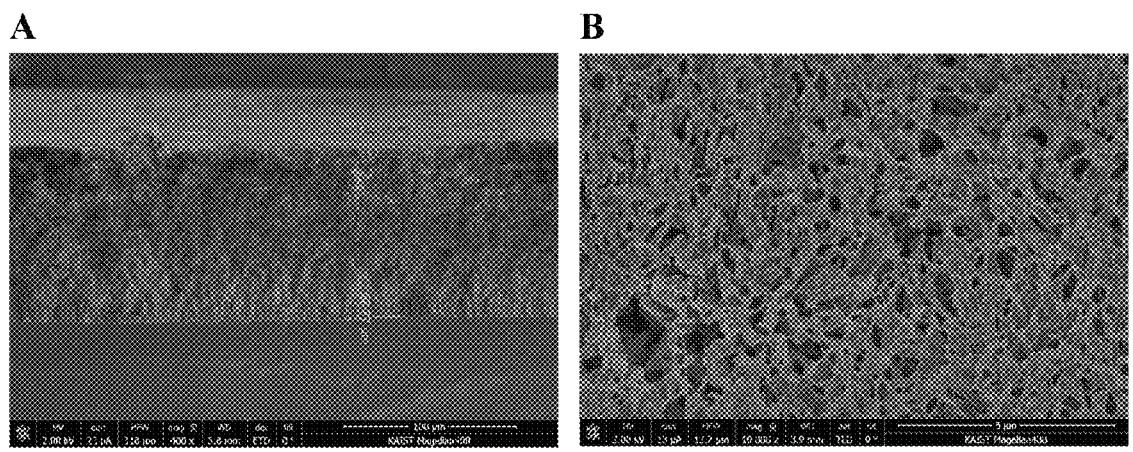
FIG. 57 shows SEM images of cross sections of PVDF composite membranes prepared by casting membranes with preformed acrylic nanoparticles (poly(methacrylic acid)). Panel A shows complete membrane morphology. Panel B shows magnified image showing typical fibril structure but no particles visible (Acrylic nanoparticles are much smaller than PEI nanoparticles).
Figure 58:
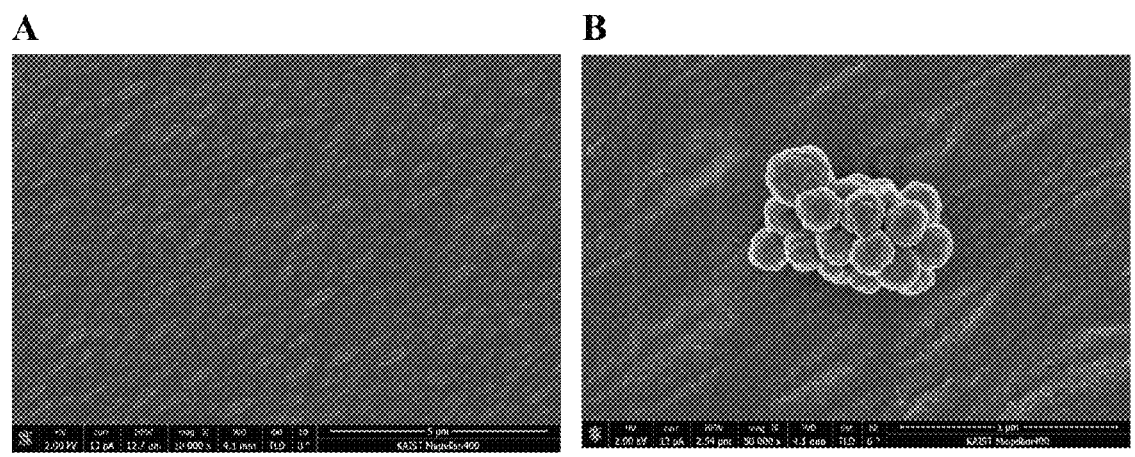
FIG. 58 shows SEM images of top surfaces of a PVDF composite membrane prepared by casting a membrane with preformed acrylic nanoparticles. Panel A shows rough surface with less porosity. Panel B shows magnified image shows Acrylic NPs presence at surface layer with nanometer pores.

Exemplary morphological characterization of membranes embedded with preformed PEI nanoparticles can be seen in FIG. 53, FIG. 55, and FIG. 56, and exemplary morphological characterization of membranes embedded with preformed PMAA nanoparticles can be seen in FIG. 54, FIG. 57, and FIG. 58. In particular, the fractal aggregation of particles that occurs with membranes cast with preformed nanoparticles can be seen, for example, in FIG. 53 and FIG. 58B.

Example 20

Figure 59:
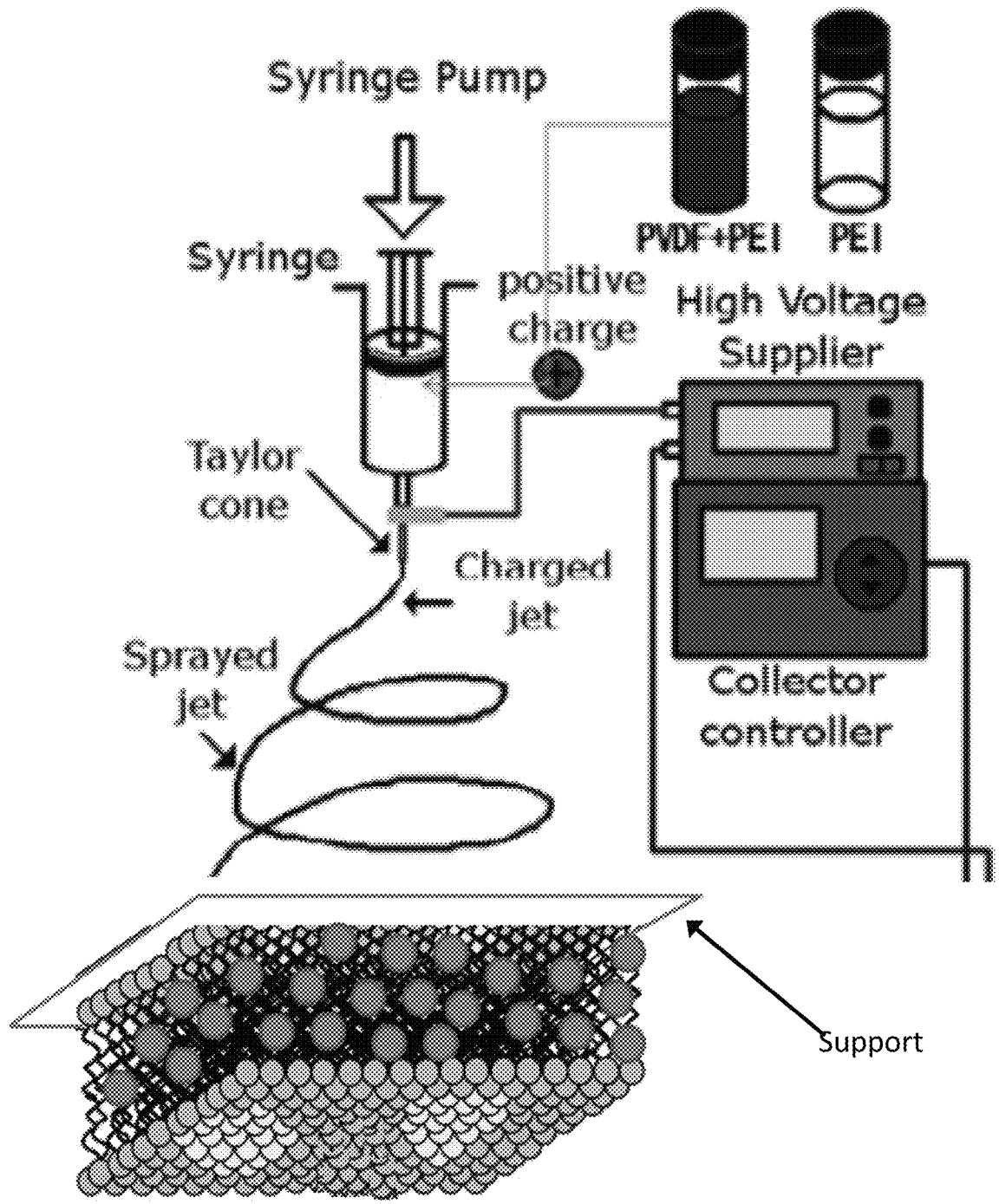
FIG. 59 shows a schematic illustration of an exemplary formation of a bicomposite membrane according to embodiments herein described. In particular, the schematic illustration shows the electrospinning of nanofibers and/or microfibers in the bicomposite membrane comprising a scaffold component providing a supporting framework for one or more additional components attached to the scaffold providing functionalities to the scaffold onto a support layer attached to a polymer matrix formed by a porous polymeric aggregate comprising embedded polymeric nanoparticles as herein described.
Figure 60:
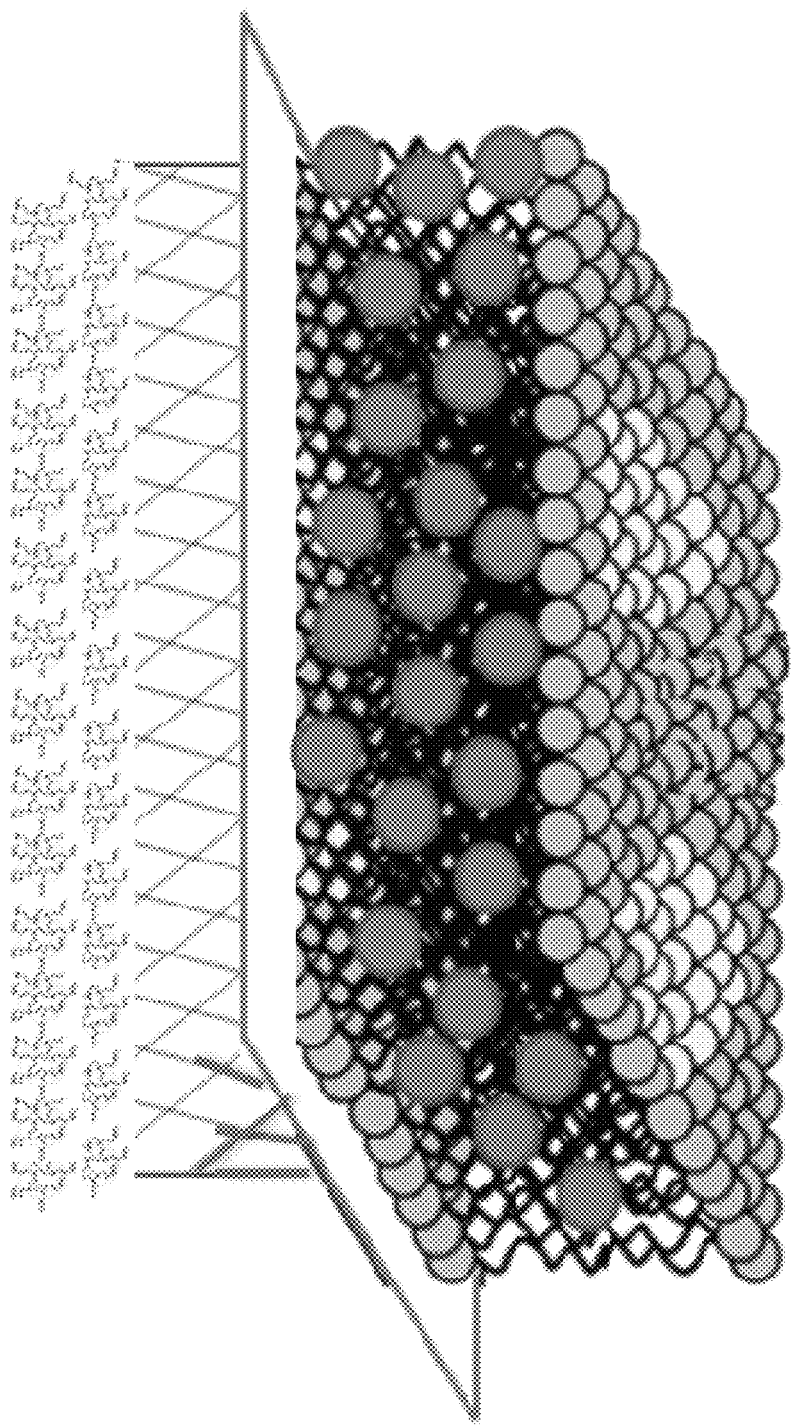
FIG. 60 shows a schematic illustration of a an exemplary bicomposite membrane comprises a plurality of nanofibers and/or microfibers herein described attached to a polymer matrix formed by a porous polymeric aggregate comprising polymeric nanoparticles produced as illustrated in FIG. 59.

Combination of Polymeric Membranes Comprising Embedded Polymeric Nanoparticles with Composite Nanofiber Membranes In some embodiments, the membranes with embedded nanoparticles as described herein can be cast onto a support layer such as a polyethylene terephthalate (PET) non-woven fabric support layer as shown in Example 2 to form a supported polymeric membrane with embedded polymeric nanoparticles (see also FIG. 59 and FIG. 60). Then a nanofiber-based membrane can be fabricated on the side of the support layer opposite to the membrane with embedded polymeric nanoparticles using the methods described in U.S. patent application Ser. No. 13/570,221 entitled "Filtration Membranes, and Related Nano and/or Micro fibers, Composites, Methods and Systems" filed on Aug. 8, 2012 to form a bi-composite membrane.

Example 21

General Method for Formation and Optimization of Filtration Membranes with Embedded Nanoparticles Formed In Situ Described below is a general method for formation and optimization of filtration membranes with embedded nanoparticles formed in situ. In particular, the method comprises membrane preparation, membrane characterization, and membrane performance evaluation.

In the membrane preparation, a desired polymer to form the polymer matrix and a desired polymer to form the polymeric nanoparticles (in particular a hyperbranched polymer) are selected based on compatibility of the two polymers. In particular, the compatibility can be determined from parameters known in the art such as, for example, similar solubility parameters (see, e.g., [Ref 6-8]) or ability to form hydrogen bonds (e.g., between the amine groups of a dendritic polymer such as PEI and the fluoride atoms of a linear polymer such as PVDF or between the carboxylic acid groups of a dendritic polymer such as MPA and the oxygen atoms of a linear polymer such as PES). The desired polymer to form the polymer matrix and a desired polymer to form the polymeric nanoparticles can be dissolved in a suitable solvent or mixture of solvents (e.g. dimethylformamide (DMF), dimethylacetamide (DMA), triethylphosphate (TEP), and/or N-methylpyrrolidinone (NMP)) based on similar parameters known to a skilled person (e.g. similar solubility parameters; see, e.g., [Ref 6-8]). The blending of desired polymer to form the polymer matrix and a desired polymer to form the polymeric nanoparticles can be performed for a time and at a temperature to permit a homogenous blend. The time and temperature can be determined by measuring the cloudiness or viscosity of the blend and increasing or decreasing the time and temperature to provide a blend with suitable properties as would be known to a skilled person. Once a suitable blend is obtained, a desired cross-linker can be added to the blend to provide a dope with in situ generated nanoparticles. The cross-linker can be selected based on the functional groups on the polymer to form the polymeric nanoparticles (in particular a hyperbranched polymer) as would be apparent to a skilled person. For example, if the dendritic polymer has amine groups, the cross-linker can be an epoxide such as epichlorohydrin or a dihaloalkane such as 1,3-dibromopropane. The initial amount of desired polymer to form the polymer matrix can be between 10 and 20 wt % of the blend and the initial combined amount of polymer to form the polymeric nanoparticles (in particular a hyperbranched polymer) and amount of cross-linker can be between 5 and 20 wt %. The initial amounts and can be adjusted upon evaluation of the properties of the dope solution produced with the in situ generated particles as would be apparent to a skilled person. For example if the dope solution is too viscous to cast a membrane, the amount of cross linker can be decreased. Additionally, the sizes and distribution of the particles in the blend can be evaluated through techniques such as light scattering. The initial amounts can also be altered after performing the membrane characterization and membrane performance evaluation described herein until a membrane with suitable properties is produced. In particular, several membranes with different amounts of desired polymer to form the polymer matrix, desired polymer to form the polymeric nanoparticles, and cross linker can be produced for evaluation and comparison. In addition to membranes with embedded nanoparticles being produced, control membranes comprising only desired polymer to form the polymer matrix and desired polymer to form the polymer matrix and desired polymer to form the polymeric nanoparticles (without cross-linker) can be produced to be compared with membranes produced with embedded nanoparticles.

After blends with embedded nanoparticles having properties suitable for casting of membranes as would be identifiable to a skilled person, the nanoparticles can be functionalized either before or after the casting of the membrane to provide nanoparticles with desired functionality (see, e.g., Examples 15 and 16).

In membrane characterization, the morphological and chemical properties of the membranes and embedded nanoparticles are measured. In particular, the membranes can be analyzed by SEM to confirm the formation and homogeneous distribution of discrete nanoparticles (see e.g. Example 2). The amounts of desired polymer to form the polymer matrix, desired polymer to form the polymeric nanoparticles, and cross linker initially chosen can be adjusted by increasing or decreasing their amounts until desired morphological properties are obtained. In addition, the sizes of the nanoparticles can be determined by AFM and the amounts of desired polymer to form the polymer matrix, desired polymer to form the polymeric nanoparticles, and cross linker initially chosen can be adjusted by increasing or decreasing their amounts until nanoparticles of desired sizes as would be recognized by a skilled person are obtained. In addition, spectroscopic characterization (e.g. infrared spectroscopy or x-ray photoelectron spectroscopy) can be performed to evaluate the presence of desired functional groups on the embedded nanoparticles and x-ray and neutron scattering experiments can be performed to evaluate the size and distribution of the nanoparticles. In addition, contact angle measurements can be performed to assess the hydrophilicity and wettability of the membrane and the amounts of desired polymer to form the polymer matrix, desired polymer to form the polymeric nanoparticles, and cross linker adjusted to provide desired levels of hydrophilicity and wettability as would be identifiable to a skilled person.

In membrane performance evaluation, the desired properties of the membranes, as determined by the functional groups on the dendritic nanoparticles, as well as general properties (e.g. flux) are measured. For example, if the nanoparticles are chosen to reject proteins (e.g. BSA), a test membrane can be used to reject BSA in a solution and its flux measured during the BSA rejection and after a cleaning (see, e.g., Example 2 and FIG. 17) and the amounts of desired polymer to form the polymer matrix, desired polymer to form the polymeric nanoparticles, and cross linker adjusted until membranes with desirable flux and rejection properties, as identifiable to a skilled person, are obtained.

In particular, several membranes with different amounts of polymer that will form the polymeric nanoparticles (for example, using the concentrations for NSM-1, NSM-2, and NSM-3 in Example 2) can be made as described herein. The membranes can be characterized and evaluated (e.g. morphology, chemistry, particle size, particle concentration, ion-rejecting ability and other characteristics described herein and apparent to a skilled person). Then membranes with amounts of polymer that will form the polymeric nanoparticles different than the initial amounts can be made to produce membranes with optimized features (e.g. particle concentration, pore size, ion-rejecting ability and others described herein and apparent to a skilled person).

Example 22

Synthesis, Characterization, and Performance Evaluation of Ion-Selective Nanofibrous Composite Membranes Using PVDF and Hyperbranched PEI Macromolecules as Building Blocks This example shows the synthesis of nanofibrous composite (NFC) membranes using polyvinylidene fluoride (PVDF) and hyperbranched polyethylenimine (PEI) as building blocks. In particular, these NFC membranes can be fabricated such that they are directly attached to polymer matrix formed by a porous polymeric aggregate comprising polymeric nanoparticles (e.g. by forming a polymer aggregate comprising polymeric nanoparticles by in situ particle formation as herein described or attached to a support layer (e.g. a PET non-woven fabric) and the support layer is further attached to porous polymeric aggregate comprising polymeric nanoparticles (e.g. by casting a membrane comprising porous polymeric aggregate with embedded polymeric nanoparticles as herein described (see, e.g. FIG. 59 and FIG. 60). These NFC-PVDF-PEI membranes comprise cross linked hyperbranched PEI separation layers supported by PVDF nanofibrous scaffolds that are electrospun onto commercial PVDF MF membrane supports (FIGS. 61, 62, 63) which in this example allows for fabrication of positively charged NF membranes with high water flux and improved rejection for monovalent cations. In order to obtain such membranes, the effects of cross linker chemistry on membrane properties (morphology, composition, hydrophobicity and zeta potential) and membrane performance (salt rejection and permeate flux) was first evaluated. Three cross linkers tested in this example included trimesoyl chloride (TMC), 1,3-dibromo propane (DBP) and epichlorohydrin (ECH). Four salts (NaCl, $MgCl_2$, $Na_2SO_4$, and $MgSO_4$). The results of this example indicated that PVDF nanofibers and hyperbranched PEI were suitable s building blocks for the fabrication of high performance NF membranes for water purification.

Materials: Poly(vinylidene fluoride) (PVDF) MF membrane supports (0.45 μm pore size) were purchased from Millipore (USA). PVDF powder (Kynar 761) was provided by Arkema (USA). Hyperbranched polyethyleneimine (PEI) [$M_w$: 25,000 and $M_n$: 10,000] was provided by BASF (Germany). Dimethylformamide (DMF), n-methyl-2-pyrrolidone (NMP), trimesoyl chloride (TMC), 1,3-dibromo propane (DBP) and epichlorohydrin (ECH) were purchased from Sigma-Aldrich. Analytical grade NaCl, $MgCl_2$, $Na_2SO_4$, $MgSO_4$, were purchased from Samchon Chemicals (Korea). The chemicals in this example were used as received. Deionized water (18.2 MΩ·cm resistivity) was used to rinse the membranes and prepare the salt solutions.

Figures 61, 62:
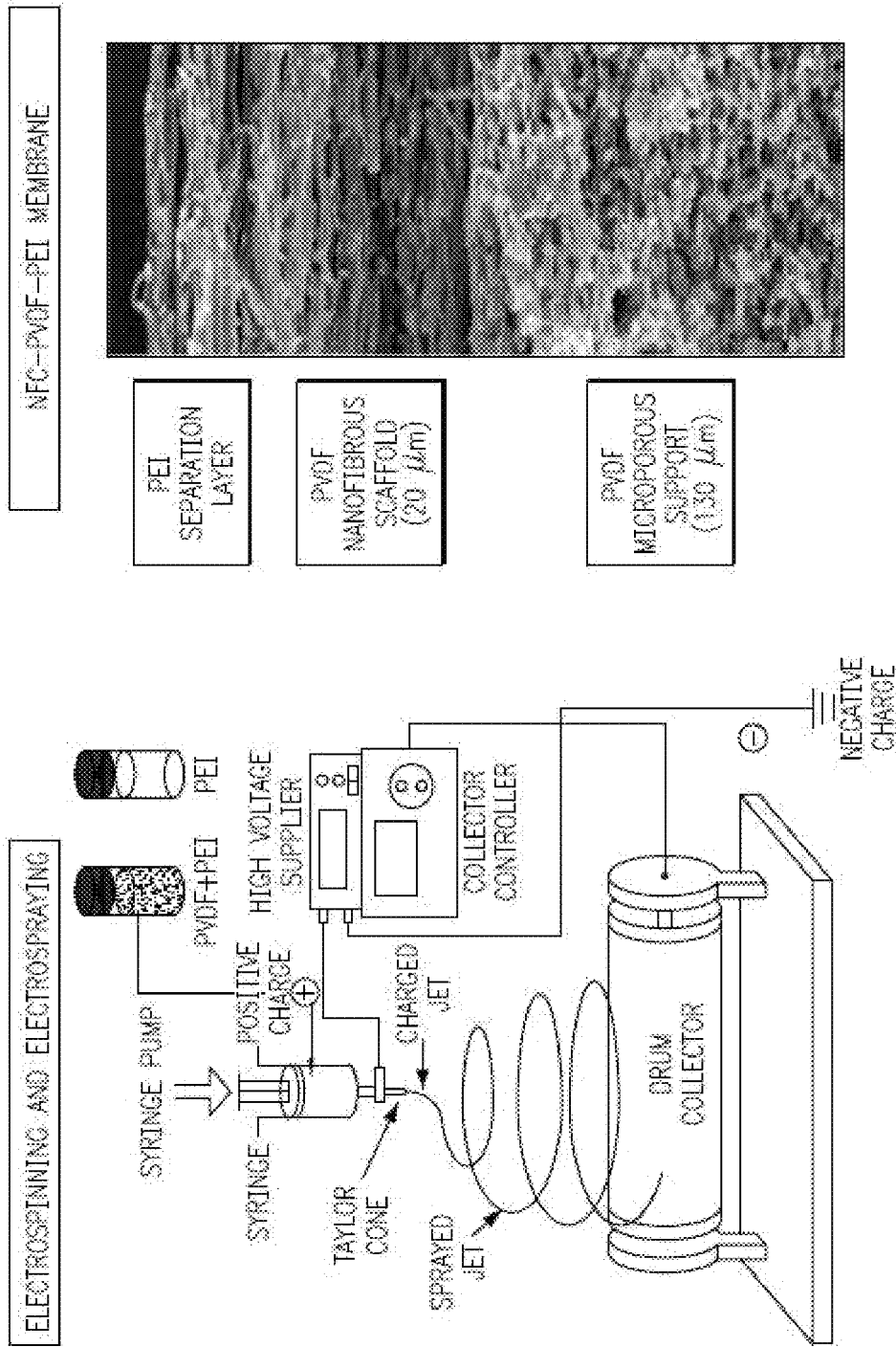
FIGS. 61, 62, and 63 show a schematic diagram of the fabrication of nanofibrous composite (NFC-PVDF-PEI) membranes with PVDF microporous support, PVDF nanofibrous scaffolds and cross linked PEI separation layers according to an embodiment herein described.
Figure 63:
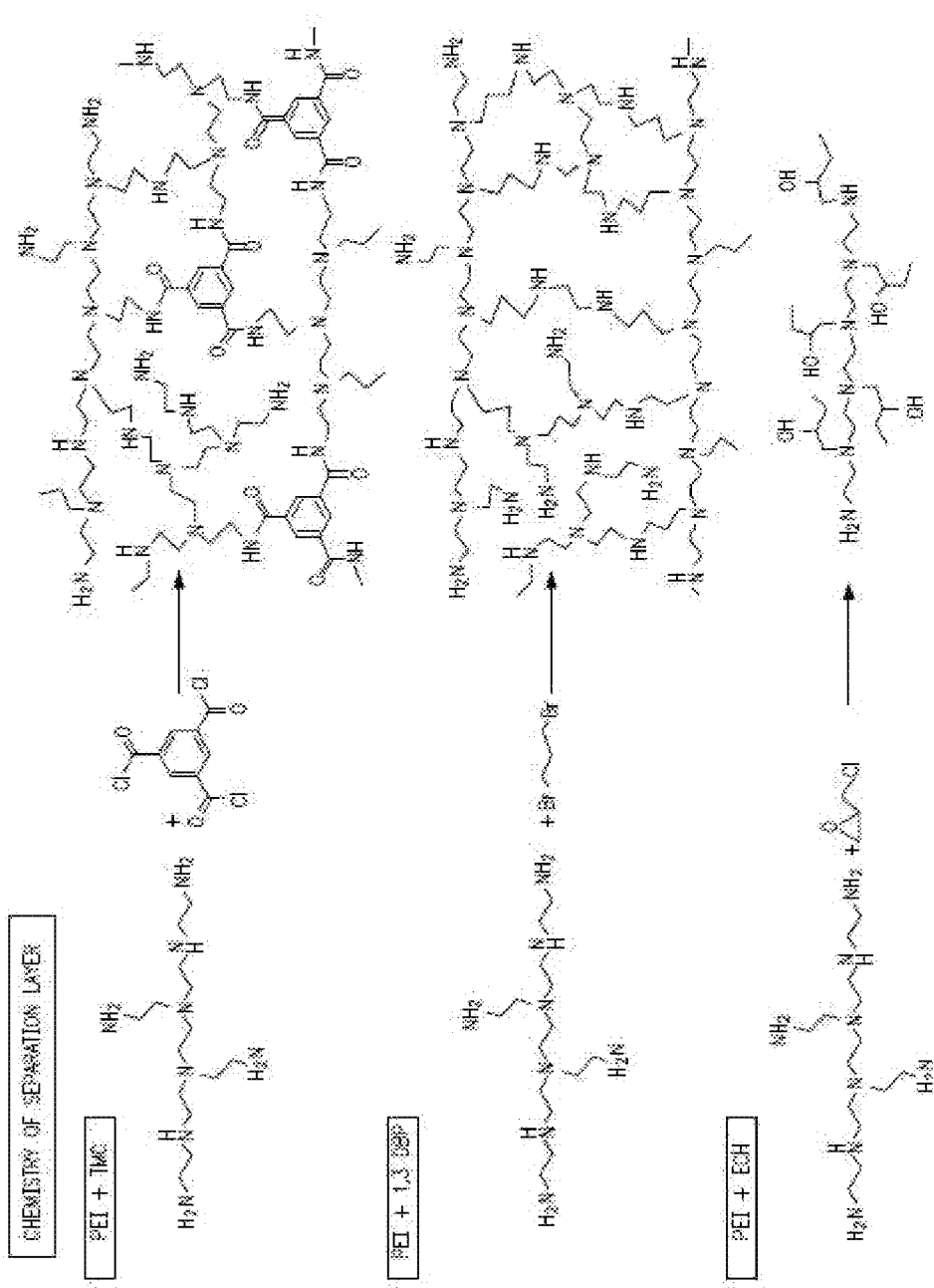

Nanofiber and Membrane Synthesis:

The Applicants utilized blends of PVDF+PEI to spin the nanofibrous scaffolds of the NFC-PVDF-PEI membranes. A typical polymer blend was prepared by dissolving PVDF (18.5 wt %) and PEI (2.5 wt %) in a mixture of DMF and NMP (1:1 w/w). The mixture was sonicated for 4 hours to obtain a homogeneous PVDF/PEI solution. A NANON-01A electrospinning (ES) machine (MECC, Japan) was used to spin the PVDF nanofibrous scaffold of each membrane. The PVDF MF support was first mounted on the NANON-01A drum collector. Following this, the PVDF/PEI blend was electrospun onto the PVDF membrane support using a solution flow rate of 0.7 mL/h and a voltage of 29 kV. During the ES process, the distance between the needle and the collector drum was kept constant at 7.5 cm. The speed of the collector was also kept constant 500 rpm. After the completion of the ES process, 1.0 mL of a solution of hyperbranched PEI in methanol (50 wt %) was electrosprayed onto the electrospun nanofibrous PVDF membranes using a solution flow rate 0.3 mL/h, a voltage of 29 kV, a needle to collector distance of 7.5 cm and a collector speed of 2500 rpm. TABLE 8 lists the process parameters used to (i) spin the PVDF nanofibers and (ii) spray them with PEI. Following electrospraying, the PEI-coated PVDF nanofibrous scaffolds were reacted with the cross linkers to generate three different types of membranes (FIGS. 61, 62, 63). To synthesize the NFC-PVDF-PEI-1 membranes, the PEI-coated nanofibrous scaffolds were reacted with a solution of TMC in toluene (1% w/v) in a glass vessel at room temperature for 5 minutes (FIGS. 61, 62, 63). Similarly, the NFC-PVDF-PEI-2 and NFC-PVDF-PEI-3 membranes were synthesized by reacting the PEI-coated PVDF nanofibrous scaffolds, respectively, with 20 wt % solutions of 1,3-DBP and ECH in toluene for one hour at 45° C. Following this, the membranes were rinsed three times with deionized (DI) water and stored in DI water at room temperature.

List of Electrospinning and Electrospraying Process Parameters

TABLE 8

List of electrospinning and electrospraying process parameters

| Process Parameters | Electrospinning | Electrospraying |
|---|---|---|
| Concentration of Polymer Solution | PVDF (18.5 wt) + PEI (2.5 wt %) in mixtures of DMF and NMP (1:1 w/w) | 50-wt % solution of PEI in methanol |
| Amount of Polymer Solution | 6 mL | 1 mL |
| Solution Flow Rate | 0.7 mL/hr | 0.3 mL/hr |
| Applied Voltage | 29 kV | 29 kV |
| Needle Diameter (mm) | 0.394 mm | 0.394 mm |
| Needle Collector Distance | 7.5 cm | 7.5 cm |
| Drum Collector Speed | 500 rpm | 2500 |

Nanofiber and Membrane Characterization:

The morphology, chemical composition, hydrophobicity and zeta potential of the PVDF nanofibers and NFC-PVDF-PEI membranes were characterized using various analytical tools. The cross-sectional and surface morphologies of the nanofibers and membranes were imaged using a field emission scanning electron microscope (FESEM, FEI, SIRION-100, USA). Before imaging, the samples in this example were coated with gold at 30 mA for 120 seconds to minimize the charging effect. To obtain the cross-sectional FESEM images, the membranes were frozen and fractured following immersion in liquid nitrogen. The SEM images were subsequently analyzed to estimate the thickness of the membrane surface layers using the Image J Version 1.45 m image processing/analysis software. The compositions of the surface layers of the NFC-PVDF-PEI membranes were characterized by attenuated total reflectance Fourier transform infrared spectroscopy (ATR-FTIR) using a JASCO 4100 FT-IR spectrometer (Japan).

All samples in this example were scanned from 500 $cm^{-1}$ to 4000 $cm^{-1}$ with a scanning speed of 2 mm/sec using a zinc selenide ATR crystal plate with an aperture angle of 45°. The hydrophobicity of each NFC-PEI membrane was determined from contact angle measurements using a Phoenix 300 contact angle analyzer (SEO cooperation, Korea). A microsyringe was utilized to place a water droplet on the surface of each membrane. After 30 seconds, the image was captured and analyzed using the instrument's image processing software. Each reported contact angle is the average of ten different measurements. The zeta potentials of the membranes were determined using the electrophoresis method [Ref 33].

This involves measuring the electrophoretic mobility of monitoring particles inside an electrophoresis chamber having a membrane and quartz cells [Ref 33]. Due to the sorption and accumulation of ions at the surface of the membranes, an electroosmotic flow occurs inside the electrophoresis chamber. This induced electroosmotic flow causes the particles to undergo electrophoretic flow [Ref 33]. An ELS-8000 electrophoretic light scattering spectrophotometer with a plate quartz cell (Otsuka Electronics, Japan) was used to measure the electrophoretic mobility of the monitoring particles in 0.01 M KCl solutions as a function of pH. The monitoring particles consisted of polystyrene (PS) latex particles (Otsuka Electronics, Japan) with a hydroxy propyl cellulose surface coating and diameter of 520 nm. The PS particles were dispersed in 0.01 N KCl solutions. The pH of the KCl solutions was adjusted with 0.1 N HCl or KOH as needed.

The measured electrophoretic mobilities (U) [cm$^2$ V$^{-1}$ s$^{-1}$] was converted to zeta potentials ($\zeta_{EP}$) [mV] using the Smoluchowski equation as given below ([Ref 33]):

$$\zeta_{EP} = 4\pi\eta U/\epsilon_r \epsilon_0 \qquad \text{Eq 1}$$

where $\eta$ is the liquid viscosity (0.89×10$^{-3}$ Pa s), $\epsilon_r$ is the relative permittivity of the liquid (78.38) and $\epsilon_0$ is the vacuum permittivity (8.854×10$^{-12}$ s m$^{-1}$).

Filtration Experiments:

A custom-built filtration system with an effective membrane area of 24 cm$^2$ was used to measure the salt rejection and permeate flux of each NFC-PVDF-PEI membrane. During each filtration experiment, the Applicants used a feed solution of 10 L with a salt concentration of 2000 mg/L. The pH of the feed solution was adjusted with a solution of 0.1 N HCl or 0.1 N NaOH as needed. The filtration experiments in this example were carried out at room temperature and at a constant pressure of 7.0 bar. The salt rejection (R) of each membrane was assayed by electric conductivity measurements. R was expressed as:

$$R = (1 - C_p/C_f) \times 100 \qquad \text{Eq 2}$$

where $C_f$ and $C_p$ are, respectively, the conductivity of the feed and permeate solutions. The permeate flux (J) [L m$^{-1}$ hr$^{-1}$] at time t through each membrane was expressed as:

$$J = V_p/(A \times \Delta t) \qquad \text{Eq 3}$$

where $V_p$ is the volume of permeate [L] collected during the sampling time $\Delta t$ [hr] and A is the effective membrane [m$^2$].

Nanofiber Synthesis and Characterization:

Hyperbranched polyethyleneimine (PEI) and poly(vinylidene fluoride) (PVDF) were selected as building blocks for the separation layers, nanofibrous scaffolds and microporous supports of the filtration membranes (FIGS. 61, 62, 63). Due its high density of reactive amine groups and ready availability from commercial sources [Ref 44, 45], hyperbranched PEI is a versatile building block for preparing ion-selective thin films. Other work has shown that hyperbranched PEI can be used to synthesize NF membranes with positively charged separation layers [Ref 46, 47]. In this example, PVDF was selected as base polymer to fabricate the nanofibrous scaffolds and microporous supports of the filtration membranes at least in part because PVDF is widely used as base polymer in the fabrication of commercial UF/MF membrane because of its high thermal/chemical resistance and tensile strength [Ref 48, 49] and because PVDF is soluble in a broad range of solvents including dimethylformamide (DMF), n-methyl-2-pyrrolidone (NMP) and dimethyl acetamide (DMAc) [Ref 48, 50]. This provides many degrees of freedom for optimizing the properties of the microporous supports and nanofibrous scaffolds of the filtration membranes (FIGS. 61, 62, 63) by selecting appropriate synthetic conditions. However, optimization should take into account features of the chemical to be selected. For example, if a membrane is provided for filtering ions, optimization should take into account that in some instances proteins and other hydrophobic macromolecular assemblies present in water/wastewater can foul PVDF membranes due to their hydrophobicity.

Figure 64:
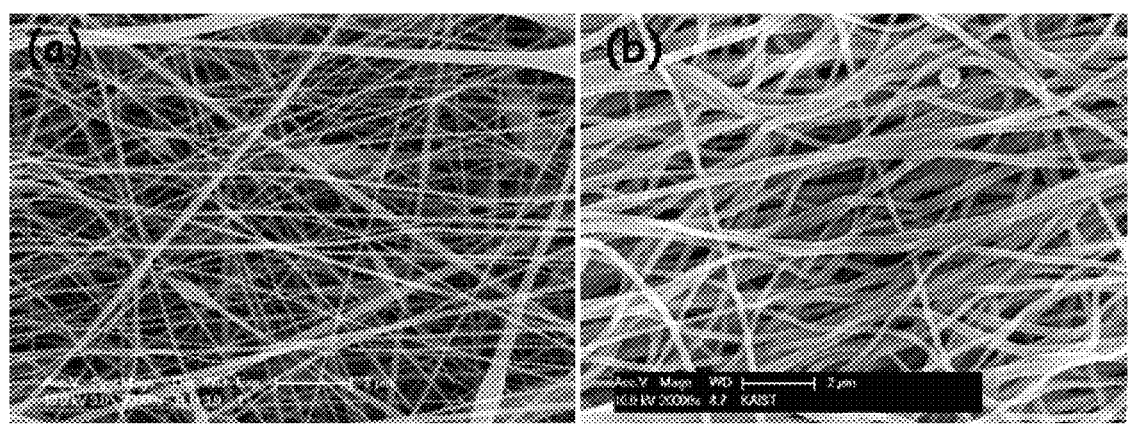
FIG. 64 shows images of electrospun nanofibers from polymer solution according to an embodiment herein described. Panel A shows an SEM image of the electrospun nanofibers from a polymer solution dissolved in DMF solvent. Panel B shows and SEM image of the electrospun nanofiber from polymer solution NMP/DMF mixed solvent.

Compared to membrane surface treatment methods such as chemical oxidation, plasma treatment and polymer grafting [Ref 51], blending hydrophobic polymers such as PVDF with more hydrophilic polymers can be used as a method for decreasing the hydrophobicity of polymeric membranes [Ref 52]. Because hyperbranched PEI and PVDF are both soluble in DMF and NMP, the blends of PVDF (18.5 w %) and PEI (2.5 w %) were used to synthesize the nanofibrous scaffolds of the NFC-PVDF-PEI membranes (FIGS. 61, 62, 63). The blends were prepared by dissolving the required amounts of PVDF and PEI in mixtures of DMF and NMP (1:1 w/w). Consistent with literature data [Ref 53], the Applicants found that the average diameter (155.8 nm±44.4 nm) of PVDF nanofibers electrospun using mixtures DMF/NMP (1:1 w/w) was larger than that of the corresponding PVDF nanofibers (81.4 nm±21.4 nm) that were prepared using pure DMF (FIG. 64).

The utilization of mixtures of solvents for electrospinning was suitable for this example for at least two reasons [Ref 53, 54]. First, using a mixture of solvents can eliminate the formation of beaded nanofibers [Ref 53]. Beads are defects that are formed during the electrospinning of polymeric nanofibers (PNFs) when low-viscosity solvents are utilized to dissolve the base polymers [Ref 53]. In filtration membranes, beaded nanofibers decrease the membrane porosity and interrupt the flow of water through the membrane nanofibrous scaffolds [Ref 53]. The viscosity of NMP (1.7 cps) is larger than that of DMF (0.9 cps). Consistent with the observations of Ramakrishna et al. (2005), the Applicants have found the use of pure DMF as spinning solvent, in this example, resulted in the formation of beaded PVDF nanofibers (FIG. 64A). In contrast, in this example, no beaded nanofibers were observed when mixtures of DMF and NMP (1:1 w/w) were used as spinning solvents (FIG. 64b). Second, the use of mixtures as spinning solvents can also increase both the adhesion/tensile strength of PNFs as well as the strength of their adhesion to nonwoven microporous supports. Yung et al. [Ref 54], regarding adhesion/tensile strength of polymeric nanofibers (PNFs) and their delamination from nonwoven microporous polymeric supports reported that the adhesion between polyethersulfone (PES) nanofibrous layers and a nonwoven poly(ethylene terephthalate) (PET) microporous support was stronger when the base PES polymer was dissolved in mixtures of DMF and NMP (6:4 w/w). Applicants have also found that the use of mixtures of DMF and NMP increases the adhesion strength of PVDF nanofibers to PVDF microporous supports. Consistent with the observations of Yung et al. [Ref 54], the Applicants have found the use of pure DMF in this example as spinning solvent resulted in the formation of PVDF nanofibrous scaffolds that are easily peeled off by hand from the PVDF microporous supports and substantially none of the PVDF nanofibrous scaffolds in this example can be peeled off by hand from their supports when the fibers were electrospun using mixtures of DMF and NMP (1:1 w/w).

Figure 65:
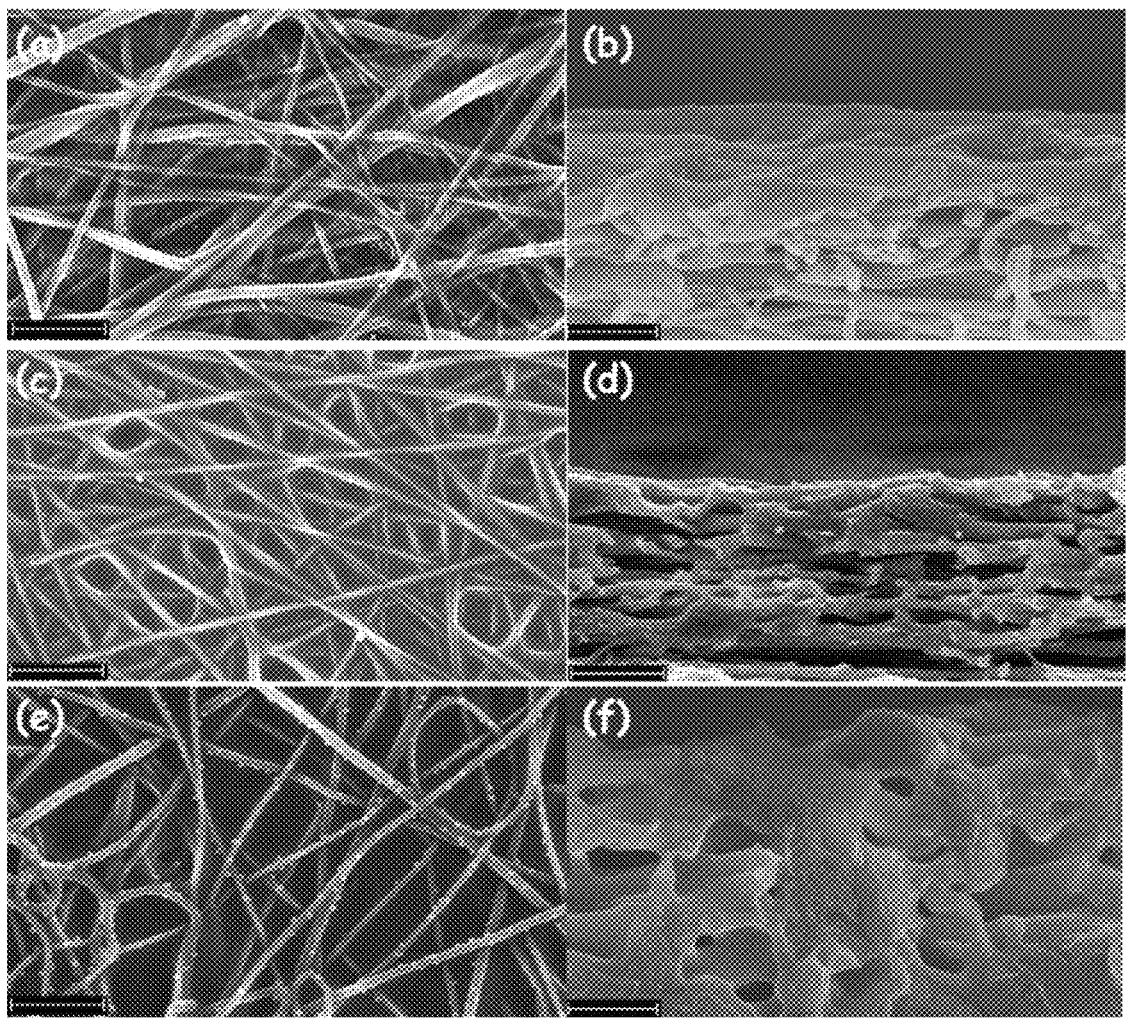
FIG. 65 shows SEM images of the surfaces and cross-section morphologies of composite materials and membranes according to an embodiment herein described. Panel A (surface) and Panel B (cross-section) show SEM images of an NFC-PVDF-PEI-1 membrane cross linked with trimesoyl chloride. Panel C (surface) and Panel D (cross-section) show SEM images of NFC-PVDF-PEI-2 membrane cross linked with 1,3-dibromopropane. Panel E (surface) and Panel F (cross-section) show SEM images of NFC-PVDF-PEI-3 cross linked with epichlorohydrin. The length of the scale bar is equal=5 μm.

Membrane Synthesis and Characterization:

To fabricate ion-selective filtration membranes (FIGS. 61, 62, 63), electrospraying was used to deposit films of hyperbranched PEI onto PVDF nanofibrous scaffolds that were electrospun onto commercial PVDF microfiltration membrane supports using mixtures of DMF and NMP (1:1 w/w). Electrospraying can be a suitable technique for depositing films onto a broad range of substrates including polymeric membranes (Jaworek and Sobczyk, 2008). The films can be deposited from solutions or suspensions of microparticles and/or nanoparticles with controlled thickness ranging from approximately 10 nm to 100 μm. Roso et al. (2008) have combined electrospinning with electrospraying to fabricate catalytic membranes having polysulfone nanofibrous scaffolds with embedded $TiO_2$ nanoparticles. TABLE 8 lists the process parameters used to spray the PVDF nanofibrous scaffolds with hyperbranched PEI. Based on SEM images (data not shown), the Applicants found the surfaces of the PVDF nanofibrous scaffolds can be fully covered by spraying them with 1.0 mL of a 50-wt % solution of PEI in methanol. Following electrospraying, the PEI-laden nanofibrous PVDF were reacted, respectively, with trimesoyl chloride (TMC), 1,3-dibromopropane (DBP) and epichlorohydrin (ECH) to produce filtration membranes with cross linked PEI separation layers (FIGS. 61, 62, 63) as described in this example. TABLE 9 lists selected properties of the NFC-PVDF-PEI membranes that were measured in this example including contact angle, zeta potential, isoelectric point and surface layer thickness. FIG. 65 shows the FESEM images of the surface and cross-section morphology of the NFC-PVDF-PEI membranes. As shown in FIG. 65a and FIG. 65b, the surface of the NFC-PVDF-PEI-1 membrane (with TMC cross linker) consists of a film of PVDF nanofibers with cross linked PEI macromolecules. Due to its rough/wiggly surface morphology, it was difficult to measure the thickness of the surface layer of the NFC-PVDF-PEI-1 membrane with high precision. Using the Image J Version 1.45 m image processing/analysis software, the thickness of the membrane surface layer was estimated as being equal to 240 nm 100 nm (TABLE 9). This value is within the range of the observed thickness (150-2000 nm) of the surface layers of conventional polymeric NF membranes [Ref 55, 56]. FIG. 65 shows that both the surface of the NFC-PVDF-PEI-2 membrane (with DBP cross linker) and that of the NFC-PVDF-PEI-3 membrane (with ECH cross linker) consist also of films of PVDF nanofibers with cross linked PEI macromolecules. The thickness of the separation layers of the NFC-PVDF-PEI-2 and NFC-PVDF-PEI-2 membranes can be estimated, respectively, as approximately equal to 10 μm and 13 μm (TABLE 9). The large thickness of the surface of these membranes can be attributed to longer crosslinking reaction times (1 hour) at higher temperature (45° C.) in the presence of excess reagents (e.g. solutions of 20 wt % of DBP/ECH in toluene).

that are embedded in the PVDF nanofibrous scaffold (FIGS. 61, 62, 63). As shown in FIG. 66c, the FT-IR spectrum of the NFC-PVDF-PEI-1 membrane exhibits some characteristic features of NF membranes with amide groups including CN stretching (1641 $cm^{-1}$) and C=O stretching (1532 $cm^{-1}$) (Setiawan et al., 2011; Sun et al., 2011). These amide groups are generated when the PEI macromolecules that are embedded in the membrane PVDF nanofibrous scaffold react with TMC cross linkers (FIGS. 61, 62, 63). The FT-IR spectrum of the NFC-PVDF-PEI-2 membrane (FIG. 66d) shows no new characteristic peak. This observation is consistent with the understanding that mostly secondary/tertiary amines are generated when the embedded PEI macromolecules of the membrane PVDF nanofibrous scaffold reacts with 1,3-DBP cross linkers (FIGS. 61, 62, 63). In contrast, the FT-IR spectrum of the NFC-PVDF-PEI-3 membrane exhibits a new peak, for OH stretching at 3257 $cm^{-1}$ indicating that hydroxyl groups are produced when the PEI macromolecules that are embedded in the membrane PVDF nanofibrous scaffold reacts with ECH cross linkers (FIGS. 61, 62, 63). TABLE 9 shows significant differences between the hydrophilicity and zeta potential potentials of NFC-PVDF-PEI membranes. The contact angle of the PVDF membrane support is equal to 130.2°±0.9° thereby indicating that the support is very hydrophobic. In contrast, the contact angles for the NFC-PVDF-PEI-1, NFC-PVDF-PEI-2 and NFC-PVDF-PEI-3 membranes are equal, respectively, to 38.6±1.4°, 54.9±0.5°, and 50.2±1.3° thereby indicating these membranes are hydrophilic and less susceptible to fouling via sorption of proteins and other hydrophobic macromolecular assemblies present in water/wastewater. It is worth mentioning that the contact angle of the NFC-PVDF-PEI-1 membrane (38.6°±1.4°) is smaller by ~10-20° than those of commercial thin film composite polyamide NF/RO membranes with cross linked polyamide separation layers. These membranes have contact angles of 50-60° [Ref 57]. FIG. 67 shows the zeta potentials of the NFC-PVDF-PEI membranes measured at various pH. TABLE 9 lists their estimated isoelectric points and zeta potentials. The isoelectric points of the NFC-PVDF-PEI-1, NFC-PVDF-PEI-2 and NFC-PVDF-PEI-3 membranes are respectively, equal to 7.8, 6.4 and 5.7. Their zeta potentials at pH 6 are equal to 39.7±3.7 mV, 9.0±3.0 mV, and −4.5±0.9 mV, respectively.

Evaluation of Membrane Performance:

The overall results of the characterization experiments indicate that the NFC-PVDF-PEI-1 membrane (with TMC cross linker) is more hydrophilic than commercial TFC-PA RO/NF membranes. The large and positive zeta potential of the NFC-PVDF-PEI-1 membrane at pH 6-7 (FIG. 67) indicates that it has good potential for high water flux and improved rejection for monovalent cations. To evaluate the

TABLE 9

Selected properties of the NFC-PVDF-PEI membranes synthesized in this example

| Membrane | Surface Layer | $^a$Contact Angle | Isoelectric Point | Zeta Potential (pH 6) | Surface Layer Thickness |
|---|---|---|---|---|---|
| NFC-PVDF-PEI-1 | Cross linked PEI/TMC | 38.6 ± 1.4° | 7.8 | 39.7 ± 3.7 mV | 240 ± 100 nm |
| NFC-PVDF-PEI-2 | Cross linked PEI/DBP | 54.9 ± 0.5° | 6.4 | 9.0 ± 3.0 mV | 10 μm |
| NFC-PVDF-PEI-3 | Cross linked PEI/ECH | 50.2 ± 1.3° | 5.7 | −4.5 ± 0.9 mV | 13 μm |

$^a$All the contact angles were measured in water. The contact angle of the PVDF MF membrane support is equal to 130.2° ± 0.9°.

Figure 66:
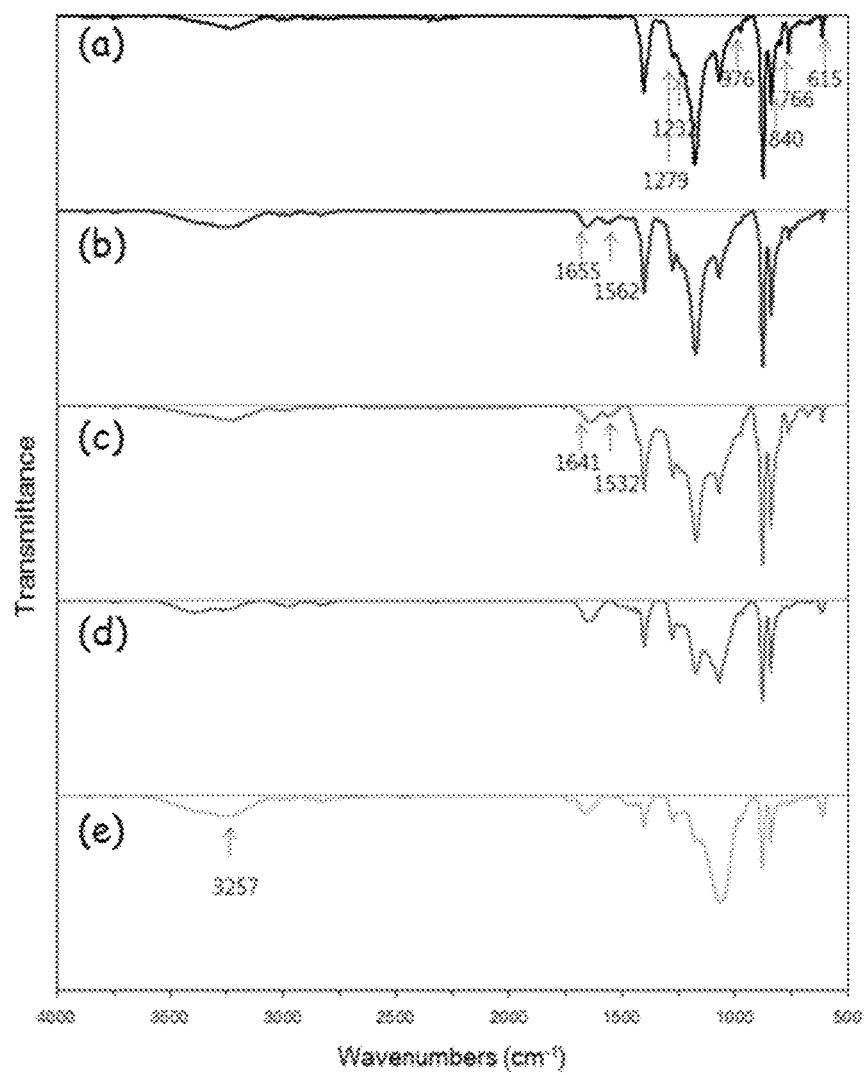
FIG. 66 shows FTIR-ATR spectra of microporous supports according to an embodiment herein described. Panel A shows a spectrum of a PVDF microporous support. Panel B shows a spectrum a PVDF+PEI nanofibrous scaffold. Panel C shows a spectrum NFC-PVDF-PEI-1 membrane cross linked with trimesoyl chloride. Panel D shows a spectrum NFC-PVDF-PEI-2 membrane cross linked with 1,3-dibromopropane. Panel E shows a spectrum NFC-PVDF-PEI-3 membrane cross linked with epichlorohydrin.
Figure 67:
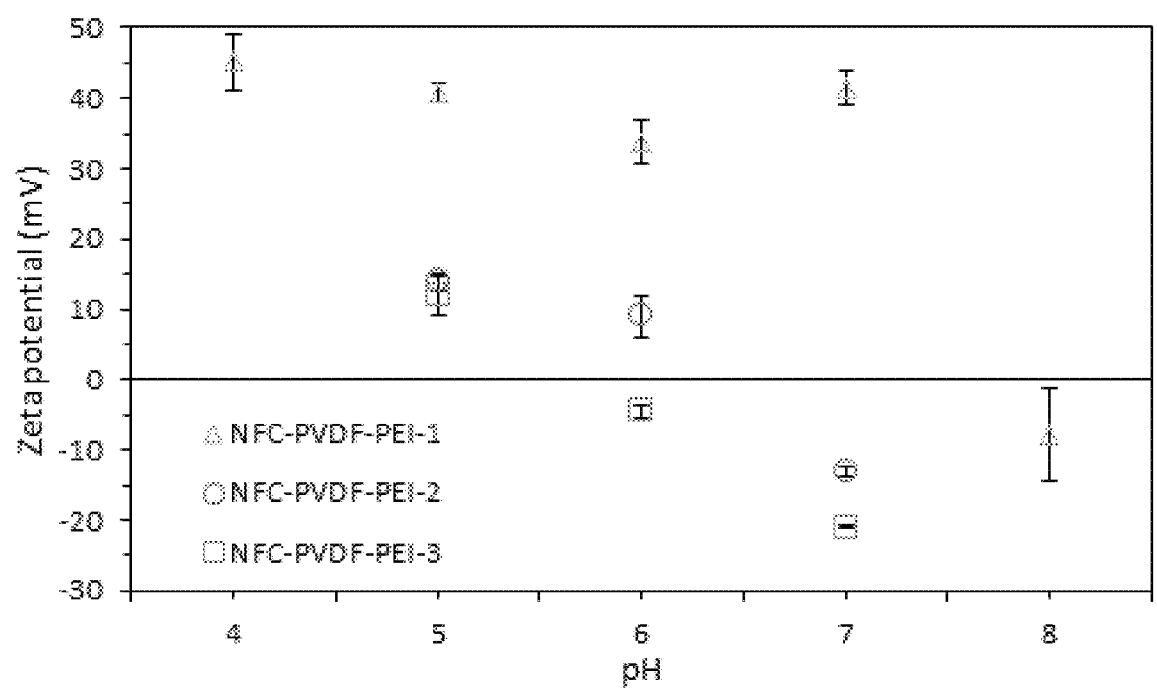
FIG. 67 shows zeta potentials of NFC-PVDF-PEI membranes according to an embodiment herein described in aqueous solutions as a function pH.
Figure 68A:
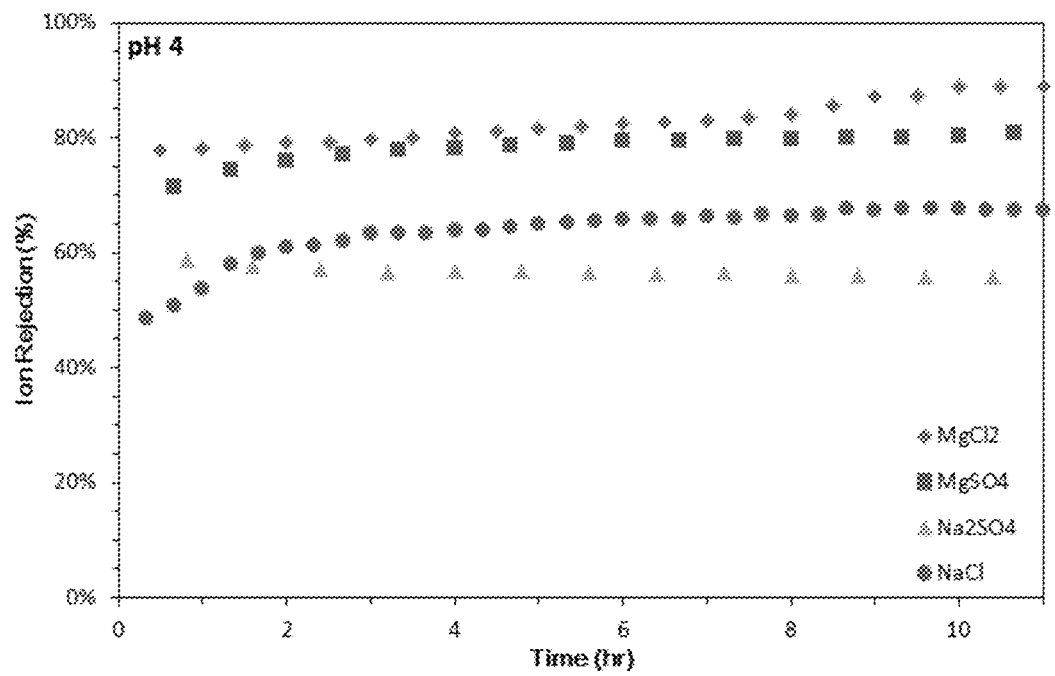
FIGS. 68A-F shows a graph of a salt rejection and permeate flux of NFC-PVDF-PEI-1 at pH 4, 6 and 8 as a function of time.
Figure 68B:
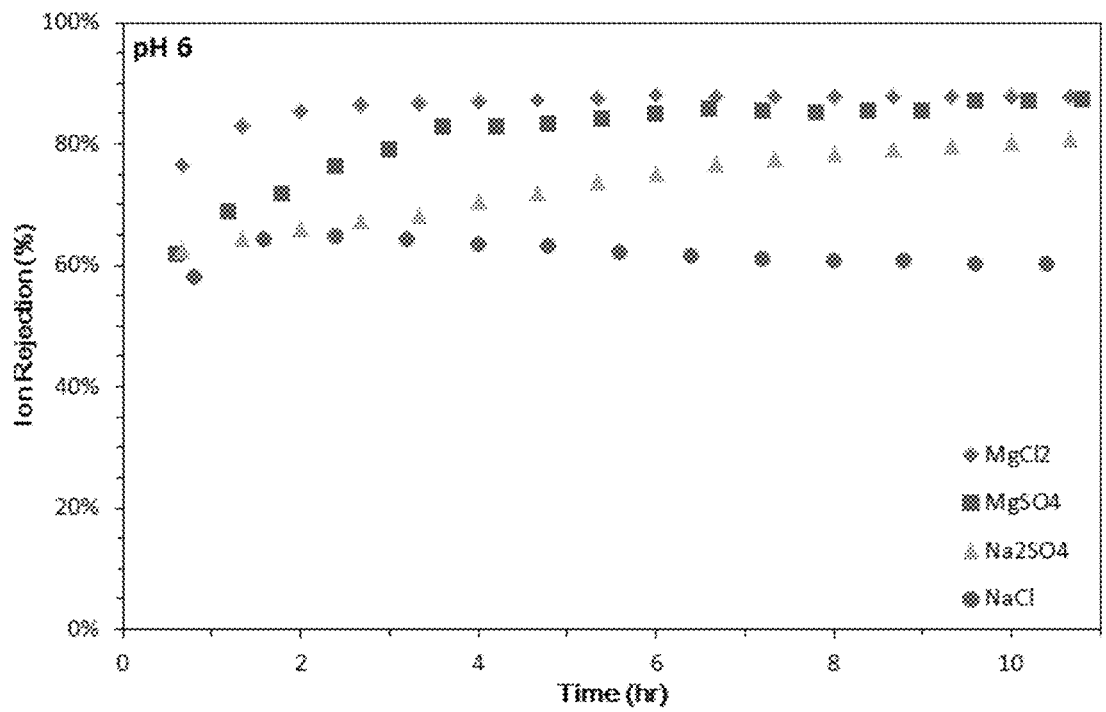
Figure 68C:
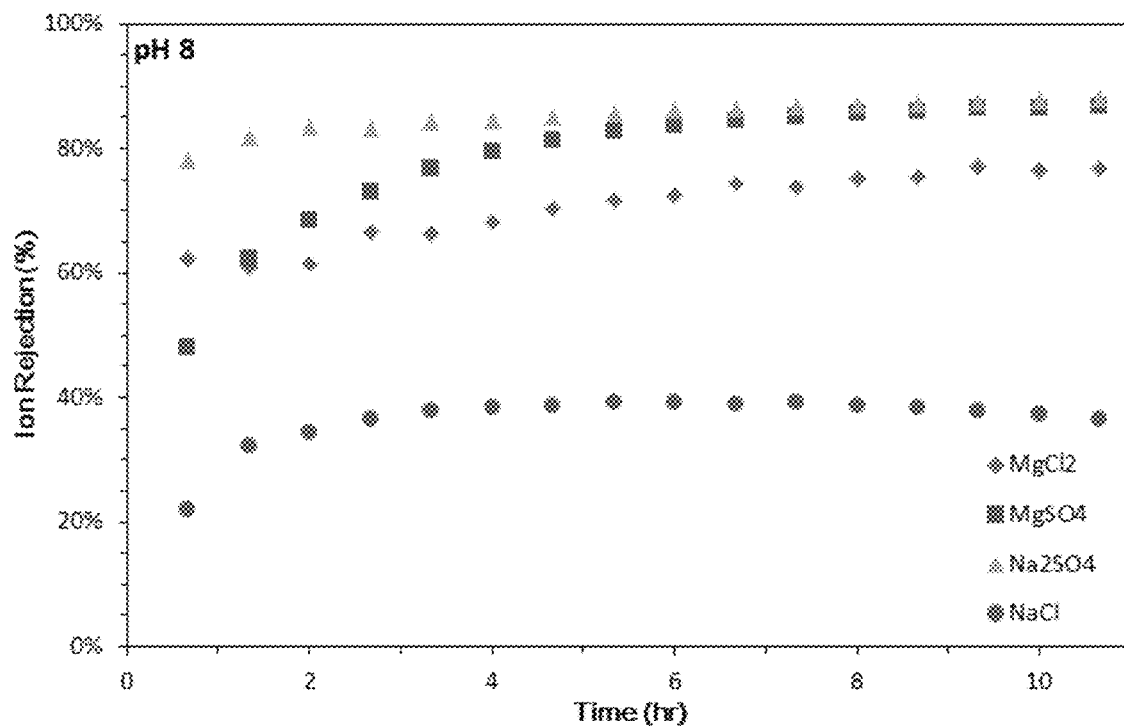
Figure 68D:
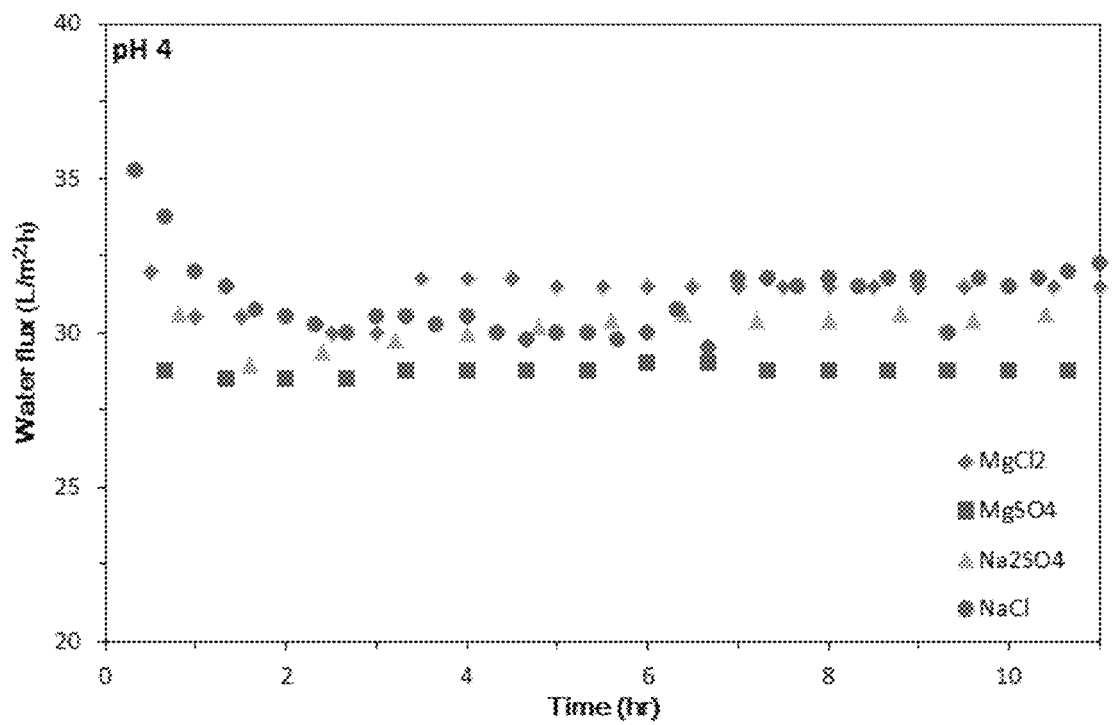
Figure 68E:
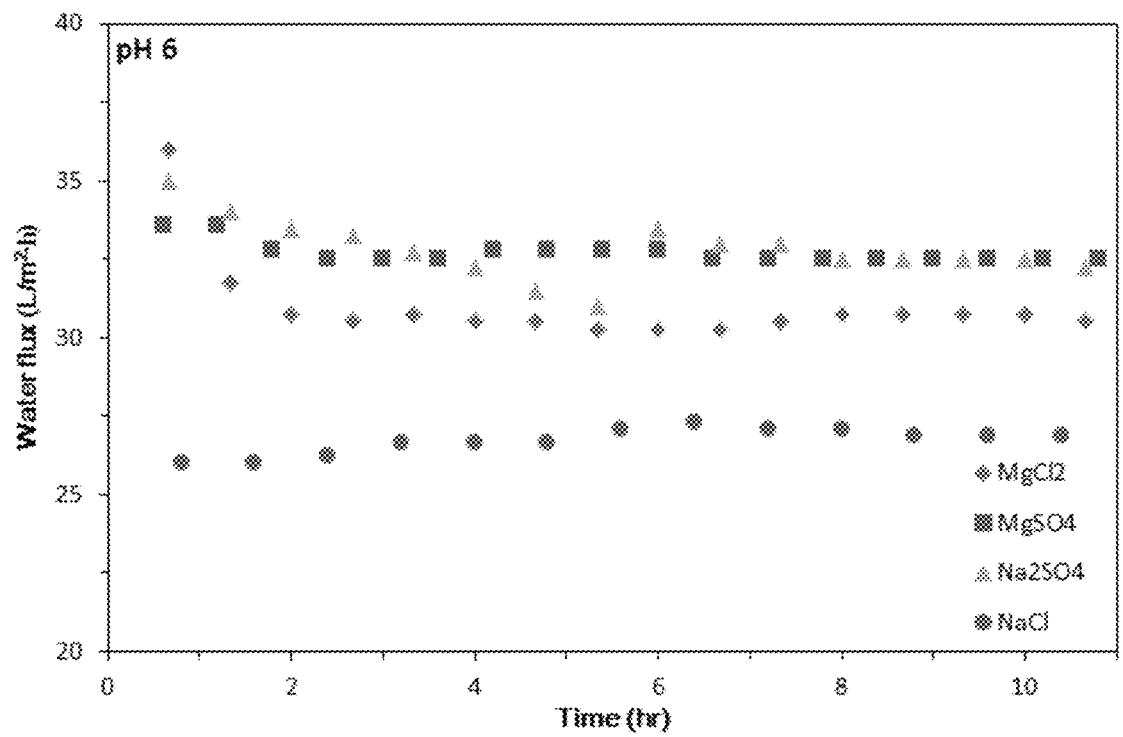
Figure 68F:
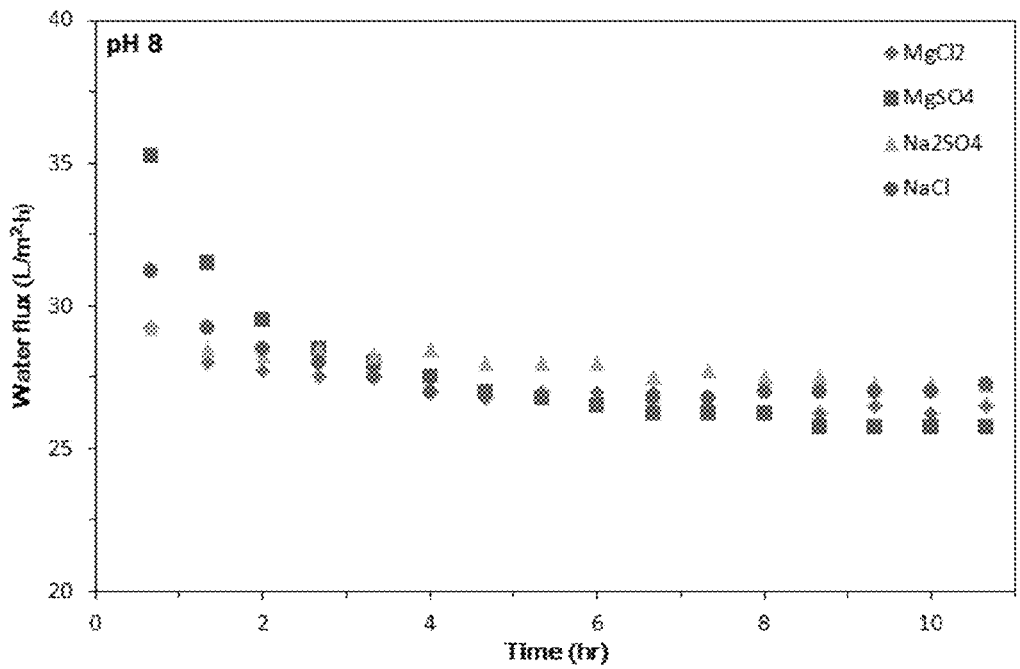
Figure 69:
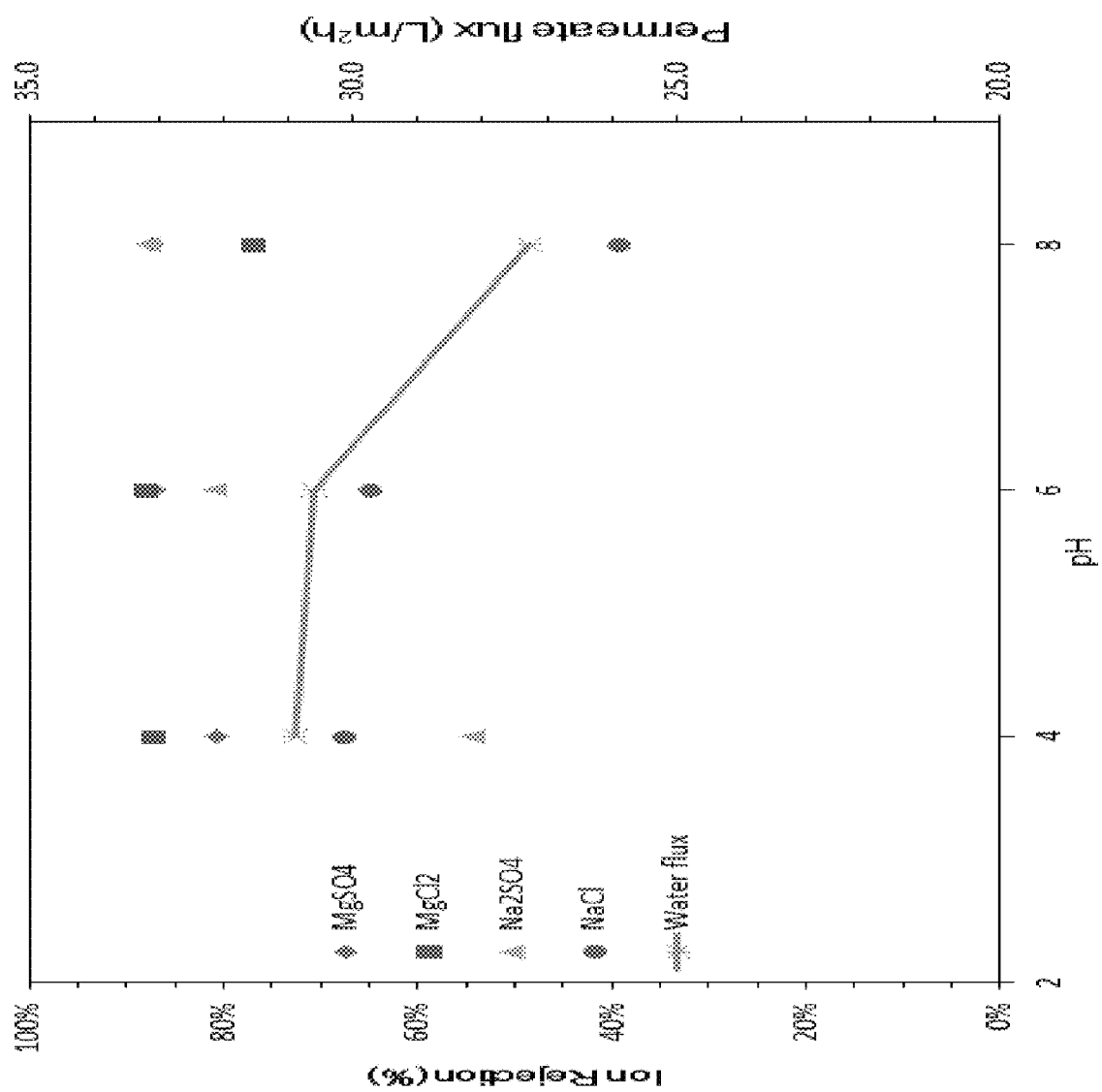
FIG. 69 shows a diagram illustrating salt rejection and permeate flux of a NFC-PVDF-PEI-1 membrane as a function of pH according to an embodiment herein described.

FIG. 66 shows the ATR-FTIR spectra of a PVDF membrane support, a blended PVDF/PEI nanofibrous scaffold and those of the NFC-PVDF-PEI membranes. FIG. 66a highlights several characteristic peaks of PVDF surfaces including $CF_2$ bending (615 and 766 $cm^{-1}$), $CH_2$ rocking (840 $cm^{-1}$), CH stretching (976 $cm^{-1}$) and CF stretching (1234 and 1279 $cm^{-1}$) [Ref 32]. FIG. 66b shows that the blended PVDF/PEI nanofibrous scaffold exhibits two major peaks including (i) $NH_2$ bending (1655 $cm^{-1}$) from primary amines and (ii) NH stretching (3255 $cm^{-1}$) from primary/secondary amines. The Applicants assign these peaks to PEI macromolecules performance of this membrane, cross-flow filtration experiments were performed to measure its ion rejection and permeate flux in saline solutions as described in this example. Aqueous solutions (2000 mg/L) of four salts (NaCl, MgCl$_2$, Na$_2$SO$_4$, and MgSO$_4$) were evaluated. FIG. 68 shows the salt rejection and permeate flux of the NFC-PVDF-PEI-1 membrane during the course of a typical 12-hr filtration experiment. In this, the membrane salt rejection and permeate flux reached constant values after 2 hour of filtration. FIG. 69 shows that the NFC-PVDF-PEI-1 membrane exhibits higher rejections for the 2-1 salt (MgCl$_2$) and 2-2 salt (MgSO$_4$) than for the 1-1 salt (NaCl) and 1-2 salt (Na$_2$SO$_4$) at pH 4 and 6. This result is consistent with that of a Donnan exclusion membrane with a positive surface charge [Ref 58]. As indicated in TABLE 9, the NFC-PVDF-PEI-1 membrane has an isoelectric point of 7.8. The isoelectric point of a membrane is the pH at which it has no net charge in solution. Thus, the NFC-PVDF-PEI-1 membrane is (i) positively charged at pH 4 and 6 and (ii) negatively charged at pH 8 (FIG. 68). Consistent with the Donnan effect, the NFC-PVDF-PEI-1 membrane will have a higher rejection for divalent cations (e.g. Mg$^{2+}$) over monovalent cations (e.g. Na$^+$) at pH 4 and 6 [Ref 58-60]. A positively charged membrane will also reject an equivalent amount of anions to maintain overall solution electroneutrality. Because of this, the Applicants expected the rejection of a magnesium salt (MgCl$_2$ MgSO$_4$) by a NFC-PVDF-PEI-1 membrane will be larger than that of a sodium salt (e.g. Na$_2$SO$_4$) in aqueous solutions at pH 4 and 6. At pH 8, however, FIG. 69 shows that the salt rejection order of the NFC-PVDF-PEI-1 membrane is Na$_2$SO$_4$>MgCl$_2$>NaCl. In this example, the MgCl$_2$ rejection of the NFC-PVDF-PEI-1 membrane decreased from 87.2% to 76.7% as solution pH water increased from 4 to 8. In contrast, its Na$_2$SO$_4$ rejection increased significantly from 54.5% to 88.0% with increasing pH from 4 to 8. This higher Na$_2$SO$_4$ rejection is consistent with that of Donnan exclusion membranes with negative surface charges including thin film composite polyamide NF membranes [Ref 58, 61, 62] and asymmetric sulfonated polyethersulfone NF membranes [Ref 63, 64].

The salt rejections and permeate fluxes of the NFC-PVDF-PEI-2 and NFC-PVDF-PEI-3 membranes were also measured (TABLE 10). TABLE 10 lists the MgCl$_2$/NaCl rejections and permeate fluxes of the NFC-PVDF-PEI membranes at pH 6. The MgCl$_2$/NaCl rejections and permeate fluxes of selected nanofiltration membranes with positively charged surface layers are also listed in TABLE 10 [Ref 56]. As shown in TABLE 10, the MgCl$_2$ rejection of the NFC-PVDF-PEI-1 membrane (87.8%) is higher than those of the NFC-PVDF-PEI-2 membrane (75.5%) and NFC-PVDF-PEI-3 membrane (76.4%).

The NaCl rejections of the NFC-PVDF-PEI-1 and NFC-PVDF-PEI-3 membranes are comparable. They are equal to 64.8% and 62.6%, respectively. However, the NaCl rejection of the NFC-PVDF-PEI-2 is lower and equal to 22.9%. TABLE 10 indicates that the permeate flux of the NFC-PVDF-PEI-3 membrane is relatively low (8-9.0 L m$^{-2}$ h$^{-1}$). In contrast, the permeate flux of the NFC-PVDF-PEI-1 membrane is relatively high (27-30 L m$^{-2}$ h$^{-1}$). As shown in TABLE 10, the permeate flux of the NFC-PVDF-PEI-2 membrane (25-30 L m$^{-2}$ h$^{-1}$) is comparable to that of the NFC-PVDF-PEI-1 membrane. This result is surprising as the NFC-PVDF-PEI-1 membrane has a higher surface charge at pH 6 (39.7 mV versus 9.0 mV) with a lower contact angle (38.6° versus) 54.9° and a thinner surface layer (200 nm versus 10 μm). The overall results of this example indicate that nanofibrous composite (NFC) membranes with PVDF nanofibrous scaffolds and cross linked PEI separation layers are promising building blocks for the fabrication of high performance NF membranes for water purification. Without optimization, the NFC-PVDF-PEI-1 membrane (FIGS. 61, 62, 63) already exhibits a high water flux (~30 L m$^{-2}$ h$^{-1}$) and good rejections for MgCl$_2$ (~88%) and NaCl (~65%) rejection in salt solutions (2000 mg/L) at pH 6 using a pressure of 7 bar (TABLE 10). The nanofiltration membranes listed in TABLE 10 that have higher MgCl$_2$/NaCl rejections that those of NFC-PVDF-PEI-1 membrane have also lower permeate fluxes (~15.0-19.0 L m$^{-2}$ h$^{-1}$).

TABLE 10

| Membrane | $R_{MgCl2}$ (%) | $J_{MgCl2}$ (L m$^{-2}$ h$^{-1}$) | $J_{NaCl}$ (%) | $J_{NaCl}$ (L m$^{-2}$ h$^{-1}$) | Separation Layer | Experimental conditions | Reference |
|---|---|---|---|---|---|---|---|
| NFC-PVDF-PEI-1 | 87.8 | 30.5 | 64.8 | 27.1 | Cross linked PEI/TMC | 2000 ppm MgCl$_2$; 2000 ppm NaCl; 7.0 bar | This Example |
| NFC-PVDF-PEI-2 | 75.5 | 29.8 | 22.9 | 24.8 | Cross linked PEI/1,3-DBP | 2000 ppm MgCl$_2$; 2000 ppm NaCl; 7.0 bar | This Example |
| NFC-PVDF-PEI-3 | 76.4 | 9.3 | 62.6 | 8 | Cross linked PEI/ECH | 2000 ppm MgCl$_2$; 2000 ppm NaCl; 7.0 bar | This Example |
| PPO | 73 | 63 | 36 | 63 | Poly(2,6-dimethyl-1,4-phenylene oxide) | 1000 ppm MgCl$_2$; 1000 ppm NaCl; 3.5 bar | [Ref 65] |
| PDMAEMA/PSF | 98 | 8.3 | 77.8 | 7.6 | Poly (N,N-dimethylaminoethyl methacrylate) | 1000 ppm MgCl$_2$; 1000 ppm NaCl; 8.0 bar | [Ref 66] |
| HACC/PAN NF-1 | 94.1 | 6.9 | 47.3 | 12.9 | 2-hydroxypropyltrimethyl ammonium chloride chitosan/hexane diacid/acetic anhydride | 2000 ppm MgCl$_2$; 2000 ppm NaCl; 5.0 bar | [Ref 67] |

TABLE 10-continued

| Membrane | $R_{MgCl2}$ (%) | $J_{MgCl2}$ (L m$^{-2}$ h$^{-1}$) | $J_{NaCl}$ (%) | $J_{NaCl}$ (L m$^{-2}$ h$^{-1}$) | Separation Layer | Experimental conditions | Reference |
|---|---|---|---|---|---|---|---|
| QAPPESK | 84 | 49 | 31 | 54 | Quaternized poly(phthalazinone ether sulfone ketone) | 1000 ppm MgCl$_2$; 1000 ppm NaCl; 4.0 bar | [Ref 68] |
| GCTACC/PAN | 91.7 | 8.5 | 57 | 8.6 | A graft copolymer of trimethylallyl ammonium chloride onto chitosan | 2000 ppm MgCl$_2$; 2000 ppm NaCl; 12.0 bar | [Ref 67] |
| PEI modified membrane | 91.2 | 15 | 82.2 | 15 | PEI coating on polyamide thin film composite membrane | 75 ppm MgCl$_2$; 90 ppm NaCl; 8.0 bar | [Ref 69] |
| PCNFM3 | 94.3 | 19.1 | 60.7 | 20.6 | Poly(2-methacryloyloxy ethyl trimethylammonium chloride-co-2-hydroxyethyl acrylate) | 1000 ppm MgCl$_2$; 1000 ppm NaCl; 6 bar | [Ref 70] |
| M-40 | 63.3 | 30.2 | 36.6 | 30.2 | Poly(arylene ether sulfone) with pendant tertiary amine group | 1000 ppm MgCl$_2$; 1000 ppm NaCl; 5 bar | [Ref 71] |

Example 23

Synthesis, Characterization, and Performance Evaluation of Ion-Selective Nanofibrous Composite Membranes Using PAN and Hyperbranched PEI Macromolecules as Building Blocks This example show a fabrication of an ion-selective NFC-PAN-PEI filtration membrane comprising three parts (FIG. 70): (1) a bottom layer; (2) a mid layer; and (3) a top layer was fabricated. In particular, these NFC membranes can be fabricated such that they are directly attached to polymer matrix formed by a porous polymeric aggregate comprising polymeric nanoparticles (e.g. by forming a polymer aggregate comprising polymeric nanoparticles by in situ particle formation as herein described or attached to a support layer (e.g. a PET non-woven fabric) and the support layer is further attached to porous polymeric aggregate comprising polymeric nanoparticles (e.g. by casting a membrane comprising porous polymeric aggregate with embedded polymeric nanoparticles as herein described (see, e.g. FIG. 59 and FIG. 60).

1) Bottom Layer Fabrication:
A poly(ethylene terephthalate) (PET) support paper (3153TH-80S, Basis Weight=80.1 g/m$^3$, Thickness=109 μm, Air Permeability=2.71 cc/cm$^2$/sec, Porosity=5.34 ft$^3$/ft$^2$/min) was used as a bottom layer.

2) Mid Layer Fabrication:
Onto the PET paper, the polyacrylonitrile (PAN) mesh mid layer was fabricated which is composed of PAN nanofibers using electrospinning technique.

(a) Materials
Poly(acrylonitrile) (PAN, powder, M$_w$=150,000 g/mol), 1,3,5-Benzenetricarbonyl trichloride (trimesoyl chloride or TMC, 98%) were purchased from Sigma-Aldrich (USA). N,N-dimethylformamide (DMF, 99.5%), 1-Methyl-2-Pyrrolidone (NMP, 99.5%) were purchased from Dae Jung Chemicals and Metals Co. Ltd (Korea). Toluene (99.5%) was purchased from Samchun Pure Chemicals Co. Ltd (Korea). Hyperbranched Polyethyleneimine (PEI, M$_n$=10,000 g/mol) was purchased from Nippon Shokubai Co. Ltd (Japan) and the name of product was SP-200. The reagents and solvents in this example were used without further purification.

(b) Preparation of PAN Solution for Electrospinning.
1. PAN powder was added into a 30 ml glass vial. 2. DMF and NMP solvent was added into the vial to make PAN solution. 3. The solution was put in an oven for 6 h at 80° C. until the solution become clear. 4. The solution was put in a sonicator for 3 h to make homogeneous solution.

(c) Fabrication Procedure of Electrospun PAN Mid Layer
PAN mesh mid layer was fabricated using an electrospinning machine, 'eS-robot' model from NanoNC company. First, a PET support paper was attached onto the drum collector, and electrospun PAN nanofibers directly fabricated onto it. Here are the typical conditions for electrospinning of PAN solution. The applied voltage is 27 kV, and the distance between the tip and the collector is 10 cm, and the inner diameter of tip is 0.51 mm, and the rotation speed of drum is 100 rpm, and the flow rate is 1 ml/h. Total spinning time is depended on the flow rate of spinning solution and total volume of electrospun solution. Also, the thickness of nanofiber mesh is depended on the area of the electrospun mesh and total volume of electrospun solution. The fabricated membrane was heated 150° C. for 1 day in oven.

3) Top Layer Fabrication:
The top layer of the NFC-PAN-PEI membrane was synthesized by interfacial polymerization onto the electrospun PAN nanofibrous mesh, using PEI 25 k as a monomer of aqueous solution and TMC as a monomer of organic solution. First, a membrane (the one after finishing electrospinning) was immersed in the aqueous PEI 25 k solution for 1 h. After that, gently removed the excess solution on the membrane by glass roller, then it was immersed in the TMC solution (use Toluene as a organic solvent) for a required reaction time. After polymerization, the membrane was immersed in the pure TMC solution for 2 min to get rid of left TMC in it. Subsequently, the membrane was air-dried for 30 min and it was stored in DI water before its testing.

Figure 72:
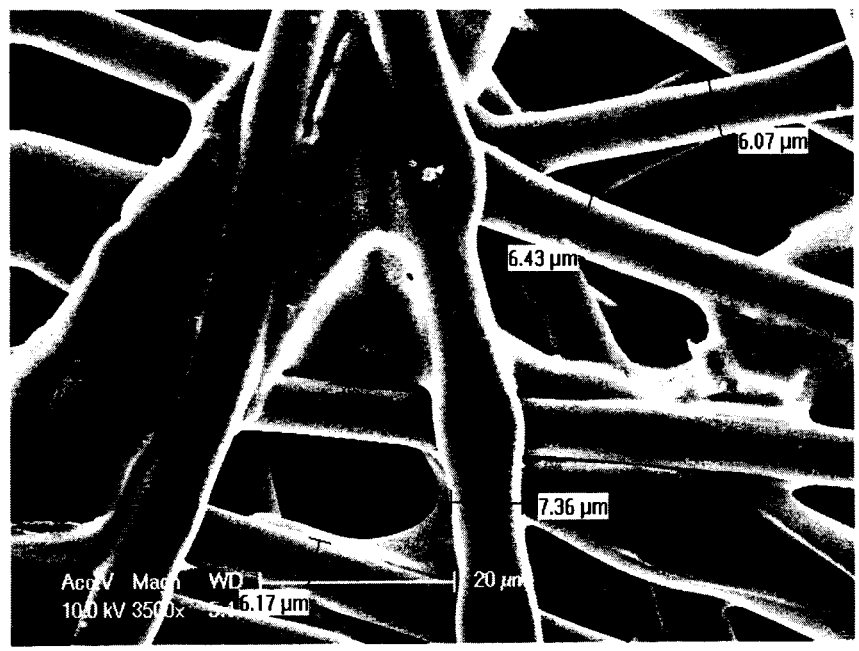
FIG. 72 shows an SEM image of the PET paper of an exemplary membrane as depicted in FIG. 70 at high magnification.
Figure 73:
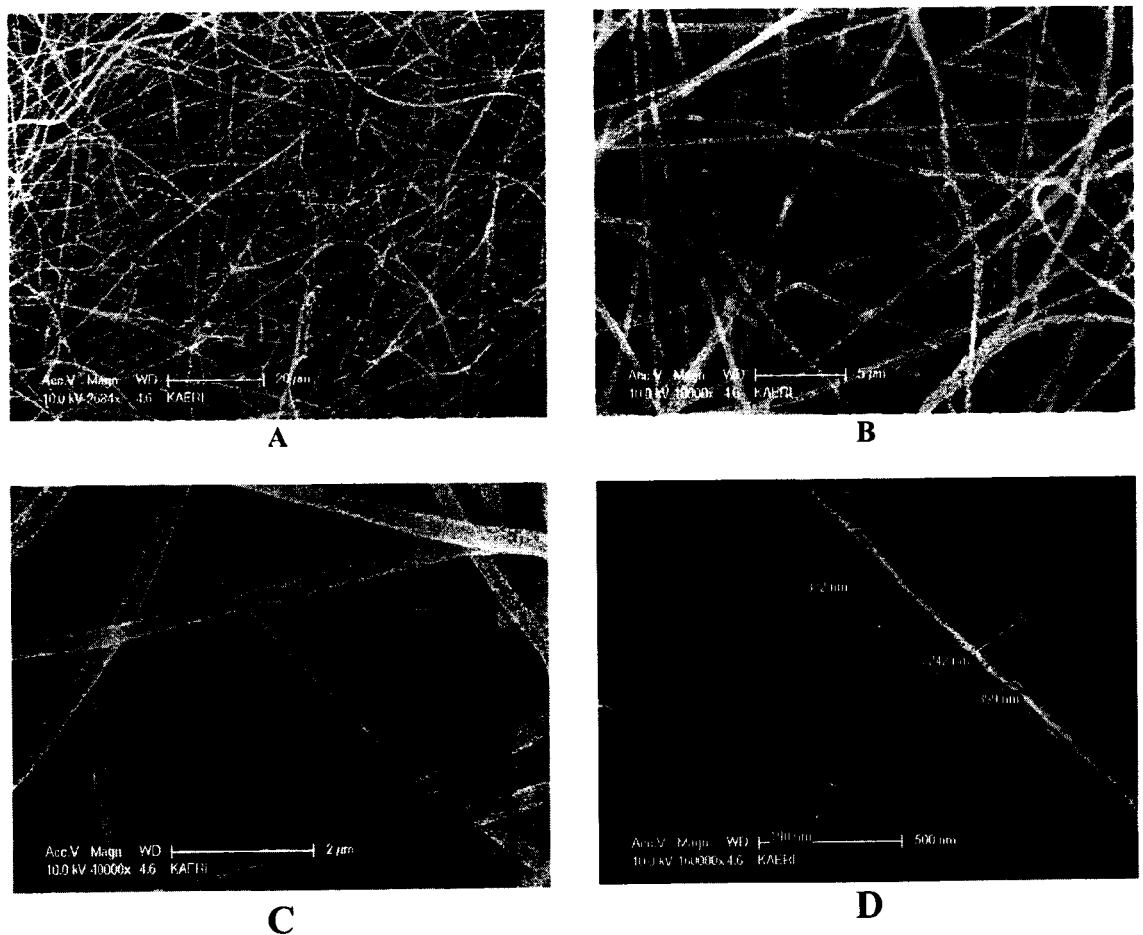
FIG. 73 shows SEM images of electrospun PAN nanofibers from FIG. 70 at different magnifications. Panel A shows images 20 μm scale. Panel B shows images at 5 μm scale. Panel C shows images at 2 μm scale. Panel D shows images at 500 nm scale.

4) Scanning Electron Microscopy (SEM)
The morphology of the each layer of the filtration membrane was investigated by scanning electron microscopy The NFC-PAN-PEI membrane fabricated was then characterized as shown below 1) Bottom Layer Characterization
The PET support paper gives a major mechanical strength to the filtration membrane, during not only practical water filtration processes but also fabrication processes. The diameter of fibers is approximately around 6-7 μm as can be seen in the exemplary schematic illustration of FIG. 71 and FIG. 72.

2) Mid Layer Characterization

The necessity of mid layer of TFC or filtration membrane comes from that the thin top layer cannot be fabricated directly onto PET due to the huge pore size (the empty space between each fibers) of the PET paper. The smaller pore size in this specific case associated to a smaller diameter of the fibers, (approximately 200-400 nm), as can be seen from the depiction of FIG. 73A-D The electrospun nanofiber mesh was used to narrow down the pore size of the membrane's top part where the synthesis of thin layer actually occurs. As the diameter of nanofibers is decreased, the pore size of the nanomesh is also decreased which leads to successful interfacial polymerization in uniform. Among the conditions of electrospinning, the diameter of nanofiber is strongly related with the concentration of polymer solution. In this research, the minimum concentration for successful electrospinning was 6 wt %.

(a) Adhesion Between PAN Nanomesh and PET Support.

A good adhesion between PAN nanomesh and PET paper is can be important for further fabrication steps and the filtration test. If adhesion force is not strong enough, PAN mid layer is expected to be easily delaminated during the interfacial polymerization step. Since there are no strong chemical or physical bonds between PAN mid layer and PET paper, the only major interaction that can utilize is van der Waals forces. When DMF was solely used as a solvent for PAN solution, the adhesion was weak due to the highly volatile nature of DMF (Vapor pressure: 3.85 mmHg at 25° C.) which makes electrospun fibers too dry even before they arrive on the PET surface. It is obvious that the good adhesion cannot be obtained between dry PAN nanofibrous mesh and PET paper. In this point of view, the Applicants added another solvent, NMP, which is not only mixable with DMF but also the less volatile (Vapor pressure: 0.5 mmHg at 25° C.) and also PET is soluble to NMP. Through many experiments, it was concluded that the appropriate ratio of these two solvents in PAN solution in this example is 6:4 (v/v). NMP solvent made electrospun fibers somewhat wet even after they arrived at the PET surface and residual NMP solvents contributed to allowing for good adhesion by increasing a total contact area between PAN electrospun fibers and PET paper. The adhesion between each nanofiber was also increased which can contribute to increase the total mechanical integrity of the membrane.

Electrospinning conditions also influenced adhesion. When the mid layer was above certain thickness, the mid layer delaminated naturally during the air drying after finishing electrospinning. This happened due to the shrinkage of mid layer with natural evaporation of organic solvents. When the thickness of the mid layer was small, the shrinkage of the mid layer was also small which was not enough to make membrane delaminate. If the thickness of the mid layer was too small, interfacial polymerization cannot be successfully done. The thickness of the mid layer was controlled by controlling total spinning volume. The speed of drum collector and flow rate also set to certain value to obtain the membrane with smooth surface and having good adhesion. Finally, the membrane was heated to 120° C. for a day. This process significantly increased the adhesion between mid-layer and PET paper which can due to re-melting process of PAN nanofibers.

3) Top Layer Characterization

The top layer of membrane can be important to membrane performances such as water flux and ion rejection. Different from typical interfacial polymerization, bulky hyperbranched PEI 25 k was used as a monomer in aqueous solution. The concentration of hyperbranched PEI 25 k can be at least 10 wt % for successful interfacial polymerization which means the covering up of the top part of PAN nanofibrous layer without cracks. This minimum concentration can be because there is a certain number of monomer molecules, depending on the area of pore size, which are needed at the interface to fully cover up each pore. To be successful in interfacial polymerization process without cracks, the pore size of nanofibrous mid layer has to be as small as possible. The concentration of TMC monomer in Toluene was set to 0.1 wt % which is typical. The toluene was used since solubility of PEI 25 k in Toluene is quite higher than any other organic solvents. The reaction time was set to 10 min. This is quite long reaction time compared to typical interfacial polymerization.

Figure 74:
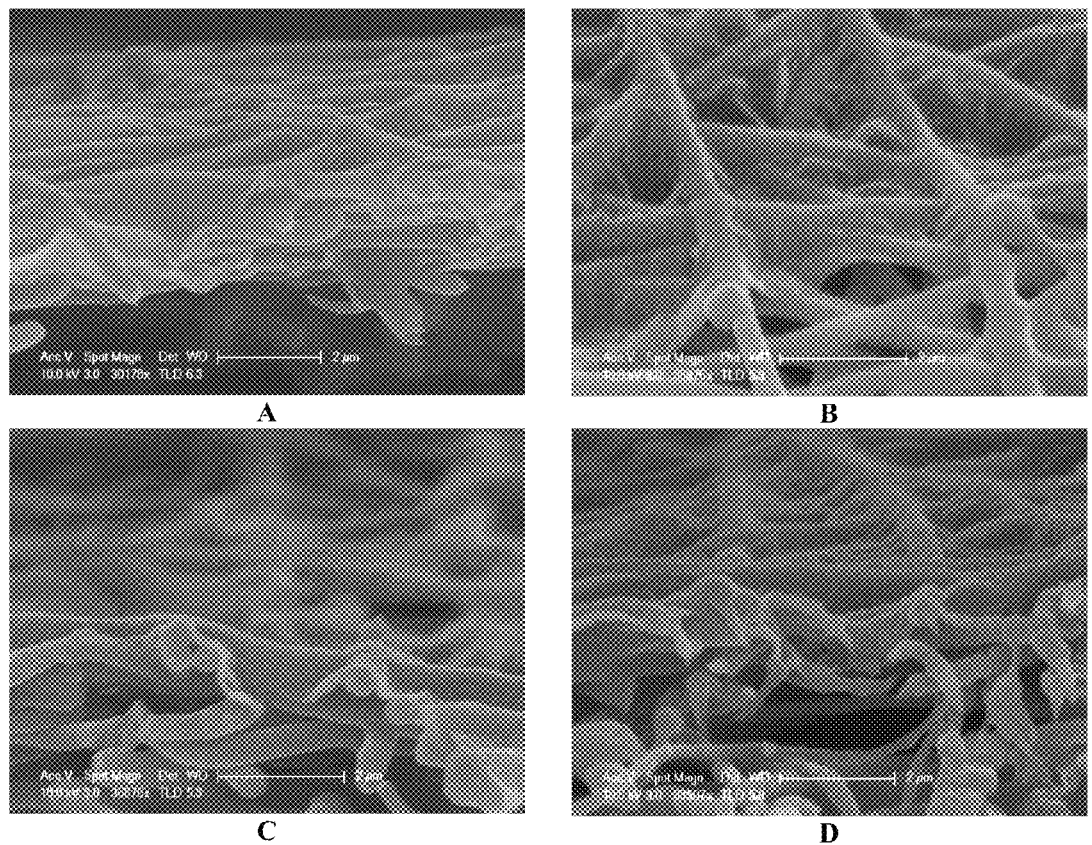
FIG. 74 shows SEM images of interfacial polymerized top PEI thin layers (Cross-section views) from an exemplary membrane as depicted in FIG. 70 according to an embodiment herein described. Panels A-D show images of a cross-linked PEI coating on a layer of PAN nano and microfibers.
Figure 75:
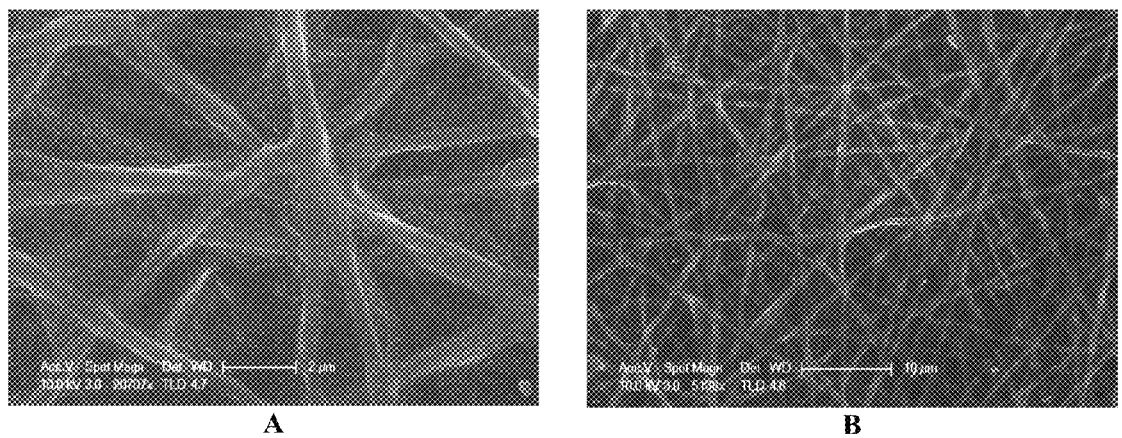
FIG. 75 shows SEM images of interfacial polymerized PEI thin layers from an exemplary membrane as depicted in FIG. 70. Panels A-B show, according to an embodiment herein described, show images a top view of a cross-linked PEI coating on a layer of PAN nano and microfibers.

In SEM images, clear evidence of top thin layer was formed onto nanofibrous mid layer can be seen. The thickness of PEI thin film seems less than 100 nm. The conditions of interfacial polymerization in FIG. 74 and FIG. 75 are PEI 5 wt %, TMC 0.1 wt %, reaction time 10 min.

Example 24

NFC-PAN-PEI Membrane Evaluation

The performance of the NFC-PAN-PEI membranes were evaluated using a custom-made cross-flow filtration equipment. The effective membrane area of this system was 24 cm². The membranes in this example were operated at 100 psi and an applied cross flow rate was 1.5 LPM. The feed solutions (NaCl, MgSO$_4$, Na$_2$SO$_4$, MgCl$_2$) in this example were prepared by dissolving each salt in distilled water with a concentration of 2000 ppm. NaCl (99.0%) was purchased from Sigma-Aldrich (USA) and MgSO$_4$ (99.0%), Na$_2$SO$_4$ (99.0%), MgCl$_2$ (98.0%) were purchased from Dae Jung Chemicals Co. Ltd (Korea).

The water permeability of each membrane was measured in LMH unit, based on the data of permeate water volume for certain time. The salt concentration in permeate solutions was measured by a conductivity measurement equipment (Eutech Instruments, CON 510). Based on the data of each concentration of permeate ($C_p$) and feed ($C_f$), the rejection (R) was calculated by the equation below $$R(\%) = \left[1 - \left(\frac{c_p}{c_f}\right)\right] \times 100.$$

Figure 76:
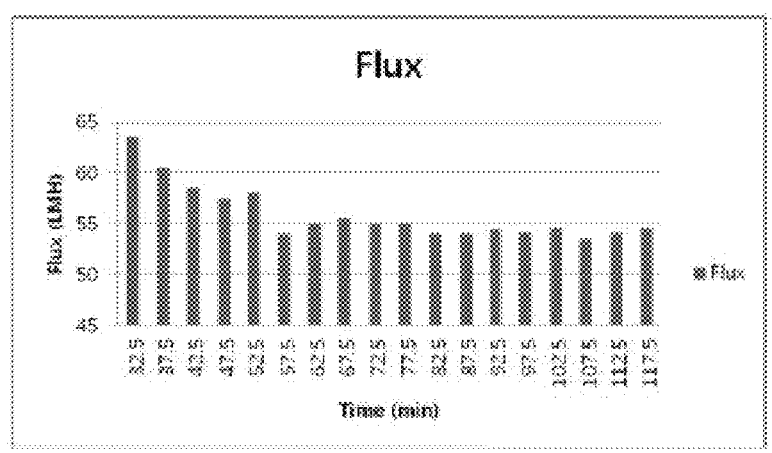
FIG. 76 shows a permeable flux of an exemplary membrane as depicted in FIG. 70 according to an embodiment herein described.
Figure 77:
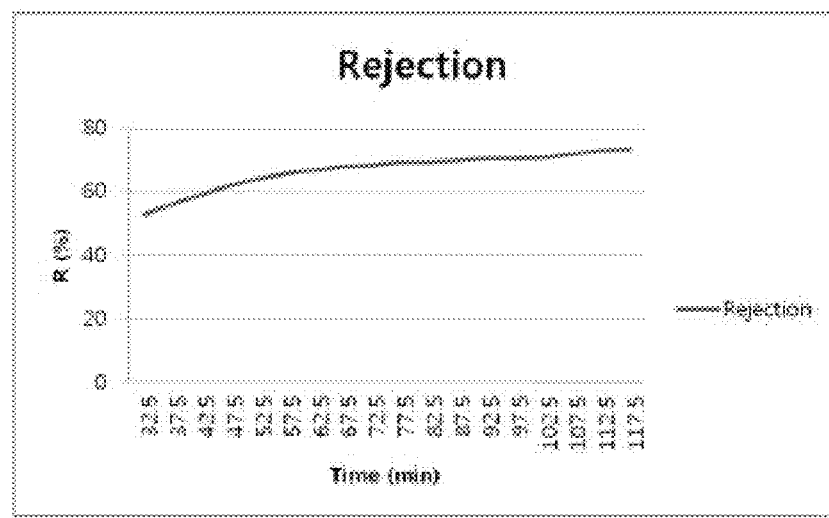
FIG. 77 shows a ion rejection trends of an exemplary membrane as depicted in FIG. 70 according to an embodiment herein described.

Permeability Characteristics of NFC-PAN-PEI Membranes:

Based on the results in this example, it was found that the water permeability reached at steady state after the 1 h filtration time which can be due to the membrane, particularly the active layer, being compacted by pressure. This compaction can increase the density of thin active layer which led to the decrease of the water flux. However, the compaction of active layer led to the increase of ion rejection FIG. 76 and FIG. 77 show a typical water permeability characteristic and a ion rejection trends with operating time in the HPEI-filtration membrane.

Interfacial Polymerization onto Nanofibrous Mid-Layer:

Typically interfacial polymerization is done onto UF level membranes which apparently has a much smaller pore size than electrospun nanofibrous mid-layer. In these examples, somewhat different monomers and the mid-layer (nanofibrous support) were applied, which made the conditions of interfacial polymerization for the PAN filtration membrane to be much different from typical conditions of interfacial polymerization for commercial RO or NF membranes. The conditions of interfacial polymerization were evaluated by water filtration test using MgSO$_4$ solution (500 ppm) in terms of ion rejection and water flux.

Morphology of PAN Mid-Layer:

Since the concentration of PAN spinning solution strongly affects the fiber diameter of PAN nanofibers, which determines the pore size of the PAN mid-layer, the performance of membranes were tested by using the membranes which fabricated by different spinning solutions.

(A) 10 wt % PAN solution: the chance of successful interfacial polymerization was inconsistent (at PEI 10 wt %). Ion rejection (MgSO$_4$) was limited to around 70%. (300-500 nm)

(B) 6 wt % PAN solution: the chance of successful interfacial polymerization was consistent (at PEI 10 wt %) Ion rejection (MgSO$_4$) can be increased to over 90%. (150-200 nm)

The limitation of ion rejection for the 10 wt % PAN membrane can be due to the uncovered pores (cracks) in the membrane. Also, the 10 wt % PAN membrane showed much higher water flux compared to the 6 wt % PAN membrane at same conditions due to same reason, the existence of uncovered pores.

Based on the difference of fiber diameter between 10 wt % PAN membrane and 6 wt % PAN membrane, the Applicants concluded that the nanofibrous membrane with smaller diameter is better for successful interfacial polymerization.

Concentration of PEI 25 k in Aqueous Solution:

Generally, 1 or 2 wt % of monomers (diamines) are dissolved in aqueous solution for interfacial polymerization. In this research, the Applicants observed no ion rejection when using below 10 wt % of PEI 25 k regardless of the reaction time and cross linker concentration. The reason of this phenomenon might be that there is minimum number of monomer molecules at the interface in the interfacial polymerization. Due to the difference of molecular weight between diamines and PEI 25 k, which is approximately 1:80, the Applicants need to dissolve 80 times more to meet the number of monomers at the interface by simple math. However, the molecular size of PEI 25 k is approximately 4-5 times larger (by radius assuming that PEI is spherical) so that the concentration can be increased around 10-20 wt % to meet the number of monomers. In this example, at least 10 wt % of PEI 25 k aqueous solution when 6 wt % PAN membrane was used. If the monomer is changed to one that has large molecular weight, the aqueous solution can be more concentrated then 10 wt %.

TABLE 11

| PAN Solution | PEI Conc. | TMC Conc. | Rxn Time | Performance (Flux, Ion rejection) (MgSO$_4$ 2000 ppm, pH 4, 100 psi) |
|---|---|---|---|---|
| 6 wt % | 10 wt % | 0.1 wt % | 10 min | 42 LMH, 90% |
| 6 wt % | 5 wt % | 0.1 wt % | 10 min | 77 LMH, 79% |

As shown in TABLE 11, the ion rejection of the membrane generally cannot reached 80% when 5 wt % PEI was used. Even with increased reaction time, the ion rejection of this membrane did not increase very much, largely only the flux was decreased.

Reaction Time:

Typical reaction time of interfacial polymerization in this example is finished in 1-2 min. Typical reaction time was 10 min to obtain maximum ion rejection. When the reaction time was decreased, the water flux was much increased; however the ion rejection was decreased.

TABLE 12

| PAN Solution | PEI Conc. | TMC Conc. | Rxn Time | Performance (Flux, Ion rejection) (MgSO$_4$ 2000 ppm, pH 4, 100 psi) |
|---|---|---|---|---|
| 6 wt % | 10 wt % | 0.1 wt % | 7.5 min | 60LMH, 77% |
| 6 wt % | 10 wt % | 0.1 wt % | 10 min | 40LMH, 90% |

The reaction time determines the thickness of the active layer. When the 10 min. reaction time, compared to 7.5 min reaction, the active layer was formed thicker which led to less water flux and better ion rejection.

Concentration of Cross-Linker (TMC):

The concentration of cross-linker in toluene was 0.1 wt %. The purpose was fabrication of a less cross-linked positive charged membrane using PEI 25 k, so the cross-linker was used as little as possible. When the monomers are diamine groups, which sizes are much smaller compared to PEI 25 k, there will be no left active sites of TMC unreacted after the interfacial polymerization of active layer if diamine molecules are enough. However, PEI 25 k molecules are quite larger and bulky, there is a high possibility to have unreacted active sites of TMC in active layer even if PEI 25 k molecules are enough during the interfacial polymerization reaction. Because of steric hindrances between PEI 25 k, all of the TMC molecules cannot contribute to make links each PEI 25 k molecule. These unreacted active sites of TMC, which are acyl groups, turned into carboxylic acid groups when they met water. The carboxylic acids are a possible source of negative charges at certain operating pH, the number of these left active sites need to be decreased as much as possible to make more positive charged membranes. Also, the amine groups in PEI 25 k, which are sources of positive charge, was not able to survive during the interfacial polymer reaction if there are a lot of TMC molecules at the reaction interface.

Without being limited to a particular hypothesis, it is thought that when high concentration of TMC was used in interfacial polymerization reaction, a lot of TMC molecules are attached to each PEI 25 k, which not only induce more dense physical structure but also decreased the number of amine groups, and unreacted active sites in each TMC will be converted to carboxylic acid groups having negative charges. On the contrary, when low concentration of TMC solution was used, the reaction rate was slow, however, a lot of amine groups in each PEI were saved and less cross-linked structure can be obtained. Also, the number of unreacted active sites of TMC can be decreased since there is not much TMC attached to single PEI 25 k molecule.

Ion Rejection Characteristics:

The ion rejection of a PAN filtration membrane was tested by using four different salts (NaCl, MgSO$_4$, Na$_2$SO$_4$, and MgCl$_2$). The feed solutions in this example were prepared by dissolving each salt in distilled water with a concentration of 2000 ppm. The membrane was made from 6 wt % PAN support and interfacial polymerized at 10 wt % PEI, 0.1 wt % TMC, and 10 min reaction time.

TABLE 13

| | Permeate Flux (LMH) | Ion Rejection (%) |
|---|---|---|
| MgCl$_2$ | 29 | 93 |
| MgSO$_4$ | 36 | 90 |
| NaCl | 35 | 75 |
| Na$_2$SO$_4$ | 34 | 60 |

The flux of permeate flow was around 30~35 LMH at 100 psi, which is similar to commercial NF membranes although the rejection of $MgSO_4$ (90%) was lower (97-99% rejection in commercial NF membranes). However, the rejection of NaCl (75%) was quite higher than commercial NF membranes (<50% rejection in commercial NF membranes). The value of permeate flux can be further increased by controlling reaction time. The record of permeate flux was 42 LMH at same rejection level (90% rejection for $MgSO_4$, 77% rejection for NaCl). The PAN filtration membrane showed good rejection not only for divalent ions but also for monovalent ions. Moreover, it is expected that the performance of the membranes, in terms of permeation flux, can be further increased by changing conditions of interfacial polymerization.

The order of the salt rejection was $MgCl_2 > MgSO_4 > NaCl > Na_2SO_4$, which showed typical rejection order of positively charged membranes with Donnan exclusion effects. For positively charged membranes, divalent cations ($Mg^{2+}$) is more strongly rejected than monovalent cations ($Na^+$) since both ions have similar mass but different amount of charge (2 times). Consequently, the ion rejections of magnesium based salt ($MgCl_2$, $MgSO_4$) solutions are larger than sodium based salt (NaCl, $Na_2SO_4$) solutions because divalent cations feel two times larger electrostatic repulsion forces than monovalent cations. Another important phenomenon behind this rejection order is an electro-neutrality condition. When cations are rejected from a positive charged membrane, some of the anions are also rejected to make an electro-neutrality condition. Between $MgCl_2$ and $MgSO_4$, $MgCl_2$ is expected to be rejected better since two chloride ions (in $MgCl_2$), other than one sulfate ions (in $MgSO_4$), are repelled when one magnesium ion is rejected. In the rejection order between NaCl and $Na_2SO_4$, NaCl is expected to be rejected better because of the same electro-neutrality principle.

There was no evidence about the effects of size exclusion among the various ion rejection mechanisms. If the size exclusion effect was one of the ion rejection mechanisms in this membrane, the ion rejection of $Na_2SO_4$, which has a large sulfate ion, is expected to be higher than or even similar to the ion rejection of NaCl.

In summary, in several embodiments a filtration membrane is described comprising polymeric membranes with embedded polymeric micro/nanoparticles and related methods and systems.

The examples set forth above are provided to give those of ordinary skill in the art a complete disclosure and description of how to make and use the embodiments polymeric membranes with embedded polymeric micro/nanoparticles and related methods and systems of the disclosure, and are not intended to limit the scope of what the Applicants regard as their disclosure. Modifications of the above-described modes for carrying out the disclosure can be used by persons of skill in the art, and are intended to be within the scope of the following claims.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations which is not specifically disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

In particular, it will be understood that various modifications may be made without departing from the spirit and scope of the present disclosure. Accordingly, other embodiments are within the scope of the following claims.

REFERENCES

1. Frechet, J., et al. "Extraction of anions from solutions and mixtures using hyperbranched macromolecules" US 2010/0181257 A1, Jul. 22, 2010
2. Liu, Y., et al., "PAMAM dendrimers undergo pH responsive conformational changes without swelling." *Journal of the American Chemical Society* 2009 131(8): 2798-2799.
3. Yu, C. J., et al. "Extraction of Anions from Water and Wastewater Using Functionalized Hyperbranched Macromolecules" U.S. 61/200,872, 4. Greenlee, L. F., et al., "Reverse osmosis desalination: water sources, technology, and today's challenges." *Water Res* 2009 43(9): 2317-2348.
5. Crittenden, J. C., et al., "MWH's Water Treatment: Principles and Design, 2nd Ed.". 2005, New Jersey: John Wiley & Sons.
6. Strathmann, H., et al., "An introduction to membrane science and technology". 2011: Wiley.
7. van Krevelen, D. W., et al., "Properties of Polymers: Their Correlation with Chemical Structure; their Numerical Estimation and Prediction from Additive Group Contributions". 2009: Elsevier Science.
"Polymer Solutions: Solvents and Solubility Parameters." [Accessed Jan. 25, 2012]; Available from: http://www.sigmaaldrich.com/etc/medialib/docs/Aldrich/General_Information/polymer_solutions.Par.0001.File.tmp/polymer_solutions.pdf.
9. Frechet, J. M., "Functional polymers and dendrimers: reactivity, molecular architecture, and interfacial energy." *Science* 1994 263(5154): 1710-1715.
10. Martell, A. E., et al., "Metal complexes in aqueous solutions". 1996: Plenum Press New York.
11. Fréchet, J. M. J., et al., "Dendrimers and other dendritic polymers". 2001: Wiley New York.
12. Tomalia, D. A., et al., "Dendrimers—an enabling synthetic science to controlled organic nanostructures", in *Handbook of Nanoscience, Engineering and Technology*, W. A. Goddard III., et al., Editors. 2007, CRC Press Boca Raton, Fla.: Boca Raton, Fla. p. 24.21-24.47.
13. "KAIST EEWS Initiative." [Accessed; Available from: http://eews.kaist.ac.kr/new/work/index.htm.
14. Diallo, M. S. "Water treatment by dendrimer enhanced filtration" U.S. Pat. No. 7,470,369, Dec. 30, 2008
15. Diallo, M. S., "Water Treatment by Dendrimer-Enhanced Filtration: Principles and Applications", in *Nanotechnology Applications for Clean Water*, N. Savage, et al., Editors. 2008, William Andrew Applied Science Publishers. p. 143-155.
16. Diallo, M. S., et al., "Dendritic chelating agents. 2. U(VI) binding to poly(amidoamine) and poly(propyleneimine) dendrimers in aqueous solutions." *Environ Sci Technol* 2008 42(5): 1572-1579.
17. Diallo, M. S., et al., "Dendritic anion hosts: perchlorate uptake by G5-NH2 poly(propyleneimine) dendrimer in water and model electrolyte solutions." *Environ Sci Technol* 2007 41(18): 6521-6527.
18. Diallo, M. S., et al., "Dendrimer enhanced ultrafiltration. 1. Recovery of Cu (II) from aqueous solutions using PAMAM dendrimers with ethylene diamine core and terminal NH2 groups." *Environmental science & technology* 2005 39(5): 1366-1377.
19. Diallo, M. S., et al., "Dendritic chelating agents. 1. Cu(II) binding to ethylene diamine core poly(amidoamine) dendrimers in aqueous solutions." *Langmuir* 2004 20(7): 2640-2651.
20. Maiti, P. K., et al., "Solvent quality changes the structure of G8 PAMAM dendrimer, a disagreement with some experimental interpretations." *The Journal of Physical Chemistry B* 2006 110(51): 25628-25632.
21. Maiti, P. K., et al., "Effect of solvent and pH on the structure of PAMAM dendrimers." *Macromolecules* 2005 38(3): 979-991.
22. Lin, S. T., et al., "Thermodynamic stability of Zimmerman self-assembled dendritic supramolecules from atomistic molecular dynamics simulations." *The Journal of Physical Chemistry B* 2004 108(28): 10041-10052.
23. Li, Y., et al., "Efficiency of various lattices from hard ball to soft ball: Theoretical study of thermodynamic properties of dendrimer liquid crystal from atomistic simulation." *Journal of the American Chemical Society* 2004 126(6): 1872-1885.
24. Ulbricht, M., "Advanced functional polymer membranes." *Polymer* 2006 47(7): 2217-2262.
25. Mészáros, R., et al., "Interaction of sodium dodecyl sulfate with polyethyleneimine: surfactant-induced polymer solution colloid dispersion transition." *Langmuir* 2003 19(3): 609-615.
26. Koper, G. J. M., et al., "Proton binding by linear, branched, and hyperbranched polyelectrolytes." *Polymer* 2010 51(24): 5649-5662.
27. Zhao, Y. H., et al., "Porous membranes modified by hyperbranched polymers: I. Preparation and characterization of PVDF membrane using hyperbranched polyglycerol as additive." *Journal of Membrane Science* 2007 290(1): 222-229.
28. Chiang, Y. C., et al., "Nanofiltration membranes synthesized from hyperbranched polyethyleneimine." *Journal of Membrane Science* 2009 326(1): 19-26.
29. Chen, D. P., et al., "Branched polymeric media: perchlorate-selective resins from hyperbranched polyethyleneimine." *Environ Sci Technol* 2012 46(19): 10718-10726.
30. Mishra, H., et al., "Branched polymeric media: boron-chelating resins from hyperbranched polyethylenimine." *Environ Sci Technol* 2012 46(16): 8998-9004.
31. Tao, M., et al., "Hydrophilic poly(vinylidene fluoride) (PVDF) membrane by in situ polymerisation of 2-hydroxyethyl methacrylate (HEMA) and micro-phase separation." *Journal of Materials Chemistry* 2012 22(18): 9131-9137.
32. Bormashenko, Y., et al., "Vibrational spectrum of PVDF and its interpretation." *Polymer Testing* 2004 23(7): 791-796.
33. Shim, Y., et al., "Effects of natural organic matter and ionic species on membrane surface charge." *Environ Sci Technol* 2002 36(17): 3864-3871.
34. Elimelech, M., et al., "The future of seawater desalination: energy, technology, and the environment" *Science* 2011 333(6043): 712-717.
35. Callow, J. A., et al., "Trends in the development of environmentally friendly fouling-resistant marine coatings." *Nat Commun* 2011 2: 244.
36. Shannon, M. A., et al., "Science and technology for water purification in the coming decades." *Nature* 2008 452(7185): 301-310.
37. Tiraferri, A., et al., "Highly hydrophilic thin-film composite forward osmosis membranes functionalized with surface-tailored nanoparticles." *ACS Appl Mater Interfaces* 2012 4(9): 5044-5053.
38. Park, S. J., et al., "Nanofiltration membranes based on polyvinylidene fluoride nanofibrous scaffolds and crosslinked polyethyleneimine networks." *Journal of Nanoparticle Research* 2012 14(7): 1-14.
39. Li, J. H., et al., "Fabrication and characterization of a novel $TiO_2$ nanoparticle self-assembly membrane with improved fouling resistance." *Journal of Membrane Science* 2009 326(2): 659-666.
40. Qiu, X., et al., "Selective separation of similarly sized proteins with tunable nanoporous block copolymer membranes." *ACS Nano* 2013 7(1): 768-776.
41. Jang, S. S., et al., "Structures and transport properties of hydrated water-soluble dendrimer-grafted polymer membranes for application to polymer electrolyte membrane 41. fuel cells: Classical molecular dynamics approach." *The Journal of Physical Chemistry C* 2007 111(6): 2759-2769.
42. Diallo, M., et al. "Extraction of Actinides from Mixtures and Ores Using Dendritic Macromolecules" WO 2009/045237, Apr. 9, 2009
43. *Polymer Factory* [Accessed Jan. 14, 2013]; Available from: www.polymerfactory.com/.
44. Frechet, J. O., CA, US), Boz, Emine (Los Angeles, Calif., US), Diallo, Mamadou (Pasadena, Calif., US), Chi, Yonggui (Singapore, SG) "Extraction Of Anions From Solutions And Mixtures Using Hyperbranched Macromolecules" 20100181257
45. Diallo, M. P., CA, US), Yu, Changjun (Pasadena, Calif., US) "Soluble Anion Exchangers From Hyperbranched Macromolecules" 20110315636
46. Ba, C., et al., "Chemical modification of P84 copolyimide membranes by polyethylenimine for nanofiltration." *J Memb Sci* 2009 327(1-2): 49-58.
47. Chiang, Y.-C., et al., "Nanofiltration membranes synthesized from hyperbranched polyethyleneimine." *Journal of Membrane Science* 2009 326(1): 19-26.
48. Choi, H., et al., "Preparation and characterization of antifouling poly(vinylidene fluoride) blended membranes." *Journal of Applied Polymer Science* 2012 123(1): 286-291.
49. Oh, S. J., et al., "Preparation and characterization of PVDF/TiO2 organic-inorganic composite membranes for fouling resistance improvement" *Journal of Membrane Science* 2009 345(1-2): 13-20.
50. Gopal, R., et al., "Electrospun nanofibrous filtration membrane." *Journal of Membrane Science* 2006 281(1-2): 581-586.
51. Strathmann, H., "Introduction to membrane science and technology". 2011, Weinheim, Germany: Wiley-VCH Verlag & Co.
52. Mansouri, J., et al., "Strategies for controlling biofouling in membrane filtration systems: challenges and opportunities." *Journal of Materials Chemistry* 2010 20(22): 4567-4586.
53. Ramakrishna, S., "An introduction to electrospinning and nanofibers". 2005: World Scientific Publishing Company Incorporated.
54. Yung, L., et al., "Fabrication of thin-film nanofibrous composite membranes by interfacial polymerization using ionic liquids as additives." *Journal of Membrane Science* 2010 365(1-2): 52-58.
55. Baker, R. W., "Ultrafiltration", in *Membrane Technology and Applications*. 2004, John Wiley & Sons, Ltd. p. 237-274.
56. Ji, Y. L., et al., "Preparation of novel positively charged copolymer membranes for nanofiltration." *Journal of Membrane Science* 2011 376(1-2): 254-265.
57. Elimelech, M., et al., "The Future of Seawater Desalination: Energy, Technology, and the Environment." *Science* 2011 333(6043): 712-717.
58. Schäfer, A. I., et al., "Nanofiltration: principles and applications". 2005: Elsevier Science Limited.
59. Cheng, S., et al., "Positively charged nanofiltration membranes: Review of current fabrication methods and introduction of a novel approach." *Advances in Colloid and Interface Science* 2011 164(1-2): 12-20.
60. Escoda, A. I., et al., "Determining the Dielectric Constant inside Pores of Nanofiltration Membranes from Membrane Potential Measurements." *Langmuir* 2010 26(18): 14628-14635.
61. Veríssimo, S., et al., "New composite hollow fiber membrane for nanofiltration." *Desalination* 2005 184(1-3): 1-11.
62. Pontié, M., et al., "Novel approach combining physicochemical characterizations and mass transfer modelling of nanofiltration and low pressure reverse osmosis membranes for brackish water desalination intensification." *Desalination* 2008 221(1-3): 174-191.
63. Tsuru, T., et al., "Negative rejection of anions in the loose reverse osmosis separation of mono- and divalent ion mixtures." *Desalination* 1991 81(1-3): 219-227.
64. Schaep, J., et al., "Influence of ion size and charge in nanofiltration." *Separation and Purification Technology* 1998 14(1-3): 155-162.
65. Tongwen, X., et al., "A novel positively charged composite membranes for nanofiltration prepared from poly(2,6-dimethyl-1,4-phenylene oxide) by in situ amines crosslinking." *Journal of Membrane Science* 2003 215(1-2): 25-32.
66. Du, R., et al., "Properties of poly(N,N-dimethylaminoethyl methacrylate)/polysulfone positively charged composite nanofiltration membrane." *Journal of Membrane Science* 2004 239(2): 183-188.
67. Huang, R., et al., "Preparation and characterization of composite NF membrane from a graft copolymer of trimethylallyl ammonium chloride onto chitosan by toluene diisocyanate cross-linking" *Desalination* 2009 239(1-3): 38-45.
68. Yan, C., et al., "Preparation and characterization of chloromethylated/quaternized poly(phthalazinone ether sulfone ketone) for positively charged nanofiltration membranes." *Journal of Applied Polymer Science* 2008 107(3): 1809-1816.
69. Zhou, Y., et al., "Surface modification of thin film composite polyamide membranes by electrostatic self deposition of polycations for improved fouling resistance." *Separation and Purification Technology* 2009 66(2): 287-294.
70. Ji, Y., et al., "Preparation of novel positively charged copolymer membranes for nanofiltration." *Journal of Membrane Science* 2011 376(1-2): 254-265.
71. Zhang, Q., et al., "Positively charged nanofiltration membrane based on cardo poly(arylene ether sulfone) with pendant tertiary amine groups." *Journal of Membrane Science* 2011 375(1-2): 191-197.

The invention claimed is:

1. A filtration membrane with embedded polymeric nanoparticles comprising:
   hyperbranched polymeric molecules covalently cross-linked to form polymeric nanoparticles embedded in a polymer matrix formed by a porous polymeric aggregate.

2. The filtration membrane of claim 1 wherein the porous polymeric aggregate is formed by a polymer according to Formula I:

wherein:
   Q, Y, and Z comprise saturated aliphatic hydrocarbon, aromatic hydrocarbon, or unsaturated aliphatic hydrocarbons;
   m, l, and k independently are integers ranging between 0-50;
   at least one of m, l, or k is not equal to zero;
   j is an integer ranging between 50-500; and
   wherein at least one of Q (when Q≠0), Y (when Y≠0), or Z (when Z≠0), comprises a polymer component functional group.

3. The filtration membrane according to claim 2, wherein Q, Y, and Z are independently selected from the group consisting of Formulas II-X

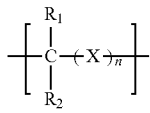 (II)

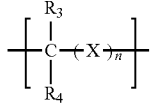 (III)

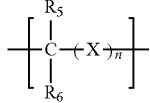 (IV)

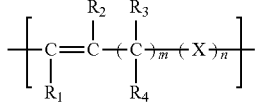 (V)

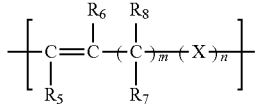 (VI)

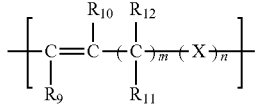 (VII)

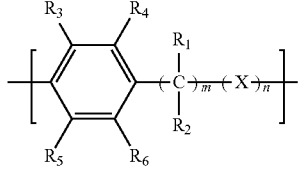 (VIII)

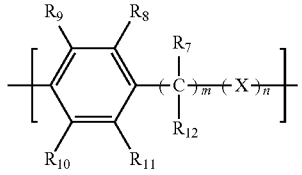 (IX)

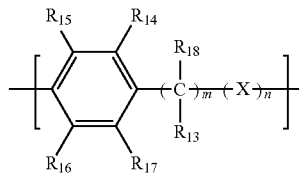 (X)

wherein:

n=0 or 1;

m is an integer ranging from 0-15; and

X is a functional group comprising an atom selected from O, S, N, P, or F; and $R_1$-$R_{18}$ are independently selected from: the polymer component functional group; hydrogen; $C_1$-$C_{20}$ linear, branched, saturated, unsaturated, or aryl hydrocarbon which are either substituted or unsubstituted with O, N, B, S, P; or substituted O, N, B, S, or P.

4. The filtration membrane according to claim 1, wherein the polymeric nanoparticles comprise covalently cross-linked dendritic polymer.

5. The filtration membrane according to claim 4, wherein the cross-linked dendritic polymer is a polyimine.

6. The filtration membrane according to claim 5, wherein the polyimine is poly(ethyleneimine).

7. The filtration membrane of claim 6, wherein the poly(ethyleneimine) has a degree of branching of about 65-70%.

8. The filtration membrane according to claim 4, wherein the cross-linked dendritic polymer is present in a concentration of greater than about 20 weight %.

9. The filtration membrane according to claim 4, wherein the cross-linked dendritic polymer is present in a concentration of greater than about 40 weight %.

10. The filtration membrane according to claim 1, wherein the polymeric nanoparticles further comprise cross-linked poly(methacrylic acid).

11. The filtration membrane of claim 1, wherein the polymeric nanoparticles are homogenously distributed in the polymer matrix.

12. The filtration membrane of claim 11, wherein the polymeric nanoparticles are in a concentration up to about 50% and/or wherein fractal formation of nanoparticle is not detectable.

* * * * *